US011856606B2

(12) United States Patent
Xia et al.

(10) Patent No.: US 11,856,606 B2
(45) Date of Patent: Dec. 26, 2023

(54) COORDINATED STATIONS IN OBSS WITH SHARED TXOP IN TIME DOMAIN

(71) Applicant: SONY GROUP CORPORATION, Tokyo (JP)

(72) Inventors: Qing Xia, San Jose, CA (US); Mohamed Abouelseoud, San Francisco, CA (US); Liangxiao Xin, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 188 days.

(21) Appl. No.: 17/390,948

(22) Filed: Jul. 31, 2021

(65) Prior Publication Data
US 2022/0174691 A1 Jun. 2, 2022

Related U.S. Application Data

(60) Provisional application No. 63/119,851, filed on Dec. 1, 2020.

(51) Int. Cl.
*H04W 4/00* (2018.01)
*H04W 74/08* (2009.01)
*H04W 72/0446* (2023.01)
*H04W 72/1263* (2023.01)
*H04W 84/12* (2009.01)

(52) U.S. Cl.
CPC ... *H04W 74/0816* (2013.01); *H04W 72/0446* (2013.01); *H04W 72/1263* (2013.01); *H04W 84/12* (2013.01)

(58) Field of Classification Search
CPC ......... H04W 74/0816; H04W 72/0446; H04W 72/1263; H04W 84/12
See application file for complete search history.

(56) References Cited

U.S. PATENT DOCUMENTS

| 9,419,752 | B2 | 8/2016 | Zhu | |
|---|---|---|---|---|
| 10,492,223 | B2 * | 11/2019 | Lee | ............... H04W 74/0816 |
| 10,548,166 | B2 * | 1/2020 | Wang | ............... H04W 56/0005 |
| 10,897,737 | B2 * | 1/2021 | Kim | ............... H04W 52/0219 |
| 11,564,257 | B2 * | 1/2023 | Xia | ............... H04W 12/06 |
| 11,595,994 | B2 * | 2/2023 | Han | ............... H04W 74/0808 |
| 2014/0269544 | A1 | 9/2014 | Zhu | |

(Continued)

FOREIGN PATENT DOCUMENTS

| EP | 2706802 | 3/2014 |
|---|---|---|
| EP | 3030027 | 6/2016 |

*Primary Examiner* — Abdelnabi O Musa
(74) *Attorney, Agent, or Firm* — O'BANION & RITCHEY LLP; John P. O'Banion

(57) ABSTRACT

A wireless local area network (WLAN) protocol allowing a Transmit Opportunity (TXOP) holder to share the TXOP with other stations (STAs) residing in either the same Basic Service Set (BSS) of the TXOP holder, or in an other BSS (OBSS). An intent to share the TXOP is communicated to the Access Point (AP), and/or directly to other STAs. Scheduling information (time and duration) are shared with the STAs either directly, or through one or more APs. When the TXOP occurs, the STAs can access the channel at the time and for the duration specified, thus providing increased use of the TXOP to improve efficiency.

14 Claims, 79 Drawing Sheets

(56) References Cited

U.S. PATENT DOCUMENTS

| | | | |
|---|---|---|---|
| 2016/0066198 A1* | 3/2016 | Wang | H04B 7/0617 |
| | | | 370/338 |
| 2019/0029037 A1 | 1/2019 | Wang | |
| 2020/0245352 A1* | 7/2020 | Seok | H04W 52/367 |
| 2021/0127307 A1* | 4/2021 | Huang | H04W 16/18 |
| 2021/0410149 A1* | 12/2021 | Xia | H04L 1/188 |
| 2021/0410163 A1* | 12/2021 | Xia | H04W 74/002 |
| 2022/0174691 A1* | 6/2022 | Xia | H04W 74/0816 |
| 2022/0174732 A1* | 6/2022 | Xia | H04L 5/0037 |
| 2022/0201591 A1* | 6/2022 | Xin | H04W 72/20 |
| 2023/0081745 A1* | 3/2023 | Xin | H04W 74/0816 |

\* cited by examiner

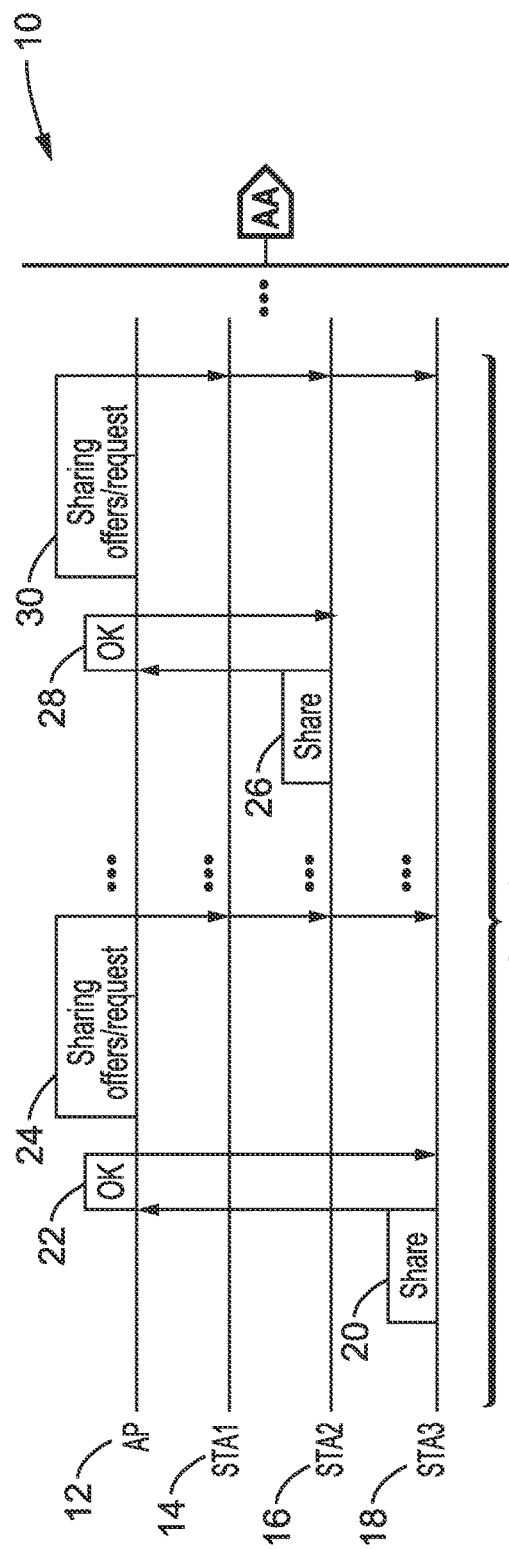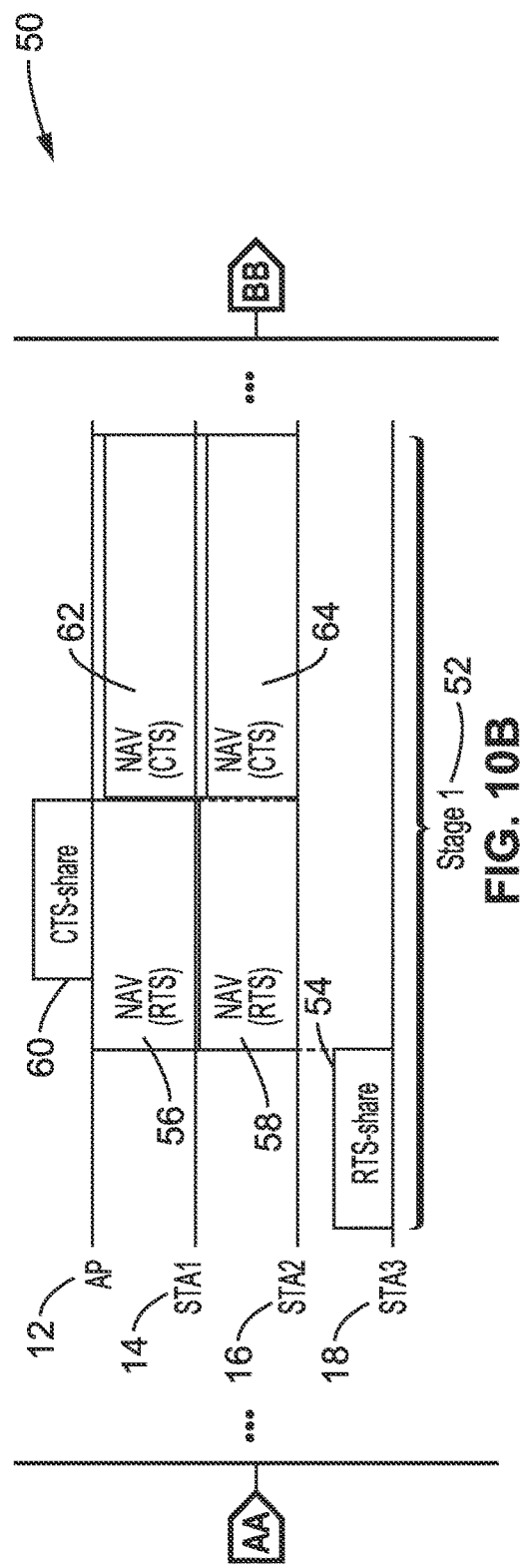
FIG. 10A
FIG. 10B

| Element ID | Length | STA Info 1 | ... | STA Info n |
|---|---|---|---|---|
| 1 | 1 | 2 | ... | 2 |

Octets:

FIG. 54  ← 1750

| AID | TXOP share holder | TXOP share participant | Reserved |
|---|---|---|---|
| B0 B7 | B8 | B9 | B10 B15 |
| 8 | 1 | 1 | 6 |

Bits:

FIG. 55  ← 1770

| Element ID | Length | Allocation Control 1 | Allocation Control 2 | ... | Allocation Control n |
|---|---|---|---|---|---|
| 1 | 1 | 10 | 10 | ... | 10 |

Octets:

FIG. 56  ← 1790

| Allocation Control | Source AID | Destination AID | Random Access Counter | Allocation Start | Allocation block duration |
|---|---|---|---|---|---|
| 1 | 1 | 1 | 1 | 4 | 2 |

Octets:

| TID | Allocation Type | Reserved |
|---|---|---|
| B0 B3 | B4 B5 | B6 B7 |

Bits: 4 | 2 | 2

| Frame Control | Duration | RA | TA | BSS ID | STA Share Offer/Request 1 | ... | STA Share/Request n | FCS |
|---|---|---|---|---|---|---|---|---|

Octets: 2 | 2 | 6 | 6 | 6 | 4 | ... | 4 | 4

| Priority | STA AID | TXOP Share Request | TXOP Resource Request | TXOP Share Offered | TXOP Resource Offered | Reserved |
|---|---|---|---|---|---|---|
| B0 B3 | B4 B11 | B12 | B13 B18 | B19 | B20 B25 | B26 B31 |

Bits: 4 | 8 | 1 | 6 | 1 | 6 | 6

| ACI Bitmap | Delta TID | ACI High | Scaling Factor | Queue Size High | Queue Size All | Reserved |
|---|---|---|---|---|---|---|
| B0　B3 | B4　B5 | B6　B7 | B8　B9 | B10　B17 | B18　B25 | B26　B31 |

Bits: 4　2　2　2　8　8　6

| Frame Control | Duration | RA | TA | BSSID | TXOP Access Allocation Info | FCS |
|---|---|---|---|---|---|---|

Octets: 2　2　6　6　6　3　4

| TID | Allocation Type | Source AID | Destination AID |
|---|---|---|---|
| B0　B3 | B4　B5 | B6　B13 | B14　B2 |

Octets: 4　2　2　8　8

FIG. 68

| Frame Control | Duration | BSSID | RA | TA | STA TXOP Schedule 1 | ... | STA TXOP Schedule n | FCS |
|---|---|---|---|---|---|---|---|---|
| 2 | 2 | 6 | 6 | 6 | 9 | ... | 9 | 4 |

Octets:

| Allocation Control | Source AID | Destination AID | Allocation Start | Allocation block duration |
|---|---|---|---|---|
| 1 | 1 | 1 | 4 | 2 |

Octets:

| TID | Allocation Type | Reserved |
|---|---|---|
| B0 B3 | B4 B5 | B6 B7 |
| 4 | 2 | 2 |

Bits:

| Frame Control | Duration | RA | TA | STA TXOP participant 1 | ... | STA TXOP Participant n | FCS |
|---|---|---|---|---|---|---|---|
| 2 | 2 | 6 | 6 | 6 | ... | 6 | 4 |

Octets:

| Source AID | Destination AID | ACI Bitmap | Delta TID | ACI High | Scaling Factor | Queue Size High | Queue Size All | Reserved |
|---|---|---|---|---|---|---|---|---|
| B0–B7 | B8–B15 | B16–B19 | B20–B21 | B22–B23 | B24–B25 | B26–B33 | B34–B41 | B42–B47 |
| Bits: 8 | 8 | 4 | 2 | 2 | 2 | 8 | 8 | 6 |

FIG. 73 — 2130

| Frame Control | Duration /ID | RA | TA | TX Duration | FCS |
|---|---|---|---|---|---|
| Octets: 2 | 2 | 6 | 6 | 2 | 4 |

FIG. 74 — 2150

| Frame Control | Duration | RA | TA | BSSID | STA TXOP Access Request 1 | ... | STA TXOP Access Request n | FCS |
|---|---|---|---|---|---|---|---|---|
| Octets: 2 | 2 | 6 | 6 | 6 | 9 | ... | 9 | 4 |

FIG. 75

| Allocation Control | Source AID | Destination AID | Allocation Start | Allocation block duration |
|---|---|---|---|---|

Octets: 1 | 1 | 1 | 4 | 2

| TID | Allocation Type | Reserved |
|---|---|---|
| B0 B3 | B4 B5 | B6 B7 |

Bits: 4 | 2 | 2

| Frame Control | Duration | RA | TA | Share offer/request info | FCS |
|---|---|---|---|---|---|

Octets: 2 | 2 | 6 | 6 | 5 | 4

| Priority | TXOP Share Request | TXOP Duration Request | TXOP Share Offered | TX Duration Offered | Reserved |
|---|---|---|---|---|---|
| B0 – B3 | B4 | B5 – B20 | B21 | B22 – B37 | B38 – B39 |
| Bits: 4 | 1 | 16 | 1 | 16 | 2 |

FIG. 79 (2250)

| Frame Control | Duration | RA | TA | STA Share Offer/Request 1 | ... | STA Share/Request n | FCS |
|---|---|---|---|---|---|---|---|
| Octets: 2 | 2 | 6 | 6 | 7 | ... | 7 | 4 |

FIG. 80 (2270)

| Priority | STA Address | STA AID | TXOP Share Request | TXOP Duration Request | TXOP Share Offered | TX Duration Offered | Reserved |
|---|---|---|---|---|---|---|---|
| B0 – B3 | B4 – B11 | B12 – B19 | B20 | B21 – B36 | B37 | B38 – B53 | B54 – B55 |
| Bits: 4 | 8 | 8 | 1 | 16 | 1 | 16 | 2 |

FIG. 81 — 2290

| Frame Control | Duration | RA | TA | STA Share Offer/Request 1 | ... | STA Share/Request n | FCS |
|---|---|---|---|---|---|---|---|
| 2 | 2 | 6 | 6 | 4 | ... | 4 | 4 |

Octets:

FIG. 82 — 2310

| Frame Control | Duration | RA | TA | TXOP share offered | STA TXOP Access Allocation 1 | ... | STA TXOP Access Allocation n | FCS |
|---|---|---|---|---|---|---|---|---|
| 2 | 2 | 6 | 6 | 2 | 9 | ... | 9 | 4 |

Octets:

FIG. 83 — 2330

| Allocation Control | STA Address | Participant Address | Allocation Start | Allocation block duration |
|---|---|---|---|---|
| 1 | 1 | 1 | 4 | 2 |

Octets:

| Frame Control | Duration | RA | TA | BSSID | STA1 Configuration | STA2 Configuration | ... | STAn Configuration | FCS |
|---|---|---|---|---|---|---|---|---|---|
| 2 | 2 | 6 | 6 | 6 | 6n | 6n | ... | 6n | 4 |

Octets:

FIG. 87

| Frame Control | Duration | RA | TA | TXOP Holder | FCS |
|---|---|---|---|---|---|
| 2 | 2 | 6 | 6 | 6 | 4 |

Octets:

FIG. 88

COORDINATED STATIONS IN OBSS WITH SHARED TXOP IN TIME DOMAIN

This application claims priority to, and the benefit of, U.S. provisional patent application Ser. No. 63/119,851 filed on Dec. 1, 2020, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless communication networks, and more particularly to multiple-user transmissions in which a STA obtaining the Transmit Opportunity (TXOP) shares it with other stations in either a single Basic Service Set (BSS) or an Other Basic Service Set (OBSS).

2. Background Discussion

The use of Wi-Fi networks continues to grow at a very rapid pace. This growth is spurred by the fast development of novel applications and the increasing amount of smart-devices in the market which require access to the internet through Wi-Fi networks. With the growing number and the increasing demand of Wi-Fi users, there is significant impetus to achieve increased throughput, lower latency and higher efficiency.

Some applications, for example real time gaming, are very sensitive to delay, and thus have higher requirements for low latency in order to provide an enjoyable user experience, such as by supporting real time interaction between different game players.

However, the current 802.11 technique initiates the uplink (UL) multi-user (MU) transmission at the AP level. This means, that if non-AP STAs need to send UL Data to the AP they cannot simply start the transmission even though they sense that the channel is free (not busy). The non-AP STAs are required to wait until they receive a trigger frame from the associated AP to start a UL Data transmission.

In addition, a Basic Service Sets (BSS) may be in close proximity to an Overlapping BSS (OBSS), such that simultaneous communication over the BSS and the OBSS can lead to interference, channel contention and packet losses.

Thus, the approaches utilized in current WLAN protocols are unable to provide levels of performance which are increasingly in demand, while they also rely on the AP to intermediate sharing, and are limited to operating within their own Basic Service Set (BSS).

Accordingly, a need exists for increasing the performance of WLAN communications, including TXOP transmission sharing within a BSS and/or OBSS, and enhanced real time communications support. The present disclosure fulfills these needs and provides additional benefits over previous technologies.

BRIEF SUMMARY

An enhanced apparatus, method and/or wireless communications protocol for wirelessly communicating over at least one channel with other wireless stations (STAs), which are either APs or non-AP STAs, on a local area network (WLAN) in its reception area, for sharing a Transmit Opportunity (TXOP) with STAs in the same Basic Service Set (BSS), or an Overlapping Basic Service Set (OBSS). Upon an AP or non-AP STA gaining access to the channel, and becoming the TXOP holder STA, it can determine to share the channel by providing information about the TXOP and determining which APs or non-AP STAs want to participate in sharing the TXOP. The TXOP holder (AP or non-AP) station in the present disclosure is configured by the protocol for communicating directly or indirectly with APs or non-AP STAs. The information is collected and participants given information on how to access the channel within the TXOP duration, such as given a specific slot and time period within the TXOP. The participating STAs, from one or more BSS, can thus share the TXOP obtained by the TXOP holder STA. The sharing may be performed in either a semi-static or dynamic manner.

The protocol allows non-AP STAs to autonomously share and schedule TXOP access with other STAs when they have obtained the channel; instead of waiting for scheduling and assignment from the AP. And instead of just sharing the TXOP with other non-AP STAs in the same BSS, the present disclosure also allows sharing the TXOP with other STAs of an OBSS.

Thus, the disclosed apparatus, method and communications protocol aids with: increasing channel utilization efficiency; reducing latency of channel contention; and reducing OBSS interference caused by channel contention from the OBSS.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 10A through FIG. 10D is a communication sequence diagram of a dynamic scenario of shared TXOP in the time domain, without AP as coordinator, according to at least one embodiment of the present disclosure.

FIG. 54 is a data field diagram of a STA TXOP shareability element format according to at least one embodiment of the present disclosure.

FIG. 55 is a data field diagram of a STA Information field format from FIG. 54, according to at least one embodiment of the present disclosure.

FIG. 56 is a data field diagram of an Access request information element format according to at least one embodiment of the present disclosure.

FIG. 57 is a data field diagram of Allocation Control field according to at least one embodiment of the present disclosure.

FIG. 58 is a data field diagram of Allocation Control subfield according to at least one embodiment of the present disclosure.

FIG. 59 is a data field diagram of Sharing offer/request frame format according to at least one embodiment of the present disclosure.

FIG. 60 is a data field diagram of Sharing offer/request info field format according to at least one embodiment of the present disclosure.

FIG. 65 is a data field diagram of Access priority subfield format according to at least one embodiment of the present disclosure.

FIG. 66 is a data field diagram of TXOP access scheduler frame format according to at least one embodiment of the present disclosure.

FIG. 67 is a data field diagram of an Access Allocation Info subfield as was seen in FIG. 66, according to at least one embodiment of the present disclosure.

FIG. 68 is a data field diagram of a Broadcast TXOP schedule frame format according to at least one embodiment of the present disclosure.

FIG. 69 is a data field diagram of Broadcast TXOP Schedule field format according to at least one embodiment of the present disclosure.

FIG. 70 is a data field diagram of Allocation Control subfield format according to at least one embodiment of the present disclosure.

FIG. 71 is a data field diagram of Shared TXOP participant announcement frame format according to at least one embodiment of the present disclosure.

FIG. 72 is a data field diagram of a Shared TXOP participant field format according to at least one embodiment of the present disclosure.

FIG. 73 is a data field diagram of a Request TXOP offer frame format according to at least one embodiment of the present disclosure.

FIG. 74 is a data field diagram of a Request TXOP Access Scheduler frame format according to at least one embodiment of the present disclosure.

FIG. 75 is a data field diagram of a STA TXOP Access Request field format according to at least one embodiment of the present disclosure.

FIG. 76 is a data field diagram of an Allocation Control subfield format according to at least one embodiment of the present disclosure.

FIG. 77 is a data field diagram of a Share Offer/Request frame format according to at least one embodiment of the present disclosure.

FIG. 78 is a data field diagram of a Share Offer/Request Info frame format according to at least one embodiment of the present disclosure.

FIG. 79 is a data field diagram of a Sharing Offers/Request frame format according to at least one embodiment of the present disclosure.

FIG. 80 is a data field diagram of a STA Share offer/request info field format according to at least one embodiment of the present disclosure.

FIG. 81 is a data field diagram of an OBSS Sharing STAs Frame according to at least one embodiment of the present disclosure.

FIG. 82 is a data field diagram of Sharing Configuration frame format according to at least one embodiment of the present disclosure.

FIG. 83 is a data field diagram of a STA TXOP Access Allocation field format according to at least one embodiment of the present disclosure.

FIG. 87 is a data field diagram of an OBSS TXOP access configurations frame format according to at least one embodiment of the present disclosure.

FIG. 88 is a data field diagram of a CTS-OBSS-share frame according to at least one embodiment of the present disclosure.

DETAILED DESCRIPTION

1. Introduction

Figure 1:
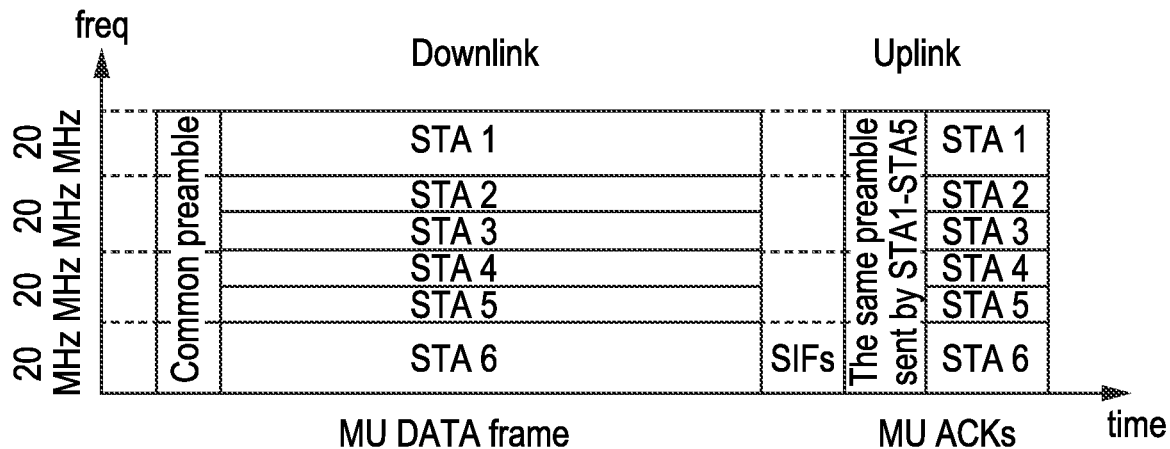
FIG. 1 is a slotted transmission diagram for an MU Data frame in a DownLink (DL) Orthogonal Frequency Division Multiple Access (OFDMA) Multiple Input Multiple Output (MIMO) transmission.

Numerous protocol amendments have been introduced for improving the performance of 802.11 WLANs, and specifically systems which communicate over the 2.4 GHz and 5 GHz bands. The majority of these techniques target data rate improvements from the perspective of the PHYsical (PHY) layer, such as increasing bandwidth from 20 MHz to 160 MHz, proposing new modulation and coding schemes and improving MIMO system operation.

Other MAC layer improvements have been introduced to reduce transmission overhead and hence increase data throughput. This can be accomplished for example by reducing the interframe spacing, aggregating and segmenting packets, and applying power consumption protocols to alternate between an awake state and a doze (sleep) state for STAs to save their power consumption.

IEEE 802.11ax introduced a technique of Orthogonal Frequency Division Multiple Access (OFDMA), where adjacent subcarriers are grouped into resource units (RUs). By assigning RUs for Multi-users (MU) up link (UL) and down link (DL) DATA transmission, the technique maximizes transmission rate.

Orthogonal Frequency Division Multiple Access (OFDMA) allows many users to use the same time resources at the same time and splits the frequency domain among them. This results in improved use of channel resources and allows latency reduction since more users can be scheduled at the same time.

2.1. WLAN Features Affecting Delay 2.1.1. Channel Access and Delay Tolerance

Both contention-based and contention-free accesses are allowed in WLAN devices. The contention based access requires the device to sense the channel and contend for a busy channel in order to gain access. This mechanism introduces additional transmission delays which were necessary for providing collision avoidance. Contention-free channel access allows the AP to gain access to the channel without contention. This is allowed in the Hybrid Controlled Channel Access where channel access coordination is accomplished by using a shorter inter-frame spacing equal to PIFs (PCF Inter-Frame spacing) compared to the DIFS (Distributed Inter-Frame spacing) used by other STAs. Although contention free access appears to be a good solution to avoid contention delay, it is not widely deployed and the majority of Wi-Fi devices are using contention based access.

For a STA to access the channel it is required to sense the channel and find that it is not busy prior to obtaining and utilizing the channel. This channel is considered busy when: (a) the STA detects a preamble of a frame, wherein the channel is considered busy for the length of the detected frame; (b) the STA detects in-band energy at more than 20 dB of the minimum sensitivity; or (c) the STA detects that the channel is virtually busy by reading the NAV of a detected frame.

802.11ax introduced two NAVs to avoid collisions that might arise by faulty resetting of the NAV timer. It will be appreciated that one Network Allocation Vector (NAV) is for the BSS STAs and the other NAV is for the non-BSS STAs. The STA maintains the two NAVs separately.

802.11ax uses Carrier Sense Multiple Access/Collision Avoidance (CSMA/CA) for channel access for all legacy 802.11 WLAN devices. Accordingly, for an AP to send a trigger frame for an UpLink Multiple-Input Multiple-Output (UL MIMO) transmission it still needs to contend for channel access. In order to enable the AP to win (obtain) channel access over any STA in its BSS, 802.11ax introduced a second set of Enhanced Distributed Channel Access (EDCA) for 802.11ax devices only, which allows legacy non 802.11ax devices to access the channel freely with EDCA and increase the chance of the AP gaining access to the channel in order to schedule UpLink (UL) or DownLink (DL) OFDMA MIMO data transmission.

2.1.2. Multi-User Transmission and Reception 802.11 WLAN devices allow the use of a MIMO antenna for transmission and reception as well as for OFDMA channel access. IEEE 802.11ax supports multi-user transmission in both uplink and downlink directions.

MIMO allows multi-stream transmission to one or more users through up to 8 streams for example in SU-MIMO DL in 802.11ac or through multi-user transmission to more than one user through MU-MIMO DL transmission as defined in 802.11ac. This allows the AP to assign one or more streams to STAs in its BSS.

With the use of wide channels for data transmission, up to 160 MHz, the channel is expected to be interference frequency selective where some frequencies experience different interference levels than others. This affects the expected achievable rate and degrades the performance. To solve this problem 802.11ax introduced OFDMA where adjacent subcarriers are grouped into resource units (RUs). These RUs can be assigned to different receivers to maximize transmission rates. This scheduling can result in maximizing the Signal to Interference and Noise Ratio (SINR) for each receiver and hence allows selecting a higher Modulation and Coding Scheme (MCS) and therefore increases achieved throughput.

OFDMA allows many users to utilize the same time resources at the same time and split the frequency domain among them. The result is an improved use of resources and allows latency reduction since more users can be scheduled at the same time. This also allows STAs needing to communicate small amounts of data to occupy narrow RUs making scheduling very efficient and providing improved distribution of resources among applications that require access to the channel, while reducing channel access time and the overhead of frame headers and preambles.

OFDMA can be more efficient when it is combined with MIMO transmission. An RU can be used to send multiple spatial streams to a STA depending on the MIMO capacities of the STAs. Also, one RU can be assigned for more than one STA to share, where each can have one or more spatial streams depending on the MIMO capacities of the STAs. Packing more STAs in the same resource also reduces latency for the STAs and APs.

FIG. 1 shows an example of DL OFDMA MIMO transmission. The AP is sending a PHY preamble to all STAs to specify the frequency/RUs mapping and RUs assignment for STAs. Following the preamble, the AP sends DL DATA to the specific STA (e.g., STA 1 through STA 6) using the RU assignment for this STA. The Multi-user ACK transmission should be synchronized to the reception of the DL DATA frame where STAs start transmission of a SIFS after reception of the DL trigger frame.

Figure 2:
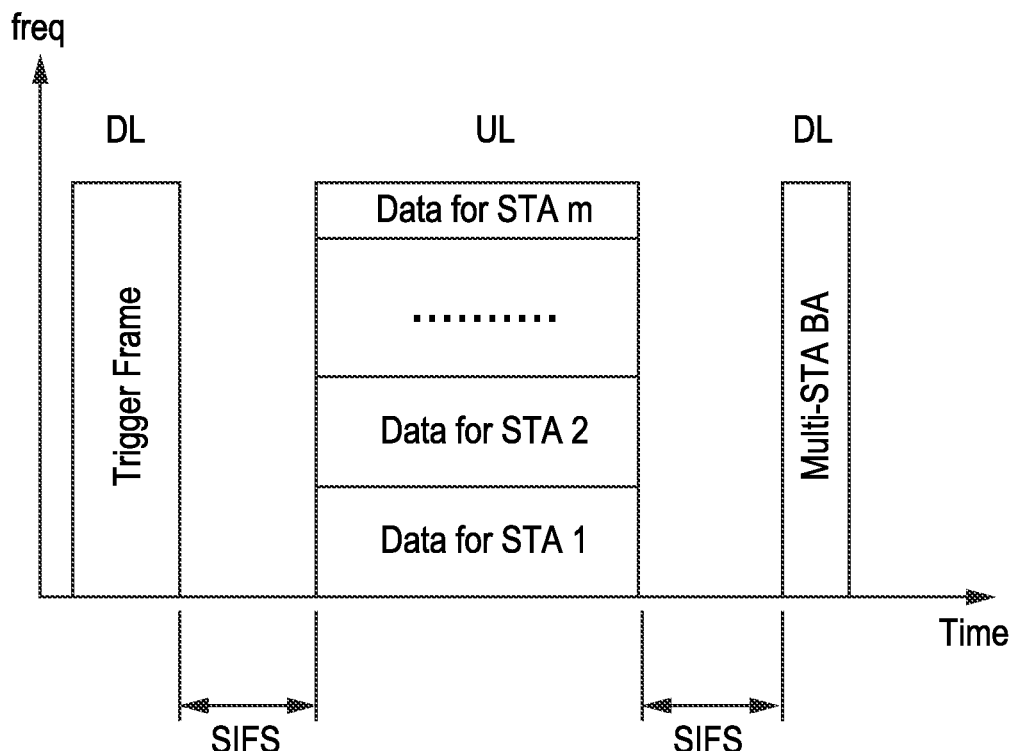
FIG. 2 is a slotted transmission diagram of an UpLink (UL) Orthogonal Frequency Division Multiple Access (OFDMA) Multiple Input Multiple Output (MIMO).

FIG. 2 shows an example of a UL OFDMA MIMO transmission. The AP is sending a trigger frame to all STAs containing the frequency and/or RU mapping and RU assignments for the STAs. The UL MIMO transmission is preferably synchronized to the reception of that frame where STAs start transmission with a SIFS after the reception of the DL trigger frame.

2.1.3. Retransmission

Figure 3:
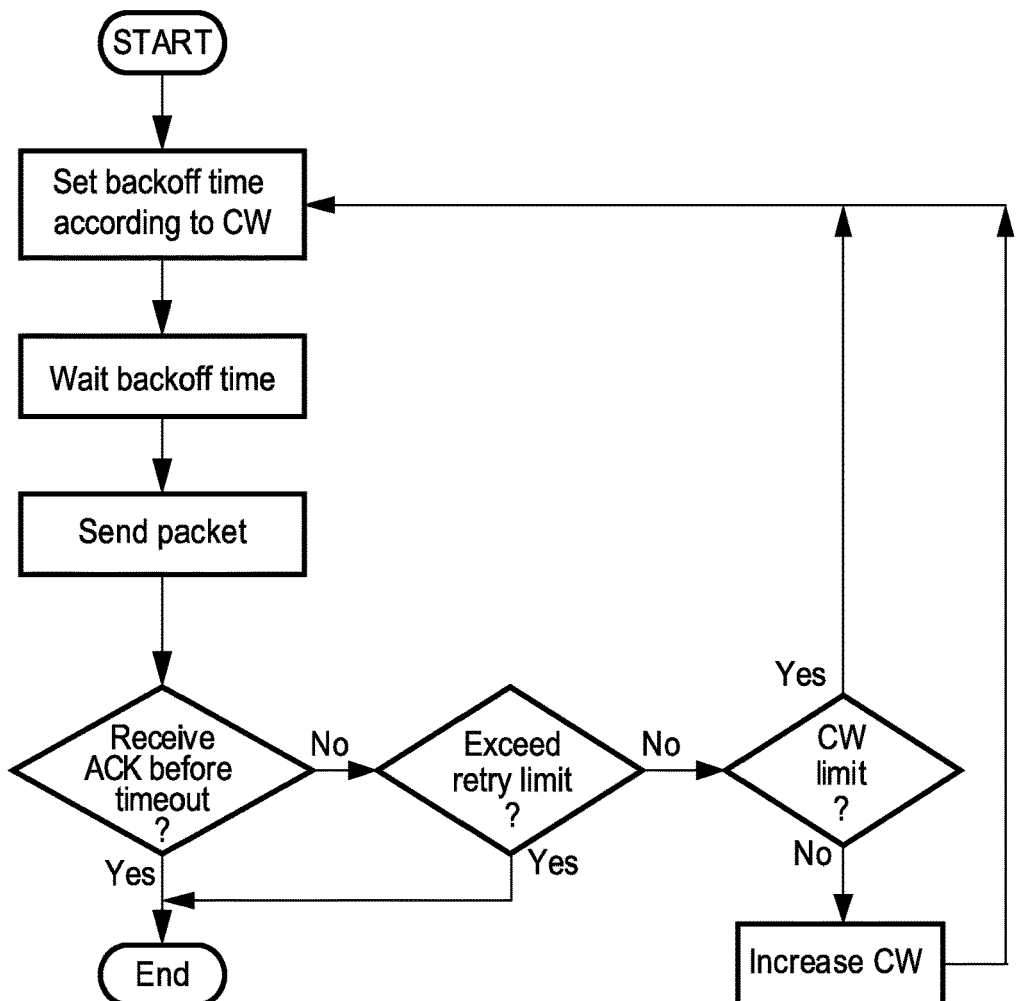
FIG. 3 is a flow diagram of a conventional retransmission scheme in Carrier Sense Multiple Access/Collision Avoidance (CSMA/CA) mechanism.

FIG. 3 illustrates the retransmission scheme in Carrier Sense Multiple Access/Collision Avoidance (CSMA/CA). WLAN systems of IEEE 802.11 use CSMA/CA to allow STAs to have access to the channel for packet transmission and retransmission. In CSMA/CA systems, before each transmission and retransmission, the STA is required to sense the channel state, and if it does not appear busy, then it sets a backoff time to contend for channel access. The backoff time is determined (decided) by a uniform random variable between zero and the size of contention window. After the STA waits for the backoff time and senses that the channel is idle, the STA sends a packet. The retransmission is required if the STA does not receive an ACK before timeout. Otherwise, the transmission succeeds.

When retransmission is required, the STA checks the number of retransmissions of the packet. If the number of retransmissions exceeds the retry limit, then the packet is dropped and no retransmissions are scheduled. Otherwise, the retransmission is scheduled. If the retransmission is scheduled, then another back off time is needed to contend for channel access for the retransmission. If the size of the contention window has not reached its upper limit, then the STA increases it. The STA sets another back off time depending on the new size of the contention window. The STA waits the back off time for retransmission.

Figure 4:
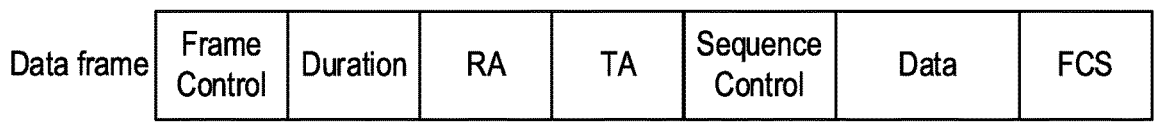
FIG. 4 is a data field diagram of a packet frame format for carrying Data in a regular WLAN system.

FIG. 4 illustrates the DATA frame format in the regular WLAN system. A Frame Control field indicates the type of frame. A Duration field contains NAV information used for CSMA/CA channel access. An RA field contains an address for the recipient of the frame. A TA field contains the address of the STA that transmitted the frame. A Sequence control field contains the fragment number and the sequence number of the packet. A Data field is shown for conveying the data to be communicated. A Frame Check Sequence (FCS) is seen here, and in many other data formats described in the present disclosure, it provides an error-detecting code added to a frame in a communications protocol.

Figure 5:
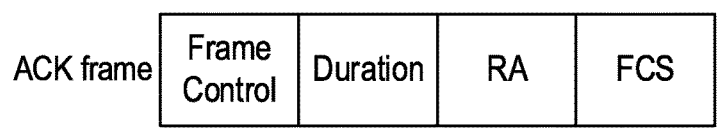
FIG. 5 is a data field diagram of an ACK packet frame format in a regular WLAN system.

FIG. 5 illustrates an ACK frame format in a regular WLAN system. A Frame Control field indicates the type of the frame. A Duration field contains NAV information used for CSMA/CA channel access. An RA field contains an address for the recipient of the frame. A Frame Check Sequence (FCS) is seen here and in many other data format described in the present disclosure and provides an error-detecting code added to a frame in a communications protocol.

Figure 6:
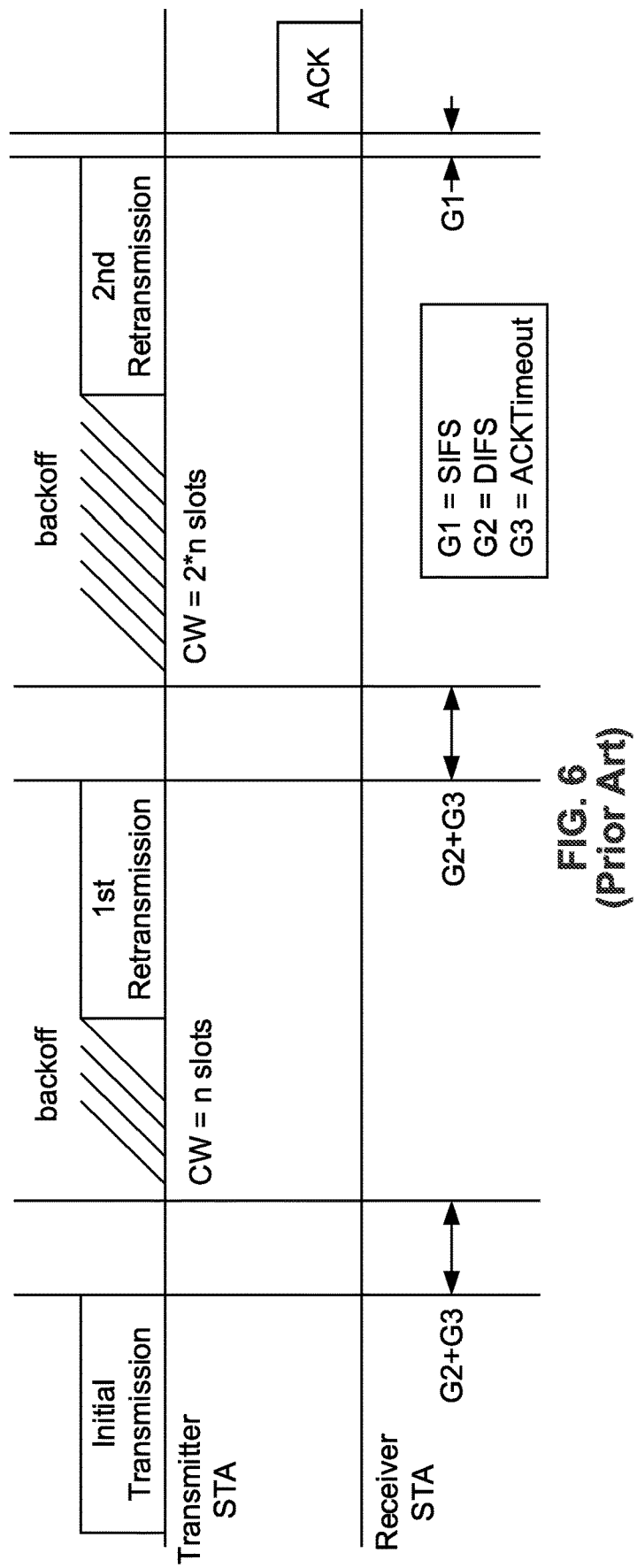
FIG. 6 is a communication sequence diagram of a double sized contention window when performing retransmission in CSMA/CA.

FIG. 6 illustrates a double sized contention window utilized in an example of retransmission under CSMA/CA where the backoff time is increased for each retransmission. The data packet frame and the ACK frame use the formats as shown in FIG. 4 and FIG. 5, respectively. After the transmitter transmits the initial transmission of a packet, it does not receive the ACK before timeout. Then, it sets another backoff time, whereby the size of contention window is "n" slots. After waiting the backoff time, the transmitter STA retransmits the packet for the first time. However, the retransmission also fails. The transmitter STA needs to retransmit the packet and sets the backoff time again to contend for channel access. This time, the size of the contention window is doubled, which is 2*n slots, due to the retransmission. The expected backoff time is also doubled by the contention window size. The second retransmission succeeds since it receives an ACK before timeout.

Figure 7:
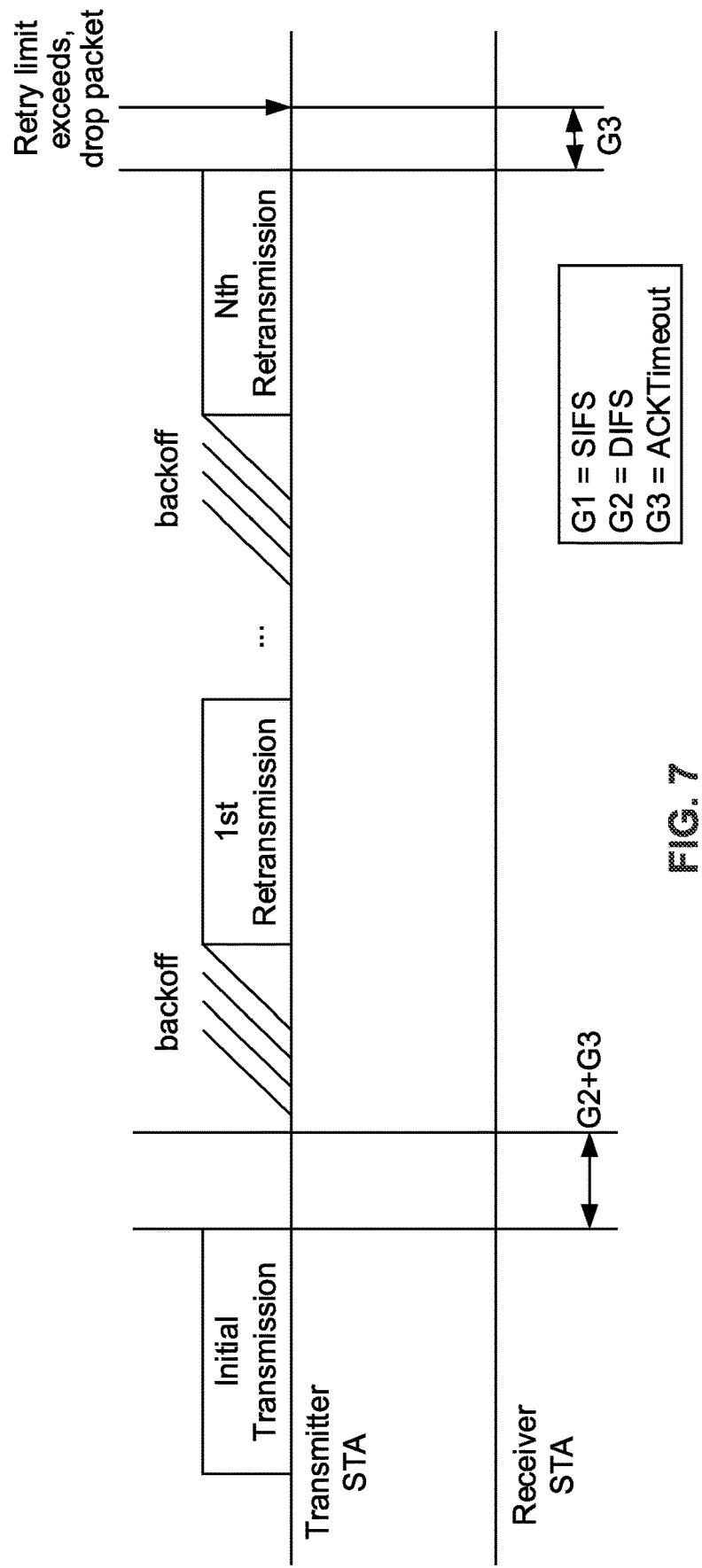
FIG. 7 is a communication sequence diagram of a packet dropped due to the retry limit in CSMA/CA.

FIG. 7 depicts an example of a packet dropped due to exceeding the retry limit in CSMA/CA. The Data packet frame and the ACK frame use the formats as shown in FIG. 4 and FIG. 5, respectively. As shown in the figure, after the initial transmission of a packet fails, the transmitter STA retransmits that packet multiple times. However, none of the retransmissions succeed. After retransmitting N times, the number of retransmission exceeds the retry limit. The transmitter STA stops retransmitting that packet and that packet is dropped.

Figure 8:
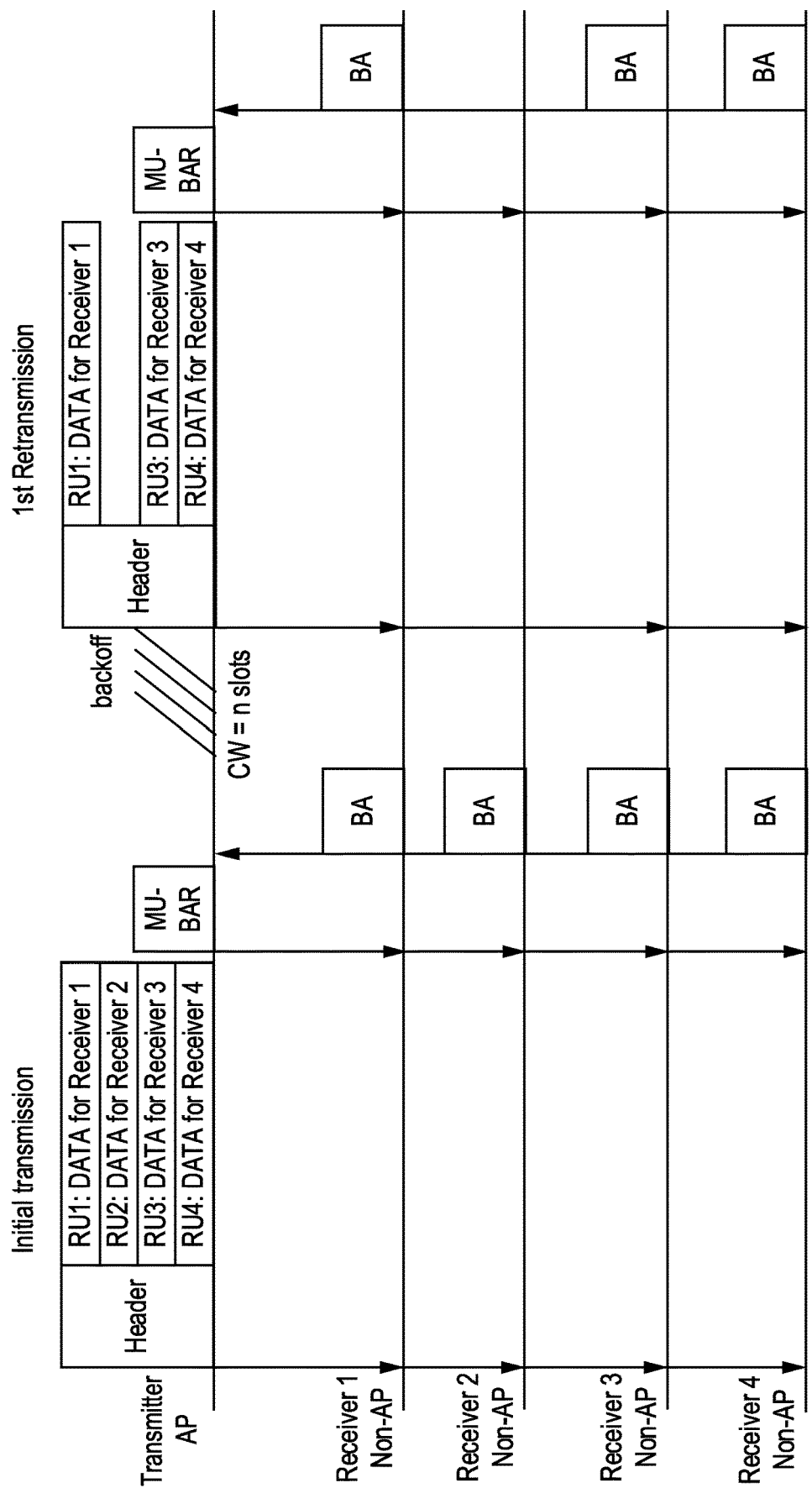
FIG. 8 is a communication sequence diagram of a legacy retransmission scheme in the downlink of an OFDMA system.

FIG. 8 depicts a legacy retransmission scheme showing an example of downlink multi-user (DL MU) transmission using OFDMA. The transmitter AP transmits Data packets to its receivers 1, 2, 3, and 4. The data packet utilizes the HE MU PPDU format. After finishing the initial transmission, the AP sends a multi-user Block ACK request (MU-BAR) to all the receivers. The receivers then send block ACK (BA) back to the AP. In response to the content in the BAs, the AP decides to retransmit the packets to receivers 1, 3, and 4. It contends for the channel and waits the backoff time, with the first retransmission occurring after the AP gains channel access.

Figure 9:
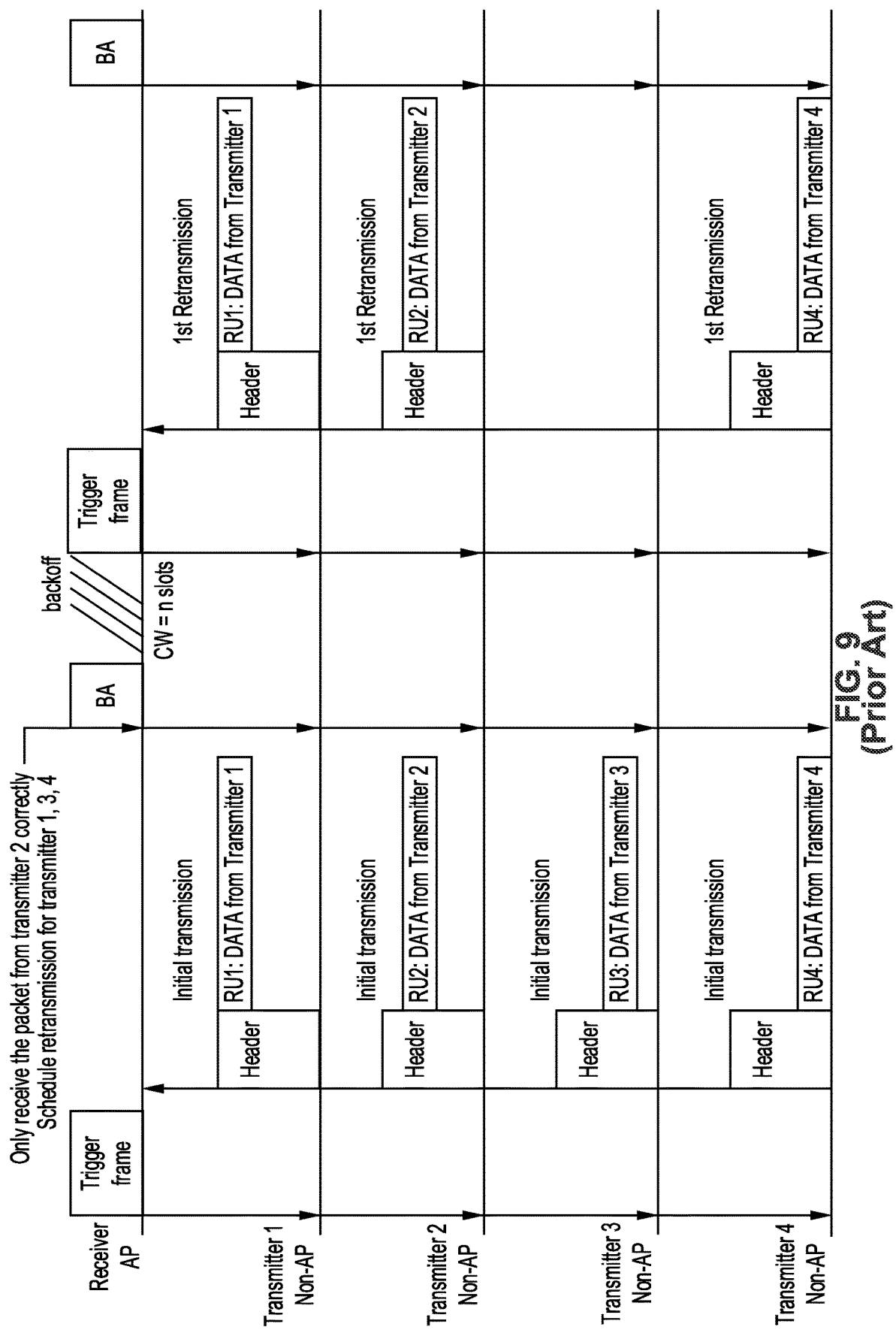
FIG. 9 is a communication sequence diagram of a legacy retransmission scheme in the uplink of an OFDMA system.

FIG. 9 depicts a legacy retransmission scheme showing an example of uplink multi-user (UL MU) transmission using OFDMA. The AP first sends a trigger frame to all the transmitters 1, 2, 3, and 4. The transmitters receive the trigger frame and start the initial transmission using the channel resource allocated by the trigger frame. The data packets could use the High Efficiency (HE) trigger based (TB) PPDU format. It will be noted that a PPDU is a Physical Layer Conformance Procedure (PLCP) Protocol Data Unit (PPDU). The AP receives the data packets from the transmitters and sends a BA frame to report the correctness of the transmission. In this example, only the packet from transmitter 3 was received correctly and a retransmission needs to be scheduled for transmitters 1, 2, and 4. The AP contends for the channel and waits a backoff time to gain channel access, after which retransmission proceeds in the same manner as the initial transmission.

The following describes TXOP sharing as described in a recent patent disclosure by the applicants.

2.2. Dynamic Scenario of Shared TXOP

A brief summary is provided below of the disclosed protocol showing four stages for each class. In the last two stages alternative solutions are depicted in subgraphs of the protocol.

2.2.1. Dynamic Scenario of Shared TXOP without AP Coordinator

FIG. 10A through FIG. 10D illustrate an example embodiment 10, 50, 70, 110 of a first dynamic scenario shared TXOP in the time domain, without using an AP as coordinator depicting interactions between AP 12, STA1 14, STA2 16 and STA3 18. Scenario 1: Non-AP TXOP holder STA (STA3) obtains (grabs) the channel, instead of waiting for AP1 to send a trigger frame. STA3 will coordinate with other STAs and share the TXOP with other STAs in the time domain.

In FIG. 10A is seen an embodiment 10 performing Stage 0 processing 32 in which the following setup is performed: (a) exchange shareability information; (b) exchange contention slot information; and (c) exchange time allocation information. STA3 obtains the channel and indicates the share information 20 in a frame sent to the AP (for example, an element can be attached to the authentication, association frame or any other frame exchanged with the AP), which acknowledges 22 receipt back to STA3. Then, the AP broadcasts the latest share information 24 of all the associated non-AP STAs. Later in the figure STA2 obtains the channel and repeats the process with exchanging a frame with the AP to indicate the share information 26 and receiving an ACK 28. After this the AP broadcasts the latest share information of all the associated non-AP STAs 30 with a sharing offers/requests frame.

In FIG. 10B is seen an embodiment 50 of performing Stage 1 processing 52 announcements in which the following is performed: (a) TXOP holder STA indicates that the upcoming TXOP is available to be shared; and (b) two new frames are utilized comprising RTS-share and CTS-share. STA3 sends an RTS-share 54 to the AP, which reserves the channel for the TXOP by setting the NAV. STA1 and STA2 check the NAV 56, 58 when receiving RTS-share 54. The AP responds with a CTS-share 60 to STA3, which reserves the channel with the updated NAV. STA1 and STA2 receive the CTS-share frame and are made aware of NAV 62, 64.

Figure 10C:
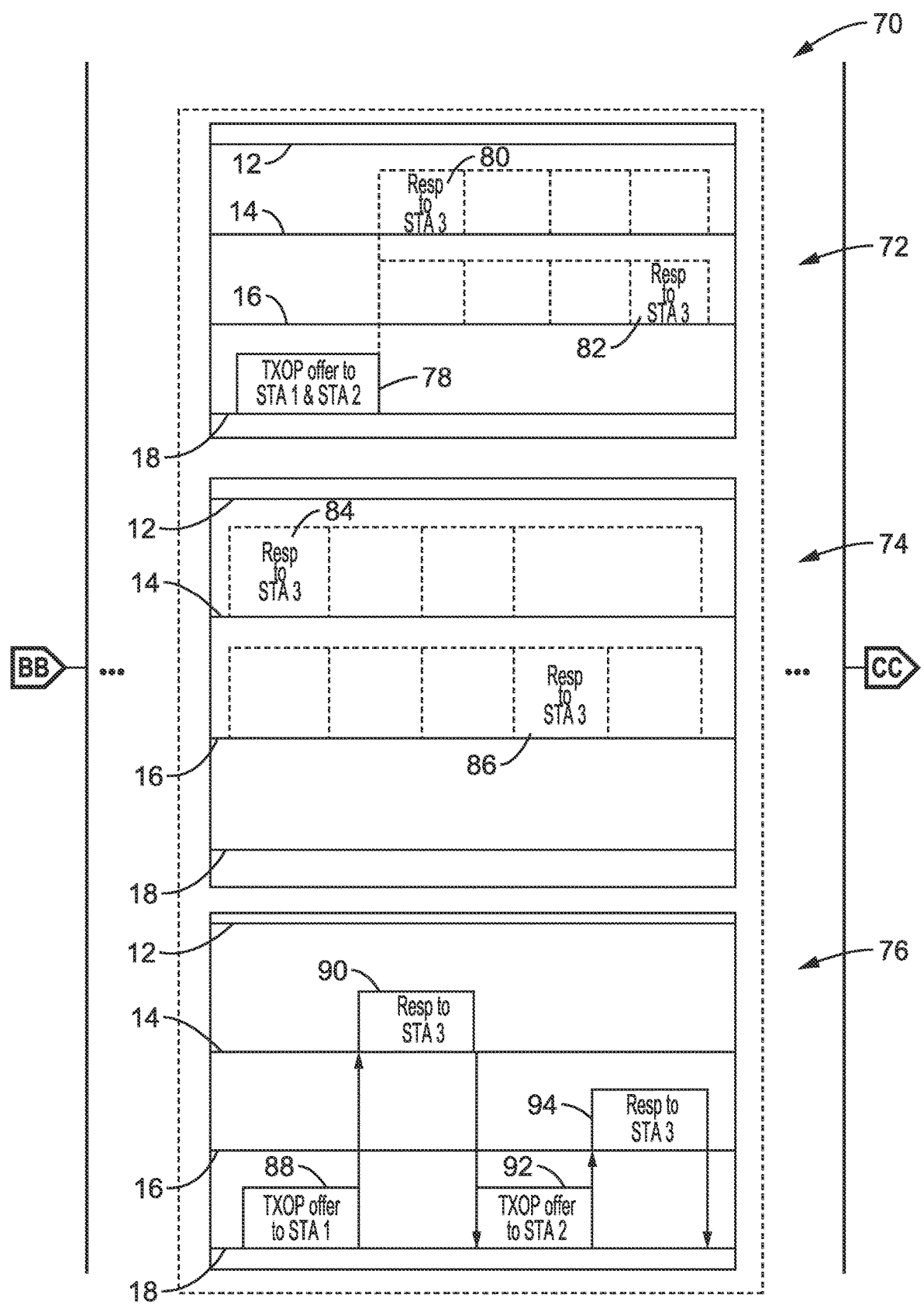

In FIG. 10C is seen a Stage 2 embodiment 70 for acquiring shared TXOP participants, showing three different alternatives for determining which non-AP STAs are requesting time in the upcoming shared TXOP, by: (a) broadcasting 72 a share frame+ACK (Dedicated/random access); (b) generating an ACK 74 after receiving RTS or CTS (Dedicated/random access); and (c) Repeating of unicasting 76 share+short-response.

At the top of the figure a share frame 72 is broadcast with the example depicting STA3 broadcasting a TXOP offer 78 to STA1 and STA2, to which a response is generated 80, 82 in the time slots of the TXOP.

In the middle of the figure a response frame 74 is seen being received after a shared RTS/CTS which contains sharing information. In the example the shared RTS/CTS (not shown here) has been generated and STA1 and STA2 utilize their timeslots in the TXOP to send a response, such as an Access Request frame 84, 86 back to STA3.

At the bottom of the figure the requests are handled 76 in response to unicasting of offers and responses. In the example shown STA3 sends a TXOP offer 88 to STA1, and STA1 responds 90, then STA3 sends a TXOP offer 92 to STA2, and STA2 responds 94.

Figure 10D:
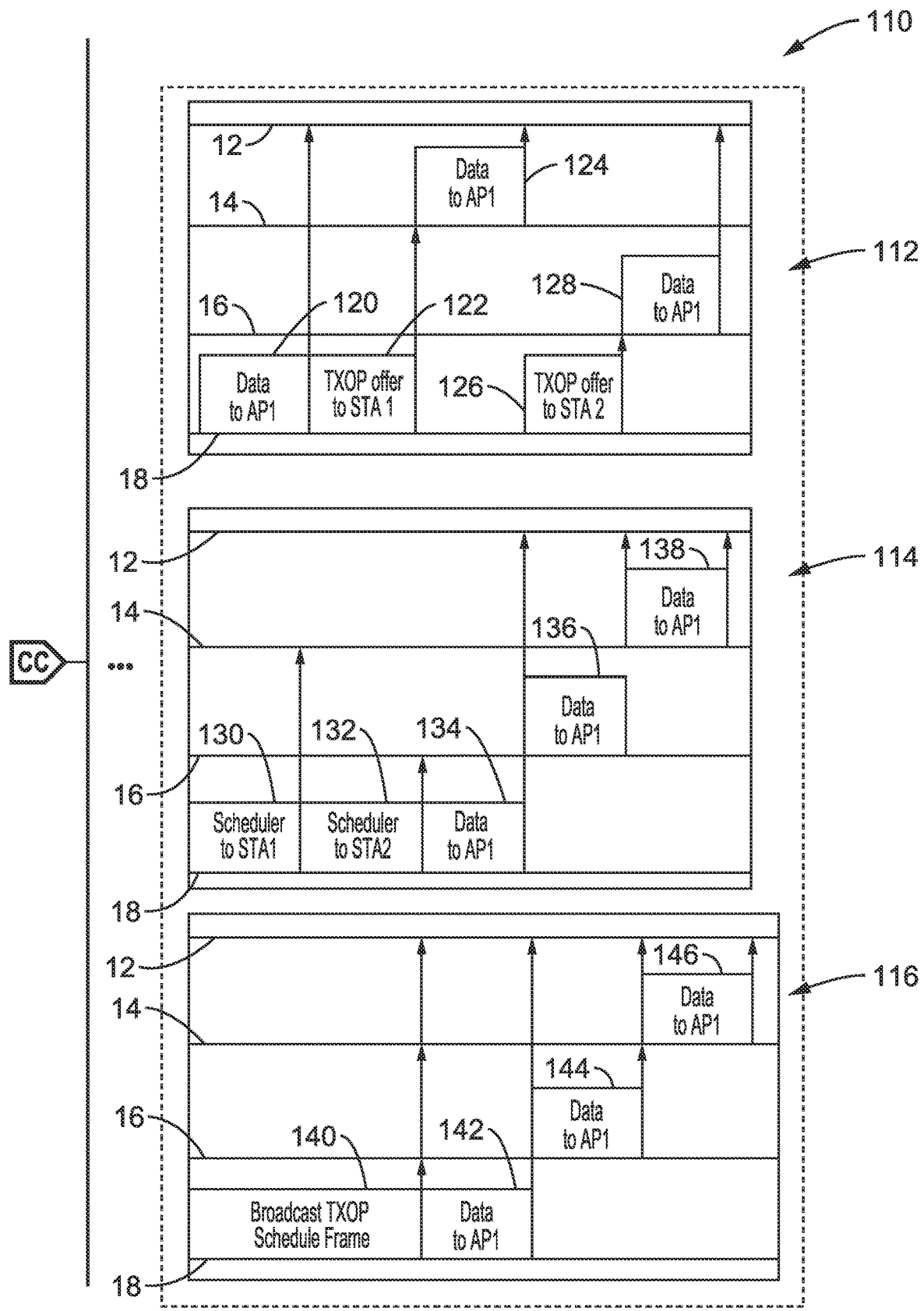

In FIG. 10D is seen a Stage 3 embodiment 110 performing scheduling and access in which TXOP access is performed in three variations: (a) dedicated polling 112 in which data is polled one by one; (b) setting a schedule by either unicasting 114, or broadcasting 116, for all STAs (scheduler frame), after which STAs transmit in the scheduled TXOP slot.

In the upper portion 112 of the figure a one by one (dedicated) polling is performed. In the example shown STA3 sends Data 120 to the AP, and then a TXOP offer 122 to STA1, which in response to the offer sends its Data 124 to the AP. After STA1 has used its shared time, then STA3 extends a TXOP share offer 126 to STA2, and STA2 in response to this offer sends its Data 128 to the AP.

In the middle portion 114 of the figure is depicted setting a schedule for all STAs by unicasting scheduler frames. In the example shown STA3 sends a schedule 130 to STA1, then a schedule 132 to STA2, after which it sends its Data 134 to the AP. STA2 is seen transmitting Data 136 to the AP in its scheduled TXOP timeslot, after which STA1 sends Data 138 to the AP.

In the lower portion 116 of the figure is depicted broadcasting a schedule for all STAs. In the example shown STA3 broadcasts a schedule 140 which can be received by STA1 and STA2. After this STA3 sends its Data 142 to the AP. STA2 is seen transmitting Data 144 to the AP in its scheduled TXOP timeslot, after which STA1 sends Data 146 to the AP in its respective timeslot.

2.2.2. Dynamic Scenario of Shared TXOP with AP Coordinator

FIG. 11A through FIG. 11D illustrate an example Scenario 2 150, 170, 190, 230 with variations. The scenario depicts a situation in which STAs cannot communicate with each other directly and an AP (AP1) is utilized as the coordinator.

Figure 11A:
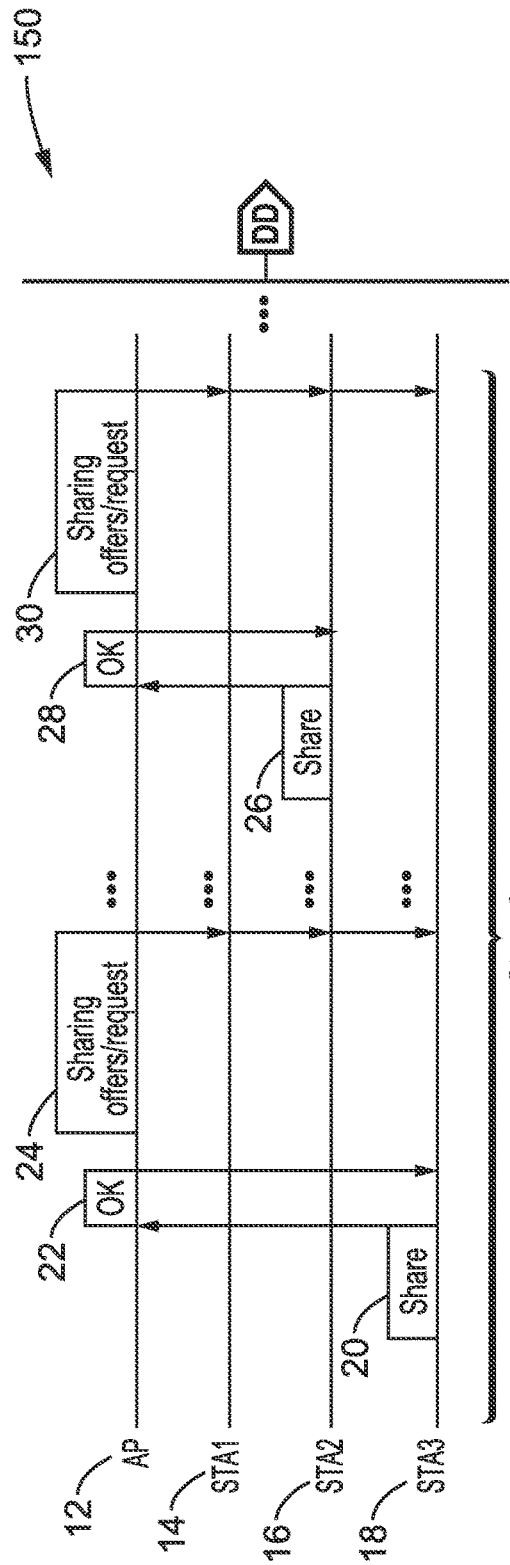
FIG. 11A through FIG. 11D is a communication sequence diagram of a dynamic scenario of shared TXOP in the time domain, with the AP as coordinator, according to at least one embodiment of the present disclosure.
Figure 11B:
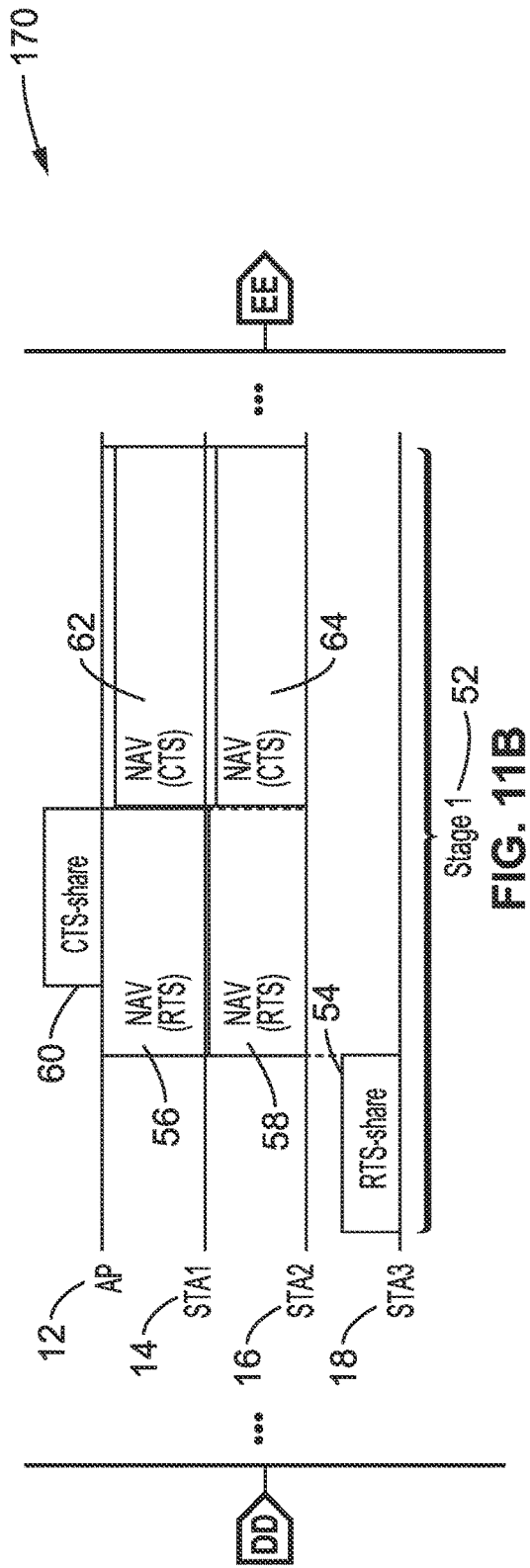

In FIG. 11A and FIG. 11B are seen Stage 0 150 and stage 1 170, which depict the same operations represented in FIG. 10A and FIG. 10B.

Figure 11C:
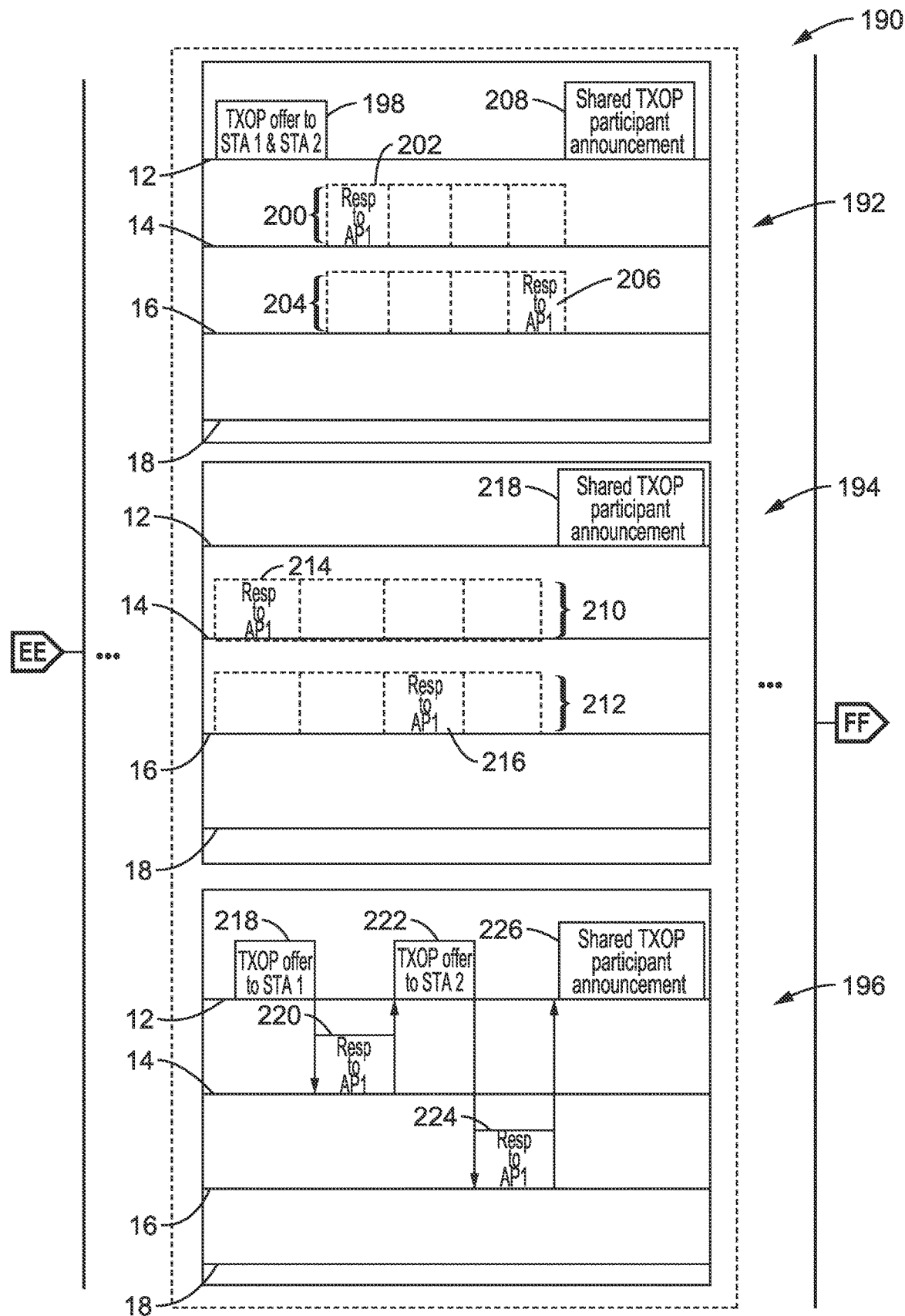

In FIG. 11C is seen a Stage 2 embodiment 190 of requests for which the AP finds the shared TXOP participant STAs and informs the TXOP holder STA, depicted with three variations 192, 194, 196.

In the upper portion 192 of the figure is an example in which the AP broadcasts a TXOP offer 198 to STA1 and STA2 to determine if they want to participate in an upcoming stage of shared TXOP. Then during the current stage of TXOP, once other non-AP STAs receive this TXOP offer frame, and are willing to participate in the shared TXOP, they should respond in the time slots with random access or dedicated access to the channel 200, 204, and STA1 sends response 202 and STA2 sends response 206 back to the AP. The AP then unicasts 208 the shared TXOP participants announcement frame to STA3 with an indication of the buffer status of each non-AP TXOP participant STA that wants to join the following shared TXOP.

In the middle portion 194 of the figure a shared RTS/CTS has been sent indicating the start of the shared TXOP. In response to this in the current stage of TXOP 210, 212, the non-AP STAs that want to join the following shared TXOP can directly respond to the AP with an indication of their buffer status by randomly accessing or performing a dedicated access of the channel. STA1 sends response 214 and STA2 sends response 216 to the AP on whether they want to participate. The AP then announces 218 the shared TXOP participant information by indicating their buffer status and unicasting the shared TXOP participant announcement frame to STA3.

In the lower portion 196 of the figure is an example in which the AP unicasts offers to one or more of the STAs to determine if they want to participate. In the example shown the AP sends a TXOP offer 218 to STA1 and STA1 responds 220. The AP then sends a TXOP offer 222 to STA2 and STA2 responds 224. The AP then includes 226 the shared TXOP participant information such as their buffer status and unicasts a shared TXOP participant announcement frame to STA3.

Figure 11D:
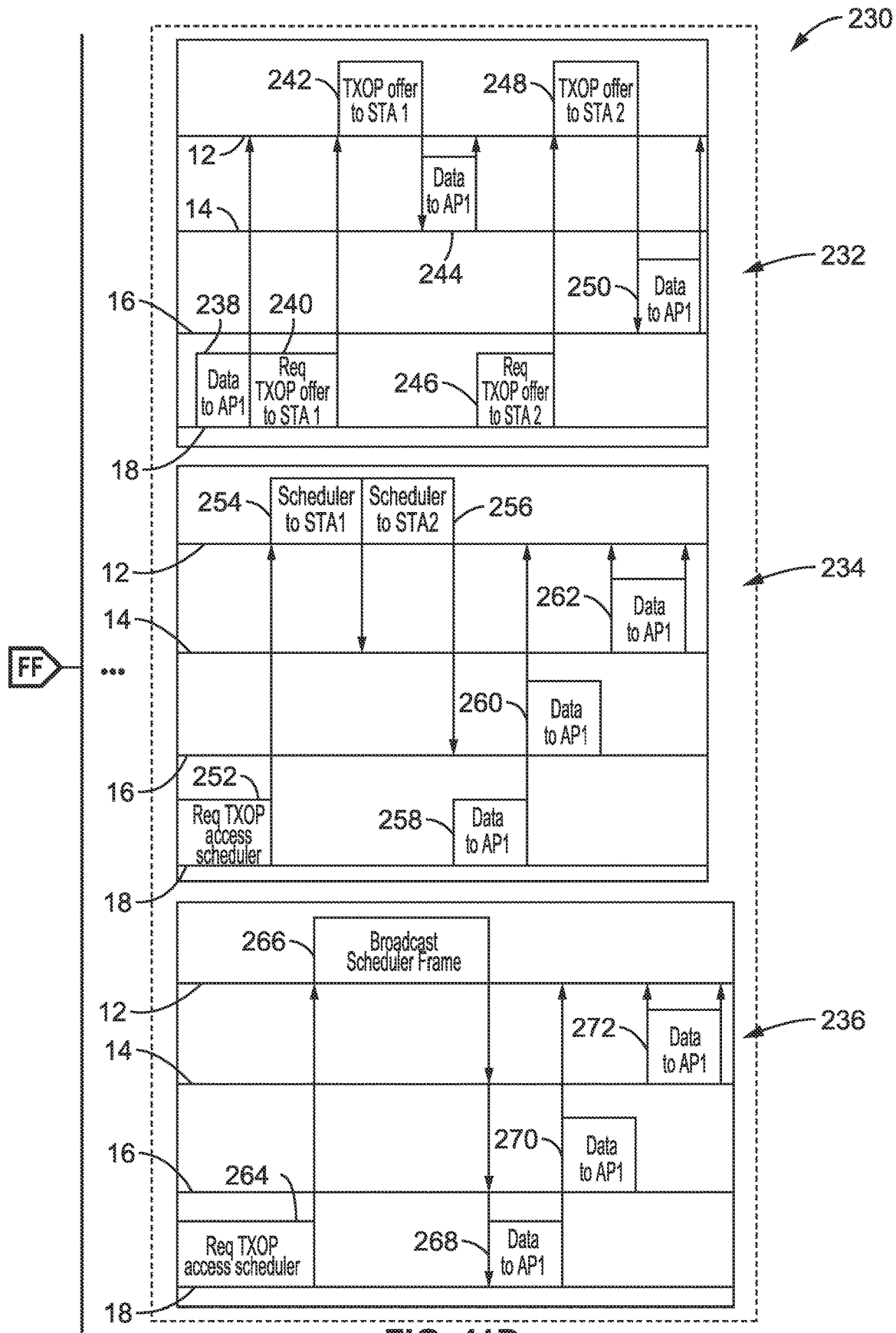

In FIG. 11D is seen a Stage 3 embodiment 230 which is the shared TXOP access is passed by the AP. Variations are shown in which: (a) the TXOP holder unicasts offers 232 through the AP, (b) the TXOP holder broadcasts sharing offers and schedule to the AP which either unicasts 234, or broadcasts 236 these schedules to the non-AP STAs.

In the upper portion of the FIG. 232 is an example showing STA3 sending Data 238 to the AP, after which it sends a request TXOP offer 240 for STA1 to the AP. The AP then sends the TXOP offer 242 to STA1 and STA1 sends Data 244 back to the AP. Similarly, STA 3 sends a request TXOP offer 246 for STA2 to the AP. The AP then sends the TXOP offer 248 to STA2 and STA2 sends Data 250 back to the AP.

In the middle portion of the FIG. 234 is an example showing STA3 sending a request TXOP access schedule 252 for all stations to the AP. The AP then unicasts a schedule 254 to STA 1, then unicasts a schedule 256 to STA 2. After this, the TXOP holder of STA3 sends its Data 258 to the AP, after which the other stations send Data in their scheduled time slots, seen as Data 260 and 262.

In the lower portion of the FIG. 236 is an example showing STA 3 sending a request TXOP offer schedule 264 for all stations to the AP. The AP then broadcasts this schedule 266 to STA1 and STA2. With this overhead completed, STA 3 then sends Data 268 back to the AP, followed by the other stations sending data to the AP in their respectively scheduled TXOP slots, shown here with Data 270 from STA 2, and Data 272 from STA 1.

2.2.3. Semi-Static Scenario of Shared TXOP

Different from the Dynamic scenario, in which the TXOP holder dynamically schedules/allocates partial of its obtained TXOP duration to other STAs based on the current communication with other STAs, which are requesting the shared TXOP at this time. In the semi-static scenario, each STA determines the schedule/allocation of its shared TXOP to others at the beginning and may not update the scheduler latter. After each STA broadcasts the preconfigured shared TXOP scheduler to others, the STAs shall only use the preconfigured TXOP duration to transmit as assigned by a TXOP holder which starts the shared TXOP.

In the dynamic scenario, the TXOP holder may need to exchange messages with other STAs during each obtained TXOP to design a dynamic and adaptive scheduler. In the semi-static scenario, the scheduler is preconfigured, so no further scheduling message exchange is required within an obtained TXOP, whereby each STA needs to follow the preconfigured schedule unless the preconfigured schedule is reset or updated.

Figure 12:
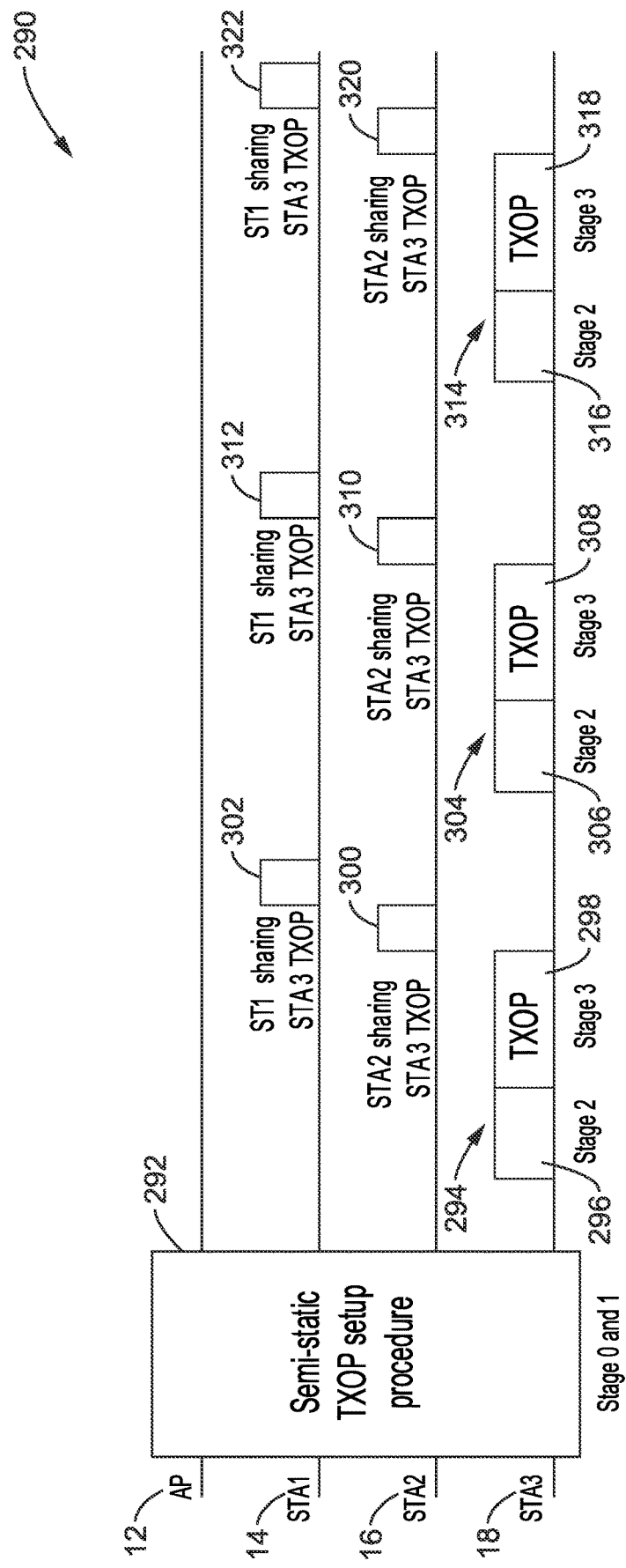
FIG. 12 is a communication sequence diagram of a semi-static scenario in the time domain, with or without the AP as coordinator, according to at least one embodiment of the present disclosure.

FIG. 12 illustrates a semi-static overview example Scenario 3 290 depicting interactions between AP 12, STA1 14, STA2 16 and STA3 18. Shown combined here is Stage 0 and Stage 1 292 which includes both a share offer/request setup stage and a TXOP holder configuration setup stage. Stage 2 represents a TXOP sharing announcement stage and Stage 3 represents a TXOP sharing phase.

The STA can set a configuration for TXOP sharing at some point through a setup procedure (with STAs or with the AP) and every time a TXOP is gained in the channel, the STA shares this TXOP with a preset number of STAs for a preset duration of time.

In the example multiple TXOP are seen 294, 304 and 314, each showing a Stage 2 TXOP sharing announcement phase 296, 306 and 316, each followed by the TXOP portion used by the TXOP holder STA3 298, 308 and 318. As a result recurrent sharing of the TXOP held by STA3 is performed seen with STA2 sharing 300, 310 and 320, and STA1 sharing 302, 312 and 322.

Figure 13A:
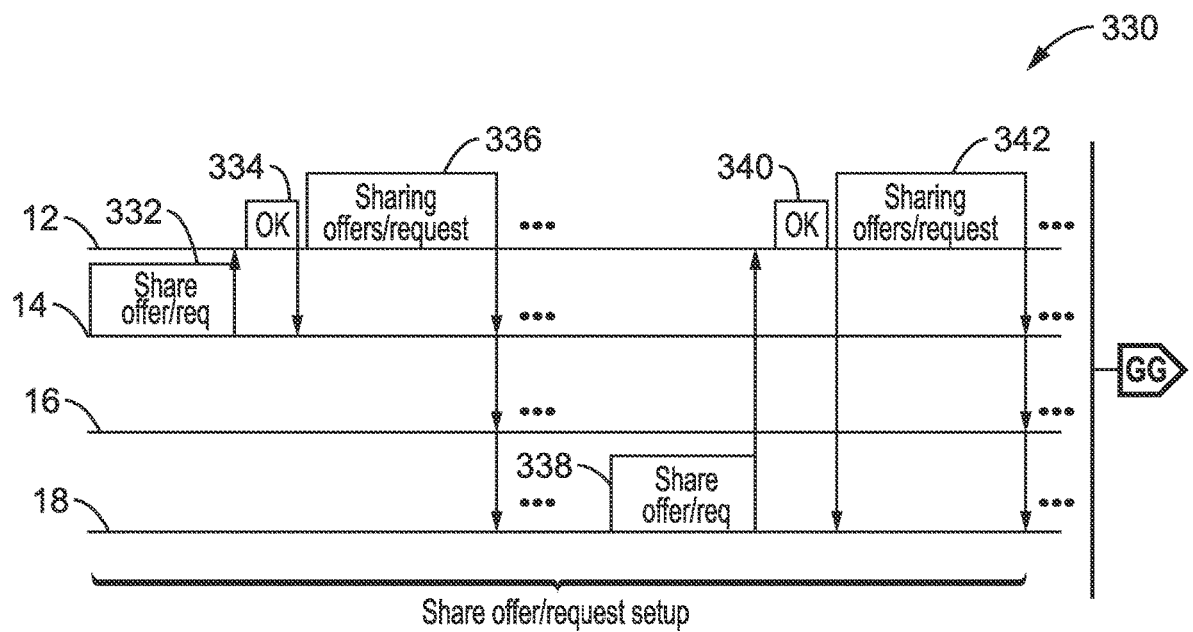
FIG. 13A through FIG. 13C is a communication sequence diagram providing a more in depth example of the semi-static scenario in the time domain according to at least one embodiment of the present disclosure.
Figure 13B:
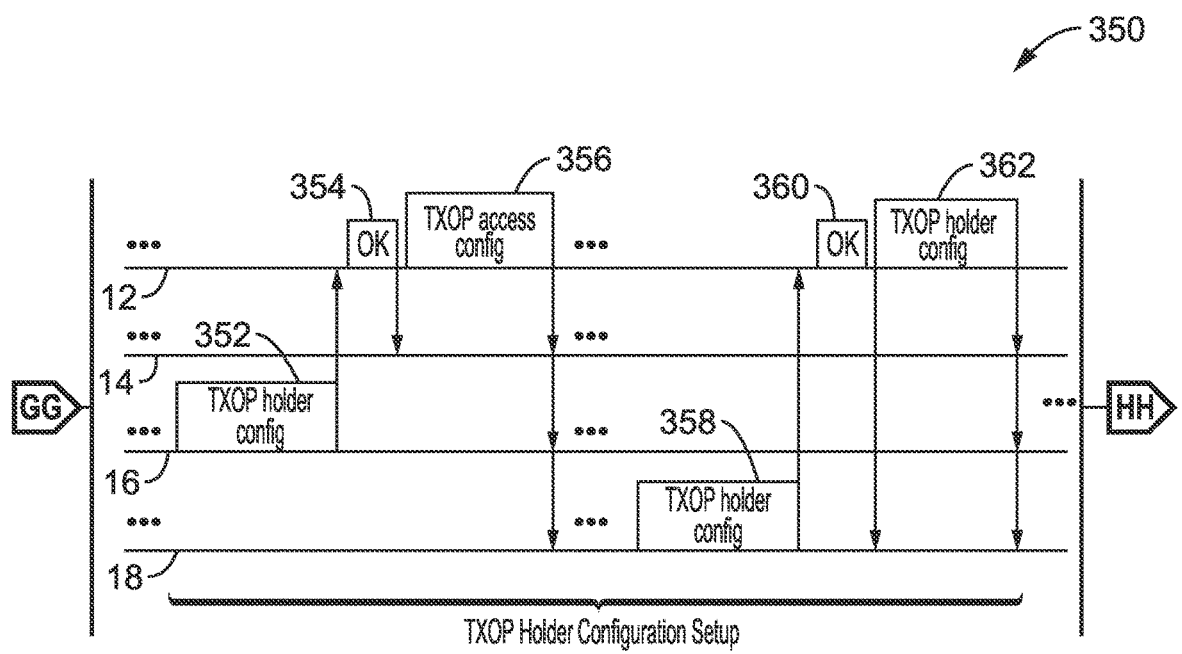
Figure 13C:
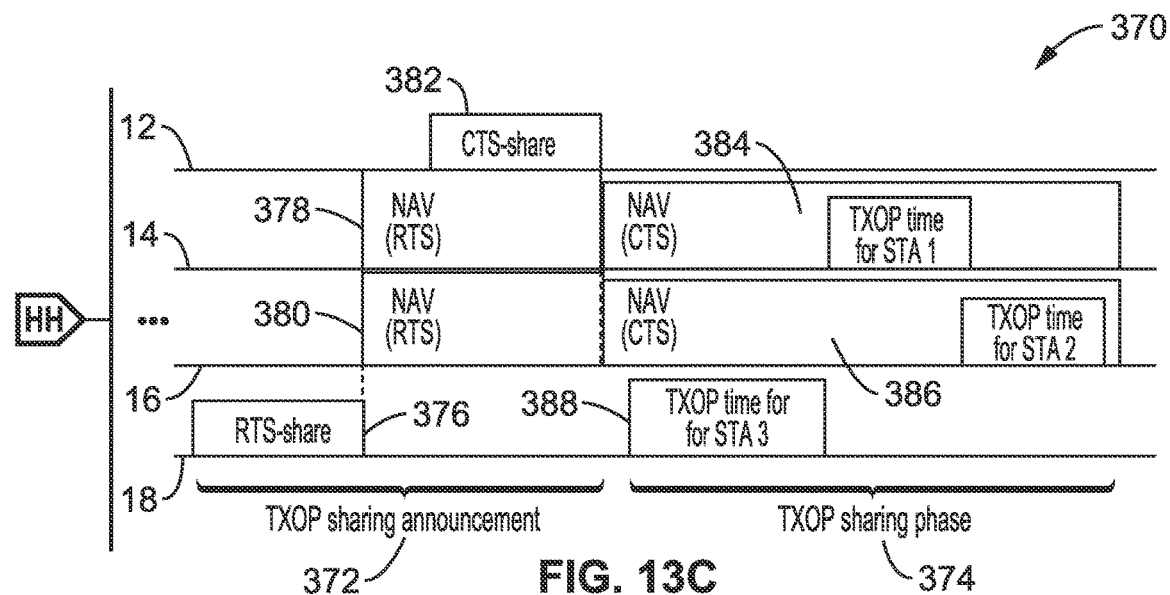

FIG. 13A through FIG. 13C illustrate an example embodiment 330, 350, 370 showing communications according to the protocol for the semi-static scenario having four stages, which was previously summarized in FIG. 12. As in the previous examples interactions are shown by way of example and not limitation between AP 12, STA1 14, STA2 16 and STA3 18.

In FIG. 13A is seen an embodiment 330 of a stage performing a share offer/request setup in which non-AP STAs exchange the share offer/request information with each other. In this example STA1 sends a share offer/request 332 to the AP, which the AP acknowledges 334 and the AP then shares 336 this information with the other STAs. Similarly, STA3 is seen sending a share offer/request 338 to the AP, which the AP acknowledges 340 and the AP then shares 342 this information with the other STAs.

In FIG. 13B is illustrated an embodiment 350 of performing a TXOP holder configuration setup stage in which a potential TXOP holder STA exchanges the configuration, semi-static TXOP sharing schedule with all STAs. In this example, STA2 sends TXOP holder configuration information 352 to the AP, which acknowledges (OKs) receipt 354, and then sends a TXOP access configuration 356 to the other STAs. Similarly, STA3 sends TXOP holder configuration information 358 to the AP, which acknowledges (OKs) receipt 360, and then the AP sends a TXOP access configuration 362 to the other STAs.

In FIG. 13C is illustrated an embodiment 370 of a stage performing TXOP sharing announcements and TXOP sharing. In the TXOP sharing announcement stage 372 the TXOP holder STA announces that the coming TXOP is allowed to be shared according to the agreed on configuration.

In the TXOP sharing phase 374 non-AP STAs access the shared TXOP according to the agreed on configuration. STA3 is seen sending an RTS-share 376 to the AP, which indicates the NAV 378, 380 of the RTS-share. The AP responds to STA3 with a CTS-share 382, STA1 and STA2 receive the CTS-share and thus are made aware of the NAV value 384, 386 set in the CTS-share. In response to the CTS-share, the TXOP holder of STA3 uses its portion 388 of the shared TXOP interval, after which the other stations share the TXOP, exemplified with STA 1 and STA 2 both sharing the TXOP.

3. Problem Statement

For the MU UL transmission, previous techniques, such as 802.11n/ac implements Request-To-Send/Clear-To-Send (RTS/CTS) or RTS/CTS with extensions in a channel access scheme to help avoid collisions. However, this scheme only allows one user to occupy the channel at one time. Besides, a long delay is introduced by the overhead of RTS/CTS frame exchange.

As a comparison, the 802.11ax technique implements the OFDMA scheme, which allows different users to access the channel simultaneously by using different resource units (RUs). This improves channel utilization efficiency and reduces average delay. However, current 802.11ax techniques rely on the AP to initiate UL transmissions for a shared TXOP. Meaning that if a non-AP STA senses the channel is free (unoccupied) and the STA has DATA to transmit to the AP, it still has to wait until receiving the trigger frame from the associated AP to join the shared TXOP for UL DATA transmission. Also, the STA has to rely on the AP to schedule and distribute available channel resources between this non-AP STA which obtains the channel and the other non-AP STAs. In this case, the STA doesn't capture the dynamic needs from the non-AP STA and it introduces several problems including low channel utilization efficiency and, thus, increased delay.

4. Contribution of the Invention

Instead of waiting for the schedule and assignment from AP, non-AP STAs can autonomously share and schedule the TXOP access with other STAs when they obtain access to the channel. Instead of just sharing the TXOP with other non-AP STAs in the same BSS, the sharing STA can also share the TXOP with other non-AP STAs in the OBSS. Thus, TXOP sharing in the present disclosure provides benefits including: (a) increasing channel utilization efficiency; (b) reducing latency of channel contention; and (c) reducing OBSS interference caused by channel contention from the OBSS.

5. Non-AP STA Hardware Setup

Figure 14:
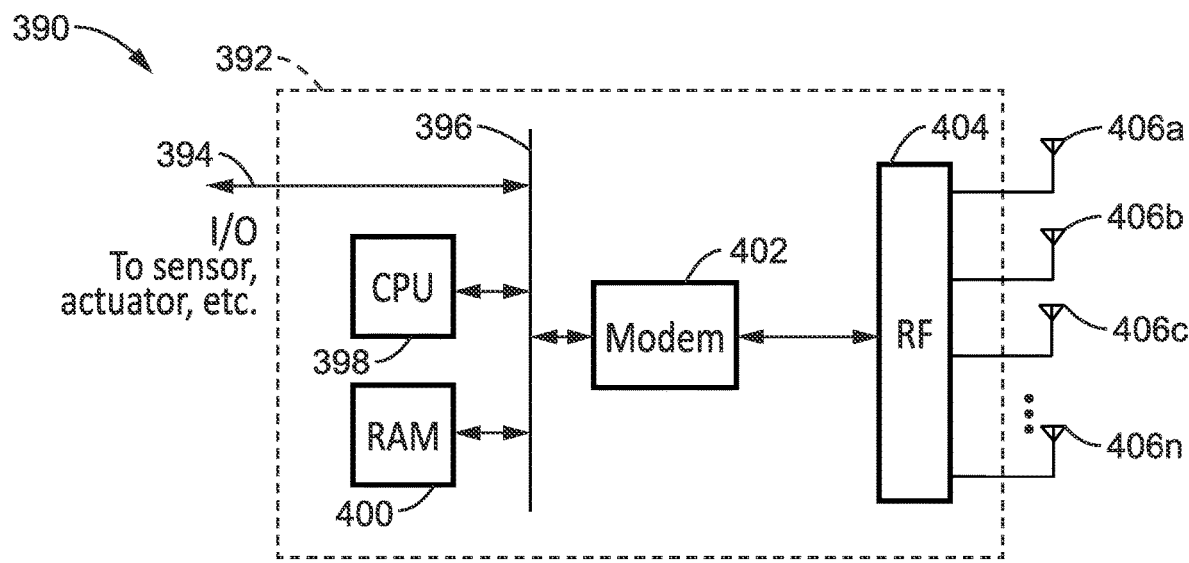
FIG. 14 is a hardware block diagram of wireless station hardware according to at least one embodiment of the present disclosure.

FIG. 14 illustrates an example embodiment 390 of a non-AP STA hardware setup, with external I/O 394 into circuitry 392 having a CPU 398 and memory (e.g., RAM) 400 for executing a program(s) which implement the communication protocol. The host machine accommodates at least one modem to support communications coupled to an RF module connected to multiple antennas for performing beamforming during transmission and reception. In this way, the STA can transmit signals using multiple sets of beam patterns.

Specifically, a WLAN station according to the present disclosure is shown with an I/O path 394 is shown into circuit block 392 which has a bus 396 connected to at least one computer processor (CPU) 398, memory (RAM) 400, and at least one modem 402. Bus 394 allows connecting various devices to the CPU, such as to sensors, actuators and so forth. Instructions from memory 400 are executed on processor 398 to execute a program which implements the communication protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with other AP, coordinator, coordinate and so forth), depending on what role it is playing in the current communication context.

This host machine is shown configured with at least one modem and RF circuit. By way of example and not limitation, a mmW modem 402 is coupled to at least one radio-frequency (RF) circuit 404 which connects to a plurality of antennas 406a, 406b, 406c through 406n (e.g., antenna array) to transmit and receive frames with neighboring STAs. The combination of processor, modem and RF circuits, allow beamformed (directional) communications to be supported, as well as for supporting quasi-omni (referred to herein simply as omni) mode transmissions from the antenna array. In addition, in at least one preferred embodiment, nulls can be generated in directional patterns created by the antenna array to shield select directions (sectors) and thus reduce interference between stations.

Thus, the STA HW is shown configured with at least one modem, and associated RF circuitry for providing communication on at least one band. By way of example and not limitation the intended directional communication band is implemented with a mmW band modem and its associated RF circuitries for transmitting and receiving data in the mmW band. In some implementations another band can be supported in hardware, generally referred to as a discovery band, which by way of example and not limitation may comprise a sub-6 GHz modem and its associated RF circuitry for transmitting and receiving data in the sub-6 GHz band.

It should be appreciated that the present disclosure can be configured with multiple modems 402, with each modem coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware as shown in the figure, can be combined into a multi-link device (MLD), which typically will have a processor and memory for coordinating the activity, while there is not always a need for a separate CPU and memory for each STA within the MLD.

6. Topology and Scenario Description 6.1. Topology Under Study

Figure 15:
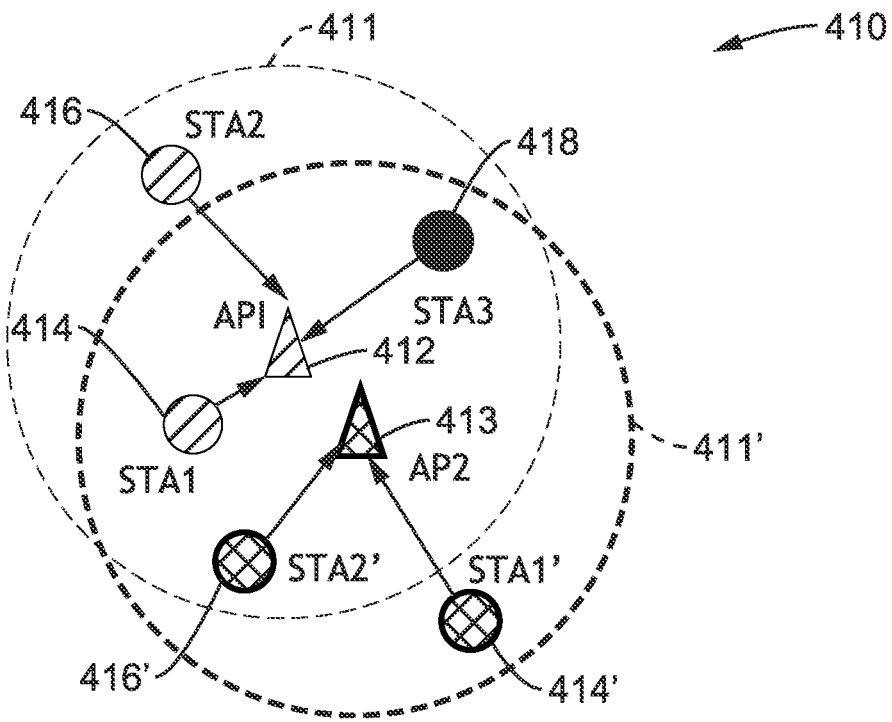
FIG. 15 is a topology of a WLAN Overlapped Basic Service Set (OBSS) scenario utilized according to at least one example of the present disclosure.

FIG. 15 illustrates an example topology 410 of a WLAN Overlapped Basic Service Set (OBSS) scenario, having a first BSS 411, and a overlapping BSS 411'. By way of example and not limitation, this scenario is shown with a first AP (AP1) 412, a second AP (AP2) 413 and STAs shown as STA1 414, STA1' 414', STA2 416, STA2' 416', STA3 418, which are shown by way of example and not limitation, as the present disclosure can support any topology arising between a number of stations which may comprise APs, non-AP shared TXOP participants, and non-AP TXOP holder STAs.

The scenario is provided for the sake of fostering understanding of the examples given herein for illustrative purposes of interactions between only a few stations each described with their specific roles.

In the example shown, BSS1 consists of an AP (AP1) and multiple non-AP stations, depicted in this figure as three non-AP STAs. For this specific example scenario STA3 is considered the non-AP TXOP holder STA, which is the STA that obtains (grabs) the channel and is willing to share the TXOP with other STAs. The other two STAs are non-AP shared TXOP participant STAs, which do not obtain the channel in these examples, but which are willing to join the TXOP shared by the TXOP holder STA.

The second BSS (BSS2) consists of an AP (AP2) and two STAs, which in this example both STA1' and STA2' in BSS2 are non-AP TXOP participant STAs.

6.2. Scenario Description

The studied BSS contains one AP (AP1) and multiple non-AP STAs. each non-AP STA may have packets generated periodically or continuously which need to be transmitted in an UpLink (UL) to AP1, while AP1 may have packets to periodically or continuously communicate in a DownLink (DL) to the non-AP STAs. The present disclosure is focusing on these UL/DL OFDMA transmissions, for which the latency is always a critical issue due to the complex scheduling between each non-AP STA and the AP. In 802.11ax technology, multiple STAs can send UL DATA sequences simultaneously within a shared TXOP toward improving TXOP utilization efficiency.

However, in 802.11ax, the AP can initiate the UL data transmission. The AP usually sends a trigger frame (e.g., BSRP) to the non-AP STAs to inquire on their buffer status and their traffic priorities. Upon receiving a response frame (e.g., BSR) from those non-AP STAs. The AP sends another trigger frame (e.g., Basic Trigger) with the resource allocation information to those non-AP STAs for them to use to send a UL data sequence.

The AP initiated TXOP cannot capture the dynamic needs from the non-AP STAs side, especially for those non-AP STAs that have RTA (Real Time Application) packets to transmit. The RTA packets usually are of a small size, yet they request rapid transmission times.

In the OBSS scenario, the delay performance is longer than in a regular BSS scenario. The interference in OBSS scenario introduces more aggressive channel contention which results in longer delays.

6.2.1. Scenario in Context of Present Disclosure

More specifically, in the present disclosure, once any non-AP STA obtains channel access, it can initiate the next shared TXOP immediately. This non-AP STA which obtains the channel is referred to as the non-AP TXOP holder STA. The TXOP is shareable in the studied BSS as well as in the OBSS.

The non-AP STAs that are willing to participate in the shared TXOP, are referred to herein as non-AP shared TXOP participant STAs. The STAs in the OBSS can also join the shared TXOP and are referred to as shared TXOP participants in this disclosure.

The non-AP TXOP holder STA shares the TXOP duration in the time domain with other non-AP shared TXOP participants in the same BSS and in an Overlapping BSS (OBSS). The non-AP TXOP holder STA does not need to wait for the AP to initiate the shared TXOP access. The non-AP TXOP holder STAs are capable of scheduling and distributing the available channel access time resources to other non-AP shared TXOP participant STAs. The non-AP TXOP holder STA can give the scheduling to the AP once the TXOP is reserved. The potential non-AP TXOP holder STAs can use a predetermined scheduling to allocate channel access resources.

It should be noted that the RTS-share and CTS-share frames in this disclosure are modified RTS and CTS frames which are utilized for a different purpose than they are in 802.11. These new frames are utilized in the same location to replace RTS-share and CTS-share to also cover the same tasks. Similarly, for other frames in this disclosure, they can be replaced by new frames or their elements incorporated into existing frames to convey the same information.

It should be noted that in the present disclosure the AP can also be the shared TXOP holder or join the shared TXOP as other shared TXOP participants. Thus, the TXOP can be shared among AP and STAs, based on UL initiated or DL initiated transmission. The present disclosure aids with reducing latency for accessing the channel and increasing channel utilization efficiency.

Figure 16:
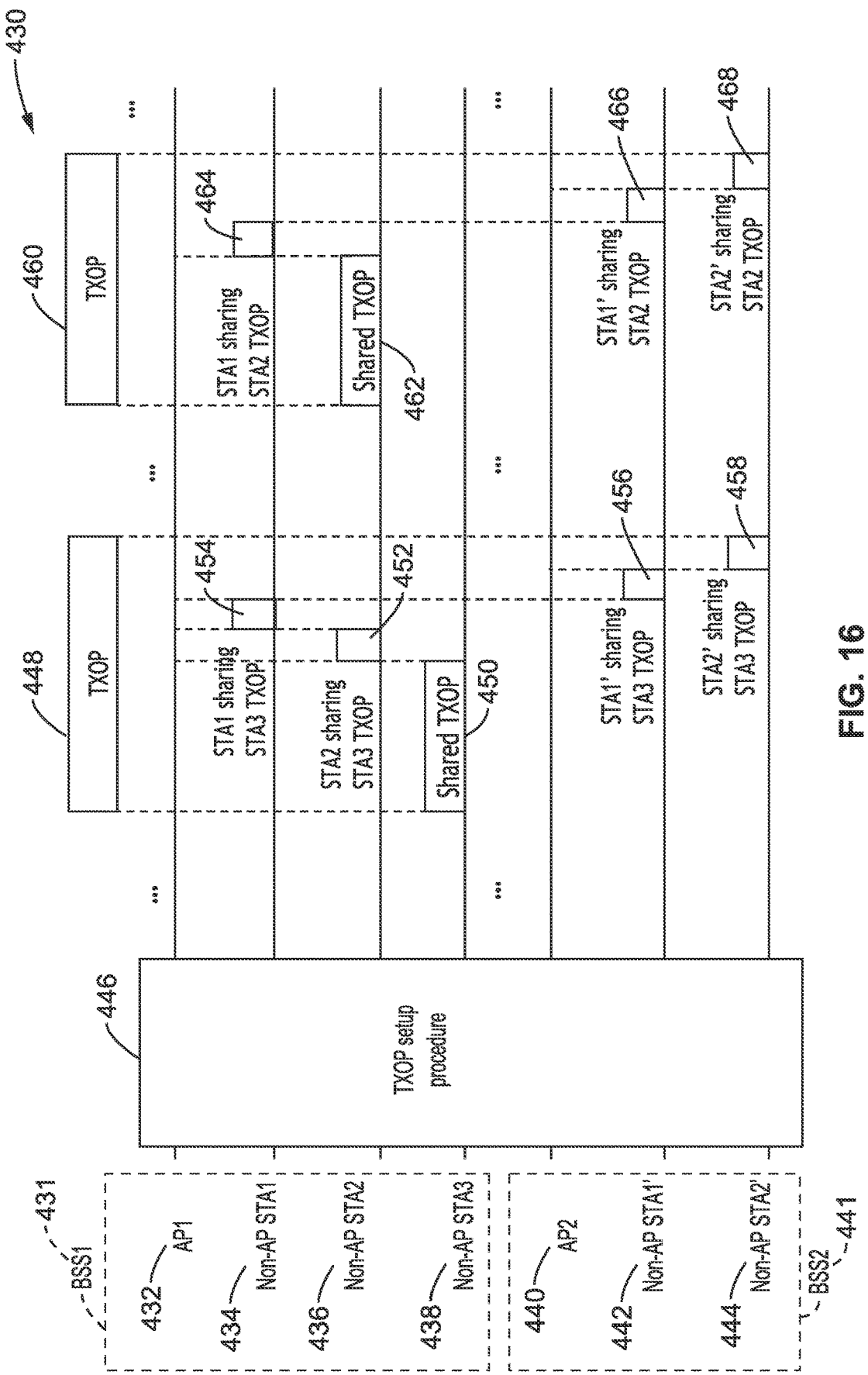
FIG. 16 is a communication sequence diagram of a shared TXOP initiated by the non-AP TXOP holder STA in OBSS according to at least one embodiment of the present disclosure.

FIG. 16 illustrates an example embodiment 430 of a shared TXOP initiated by the non-AP TXOP holder STA in OBSS. The figure shows interaction between STAs across a first BSS (BSS1) 431, containing AP1 432, and non-AP STA1 434, non-AP STA2 436 and non-AP STA3 438. A second BSS (BSS2) 441 is shown with AP2 440, non-AP STA1' 442 and non-AP STA2' 444. A TXOP setup procedure 446 is performed.

In the figure two STAs are sharing the TXOP 448 channel access process. STA3 from BSS1 gains the channel and functions as the shared TXOP holder STA. STA3, in this case, shares the TXOP with other STAs in both BSSs and schedules and assigns a shared TXOP access slot for them. STA3 first accesses the channel 450 for UL transmission in the beginning of the shared TXOP. Then, following the assignment, STA1 and STA2 in BSS1 sends UL DATA 452 and 454 to AP1 sequentially. After this, STA1' 442 and STA2' 444 in BSS2 441 send UL DATA 456, 458 to AP2 sequentially.

For the second communication STA2 436 in BSS1 431 gains the channel of TXOP 460 and operates as the shared TXOP holder. After STA2 transmits UL DATA 462 to AP1 in the beginning of the shared TXOP 448, STA1 in BSS1 joins the shared TXOP and sends UL DATA 464 to AP1. It should be appreciated in all these examples that not every STA is required to join the shared TXOP. Then, STA1' and STA2' in BSS2 send UL DATA 466 and 468 to AP2 sequentially in the assigned shared TXOP access slots.

6.3. Scenario Classification

In the present disclosure are described different solutions regarding different scenarios: (1) dynamic scenarios: (a) without AP as a coordinator in BSS1, and (b) with AP as a coordinator in BSS1; (2) Semi-static scenarios. It should be noted that the OBSS always needs an AP to operate as a coordinator between the two BSSs.

7. Protocol Design 7.1. Overview of the Protocol

Figure 17:
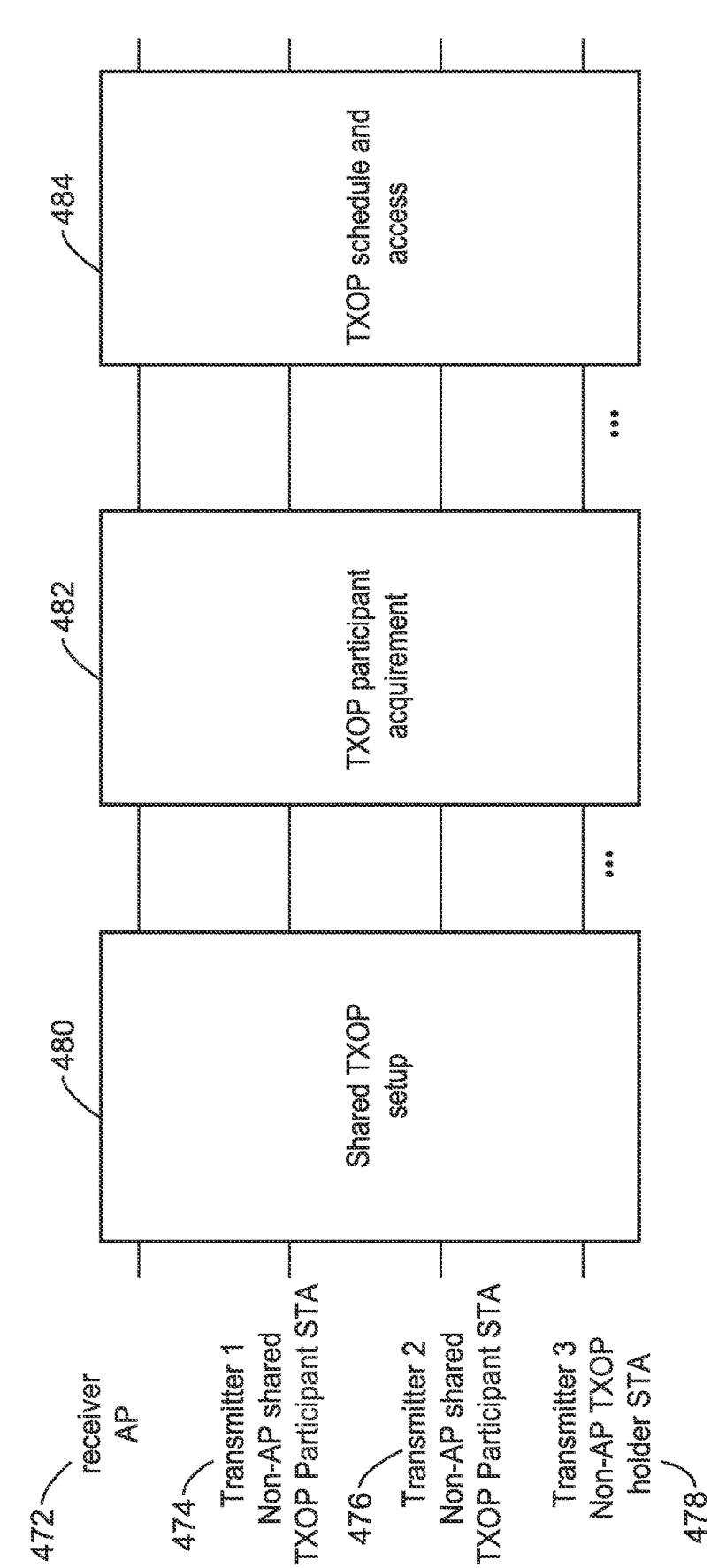
FIG. 17 is a communication sequence diagram of the principle stages of the disclosed protocol according to at least one embodiment of the present disclosure.

FIG. 17 illustrates an example embodiment 470 of the principle stages of the disclosed protocol as a general overview of the proposed dynamic scheduling based protocol (for example, a TXOP holder which senses that the channel is idle and gains the channel and shares its channel access in the time domain with other devices from the same BSS and the OBSS. If other STAs also have UL DATA to transmit, they will access the channel following the schedule as determined by the shared TXOP holder or based on the predetermined semi-static scheduling scheme.

Another protocol is also described which is based on semi-static scenario. It will be appreciated that there is no dynamic scheduling in the semi-static scenario. The decision may be made only once at the beginning stage, or this schedule can be reset or updated in a certain interval—thus this scheduler scheme is referred to as semi-static. In the semi-static scenario, the access schedule is referred to as predetermined, since the schedule is determined at the very beginning, such as during network setup. At this point, no STAs start TXOP and there is no TXOP holder. Each STA as a potential TXOP holder sends the preconfigured schedule, which means if it becomes a TXOP holder in the future, others can immediately use the assigned TXOP based on this preconfigured schedule. The semi-static scenario based protocol is introduced in Section 7.6.

Returning now to FIG. 17, the figure shows interaction between STAs in a first BSS (BSS1) containing AP 472, non-AP STA1 474, non-AP STA2 476 and non-AP STA3 478. The proposed protocol includes three stages and can be applied to different channel access designs, such as random access and scheduled access.

In the first stage a shared TXOP setup 480 is performed, the non-AP STAs and the AP in each BSS exchange TXOP shareability information, that indicates if the non-AP STAs are willing to share the offer/request of the TXOP by embedding this information in the authentication request, authentication response, association request, association response, beacon or any other frame exchanges, through the coordination of the AP. The share offer/request information is further exchanged between BSSs through the coordination of APs in both BSS, although the other BSS is not specifically shown in this figure. It will be noted that the TXOP shareability information is the same as the share offer/request information.

In the TXOP participant acquirement stage 482, the TXOP holder inquires on the other devices, with or without the coordination of the AP, in the same BSS (for example by unicasting or broadcasting a TXOP offer frame) to identify the shared TXOP participant in the shared TXOP (with receiving the access request frame from the shared TXOP participant). Then the AP from the shared TXOP holder BSS sends a CTS-share frame to the AP of the OBSS to initiate the inquiry process in the OBSS. The AP of the OBSS inquires on the other devices (e.g., by exchanging TXOP offers and accessing request frames) in the OBSS to identify the shared TXOP participants and sends their information back (e.g., in a shared TXOP participant announcement frame) to the AP of the shared TXOP BSS.

In the TXOP schedule and access stage 484, the TXOP holder allocates and assigns channel access resources with or without the coordination of the AP (e.g., by sending a TXOP offer frame or TXOP access scheduler frames or broadcasting TXOP schedule frames) to all the shared TXOP participants of the shared TXOP BSS. Then, the AP further assigns the TXOP access to the shared TXOP participants in the OBSS (e.g., by unicasting TXOP access scheduler frames to the AP of the OBSS, which further forwards this information to the STAs in the OBSS by sending a TXOP offer frame or a TXOP access scheduler frame or a broadcasted TXOP schedule frame).

It should be noted that a system can be implemented as a subset of these stages (e.g., all stages are not mandatory), or in a superset of these stages, without departing from the teachings of the present disclosure.

7.1.1. Shared TXOP Setup Stage

Figure 18:
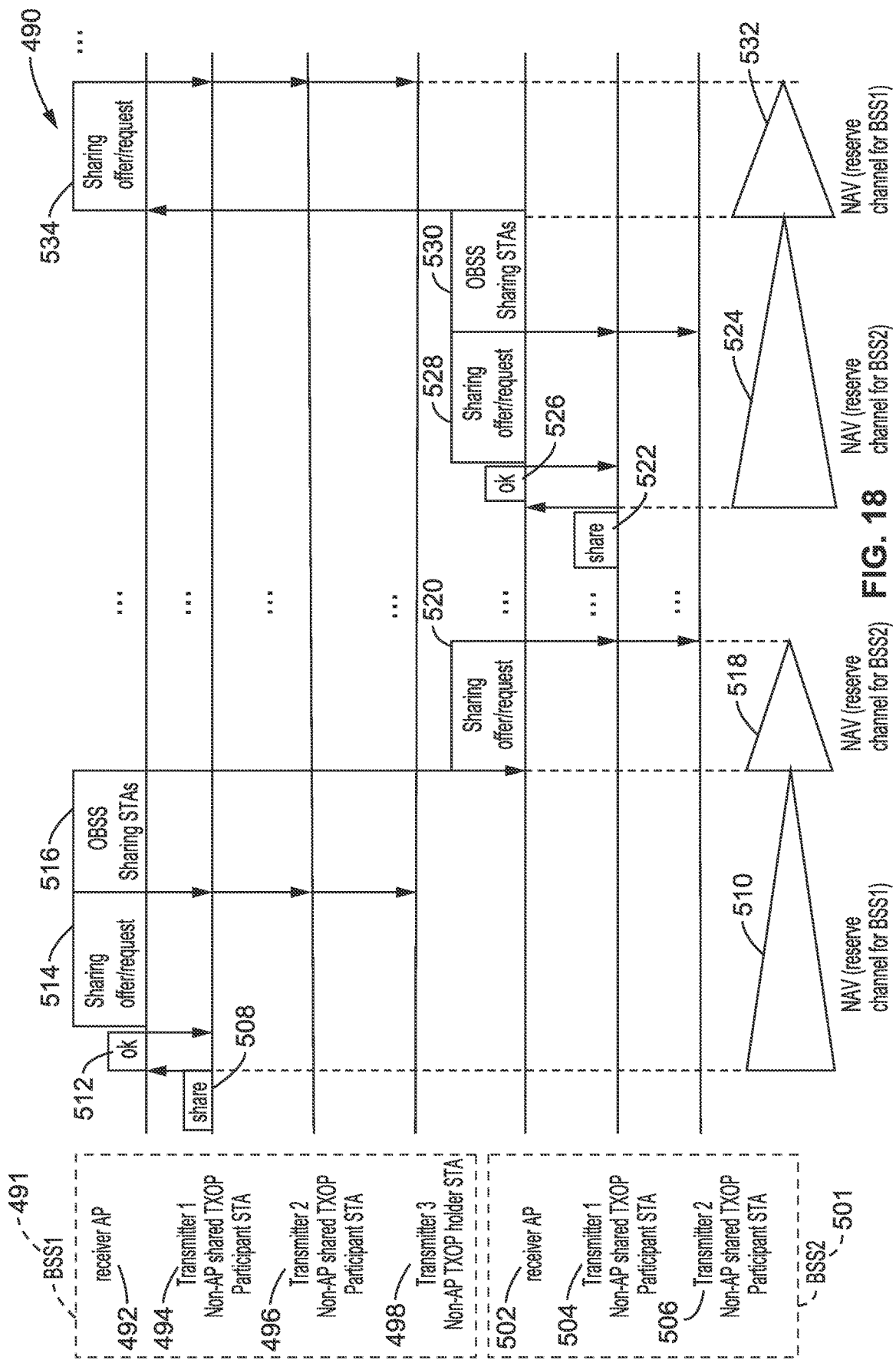
FIG. 18 is a communication sequence diagram of a shared TXOP setup stage of the OBSS scenario showing a shared information exchange in the shared TXOP setup stage for the OBSS scenario according to at least one embodiment of the present disclosure.

FIG. 18 illustrates an example embodiment 490 of the shared TXOP setup stage of the OBSS scenario showing a shared information exchange in the shared TXOP setup stage for the OBSS scenario. The figure shows interaction between STAs across a first BSS (BSS1) 491, containing AP1 492, non-AP STA1 494, non-AP STA2 496 and non-AP STA3 498. A second BSS (BSS2) 501 is shown with a receiver AP 502, non-AP STA1' 504 and non-AP STA2' 506.

The non-AP STAs indicate their share offer/request information 508 in the authentication/association request frame, which are sent to the associated AP, which responds with an acknowledgement 512.

A new communication element, as a STA TXOP shareability element, is embedded in these management frames or any other exchanged frames with the AP to indicate the share offer/request information of the shared TXOP devices. Once the AP receives this element, it checks the shareability information and sends a frame to confirm successful reception, for example through authentication/association response frames or through a beacon.

Then the AP broadcasts the share offer/requests information 514 of all the associated non-AP STAs with the sharing offer/request frame. This sharing offer/request 514 is shown being broadcast to STA1, STA2 and STA3 in BSS1. In this case, once a non-AP STA receives a sharing offer/request frame, it is made aware of the shareability of other non-AP STAs and updates its database.

Then, the AP unicasts an OBSS sharing STAs frame 516 to another AP 502 of the OBSS and indicates the shareability of all the associated non-AP STAs. Once the other AP receives the OBSS sharing STAs frame, it will check the TA field (which is the MAC address of the AP who sent this OBSS sharing STAs frame) and broadcasts this information within its BSS within a sharing offer/request frame 520 with the BSSID set as the TA as indicated in the received OBSS sharing STAs frame.

A similar set of operations is then shown on the right side of this figure, from the view point of STAs in BSS2 510. STA1' 512 sends a share request 522 to AP 512, which acknowledges 526 the transmission then sends a sharing offer/request 528 to STA1' and STA2'. After this AP 502 sends an OBSS sharing STAs message 530 to AP 492 of BSS1 491, which then sends a sharing offer/request 534 to its associated non-AP STAs.

The figure also depicts NAV operation 510, 518, 524 and 532 showing how the channel is reserved in different intervals for either BSS1 or BSS2.

Figure 19:
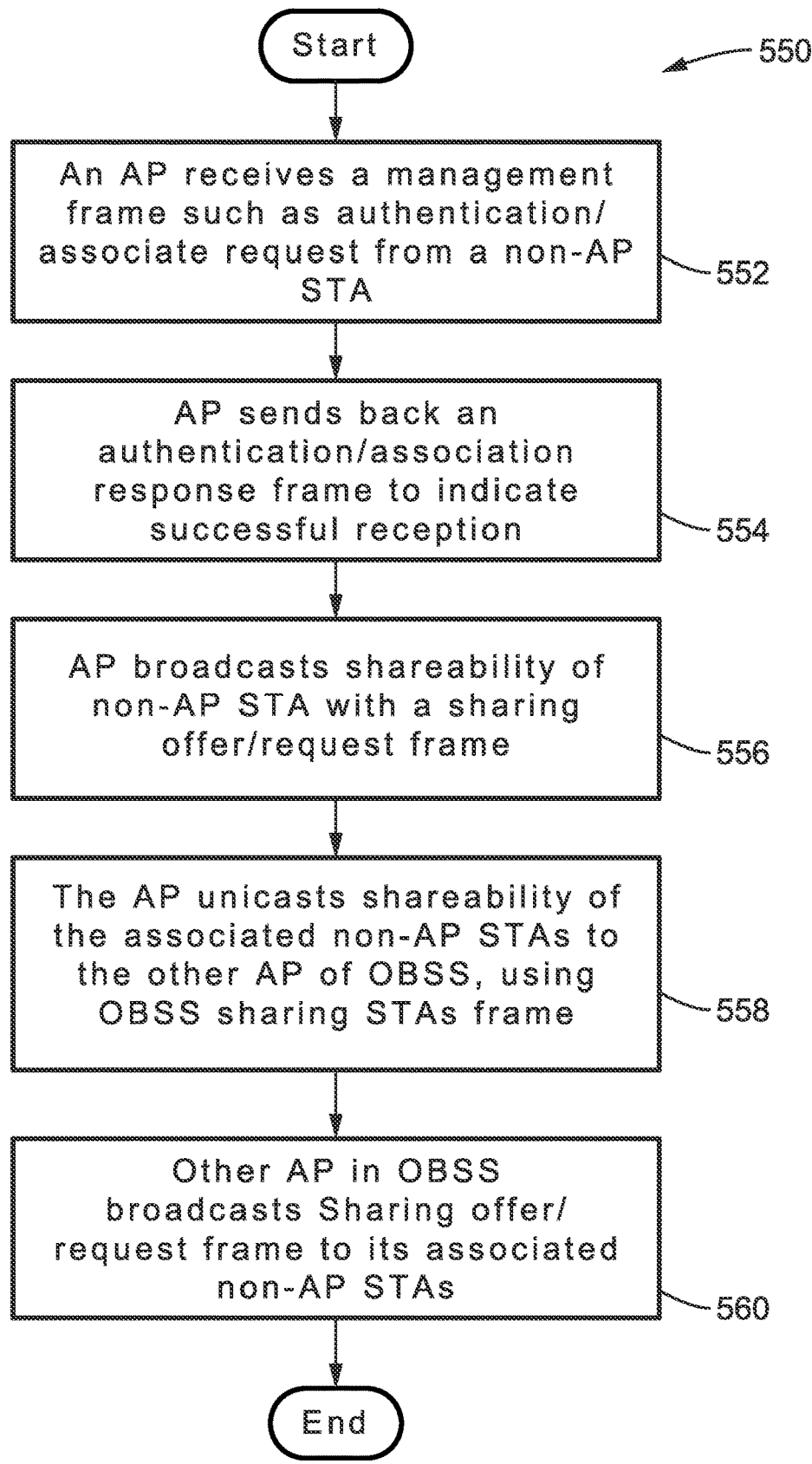
FIG. 19 is a flow diagram of a shared TXOP setup stage for an OBSS scenario that is handled by AP according to at least one embodiment of the present disclosure.

FIG. 19 illustrates an example embodiment 550 of the shared TXOP setup stage for an OBSS scenario that is handled by the AP. The AP receives 552 a management frame, for example an authentication/associate request, from a non-AP STA. The AP responds back 554 with an acknowledgement.

The AP broadcasts 556 a sharing offer/request frame to all the non-AP STAs in the internal BSS to update the shareability information of the non-AP STA.

The BSSID field of the sharing offer/request frame indicates the same MAC address as the TA of this frame, this indicates that the sharing offer/request frame is delivering 556 shareability information from a shared TXOP holder of the internal BSS. Then, the AP unicasts 558 shareability information of the associated non-AP STAs to the other AP of the OBSS, using OBSS sharing STAs frame.

When the other AP in the OBSS receives the OBSS Sharing STAs having a destination of itself, it should broadcast 560 the Sharing offer/request frame including indicating that the BSSID is the same as the TA field of the recently received OBSS Sharing STAs frame, which indicates the sharing offer/request frame is delivering shareability information from the OBSS which has an ID that is indicated by BSSID.

Figure 20:
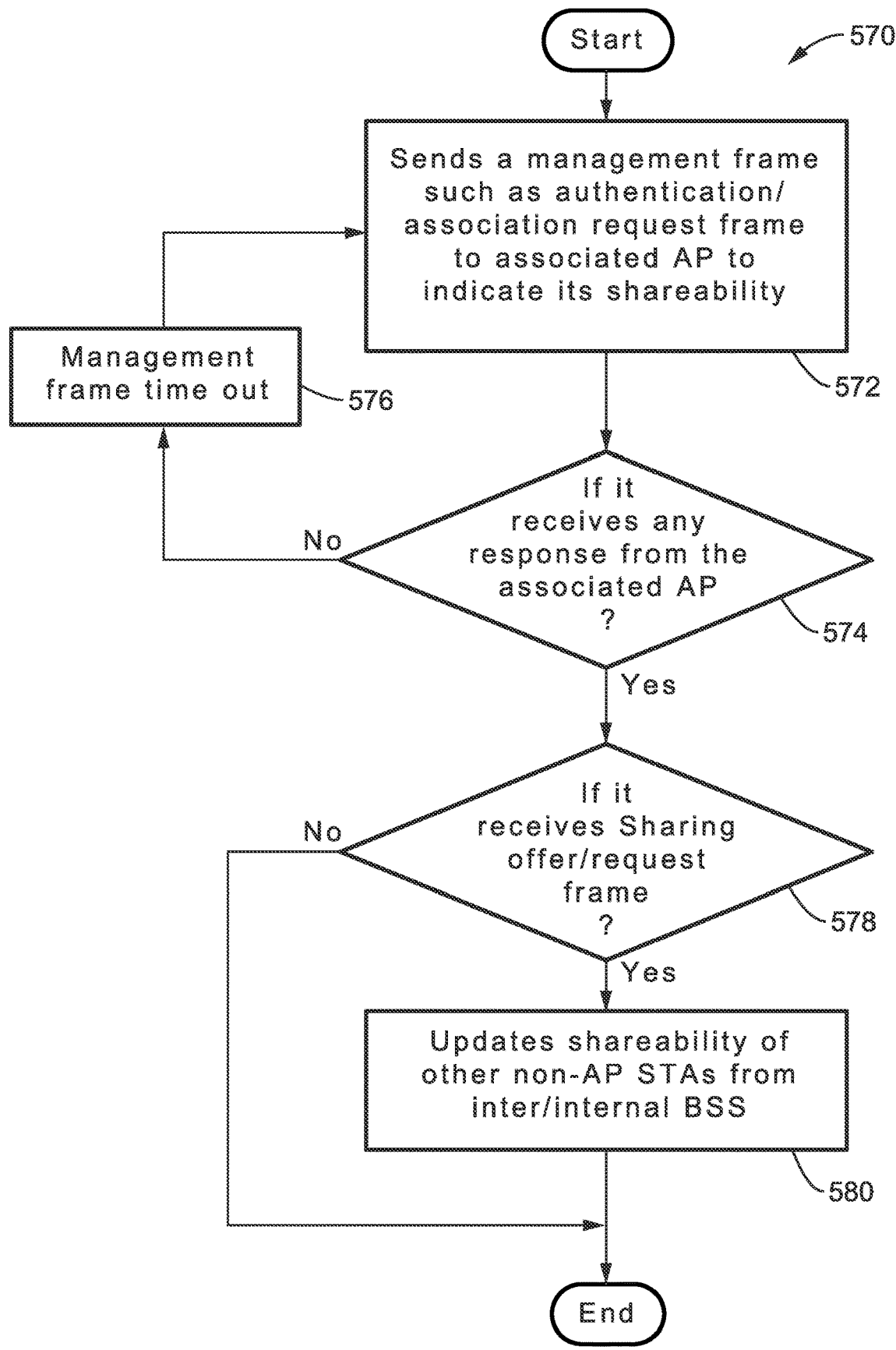
FIG. 20 is a flow diagram of a shared TXOP setup stage for an OBSS scenario that is handled at the non-AP STA level according to at least one embodiment of the present disclosure.

FIG. 20 illustrates an example embodiment 570 of the shared TXOP setup stage for an OBSS scenario that is handled at the non-AP STA level.

After the shared TXOP Setup stage starts (commences), the Non-AP STA sends 572 a management frame to the associated AP to indicate its share offer/request information of the shared TXOP, the NAV is also set up to prevent interference caused by transmission from the OBSS.

Check 574 determines if the non-AP STA has received any feedback from the associated AP within the timeout period after sending an authentication frame or the association frame that contains the shareability information. If the STA has not received a response from the AP, within the time out period, then a management frame time out occurs 576 and execution returns to block 572 for the non-AP STA to retransmit the management frame to the associated AP to indicate its shareability.

Otherwise, if block 574 determines that a response was received from the AP, then execution reaches check 578 which determines if the non-AP STA has received a sharing offer/request frame; otherwise this processing ends.

If the non-AP STA received a sharing offer/request frame, then at block 580 it updates the latest shareability information of other non-AP STAs, which may be from an inter BSS if the BSSID field and the TA field of the sharing offer/request frame indicates a different MAC address, or from the internal BSS if the BSSID field and the TA field of the sharing offer/request frame indicates the same MAC address.

7.2. TXOP Participant Acquirement Stage (w/o AP Coordinator in BSS1)

7.2.1. TXOP Participant Acquirement w/Response after Receiving TXOP Offer

Figure 21:
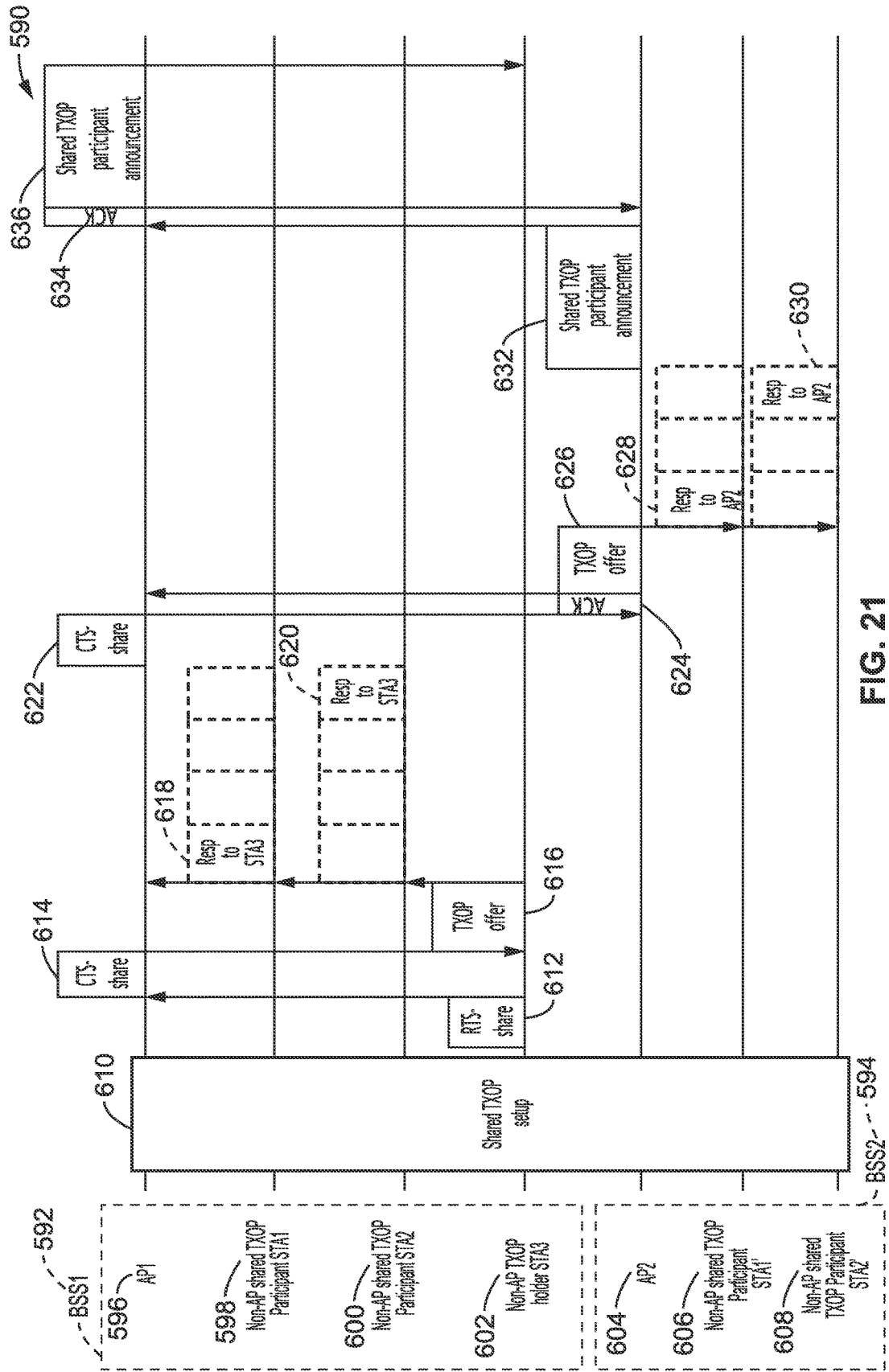
FIG. 21 is a communication sequence diagram of a TXOP participant acquirement with response after receiving a TXOP offer according to at least one embodiment of the present disclosure.

FIG. 21 illustrates an example embodiment 590 of a TXOP participant acquirement with response after receiving a TXOP offer. The figure shows interaction between STAs across a first BSS (BSS1) 592, containing AP1 596, and non-AP STA1 598, non-AP STA2 600 and non-AP STA3 602. A second BSS (BSS2) 594 is shown with AP2 604, non-AP STA1' 606 and non-AP STA2' 608. A TXOP setup procedure 610 is performed.

After the setup stage STA3 is shown as the first to obtain the channel by sending RTS-share frame 612 to AP1, and STA3 becomes the shared TXOP holder. Upon AP1 receiving the RTS-share frame from the shared TXOP holder, it sends out a CTS-share frame 614.

Upon receiving the CTS-share frame as an immediate response of the previously sent RTS-share frame, STA3 broadcasts TXOP offer frame 616 to indicate its role as a shared TXOP holder and inquires to obtain responses from the shared TXOP participants during the following time offset.

After devices in BSS1 receive the TXOP offer frames, they check the BSSID field to confirm if the TXOP offer frame is sent from the same BSS. If so, the participating STAs respond with an Access Request Frame to the source device of the TXOP offer frame within the time offset 618 and 620 assigned by the TXOP offer frame. If the TXOP offer frame is sent from a different BSS (as indicated by the BSSID different with their associated AP), the non-AP participant STAs don't do anything.

After the time offset expires, the AP of the shared BSS1 sends another CTS-share frame 622 to the other AP (AP2) 604. After receiving the CTS-share frame from AP1, AP2 responds with an ACK 624 to indicate successful reception. Then AP2 broadcasts TXOP offer frame 626 indicating it's BSSID and inquires to obtain shared TXOP participant responses in the following time offset 628 and 630. These STAs in BSS2 receive the TXOP offer frame, and they first check the BSSID field. If the BSSID indicates that this frame is sent from the same BSS, they should respond with an Access Request Frame to the source device of the TXOP offer frame within the time offset assigned by the TXOP offer frame.

After the time offset expires, then AP2 sends the Shared TXOP participant announcement frame 632 to AP1, which acknowledges 634 the transmission, and forwards the shared TXOP participant announcement frame 636 to the non-AP TXOP holder, which in this example is STA3 602.

7.2.2. TXOP Participant Acquirement Stage w/Response after Receiving CTS

Figure 22:
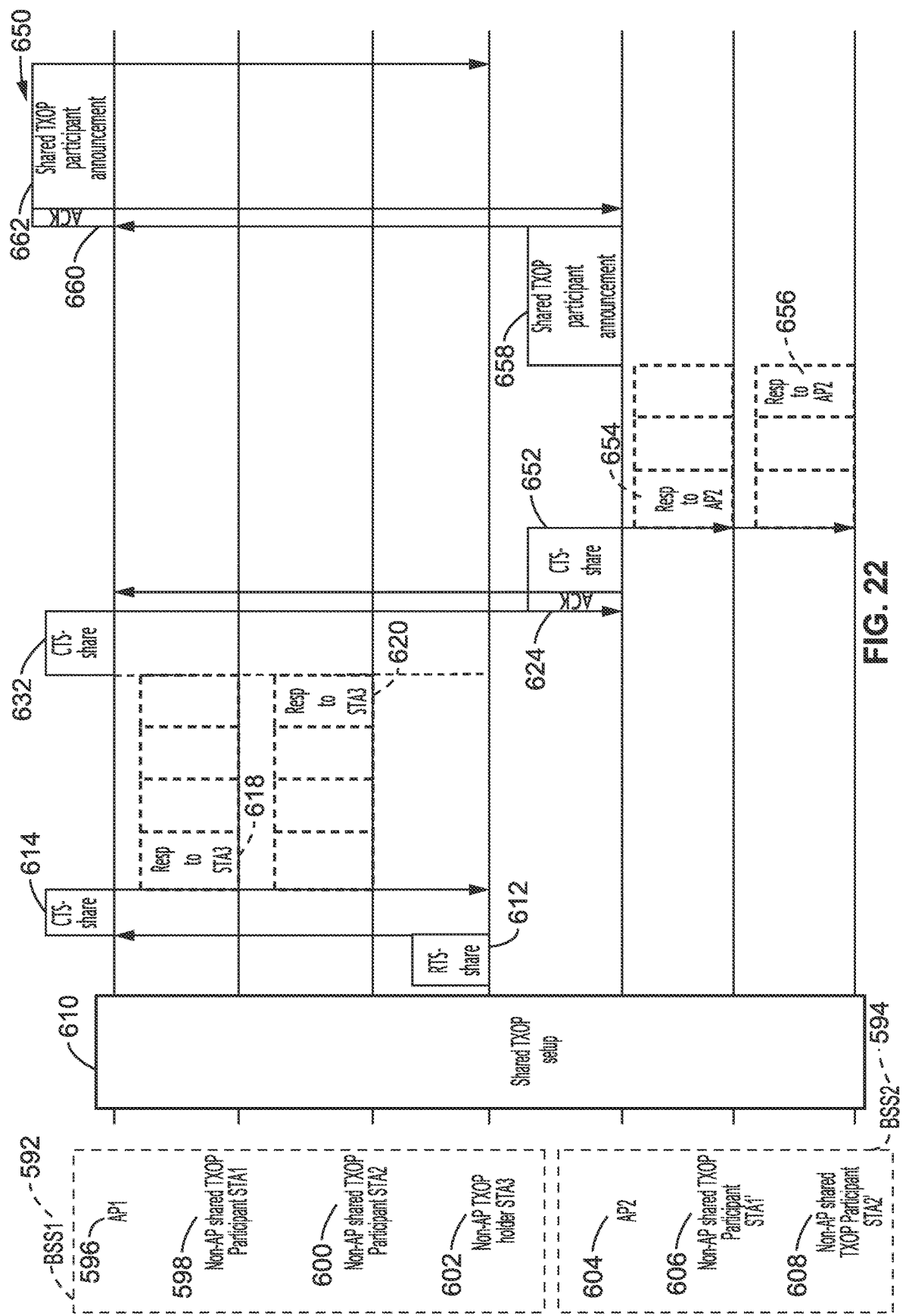
FIG. 22 is a communication sequence diagram of a TXOP participant acquirement stage with response after receiving CTS-share according to at least one embodiment of the present disclosure.

FIG. 22 illustrates an example embodiment 650 of the TXOP participant acquirement stage with response after receiving CTS-share. The figure shows interaction between STAs across a first BSS (BSS1) 592, containing AP1 596, and non-AP STA1 598, non-AP STA2 600 and non-AP STA3 602. A second BSS (BSS2) 594 is shown with AP2 604, and non-AP STA1' 606 as well as non-AP STA2' 608. A TXOP shared setup procedure 610 is performed.

The figure is almost the same as the previously introduced TXOP participant acquirement with a response sent after receiving the TXOP offer, except for removing of the TXOP offer frame step.

In particular, the operations 612 through 624 are identical as in the prior figure. Except in this figure, after a non-AP device receives the CTS-share frame 632 and has sent an ACK, it sends a CTS-share frame 652, instead of the TXOP offer as in prior figure.

The non-AP participant STAs then send Access Request Frames 654 and 656 to the source device of the CTS-share frame 652 by performing random accesses of the channel in the advertised time slots as defined in the Access request information element in the previous exchange of the management frames (e.g., authentication request, authentication response, association request, association response or any other frames that exchanges during shared TXOP setup stage). AP2 604 then sends a shared TXOP participant announcement 658 to AP1 596 in BSS1 492, which ACKs 660 the transmission and sends a shared TXOP participant announcement 662 to the TXOP holder STA in its BSS, which in this case is STA3 602.

Figure 23:
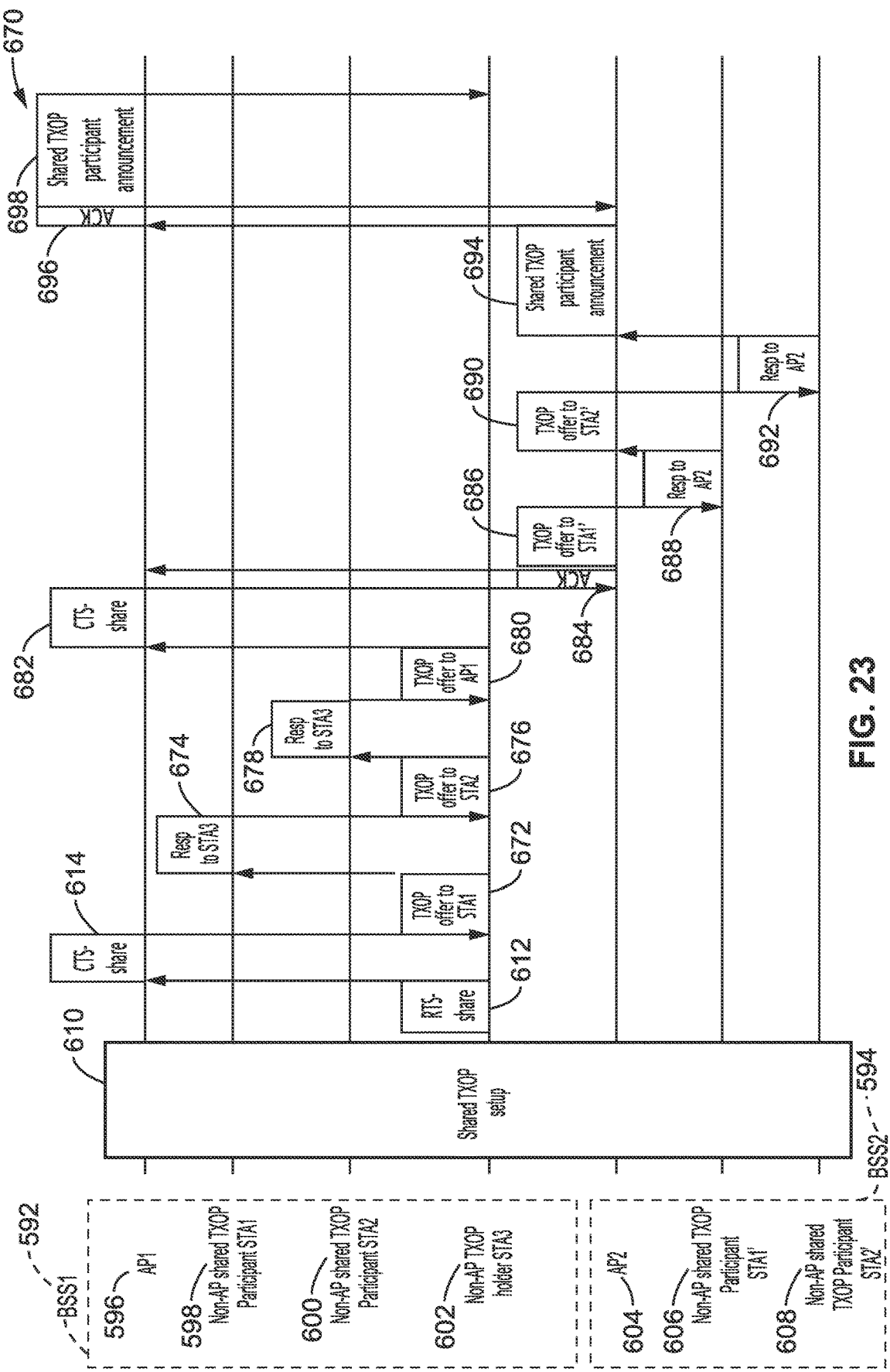
FIG. 23 is a communication sequence diagram of a TXOP participant acquirement stage with response after receiving a TXOP offer according to at least one embodiment of the present disclosure.

7.2.3. TXOP Participant Acquirement Stage w/Response after Dedicated TXOP Offer Frame FIG. 23 illustrates an example embodiment 670 of the TXOP participant acquirement stage with response after receiving a TXOP offer. As in the prior figure, interactions are shown between STAs across a first BSS (BSS1) 592, containing AP1 596, and non-AP STA1 598, non-AP STA2 600 and non-AP STA3 602. A second BSS (BSS2) 594 is shown with AP2 604, non-AP STA1' 606 and non-AP STA2' 608. A TXOP shared setup procedure 610 is performed. After STA3 obtains the channel it sends out an RTS-share 612 to AP1 and receives a CTS-share 614 from AP1 as in the previous figure.

STA3 in this case unicasts offer frames to other STAs in BSS1 in a sequential, one-by-one basis. In particular it is seen sending a TXOP offer frame to STA1 672 and to STA2 676. After receiving the unicast TXOP offer frame, each receiver STA responds with an Access Request Frame 674 and 678 for the non-AP STAs to indicate if they are willing to join the shared TXOP; thus the TXOP holder is shown receiving responses back from the non-AP STAs.

After STA3 finishes looping through all the non-AP STAs in BSS1 by sending TXOP offer frames, it sends a TXOP offer 680 to AP1. AP1 receives the TXOP offer frame and is thus made aware that the inquiry process have been performed for BSS1, and the AP1 sends a CTS-share 682 to AP2 to initiate the inquire process for BSS2.

AP2 604 receives the CTS-share frame from AP1 and responds with an ACK 684 to indicate successful reception. AP2 then sends TXOP offer frames 686 and 690 to other STAs in BSS2 sequentially in a one-by-one manner and receives Access Request Frames 688 and 692 from each polled STAs in response.

After AP2 finishes looping through all the STAs in BSS2 by sending TXOP offer frames, it sends a Shared TXOP participant announcement frame 694 to AP1 496 of BSS1 592. Once AP1 receives and acknowledges 696 the Shared TXOP participant announcement frame 694, it forwards this announcement frame as a shared TXOP participant announcement frame 698 to STA3.

It is very important to note that the AP can also join the shared TXOP with the other shared TXOP participants. Thus, the AP can also send its share request information to the shared TXOP holder; or alternatively the AP can also be the shared TXOP holder, which in this case can acquire share request info from other STAs.

7.2.4. Participant Acquirement Stage at Shared TXOP Holder Level

Figure 24A:
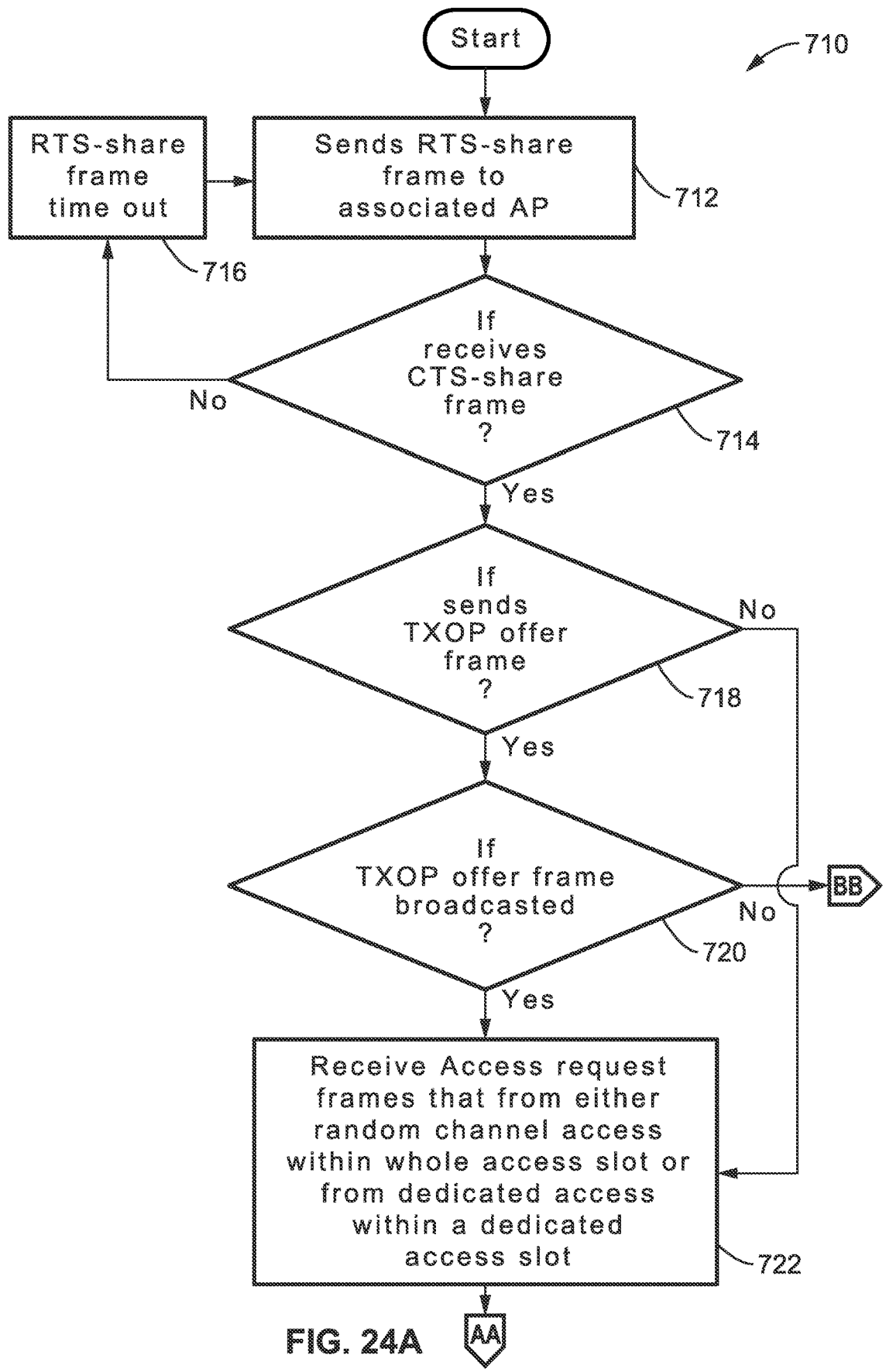
FIG. 24A and FIG. 24B is a flow diagram of a participant acquirement stage showing processing performed at the shared TXOP holder STA level according to at least one embodiment of the present disclosure.
Figure 24B:
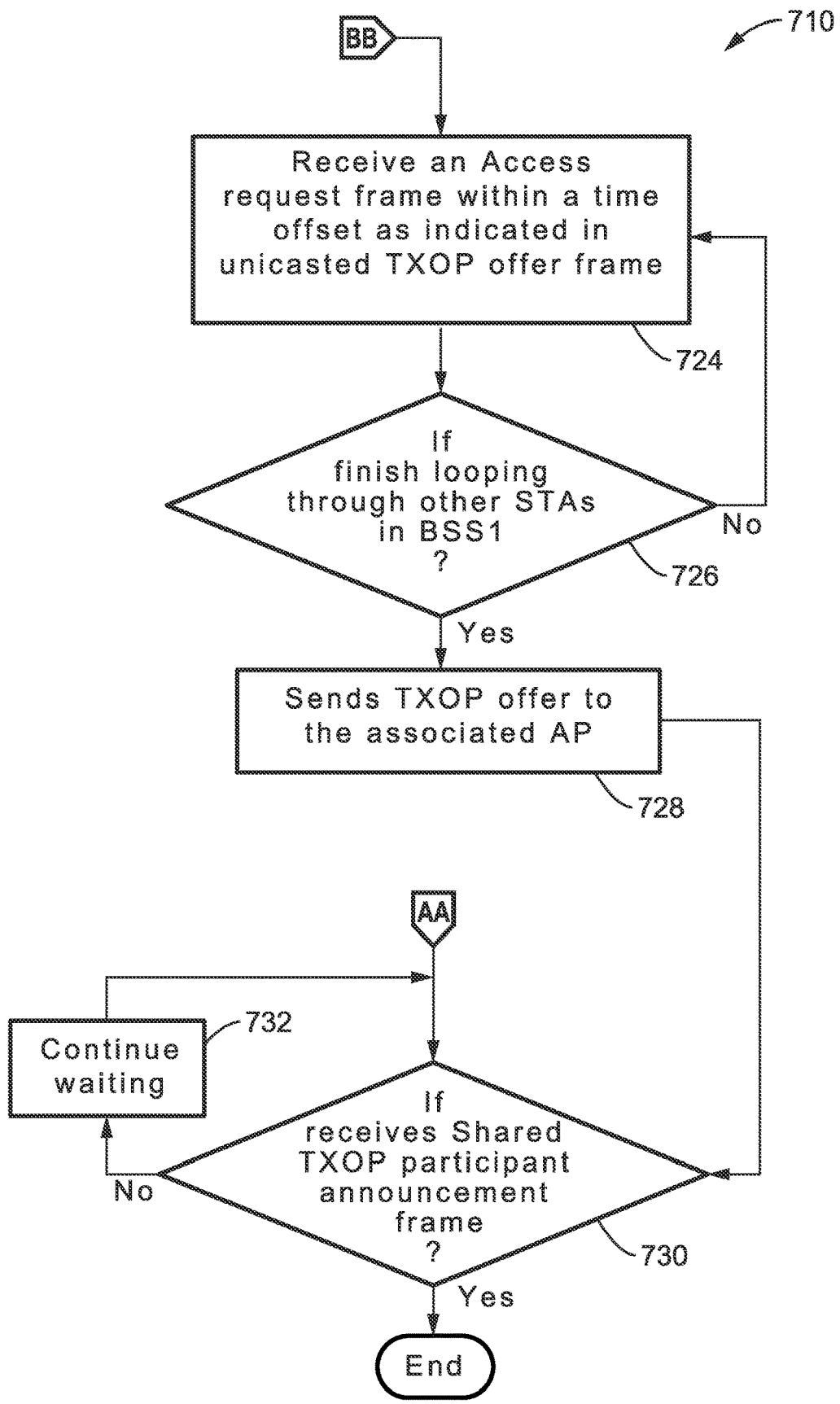

FIG. 24A and FIG. 24B illustrate an example embodiment 710 of a participant acquirement stage showing processing performed at the shared TXOP holder STA level.

The non-AP TXOP holder STA sends 712 an RTS-share frame to the associated AP. Check 714 determines if it has received a CTS-share frame in response. If the RTS-share frame times out 716, then execution returns to block 712 to send another RTS-share frame.

Otherwise, check 718 determines if the non-AP TXOP holder has sent a TXOP offer frame, or frames. If the condition is not met, then execution moves to block 722. If the condition is met, then check 720 determines if these offer frames were broadcast. If they were not broadcast, then execution moves to block 724 in FIG. 24B. Otherwise, since they were broadcast, then execution reaches block 722 with the non-AP TXOP holder STA receiving access request frames from either random channel accesses within the access slot periods, or from dedicated accesses within dedicated access slots. It should be noted that the dedicated slot duration is indicated by the Allocation Block Duration subfield of the Access request information element of the previously exchanged management frames in the shared TXOP setup stage. The whole access slot duration is also known based on adding up the dedicated slot duration.

From block 722 in FIG. 24A execution reaches check 730 in FIG. 24B which determines if the non-AP TXOP holder STA has received a shared TXOP announcement frame. If it has received the announcement frame then this processing ends, otherwise it continues waiting 732.

In the case of the TXOP offer frame not being broadcast, as detected in check 720, execution reaches block 724 with an access request frame being received within the given time offset as indicated in the TXOP Offer frame. Check 726 determines if the non-AP TXOP holder STA has finished looping through the other STAs in BSS1. If it has not finished looping, then execution returns to block 724. Otherwise, execution reaches block 728 and the non-AP TXOP holder STA sends a TXOP offer to the associated AP, before execution reaches block 730 which has already been described.

It should be noted that for the sake of brevity, this figure as well as others in the present disclosure, does not necessarily detail all the timeout conditions which can arise; however, it should be appreciated that any delays, retries or waiting which is performed may be interrupted/mitigated in response to executing instructions for handling excess delay, retries or waiting, without departing from the present teachings.

Figure 25A:
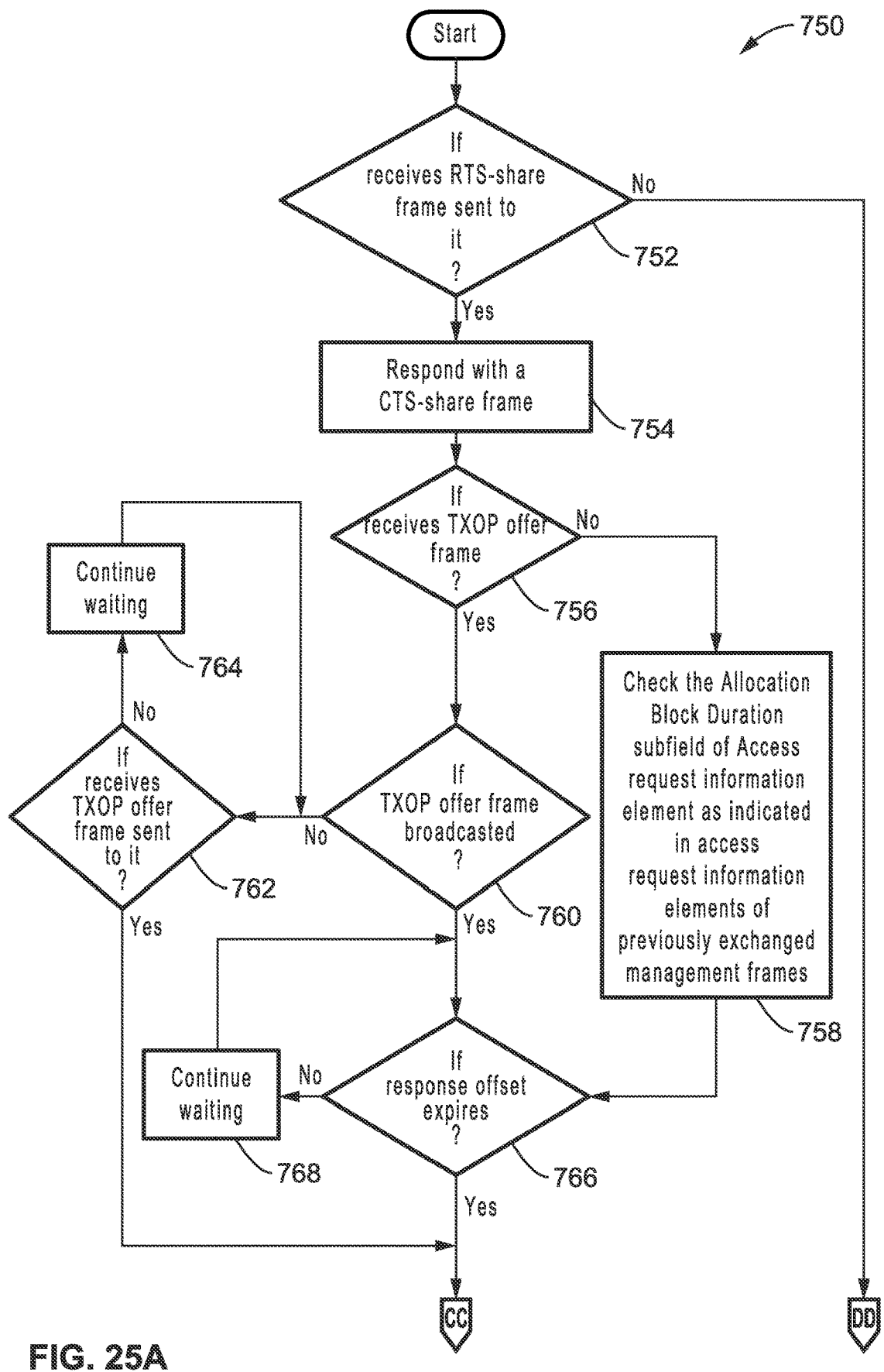
FIG. 25A and FIG. 25B is a flow diagram of a TXOP participant acquirement stage, process at AP of the shared TXOP holder BSS according to at least one embodiment of the present disclosure.
Figure 25B:
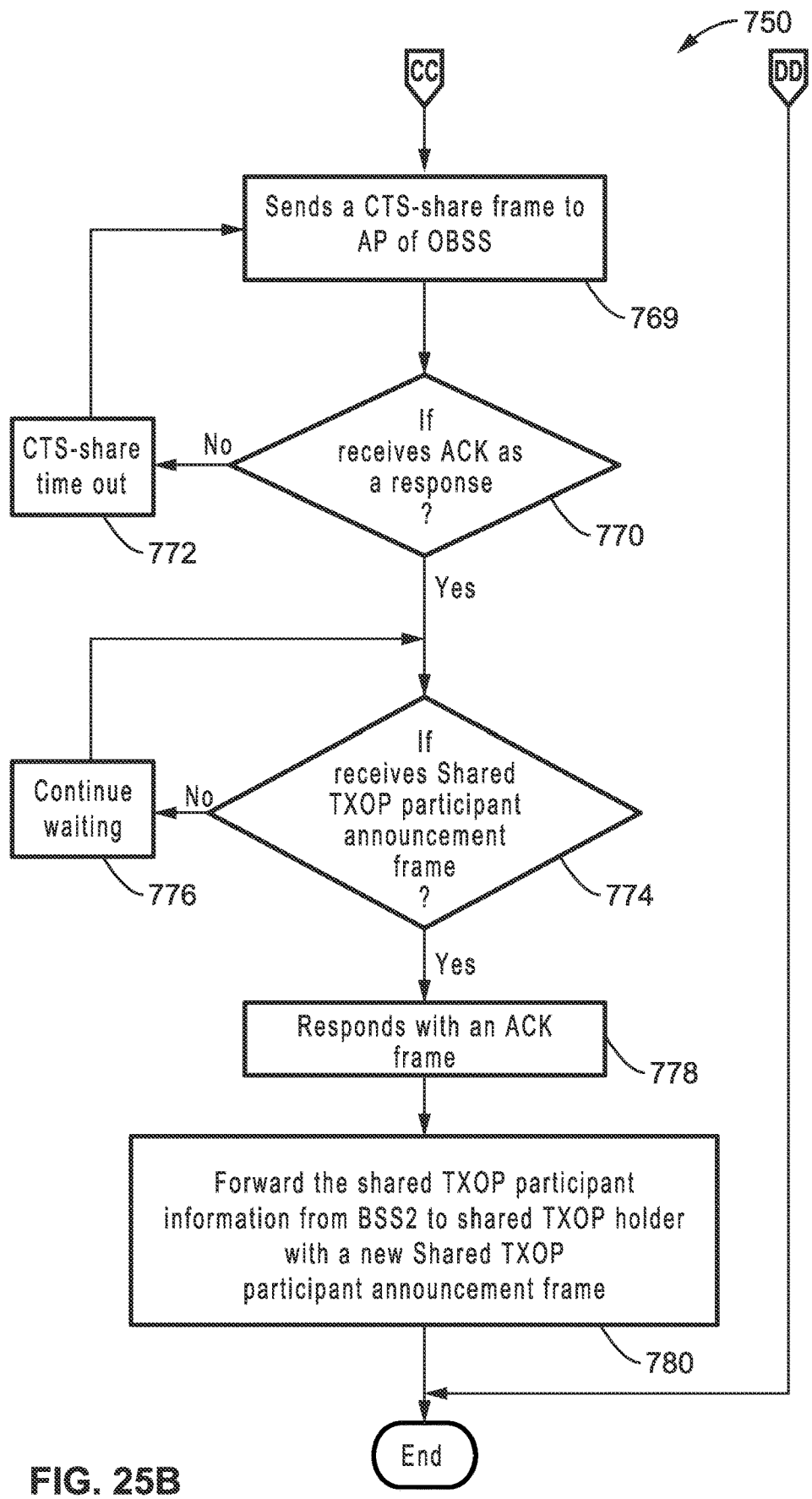

FIG. 25A and FIG. 25B illustrate an example embodiment 750 of the TXOP participant acquirement stage, processed at the AP of the shared TXOP holder BSS.

Check 752 determines if the AP has received an RTS-share frame sent to it. If not, then processing ends. Otherwise, at block 754 a response is generated by sending an CTS-share frame. Check 756 determines if the AP has received a TXOP offer frame. If the condition is not met, then at block 758 the allocation block duration subfield is checked within the access request information element of the previously exchanged management frames, with execution reaching block 766.

Otherwise, if the TXOP offer frame was detected in block 756, then check 760 is reached which determines if the TXOP offer frame was broadcast. If it was not broadcast, then at block 762 a check determines if the AP has received an TXOP offer addressed to it. If not then waiting 764 is performed for receiving the offer. Otherwise, execution moves to block 769 in FIG. 25B.

If however, check 760 finds that the TXOP offer frame was broadcast, then check 766 determines if the response offset (time period for response) has expired. If it has not expired, then waiting 768 is performed. Otherwise, execution moves to block 768 in FIG. 25B which sends a CTS-share frame to the AP of the OBSS.

Check 770 determines if the AP has received an ACK in response. If no ACK was received, then a CTS-timeout 772 occurs and generally execution returns to block 768.

Otherwise, upon receiving the ACK in block 770, then check 774 determines if the AP has received a shared TXOP participant announcement frame. If not yet received, then generally it waits 776. Upon receiving the participant announcement frame, the AP responds 778 by sending an ACK frame. Then the AP forwards 780 the shared TXOP participant information from BSS2 to the shared TXOP holder within a new shared TXOP participant announcement frame.

Figure 26A:
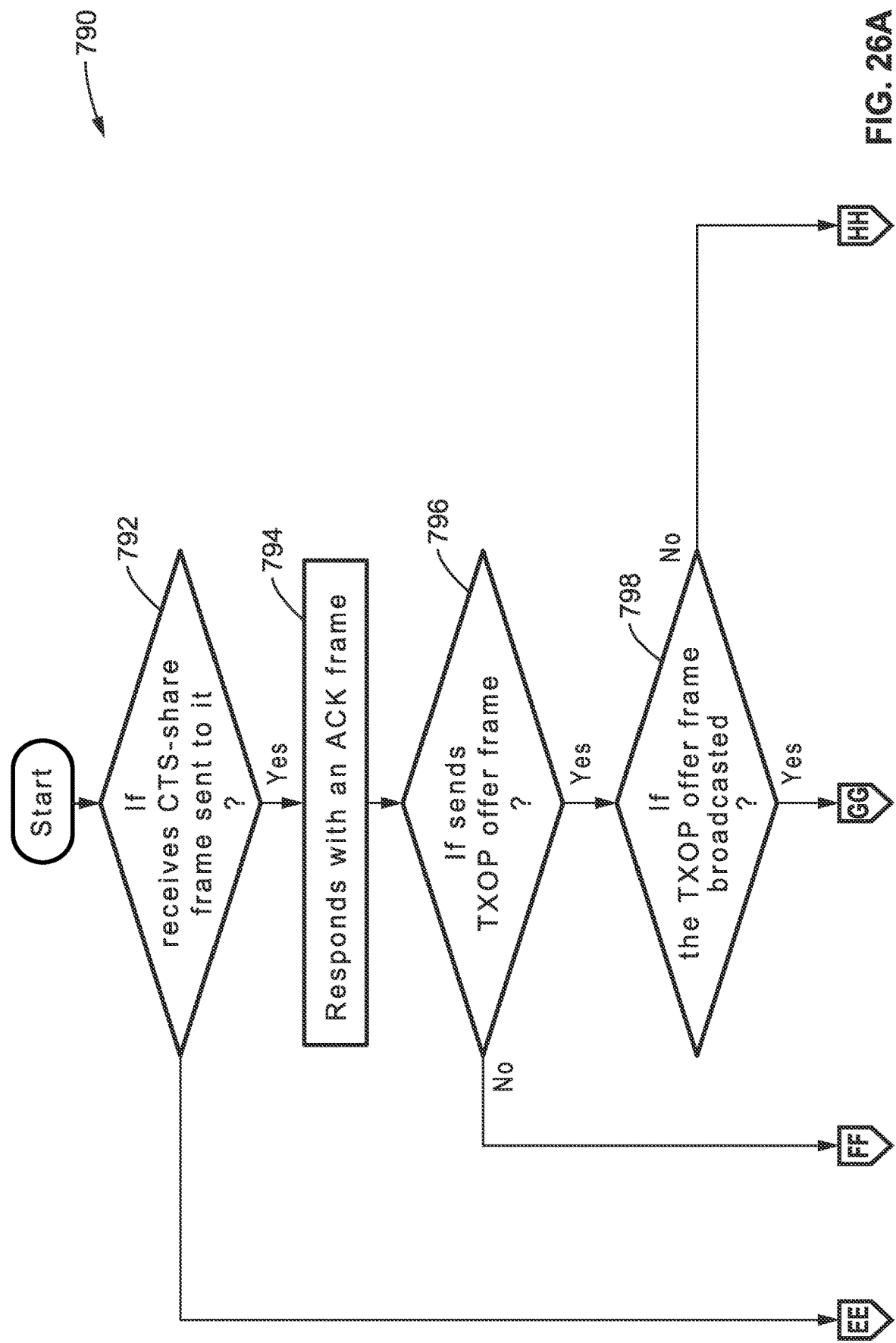
FIG. 26A and FIG. 26B is a flow diagram of a TXOP participant acquirement stage, processed at the AP of the OBSS according to at least one embodiment of the present disclosure.
Figure 26B:
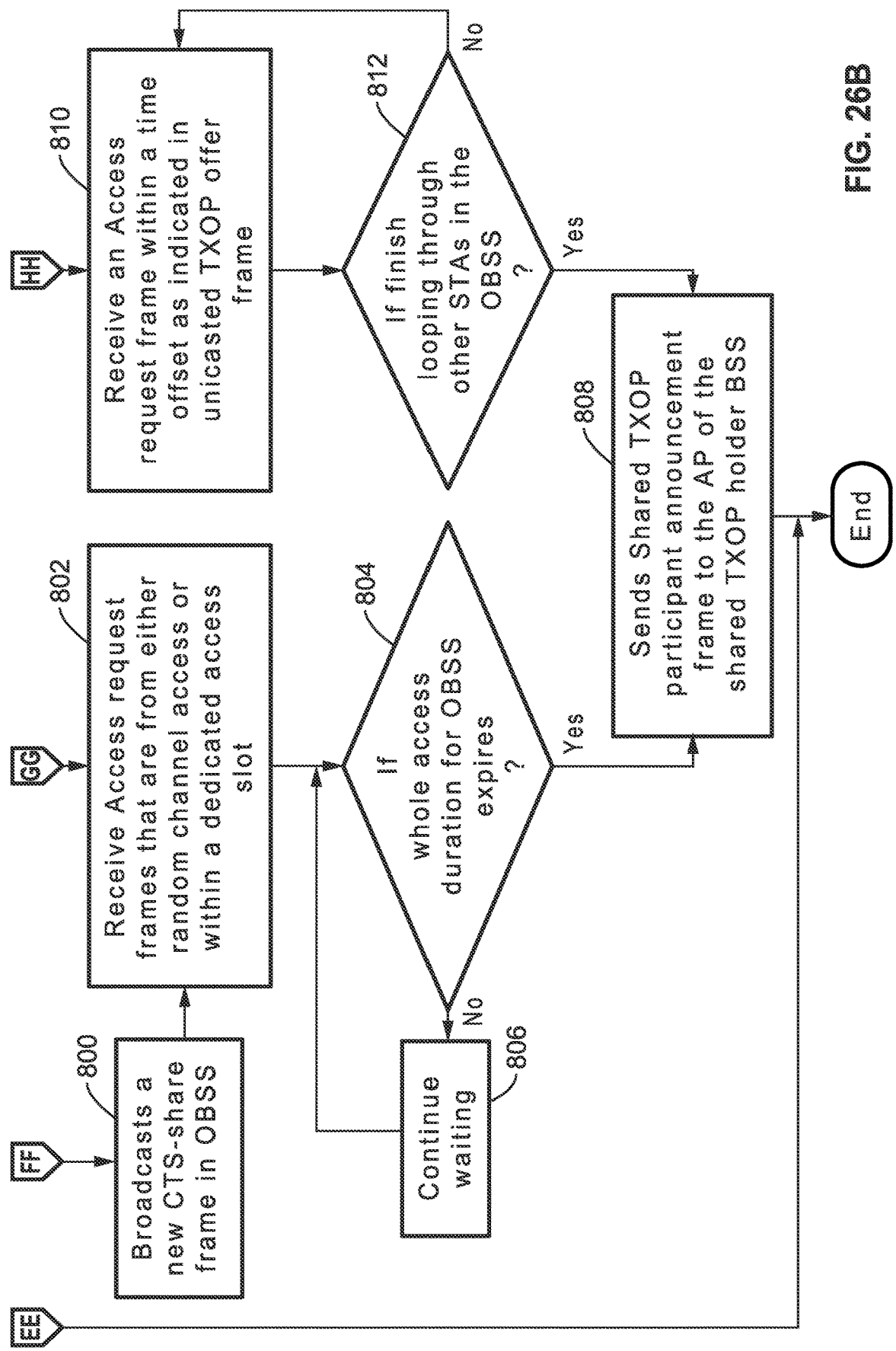

FIG. 26A and FIG. 26B illustrate an example embodiment 790 of TXOP participant acquirement stage, processed at the AP of the OBSS. At check 792 the AP of the OBSS determines if it has received a CTS-share frame sent to it. If it has not, then this processing ends. Otherwise, in block 794 it responds by sending an ACK frame to the CTS-share frame. Check 796 determines if it (the AP of the OBSS) has sent a TXOP offer frame. If it has not sent a TXOP offer frame, then block 800 in FIG. 26B is reached which broadcasts a new CTS-share frame in the OBSS, and then reaches block 802.

Otherwise, if it was determined in block 796 that the AP of the OBSS had sent a TXOP offer frame, then check 798 determines if the TXOP offer frame was broadcast. If it was broadcast, then at block 802 in FIG. 26B, the AP of the OBSS receives access request frames that are from either random channel access or within a dedicated access slot.

Check 804 determines if the entire access duration for the OBSS has expired. If the duration has not expired, then the AP of the OBSS continues waiting 806. Otherwise, block 808 is reached where the AP of the OBSS sends a shared TXOP participant announcement frame to the AP of the shared TXOP holder BSS.

Returning to consider check 798 in the case of the TXOP offer frame not being broadcast, then execution moves to block 810 of FIG. 26B with the AP of the OBSS configured for receiving an access request frame within a time offset as indicated in the unicasted TXOP offer frame. A check is made 812 to determine if the AP of the OBSS has finished looping through the other STAs in the OBSS. If it is not finished, then it keeps looping through (e.g., for at least a given time or condition). Otherwise, execution also reaches block 808 before processing ends.

Figure 27A:
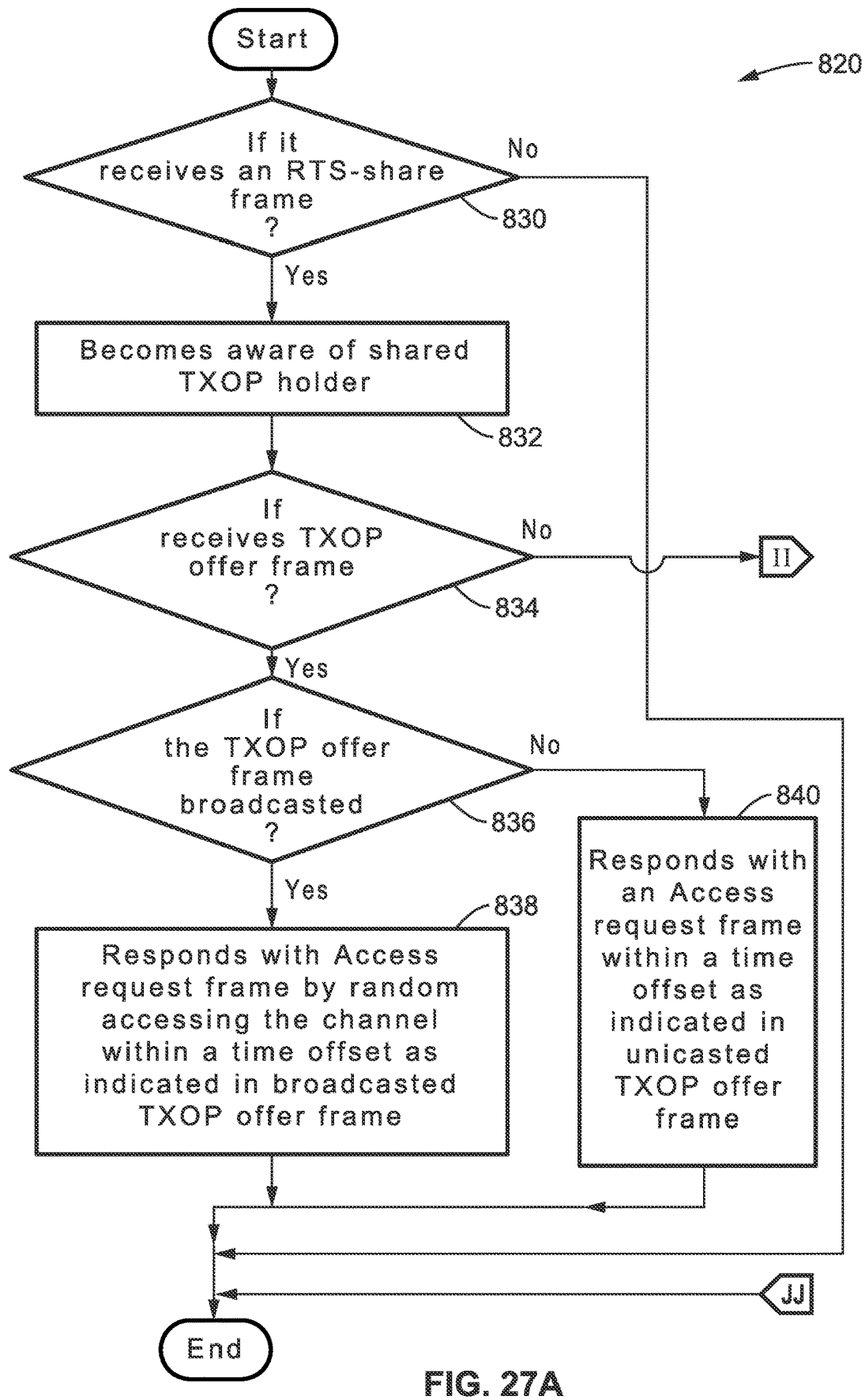
FIG. 27A and FIG. 27B is a flow diagram of a TXOP participant acquirement stage, process by a shared TXOP participant according to at least one embodiment of the present disclosure.
Figure 27B:
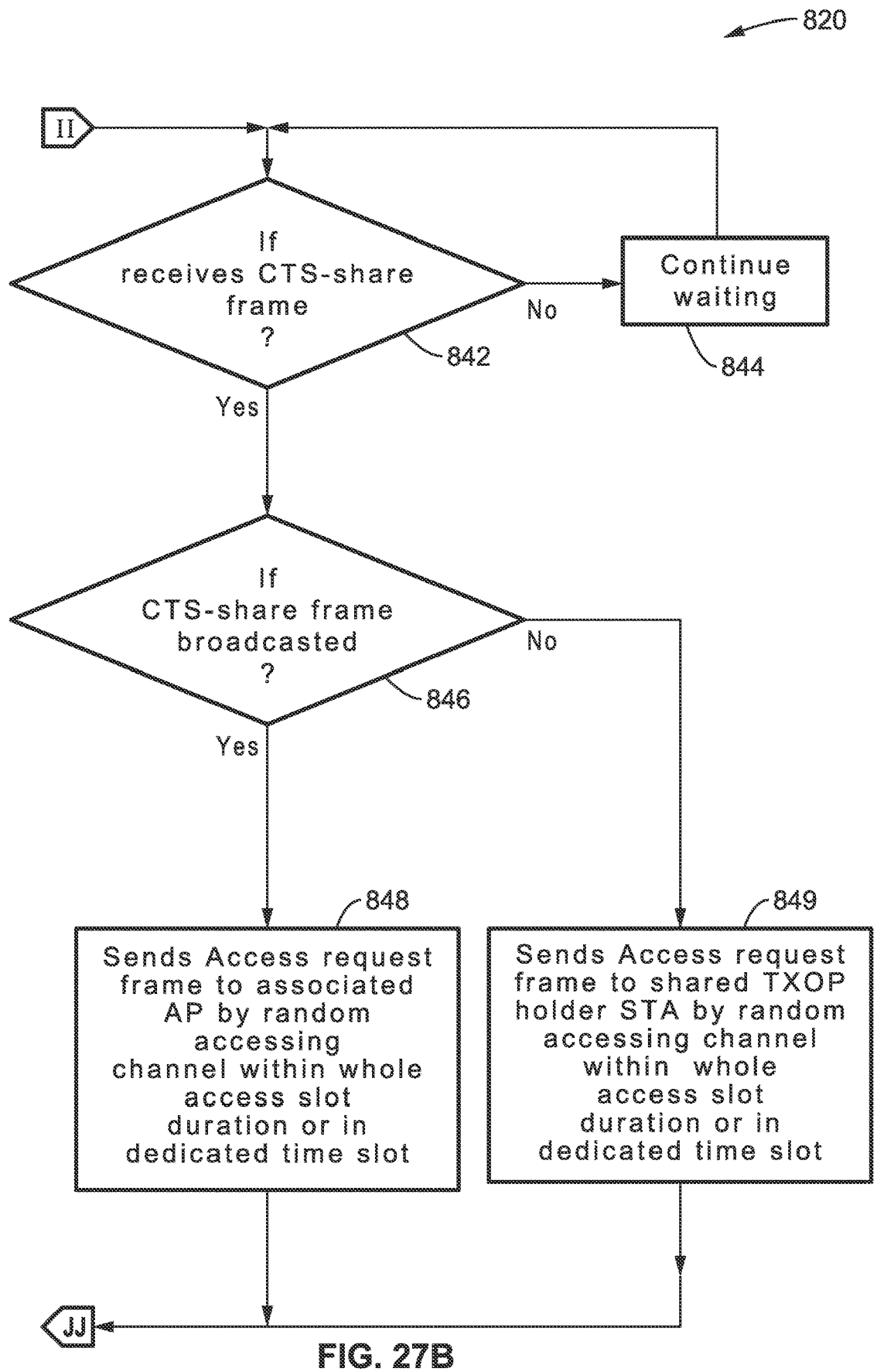

FIG. 27A and FIG. 27B illustrate an example embodiment 820 of the TXOP participant acquirement stage, as processed by a shared TXOP participant.

Check 830 determines if the shared TXOP participant has received an RTS-share frame. If not, then this processing ends. Otherwise, if the RTS share frame is received, then at block 832 through the RTS-share the shared TXOP participant has become aware of stored the information about the shared TXOP holder.

At check 834 the shared TXOP participant determines if it has received a TXOP offer frame. If it has received the offer frame, then check 836 determines if the TXOP offer was broadcast. If it was not broadcast, then the shared TXOP participant responds 840 with an access request frame within a time offset as indicated in the unicast TXOP frame, after which this processing ends. Otherwise, if the TXOP offer was broadcast, then at block 838 the shared TXOP participant responds by sending an access request frame by random access of the channel within a time offset indicated in the broadcasted TXOP offer frame, after which this processing ends.

Returning to consider check 834, if the shared TXOP participant determines that it has not received the offer frame, then check 842 in FIG. 27B determines if it has received a CTS-share frame. If it has not then it continues waiting 844. Otherwise, a check 846 is made to determine if the CTS-share frame was broadcast. If it was not broadcast, then at block 849 the shared TXOP participant sends an access request frame to the shared TXOP holder STA by randomly accessing the channel during the access slot duration or in a dedicated time slot. If, however, the CTS-share frame was broadcast, then at block 848 the shared TXOP participant sends an access request frame to the associated AP by randomly accessing the channel during the access slot duration or in a dedicated time slot.

7.3. TXOP Schedule and Access Stage w/o AP Coordination in BSS1

7.3.1. TXOP Schedule and Access with Unicast TXOP Offer Frame

Figure 28:
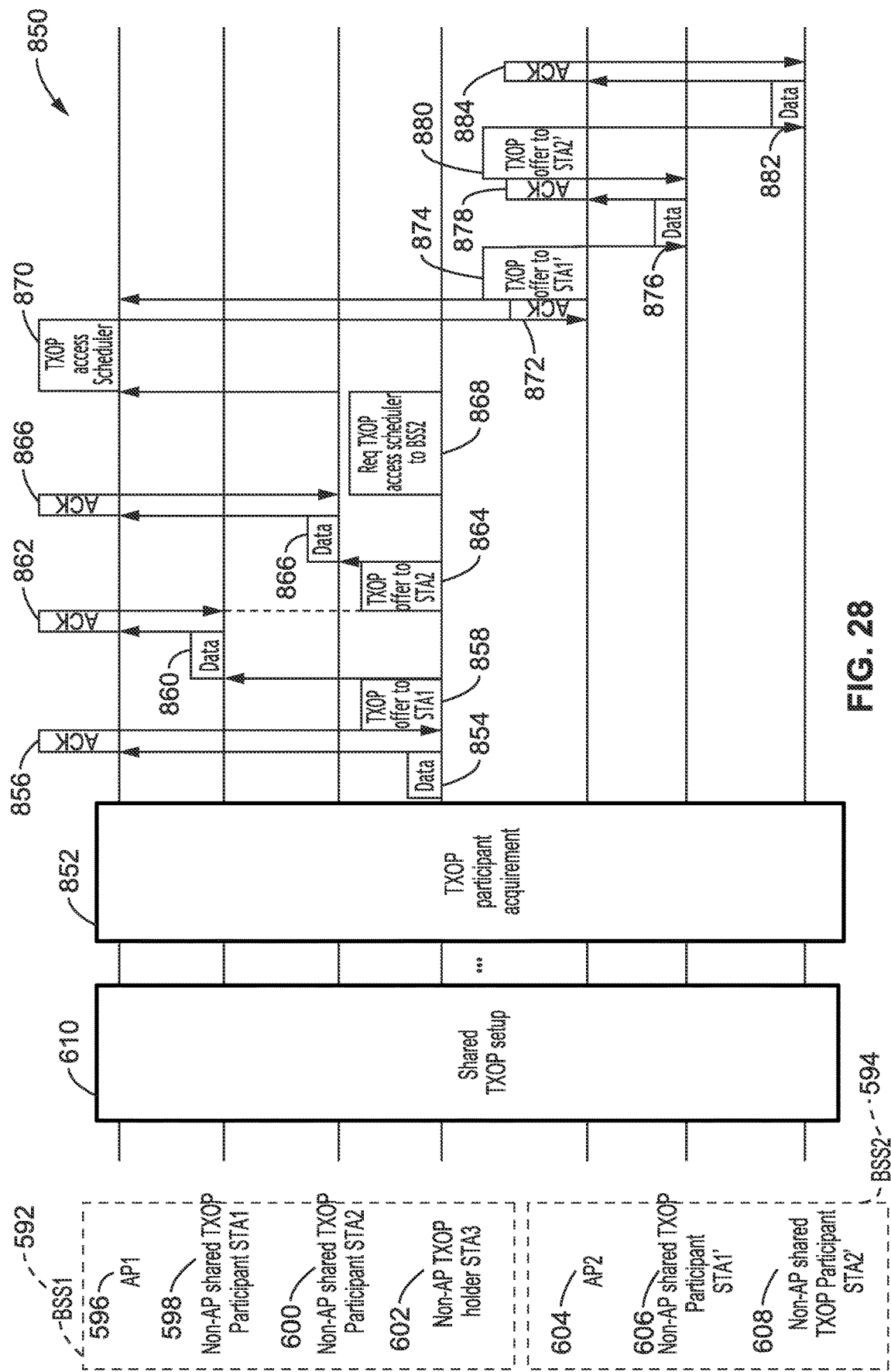
FIG. 28 is a communication sequence diagram of a TXOP schedule and access with unicast TXOP access scheduler according to at least one embodiment of the present disclosure.

FIG. 28 illustrates an example embodiment 850 of a TXOP schedule and access with unicast TXOP access scheduler. As in a prior figure, interactions are shown between STAs across a first BSS (BSS1) 592, containing AP1 596, and non-AP STA1 598, non-AP STA2 600 and non-AP STA3 602. A second BSS (BSS2) 594 is shown with AP2 604, non-AP STA1' 606 and non-AP STA2' 608. A TXOP shared setup procedure 610 is performed followed by a TXOP participant acquirement stage 852.

STA3, which is the shared TXOP holder, sends UL DATA 854 to the AP in its BSS and receives an ACK 856 in response from the AP. STA3 then separately sends (unicasts) TXOP offer frames 858 and 864 to each shared TXOP participant in BSS1. After receiving the TXOP offer frames, the shared TXOP participants (STA1 and STA2) send UL DATA 860 and 866 to the associated AP, each within the transmission duration defined in the TXOP offer frame. The AP 596 receives the UL DATA and responds with an ACK 862 and 866 indicating the receipt of DATA.

After STA3 finishes triggering UL transmissions in its own BSS, it sends a Request TXOP access scheduler frame to BSS2 868 to its associated AP. The scheduler frame indicates that this is the schedule for another BSS (indicated in the BSSID in this frame). AP1 receives the Request TXOP access scheduler frame, which shows a different BSSID from itself, and responds by sending a TXOP access scheduler frame 870 to the AP associated with that BSSID and including the scheduler information in this frame and indicating the source BSSID of the TXOP access scheduler frame.

AP2 604 from BSS2 receives the TXOP access scheduler frame from a different BSS (indicated in the BSSID). It responds with an ACK 872 to indicate successful reception. Then, AP2 sends TXOP offer frames to each shared TXOP participant in BSS2, shown as TXOP offers 874 and 880 to STA1' and STA2', respectively, which each send their UL DATA 876 and 882 to the associated AP (AP2) within the transmission duration defined in the TXOP offer frame in response, and then they receive respective ACKs 878 and 884 from AP2.

7.3.2. TXOP Schedule and Access with Unicast TXOP Access Scheduler

Figure 29:
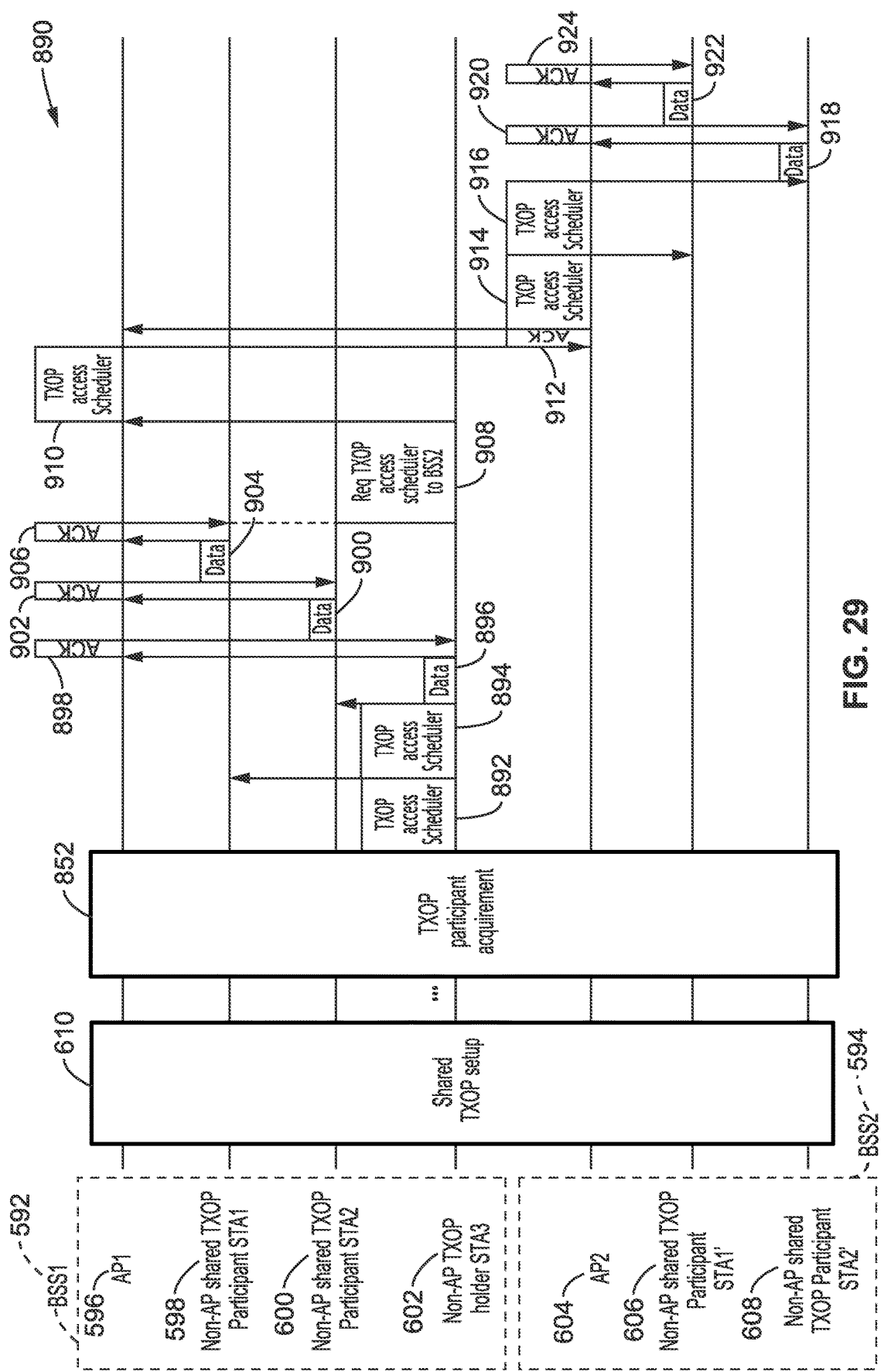
FIG. 29 is a communication sequence diagram of a TXOP schedule and access with unicast TXOP access scheduler according to at least one embodiment of the present disclosure.

FIG. 29 illustrates an example embodiment 890 of the TXOP schedule and access with unicast TXOP access scheduler. As in a prior figure, interactions are shown between STAs across a first BSS (BSS1) 592, containing AP1 596, and non-AP STA1 598, non-AP STA2 600 and non-AP STA3 602. A second BSS (BSS2) 594 is shown with AP2 604, non-AP STA1' 606 and non-AP STA2' 608. A TXOP shared setup procedure 610 is performed, followed by a TXOP participant acquirement stage 852.

STA3, which is the shared TXOP holder in these examples, and unicasts a TXOP access scheduler frame 892 and 894 to each shared TXOP participant in BSS1, seen as STA1 and STA2, and then sends UL DATA 896 to the associated AP (i.e., AP1), which responds to receipt of the UL DATA by sending an ACK 898 to the DATA source (sender).

After receiving the TXOP access scheduler frame, the shared TXOP participants (STA1 and STA2) send UL DATA 900 and 904 to the associated AP in different time slots as indicated in the Allocation Control field in the Access request information element as embedded in the beacon frame or other previously exchanged management frames. The AP responds to receipt of this UL DATA with some form of ACKs 902, 906.

After the UL transmission duration for BSS1 expires, STA3 sends a Request TXOP access scheduler frame 908 to its associated AP (BSS1), with the frame containing information that the schedule is for another BSS (indicated in the BSSID in this frame). AP1 receives the Request TXOP access scheduler frame with a different BSSID from itself. AP1 sends a TXOP access scheduler frame 910 to the AP associated with that BSSID, which includes scheduler information indicating the source BSSID of the TXOP access scheduler frame.

AP2 from BSS2 receives the TXOP access scheduler frame 910 from a different BSS (indicated in the BSSID), and responds with an ACK 912 to indicates successful reception. Then, AP2 sends TXOP access scheduler frames, exemplified as frames 914 and 916, to each shared TXOP participant in BSS2.

After receiving the TXOP access scheduler frame, the shared TXOP participants (STA1' and STA2') send UL DATA 918 and 922 to the associated AP (i.e., AP2) in different time slots as indicated in the Allocation Control field in the Access request information element as embedded in the beacon frame or other previously exchanged management frames. AP2 receives the UL DATA directed to it and replies with an ACK 920 and 924 to the DATA source.

7.3.3. TXOP Schedule and Access with Broadcast TXOP Scheduler

Figure 30:
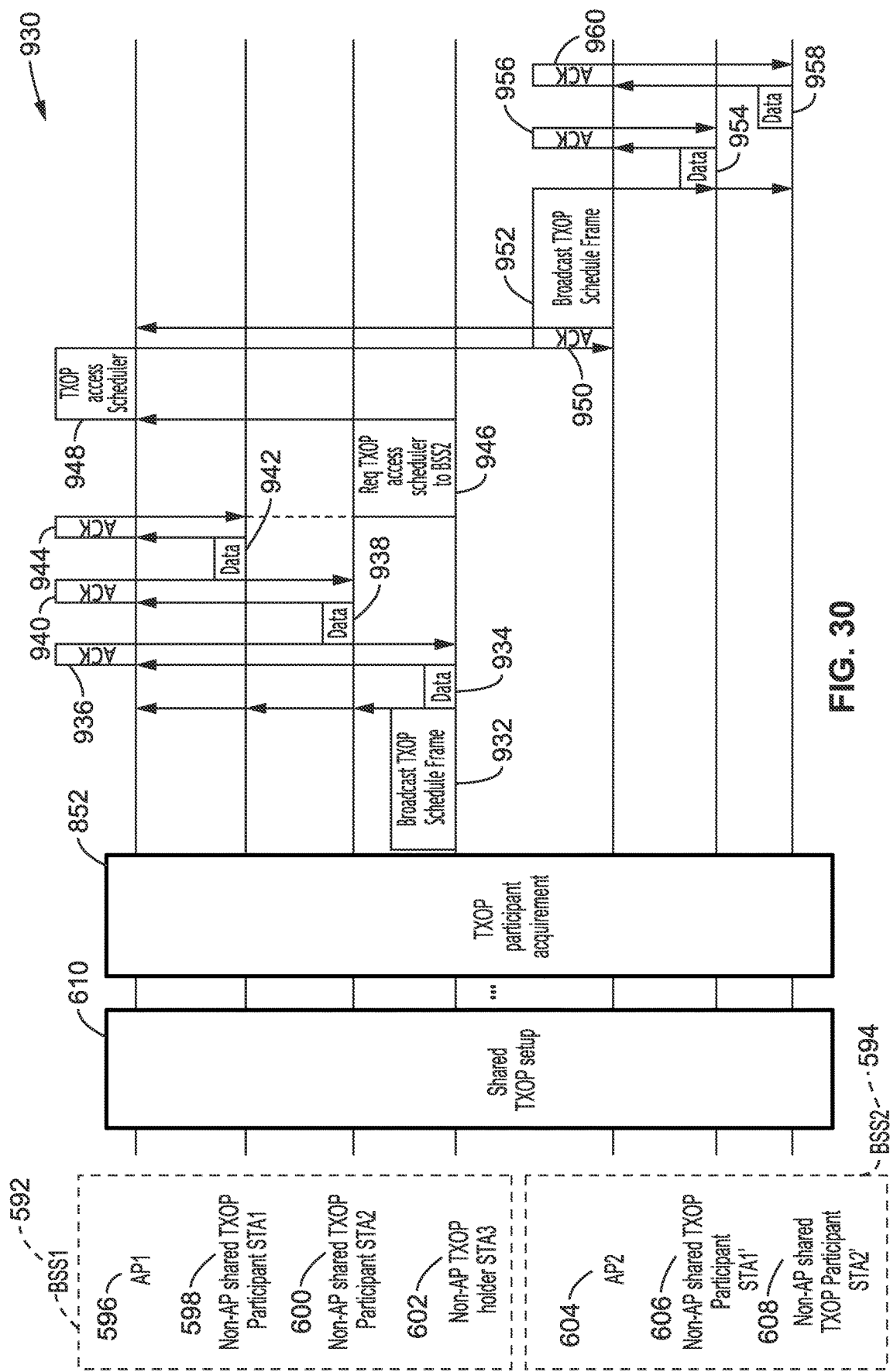
FIG. 30 is a communication sequence diagram of a TXOP schedule and access with broadcast TXOP scheduler according to at least one embodiment of the present disclosure.

FIG. 30 illustrates an example embodiment 930 of the TXOP schedule and access with broadcast TXOP scheduler. As in the prior figure, interactions are shown between STAs across a first BSS (BSS1) 592, containing AP1 596, and non-AP STA1 598, non-AP STA2 600 and non-AP STA3 602. A second BSS (BSS2) 594 is shown with AP2 604, non-AP STA1' 606 and non-AP STA2' 608. A TXOP shared setup procedure 610 and TXOP participant acquirement 852 are performed.

STA3 is the shared TXOP holder in this example and it sends a broadcast TXOP scheduler frame 932 to all STAs in BSS1 and indicates the BSSID of BSS1. After this STA3 sends UL DATA 934 to the associated AP (i.e., AP1).

After receiving the broadcast TXOP scheduler frame, the shared TXOP participants (STA1 and STA2) in BSS1 confirm this frame is from the same BSS as indicated by the BSSID, and then send UL DATA 938 and 942 to the associated AP in different time slots as indicated in the broadcast TXOP scheduler frame. AP1 receives the UL DATA directed to it and responds with ACKs 940 and 944 to the DATA source.

After the UL transmission duration for BSS1 expires, STA3 sends a Request TXOP access scheduler frame 946 to the associated AP, the information in the access scheduler frame indicates that the scheduler is for another BSS (indicated in the BSSID in this frame). AP1 receives the Request TXOP access scheduler frame with a different BSSID with itself, and sends a TXOP access scheduler frame 948 to the AP associated with that BSSID and includes in this frame scheduler information which indicates the source BSSID of the TXOP access scheduler frame.

AP2 in BSS2 receives the TXOP access scheduler frame from a different BSS (indicated in the BSSID), to which it responds with an ACK 950 to indicate successful reception. Then, AP2 sends broadcast TXOP scheduler frames 952 to all STAs in BSS2 and indicates the BSSID of BSS2. After receiving the broadcast TXOP scheduler frame, the shared TXOP participants (STA1' and STA2') confirm that the frame is from the same BSS (indicated by the BSSID), and then sends UL DATA 954 and 958 to the associated AP (i.e., AP2) in different time slots as indicated in the broadcast TXOP scheduler frame. AP2 receives the UL DATA directed to it and responds with ACKs 956 and 960 to the DATA source.

It should be noted with some emphasis that the AP can also join the shared TXOP, and other shared TXOP participants and/or the AP can share the TXOP with the shared TXOP holder. Thus, the TXOP can be shared among both AP and STAs.

7.3.4. TXOP Schedule and Access Stage, at the Non-AP TXOP Holder STA Level

Figure 31A:
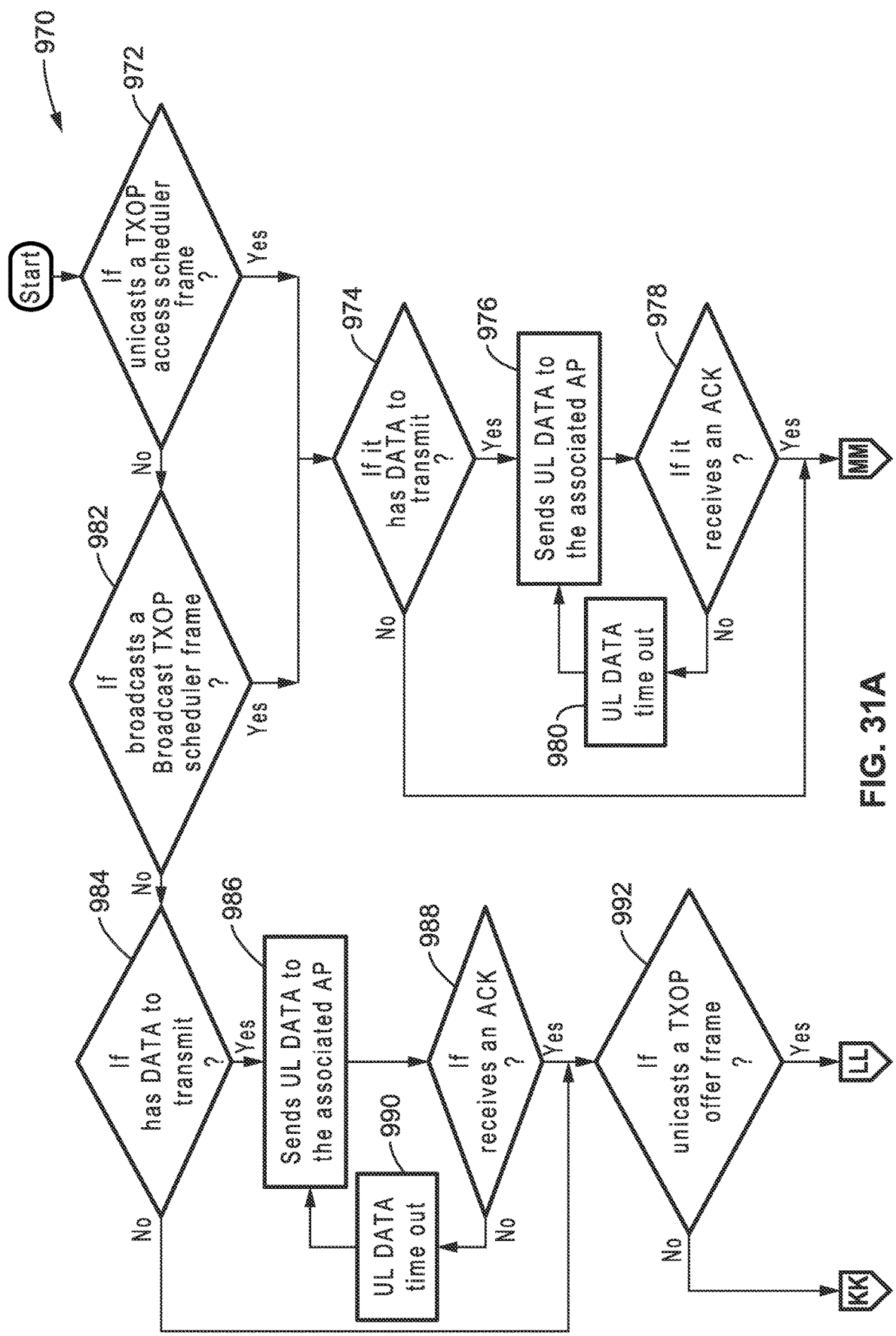
FIG. 31A and FIG. 31B is a flow diagram of a TXOP schedule and access stage, processed at the non-AP TXOP holder STA level according to at least one embodiment of the present disclosure.
Figure 31B:
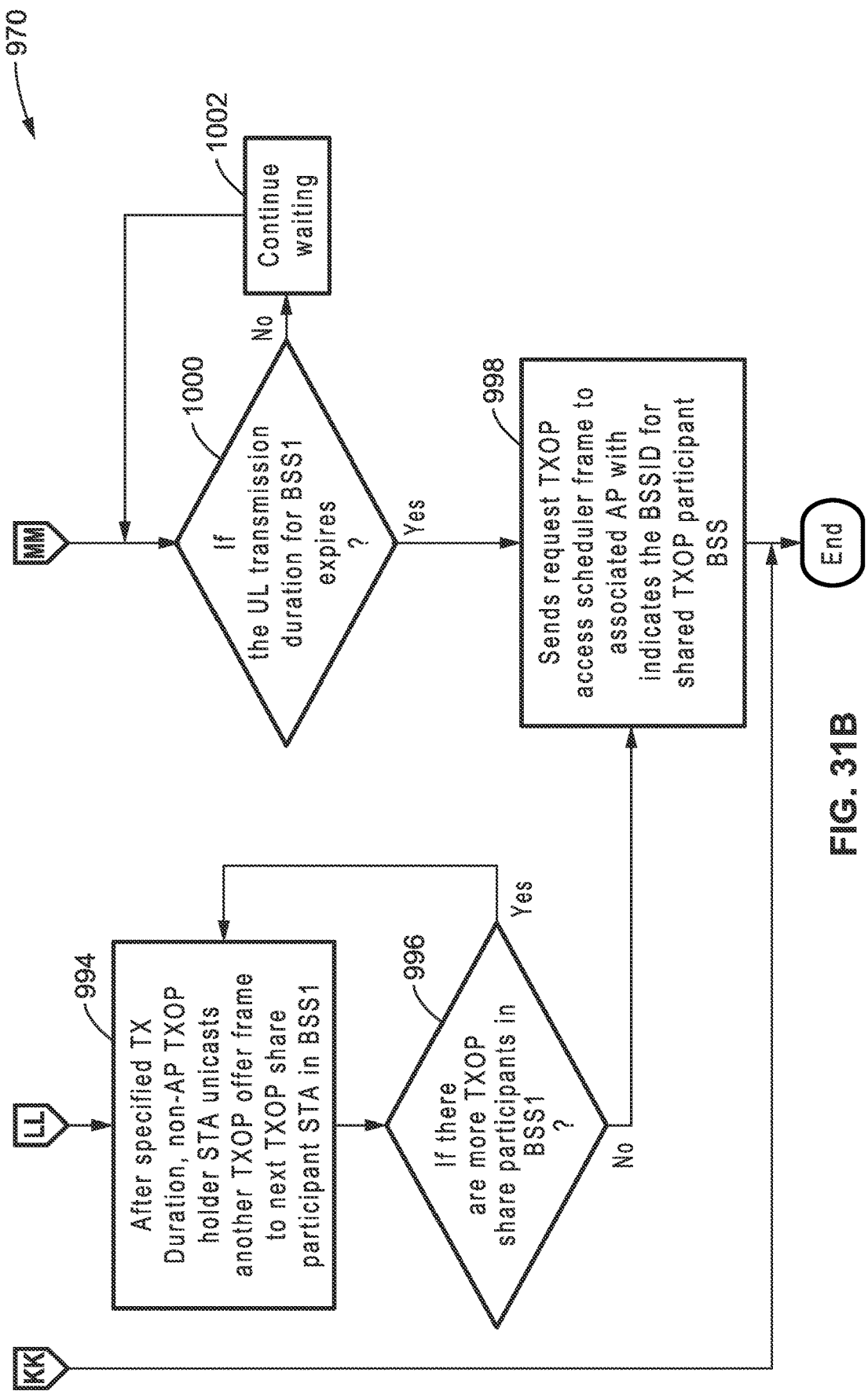

FIG. 31A and FIG. 31B illustrate an example embodiment 970 of the TXOP schedule and access stage, processed at the non-AP TXOP holder STA level. In check 972 the non-AP TXOP holder STA determines if it has unicasted a TXOP access scheduler frame. If the TXOP access scheduler frame has not been unicasted, then execution reaches block 982 which determines if the TXOP access scheduler frame has been broadcast. If either condition is met (unicast or broadcast), then check 974 determines if there is DATA to transmit. If there is no data to transmit, then execution moves to block 1000 in FIG. 31B.

Otherwise, with DATA to transmit, block 976 sends UL DATA to the associated AP. Check 978 determines if it has received an ACK. If the non-AP TXOP holder STA has not received an ACK, then a UL DATA timeout occurs 980, and execution returns to block 976. Otherwise, if the ACK was received, then execution reaches block 1000 in FIG. 31B which determines if the UL transmission duration for BSS1 has expired. If it has not expired, then the non-AP TXOP holder STA continues waiting 1002 (e.g., for at least some period) and returns to block 1000. If the duration has expired, then the non-AP TXOP holder STA sends 998 a TXOP access scheduler frame to the associated AP which indicates the BSSID for the shared TXOP participant BSS and the process ends.

Returning to consider check 984 in FIG. 31A, in the case that the non-AP TXOP holder STA has neither unicasted or broadcasted a TXOP scheduler frame, then block 984 determines if the non-AP TXOP holder STA has DATA to transmit. If there is no DATA to transmit, then execution reaches block 992. Otherwise, if there is DATA to transmit, then at block 986 the non-AP TXOP holder STA sends UL DATA to its associated AP and check 988 is performed to determine if an ACK has been received. If no ACK has been received within the allotted time period, then a UL DATA time out occurs 990 and execution returns to block 986. Otherwise at check 992 it is determined if the non-AP TXOP holder STA has unicasted a TXOP offer frame. If the condition is not met, then processing ends. Otherwise, block 994 in FIG. 31B the non-AP TXOP holder STA unicasts another TXOP offer frame to the next TXOP share participant STA in BSS1, after the specified transmit duration. Check 996 determines if there are more TXOP share participants in BSS1. If there are more participants, then execution returns to block 994, otherwise execution reaches block 998 which has already been described.

7.3.5. TXOP Schedule and Access Stage at AP Level in BSS1

Figure 32:
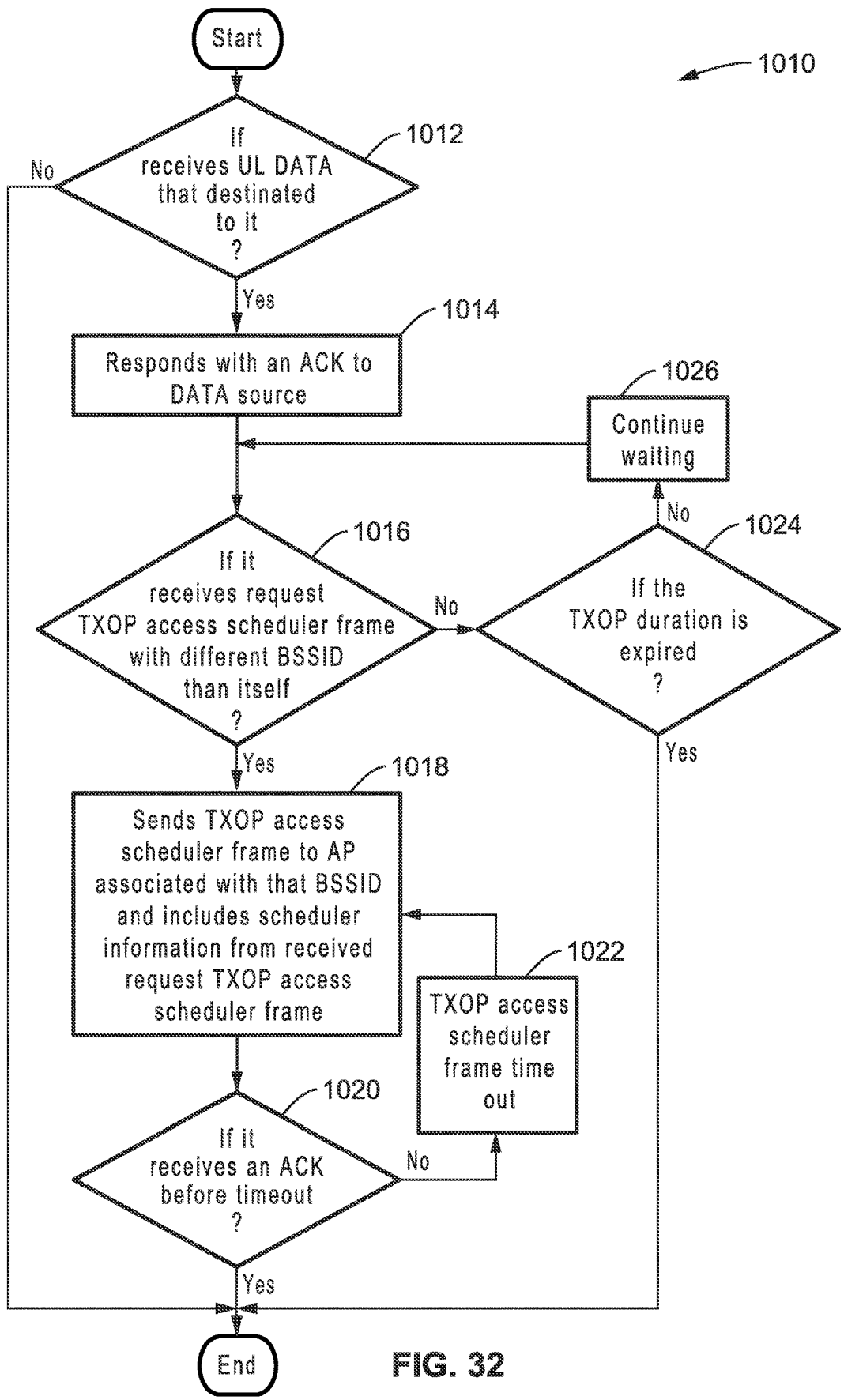
FIG. 32 is a flow diagram of a TXOP schedule and access stage, processed at the AP level in BSS1 according to at least one embodiment of the present disclosure.

FIG. 32 illustrates an example embodiment 1010 of the TXOP schedule and access stage, processed at the AP level in BSS1. The AP determines 1012 if UL DATA has been received. If no UL DATA has been received, then processing ends. Otherwise, upon receiving UL DATA the AP responds 1014 with an ACK to the sender.

In check 1016 it is determined if a request TXOP access scheduler frame has been received with a different BSSID than its own BSSID. If no scheduler frame has been received, then check 1024 determines if the duration has expired. If it has expired, then processing ends. Otherwise, waiting continues 1026 and execution moves to block 1016. If at check 1016 the scheduler frame is received, then at block 1018 the AP sends a TXOP scheduler frame to the AP associated with that BSSID and includes scheduler information from the received request TXOP access scheduler frame.

Check 1020 determines if an ACK has been received before timeout. If no timeout was received, then at block 1022 the TXOP access scheduler frame time out occurs and execution reaches block 1018. Otherwise execution ends.

7.3.6. TXOP Schedule and Access Stage at AP Level in BSS2

Figure 33A:
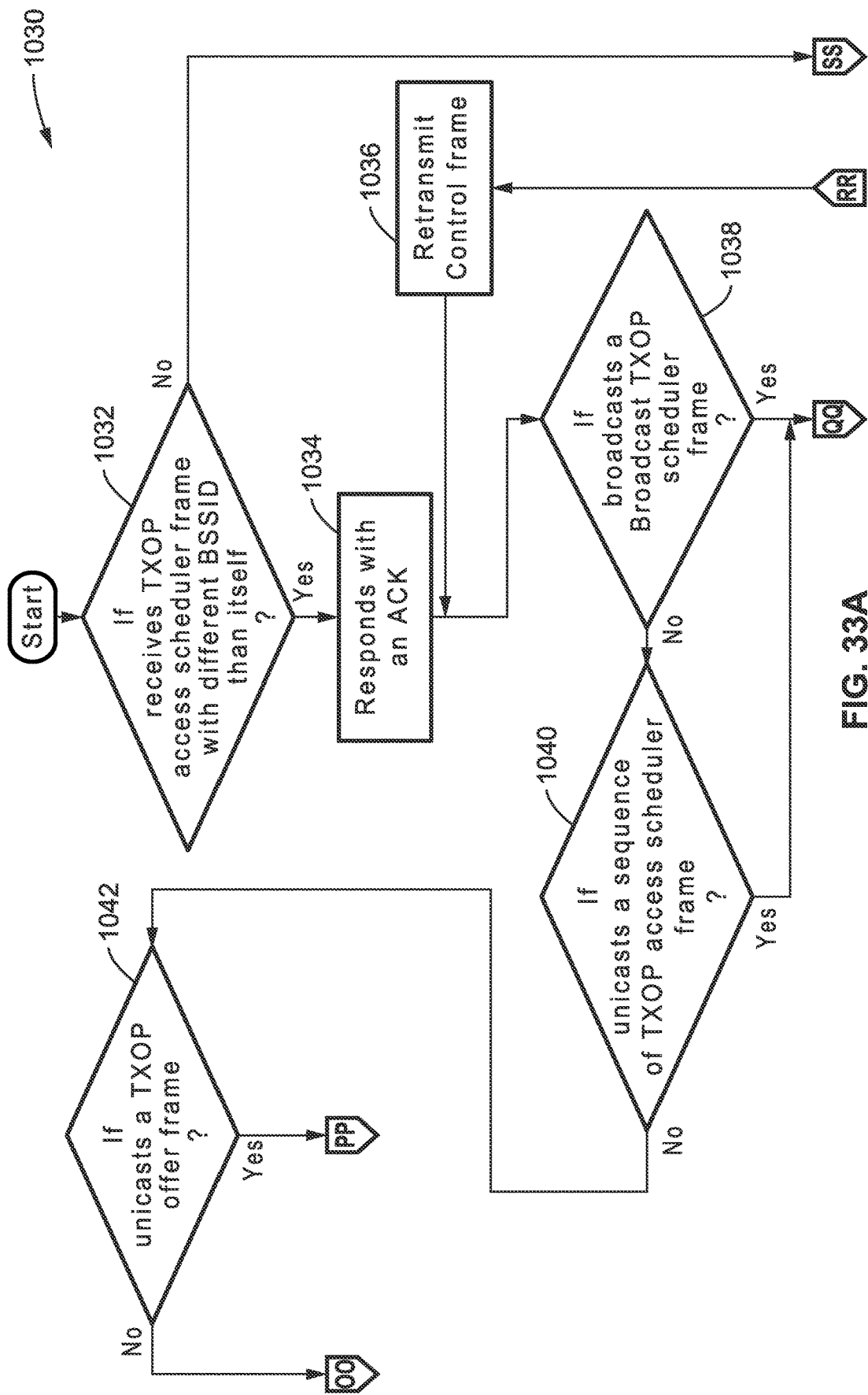
FIG. 33A and FIG. 33B is a flow diagram of a TXOP schedule and access stage, processed at the AP level in BSS2 according to at least one embodiment of the present disclosure.
Figure 33B:
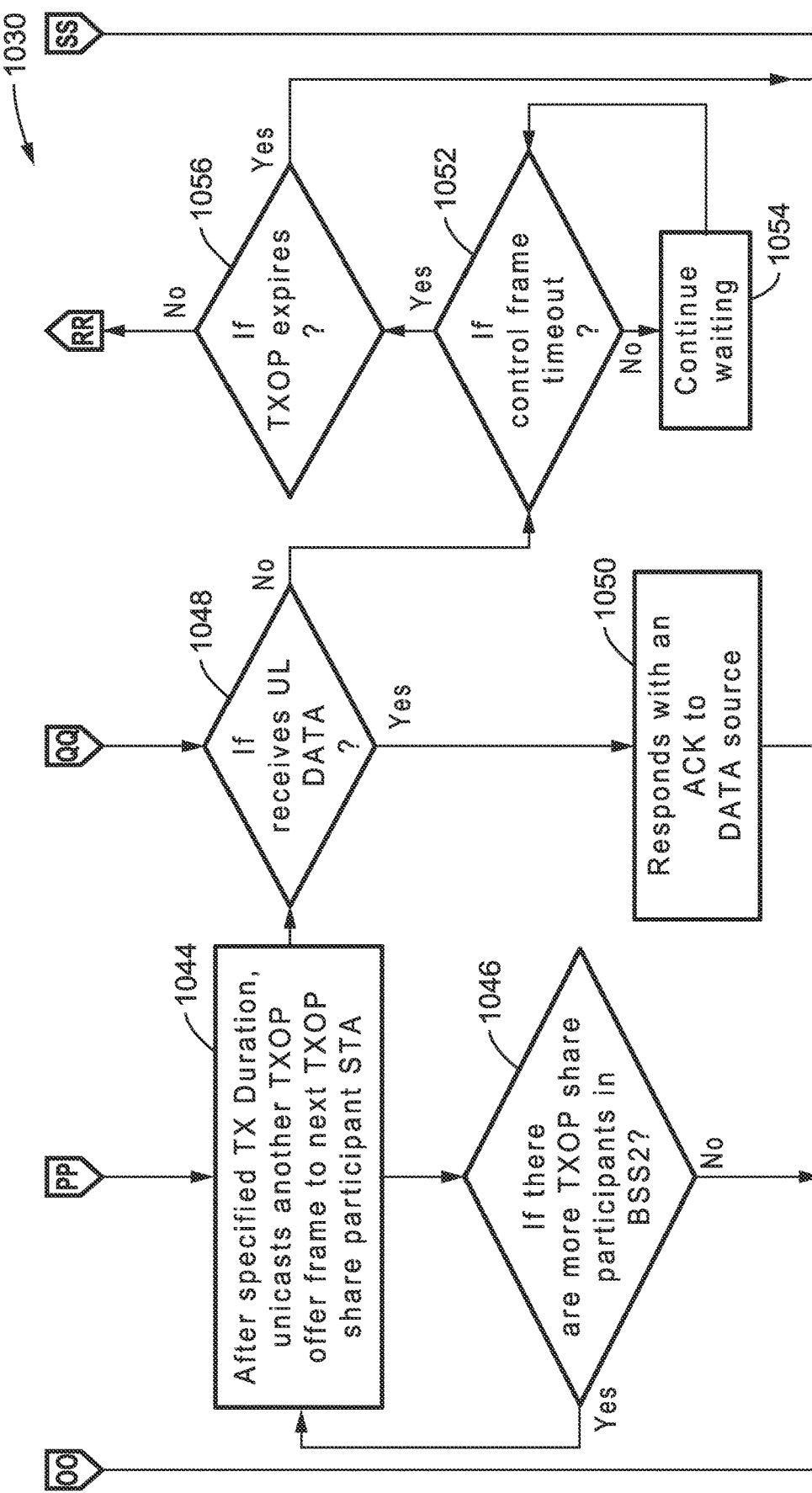

FIG. 33A and FIG. 33B illustrates an example embodiment 1030 of the TXOP schedule and access stage, processed at the AP level in BSS2. Check 1032 determines if the AP level in BSS2 has received a TXOP access scheduler frame with a different BSSID than itself. If the scheduler frame is not received, then this processing ends. Otherwise, with the frame received, block 1034 responds with an ACK. Check 1038 determines if the AP level in BSS2 has broadcast a TXOP scheduler frame. If the TXOP scheduler frame was not broadcast, then check 1040 determines if a TXOP access scheduler frame was unicasted. If the scheduler frame was unicasted, then execution moves to block 1048 in FIG. 33B. Otherwise, if the scheduler frame was not received, then check 1042 determines if a TXOP offer frame was unicasted. If it was not then processing ends. Otherwise, execution moves to block 1044 in FIG. 33B.

At check 1048 in FIG. 33B the AP level in BSS2 determines if UL DATA has been received. If it was received, then block 1050 responds with an ACK to the DATA source. If at check 1048 the UL DATA was not received, then check 1052 determines if a control frame timeout has occurred. If it has not expired, then the AP level in BSS2 continues waiting 1054. Otherwise, if it has expired, then check 1056 determines if the TXOP has expired. If it has expired, then processing ends. Otherwise, execution moves to block 1036 in FIG. 33A with the AP in BSS2 retransmitting a control frame and execution moving to block 1038.

If the check 1042 in FIG. 33A was a unicast offer frame, then at block 1044 in FIG. 33B, the AP in BSS2 unicasts another TXOP offer frame to the next TXOP share participant STA, then check 1046 determines if there are more TXOP share participants in BSS2. If there are more participants then execution returns to block 1044. Otherwise the processing ends.

Figure 34A:
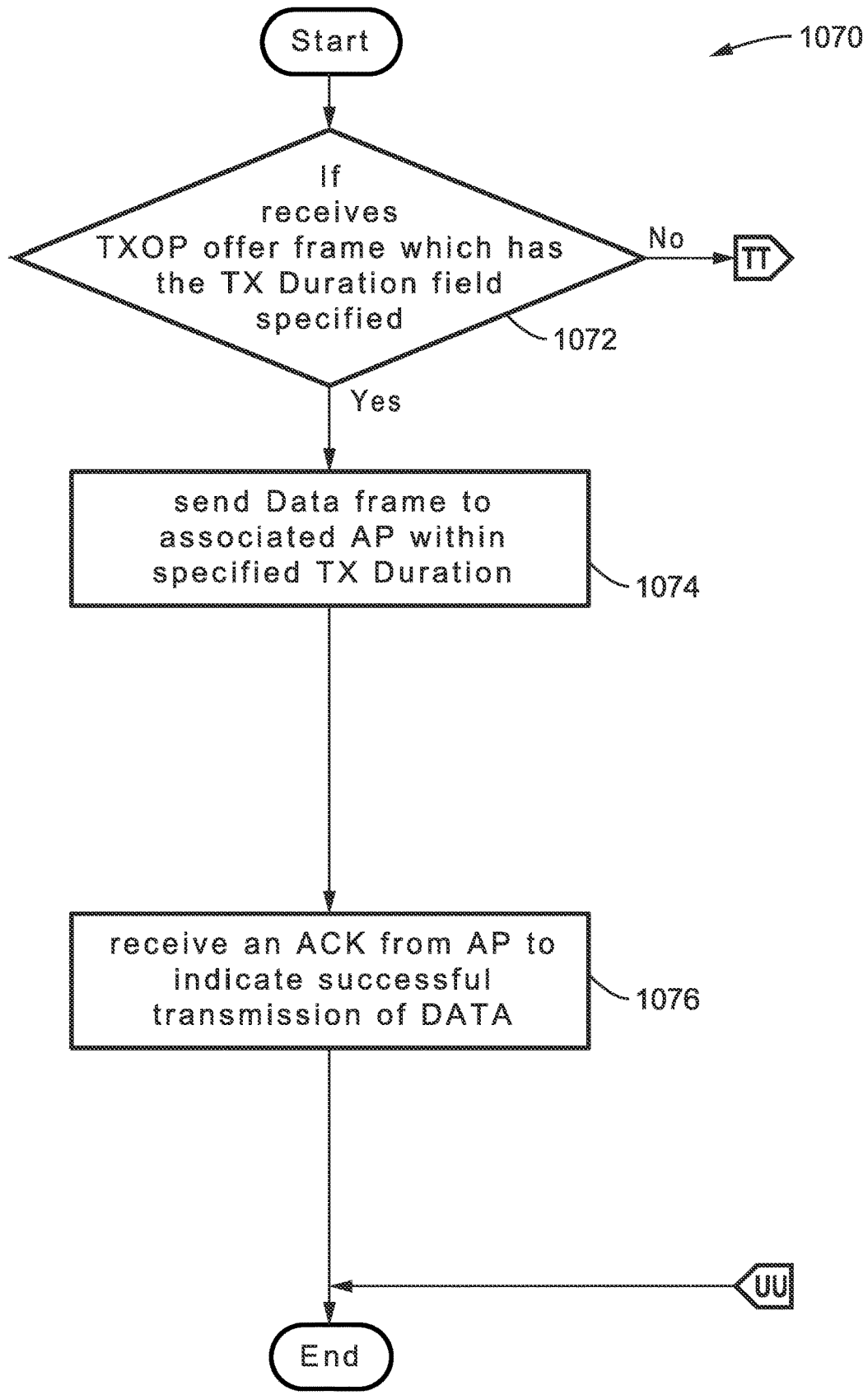
FIG. 34A and FIG. 34B is a flow diagram of a TXOP schedule and access stage, processed at the non-AP shared TXOP participant STA level according to at least one embodiment of the present disclosure.
Figure 34B:
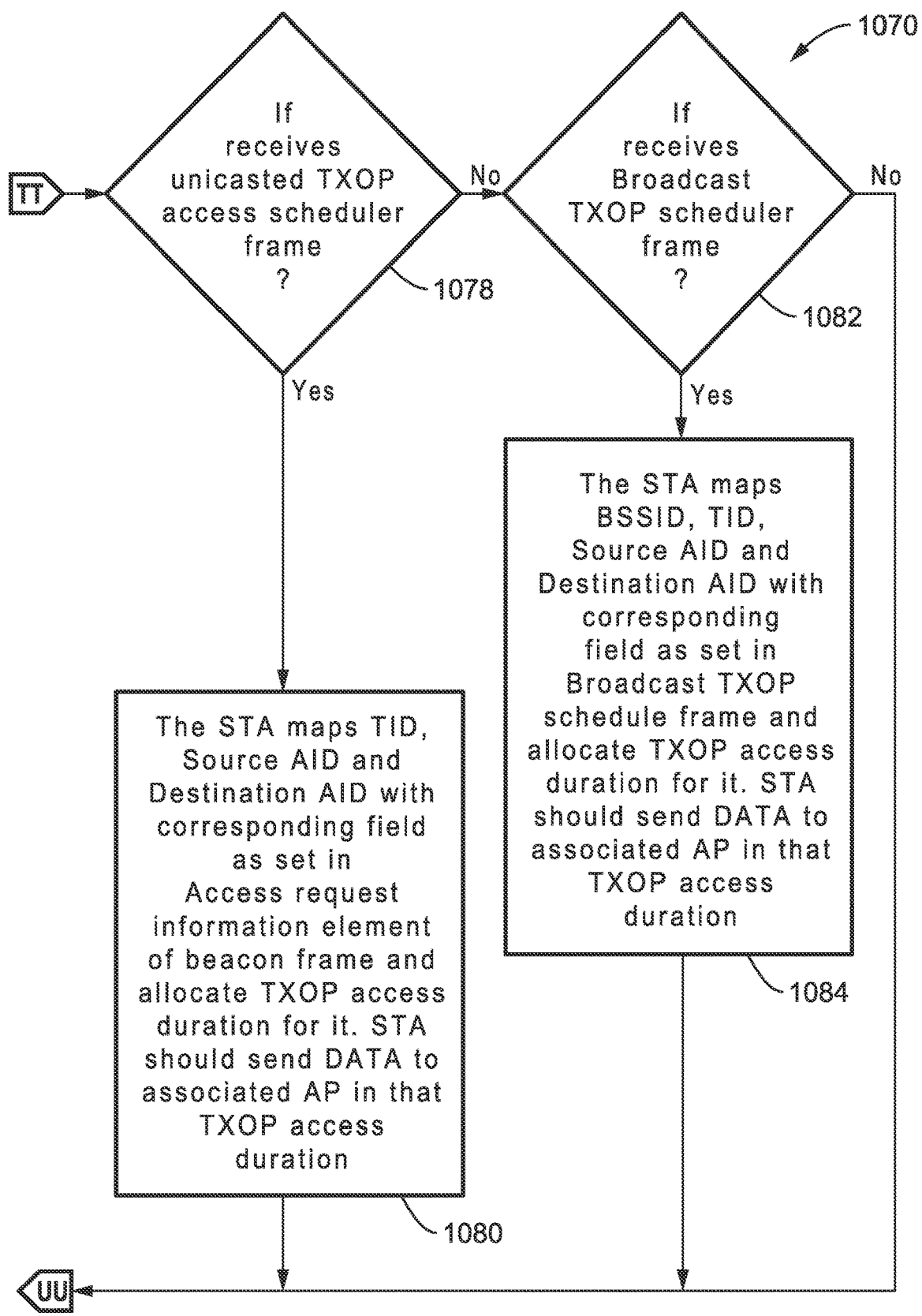

7.3.7. TXOP Schedule and Access Stage at Non-AP Shared TXOP Participant STA level FIG. 34A and FIG. 34B illustrates an example embodiment 1170 of the TXOP schedule and access stage, processed at the non-AP shared TXOP participant STA level. At check 1072 the non-AP shared TXOP participant STA determines if it has received a TXOP offer frame in which the transmit duration has been specified. If the offer frame has not been received then execution moves to block 1078 in FIG. 34B. Otherwise, upon receiving the offer frame the non-AP shared TXOP participant STA at block 1074 sends a DATA frame to the associated AP within the specified transmit duration. At block 1076 the non-AP shared TXOP participant STA receives an ACK from the AP to indicate successful transmission of DATA, after which processing ends.

Returning back to consider the other result of check 1072 in which no TXOP offer frame was received, execution moves to block 1078 to determine if the TXOP access frame was unicasted. Then the non-AP shared TXOP participant STA maps TID, Source AID and Destination AID with the corresponding field as in the access request information element of the beacon frame and allocates TXOP access duration for it. The non-AP shared TXOP participant STA sends DATA to the associated AP during that TXOP access duration, and the processing ends.

Otherwise, if the scheduler frame was not unicasted as determined in block 1078, then check 1082 determines if the TXOP scheduler frame was broadcast. If it was not broadcast either, then processing ends. If the TXOP scheduler frame was broadcast, then at block 1084 the non-AP shared TXOP participant STA maps BSSID, TID, Source AID and Destination AID with the corresponding field as set in the broadcast TXOP schedule frame and allocates TXOP access duration for it. Then the non-AP shared TXOP participant STA sends DATA to the associated AP in that TXOP access direction, after which processing ends.

7.3.8. Shared TXOP Setup Stage (with AP coordination in BSS1)

Shared TXOP setup stage is performed the same as that described in FIG. 18.

7.4. TXOP Participant Acquerement Stage (w/AP Coordinate BSS1)

7.4.1. TXOP Participant Acquerement Stage with Response after Receiving TXOP Offer (with AP Coordination)

Figure 35:
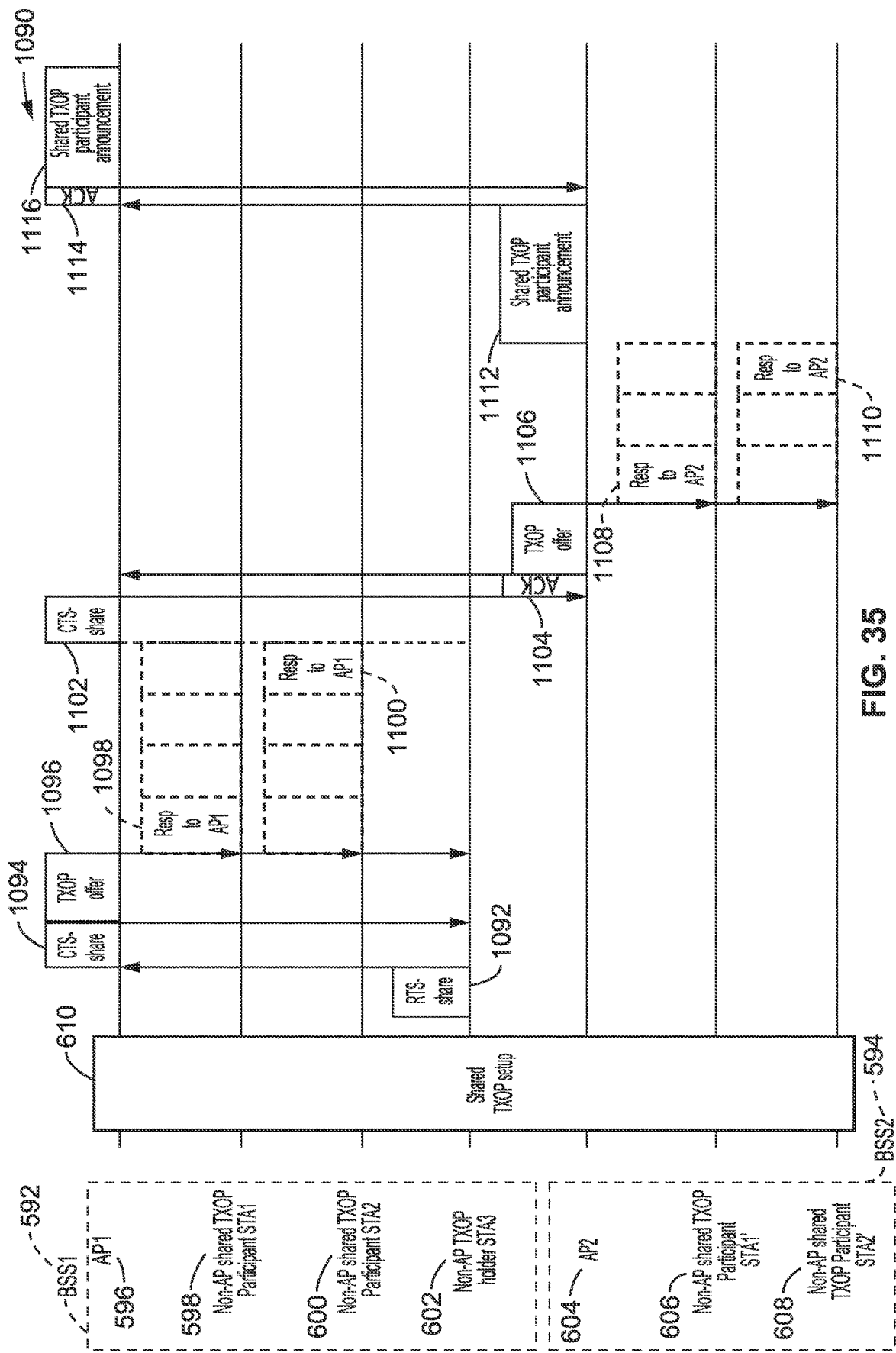
FIG. 35 is a communication sequence diagram of a TXOP participant acquirement stage with response after receiving TXOP offer according to at least one embodiment of the present disclosure.

FIG. 35 illustrates an example embodiment 1090 of the TXOP participant acquerement stage with response after receiving TXOP offer. As in many of the prior figures, interactions are shown between STAs across a first BSS (BSS1) 592, containing AP1 596, and non-AP STA1 598, non-AP STA2 600 and non-AP STA3 602. A second BSS (BSS2) 594 is shown with AP2 604, non-AP STA1' 606 and non-AP STA2' 608. A TXOP shared setup procedure 610 is performed. This interaction is similar to that of FIG. 21 showing the TXOP participant acquerement stage with response after receiving TXOP offer. However, the difference here is that instead of responding with the Access Request Frame to STA3 as the shared TXOP holder STA, the STAs send the Access Request Frame to the associated AP after receiving the broadcasted TXOP offer frame from AP.

In particular, the TXOP holder sends an RTS-share frame 1092 to its associated AP, which responds with sending a CTS-share frame 1094 to the sender (STA3). Then the AP sends a broadcast of the TXOP offer frame 1096 to STA1, STA2 and STA3. The participating TXOP STAs desiring to share the TXOP are shown responding to the AP 1098 and 1100. After the duration of the transmission is completed, then the AP sends a CTS-share 1102 to the AP of BSS2, which responds back with an ACK 1104.

The AP of BSS2 sends a TXOP offer frame 1106 to the non-AP STAs within its BSS. These STAs send their responses 1108 and 1110 to their AP. Upon receiving these responses the AP of BSS2 sends a shared participant announcement 1112 to the AP of BSS1 which responds with an ACK 1114 and sends a shared TXOP participant announcement 1116 to the shared TXOP holder STA (STA3) in BSS1.

7.4.2. TXOP Participant Acquerement Stage with Response after CTS (with AP Coordination)

Figure 36:
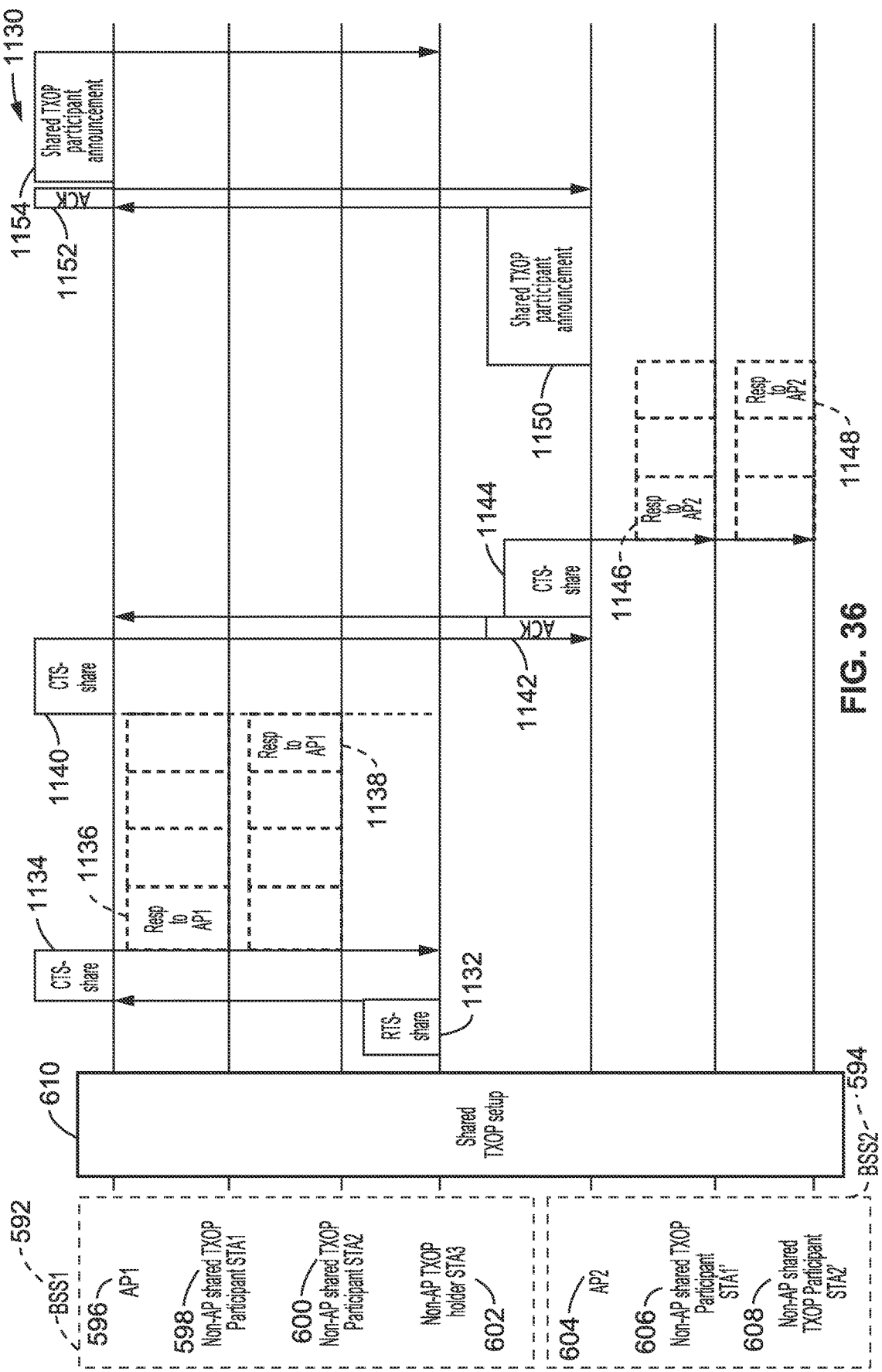
FIG. 36 is a communication sequence diagram of a TXOP participant acquirement stage with response after receiving CTS-share (with AP) according to at least one embodiment of the present disclosure.

FIG. 36 illustrates an example embodiment 1130 of the TXOP participant acquerement stage with response after receiving CTS-share which is using AP coordination. As in many of the prior figures, interactions are shown between STAs across a first BSS (BSS1) 592, containing AP1 596, and non-AP STA1 598, non-AP STA2 600 and non-AP STA3 602. A second BSS (BSS2) 594 is shown with AP2 604, non-AP STA1' 606 and non-AP STA2' 608. A TXOP shared setup procedure 610 is performed. This figure is similar to FIG. 22 showing the TXOP participant acquerement stage with response after receiving CTS-share. The difference is that instead of responding to the Access Request Frame to the STA3 (i.e., the shared TXOP holder STA), the STAs send the Access Request Frame to the associated AP (i.e., AP1) after receiving the unicasted CTS-share frame not sent to it.

In particular, the TXOP holder which is STA3 in this example obtains the channel and sends an RTS-share 1132 to its associated AP, which responds with a CTS-share, to which STA1 and STA2 send response 1136 and 1138. At the end of the time slots the AP has collected their responses and sends a CTS-share 1140 to the AP of BSS2, which replies with an ACK 1142, and then sends a CTS-share 1144 to its non-AP STAs. The participating STAs reply 1146 and 1148 in the time slots (either randomly or in dedicated positions) to their associated AP, which in response sends a shared TXOP participant announcement 1150 to the AP of BSS1, which acknowledges the announcement 1152 and forwards the information within a shared participant announcement 1154 to shared TXOP holder STA in BSS1.

Figure 37:
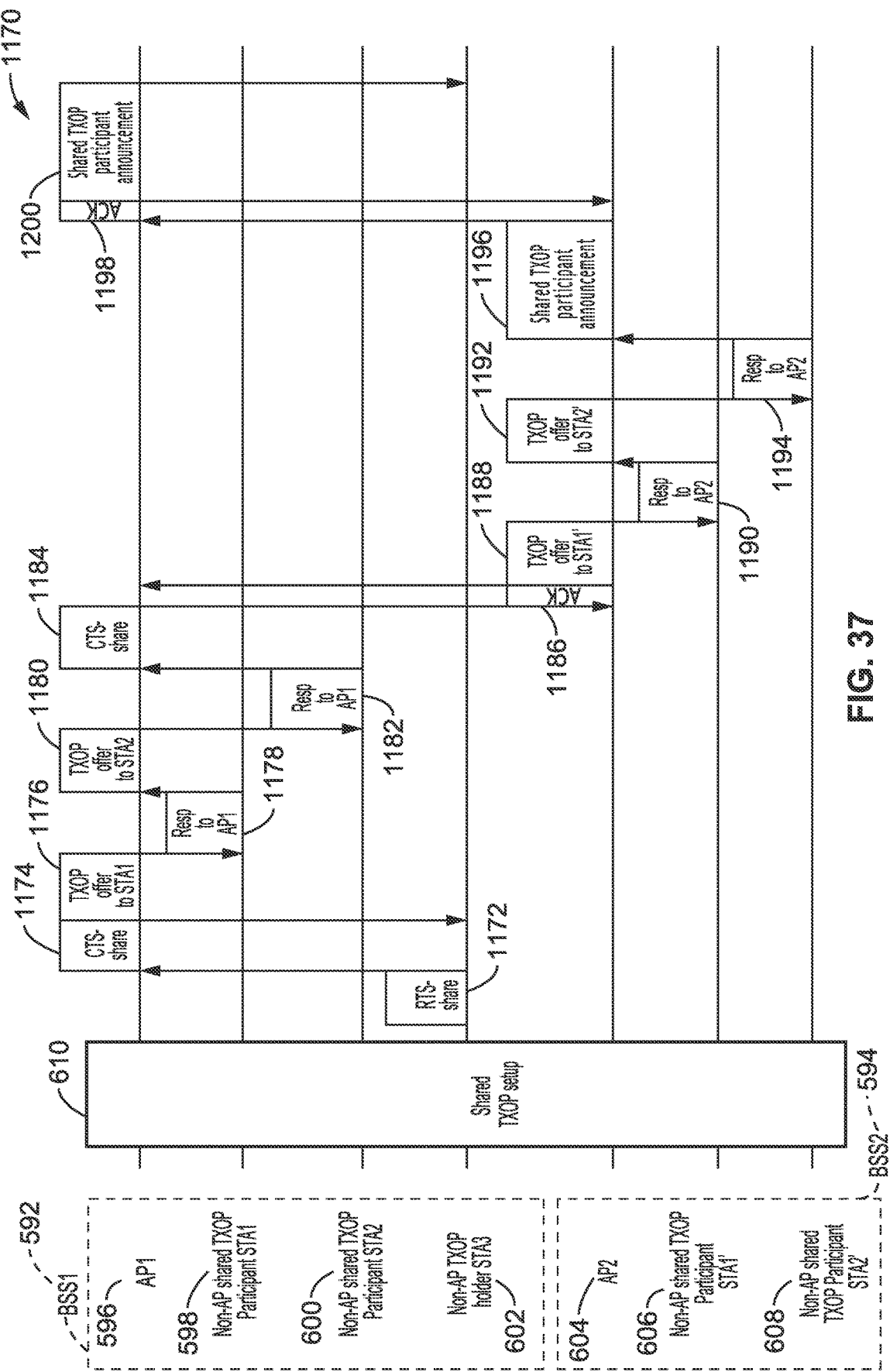
FIG. 37 is a communication sequence diagram of a TXOP participant acquirement stage with response after receiving TXOP offer according to at least one embodiment of the present disclosure.

7.4.3. TXOP Participant Acquerement Stage with Response after Dedicated TXOP Offer Frame FIG. 37 illustrates an example embodiment 1170 of a TXOP participant acquerement stage with response after receiving TXOP offer. As in many of the prior figures, interactions are shown between STAs across a first BSS (BSS1) 592, containing AP1 596, and non-AP STA1 598, non-AP STA2 600 and non-AP STA3 602. A second BSS (BSS2) 594 is shown with AP2 604, non-AP STA1' 606 and non-AP STA2' 608. A TXOP shared setup procedure 610 is performed. This is a similar to FIG. 23 TXOP participant acquerement stage with response after receiving TXOP offer. The difference being that in FIG. 37 the AP1 unicasts the TXOP offer frame to each STA in BSS1 one-by-one and receives the Access Request Frame as a response.

The non-AP TXOP holder obtains the channel and sends an RTS-share 1172 to its associated AP in BSS1. The AP responds back with a CTS-share. The AP 596 then unicasts offer frames to other STAs in BSS1 sequentially one-by-one. In particular it is seen sending TXOP offer frames to STA1 1176, and to STA2 1180. After receiving the unicast TXOP offer frame, each receiver STA responds with an Access Request Frame 1178 and 1182 to indicate if it willing to join the shared TXOP; thus the AP is shown receiving responses back from the non-AP STAs.

After the AP finishes looping through all the STAs in BSS1 by sending TXOP offer frames, it sends a CTS-share 1184 to AP2 to initiate the inquiry process for BSS2.

AP2 604 receives the CTS-share frame from AP1 and responds with an ACK 1186 to indicate successful reception. AP2 then sends TXOP offer frames 1188 and 1192 to other STAs in BSS2 one by one and should receive Access Request Frames 1190 and 1194 from each polled STA in response.

After AP2 finishes looping through all the STAs in BSS2 by sending TXOP offer frames, it collects the information and sends a Shared TXOP participant announcement frame 1196 to AP1 of BSS1. Once AP1 receives and acknowledges 1198 the Shared TXOP participant announcement frame, it forwards this announcement frame as a shared TXOP participant announcement frame 1200 to STA3 which is the TXOP holder STA.

Its should be noted that the AP can also join the shared TXOP, just as other shared TXOP participants. Thus, the AP can also send its share request information to the shared TXOP holder; or the AP can also be the shared TXOP holder, in this case it can acquire share request information from other STAs.

Figure 38:
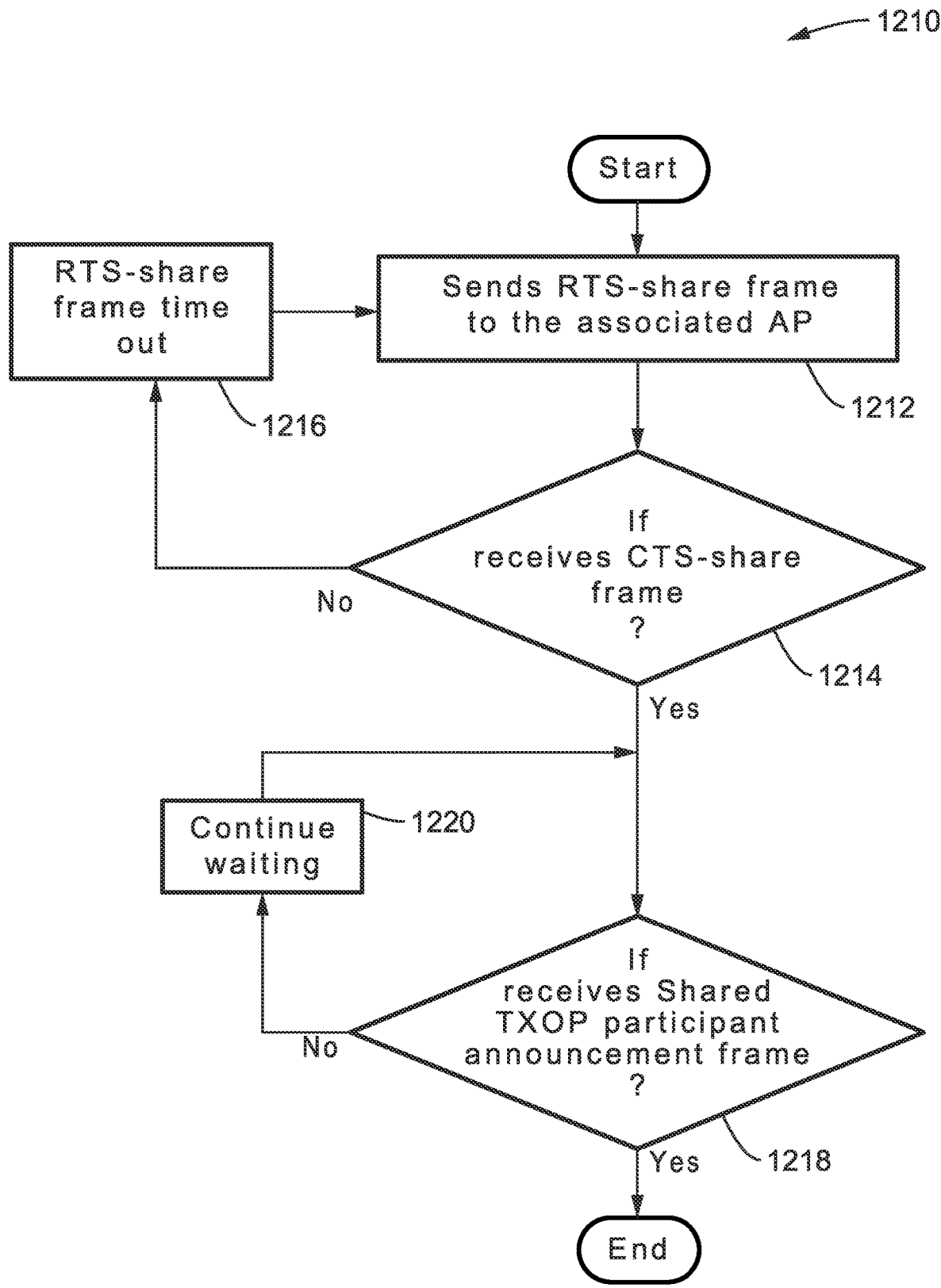
FIG. 38 is a flow diagram of a TXOP participant acquirement stage, process at shared TXOP holder STA level according to at least one embodiment of the present disclosure.

7.4.4. TXOP Participant Acquirement Stage, Processed at the Shared TXOP Holder STA Level FIG. 38 illustrates an example embodiment 1210 of the TXOP participant acquirement stage, processed at the shared TXOP holder STA level. The shared TXOP holder STA sends 1212 an RTS-share frame to its associated AP (AP of its BSS). A check 1214 determines if a CTS-share frame has been received. If the condition is not met in the time period allotted for a response, then an RTS-share frame timeout 1216 occurs and execution returns to block 1212.

Otherwise, with the CTS-share frame received, a check 1218 is performed to determine if a shared TXOP participant announcement frame was received. If it was not received, then waiting continues 1220 (for some period) and execution of block 1218 to check for the announcement frame. Otherwise the processing ends.

Figure 39A:
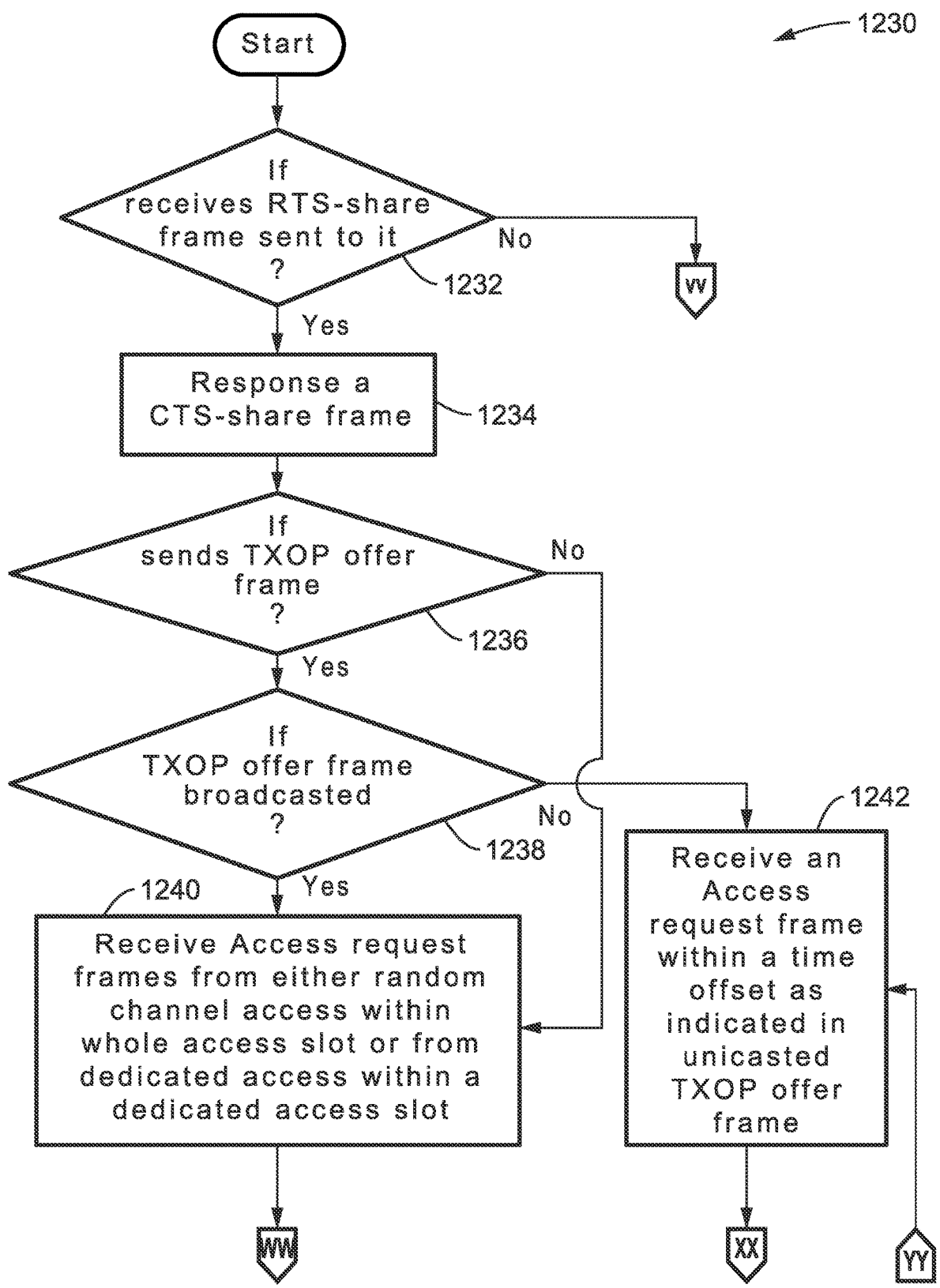
FIG. 39A through FIG. 39C is a flow diagram of a TXOP participant acquirement stage, process at AP of the shared TXOP holder BSS according to at least one embodiment of the present disclosure.

7.4.5. TXOP Participant Acquirement Stage, Processed at the AP of the Shared TXOP Holder BSS FIG. 39A through FIG. 39C illustrates an example embodiment 1230 of the TXOP participant acquirement stage, processed at the AP for the shared TXOP holder BSS.

The AP determines 1232 if an RTS-share frame has been received. It the RTS-share has not been received, then processing ends. Otherwise, the AP responds 1234 with a CTS-share frame. The AP checks 1236 if a TXOP offer frame has been sent. If it has not been sent, then execution moves to block 1240. Otherwise, check 1238 is performed which determines if the TXOP offer frame was broadcast. If it was broadcast, then in block 1240 the AP is configured to receive Access Request frames from either random channel access within slots during the channel access period or from dedicated access within a dedicated access slot, with execution moving to check 1244 in FIG. 39B.

Figure 39B:
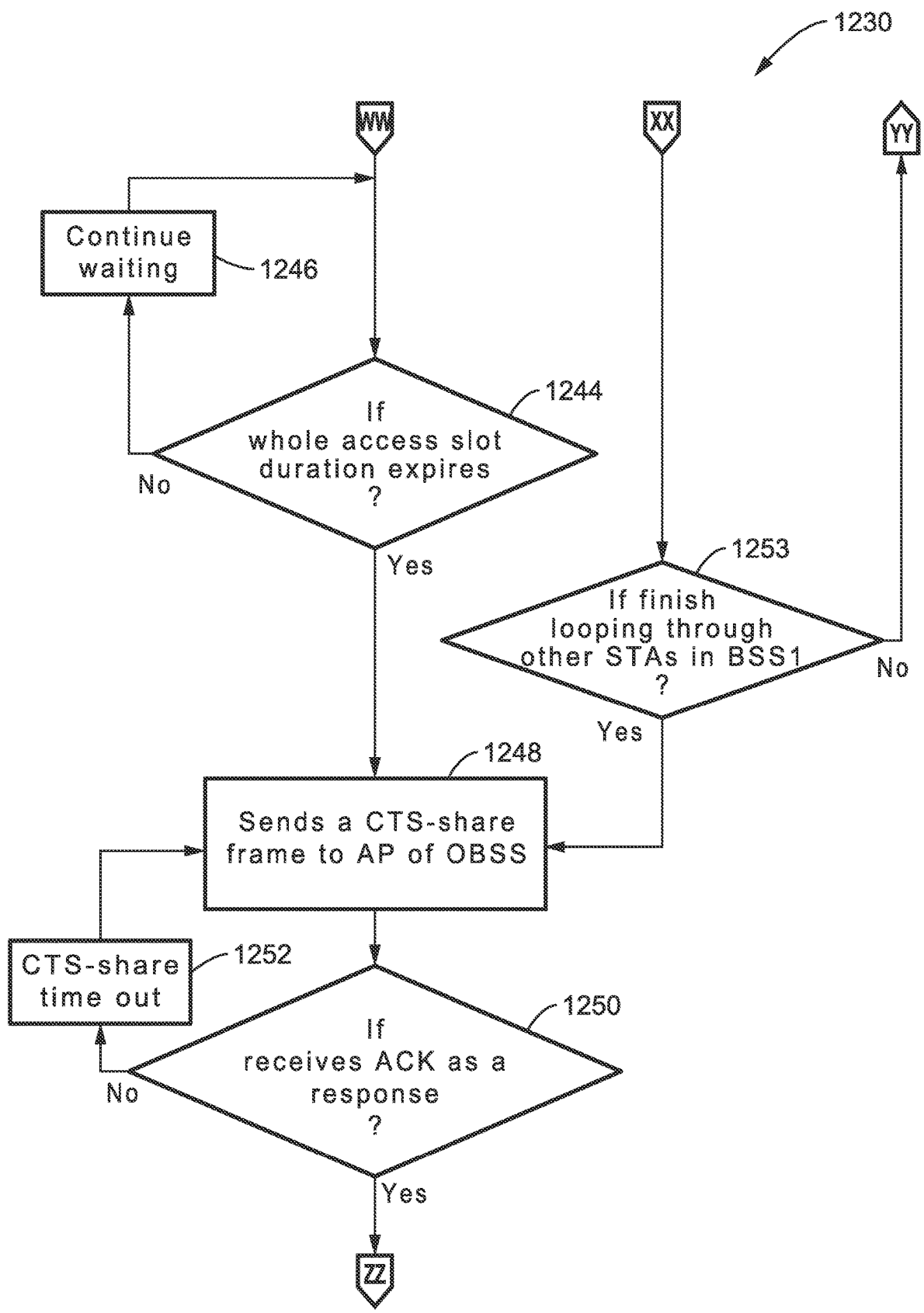
Figure 39C:
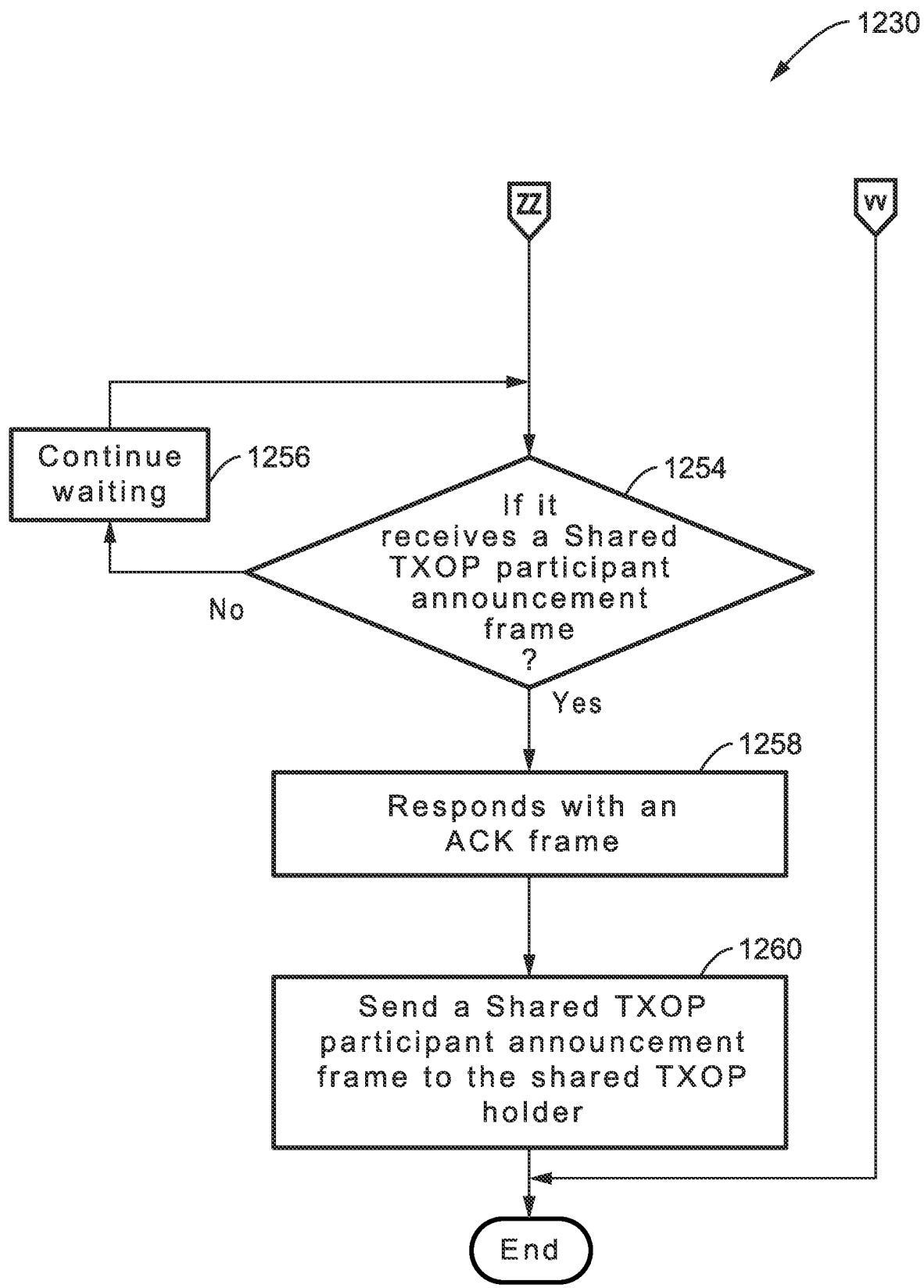

Otherwise, if it was determined at check 1238 that the TXOP offer frame was not broadcast, then at block 1242 the AP is configured to receive Access Request frames within a time offset as indicated in a unicasted TXOP offer frame, with execution moving to check 1253 in FIG. 39B which determines if the AP has finished looping through other STAs in its BSS. If it has not completed looping through, then execution returns to block 1242. If the looping has been completed then block 1248 is reached, which will be discussed below.

Arriving from block 1240 in FIG. 39A, check 1244 determines if the entire access slot duration has expired. If it has not, then waiting continues 1246 (for at least some period). Otherwise, at block 1248 the AP sends a CTS-share frame to the AP of the OBSS (in these examples that would be the AP of BSS2). Check 1250 then determines if an ACK has been received in response to the CTS-share frame. If the ACK is not received in the allotted time, then a CTS-share timeout 1252 occurs with execution moving back to block 1148 in sending another CTS-share frame. Otherwise, with the ACK received execution moves to check 1254 in FIG. 39C.

Check 1254 determines if the AP has received a shared TXOP participant announcement frame. If it has not been received, then waiting continues 1256 (for at least a given period of time). Otherwise, the AP responds 1258 with an ACK frame to the shared TXOP participant announcement frame, after which the AP sends a shared TXOP participant announcement frame to the shared TXOP holder STA.

7.4.6. TXOP Participant Acquirement Stage, Processed at the Shared TXOP Participant Level.

Figure 40A:
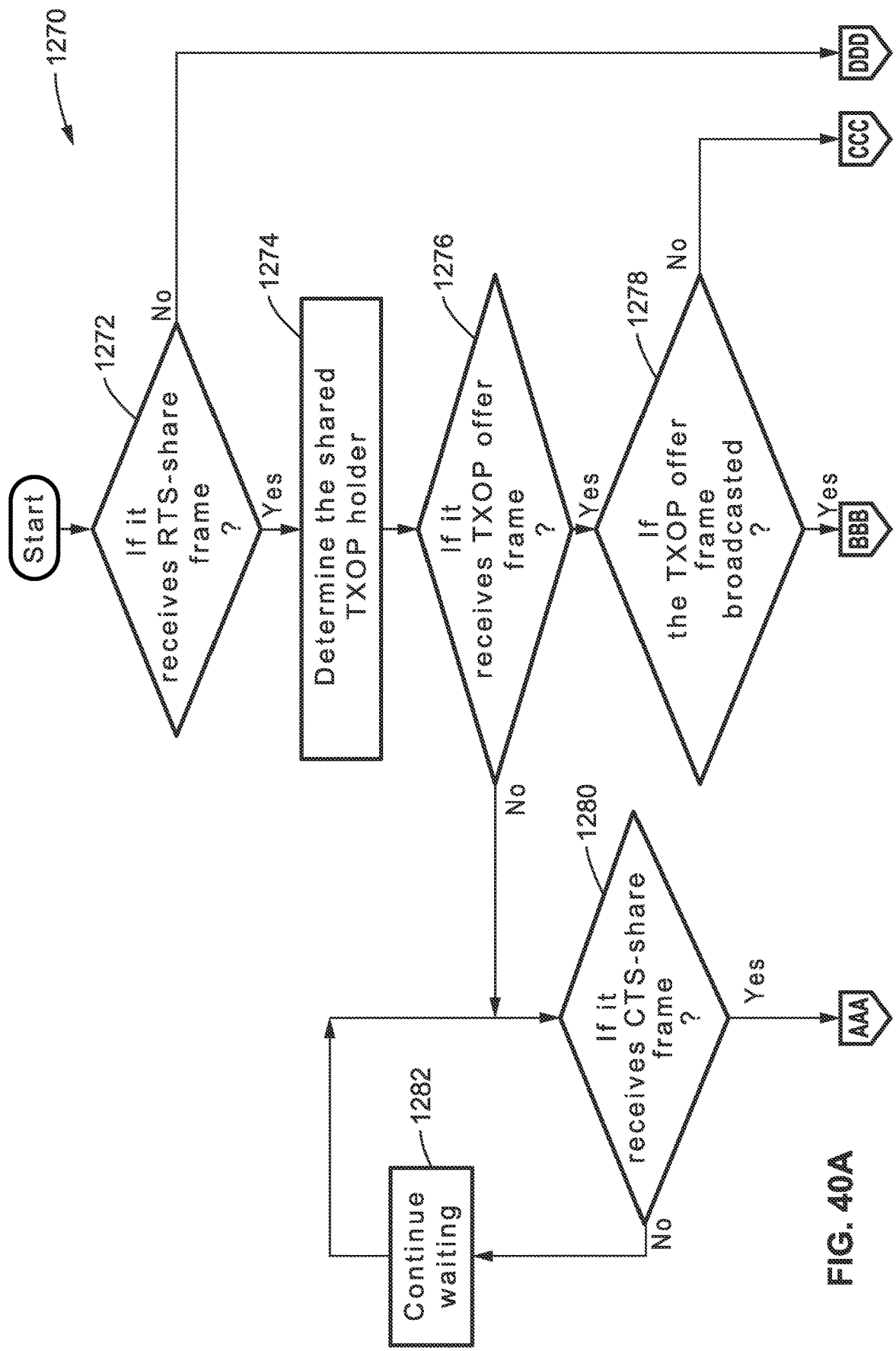
FIG. 40A and FIG. 40B is a flow diagram of a TXOP participant acquirement stage, processed at the shared TXOP participants according to at least one embodiment of the present disclosure.
Figure 40B:
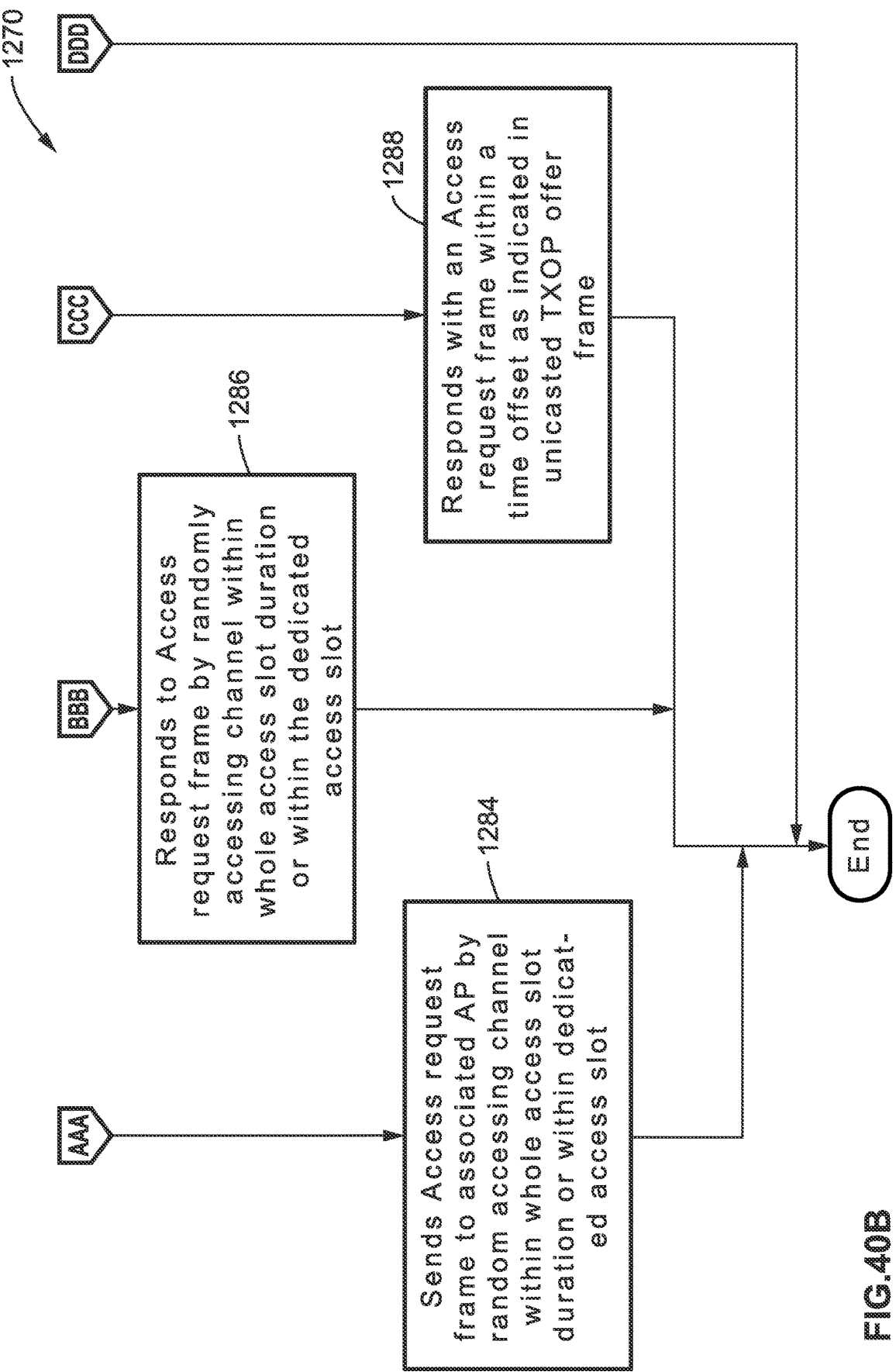

FIG. 40A and FIG. 40B illustrates an example embodiment 1270 of the TXOP participant acquirement stage, processed at the shared TXOP participant level.

The shared TXOP participant checks 1272 if it has received an RTS-share frame. If the share frame was not received, then this processing ends. Otherwise, block 1274 determines who the shared TXOP holder is by extracting it from the information contained with the RTS-share frame. Check 1276 determines if a TXOP offer frame has been received. If the condition is not met, then execution moves to check 1280 which determines if a CTS-share frame was received. If the share frame was not received, then it will wait 1282 (for at least a period of time) and keep checking 1280. When the CTS-share frame is received, then execution moves to block 1284 in FIG. 40A

In block 1284 the shared TXOP participant sends an Access Request frame to the associated AP by randomly accessing the channel within the whole access slot duration or within a dedicated (schedules) access slot. It should be noted that the dedicated slot duration is indicated by the Allocation Block Duration subfield of the Access request information element of the previously exchanged management frames in the shared TXOP setup stage. The whole access slot duration is also known based on adding up the dedicated slot duration.

Returning to consider block 1276, if the TXOP offer frame is received, then check 1278 determines if the TXOP offer frame was broadcast. If the TXOP offer frame was not broadcast, then execution moves to block 1288 in FIG. 40B in which the shared TXOP participant responds with an Access Request frame within a time offset as indicated in the unicasted TXOP offer frame, and this processing ends.

Otherwise, if the TXOP offer frame was broadcast, then execution moves to block 1286 in which the shared TXOP participant is configured to respond to an Access Request frame by randomly accessing the channel, within somewhere in the whole access slot duration or within the dedicated access slot.

7.4.7. TXOP Participant Acquirement Stage, Processed at AP

The flow diagram of the TXOP participant acquirement stage, process at the AP of the OBSS is the same as that seen in FIG. 26A and FIG. 26B.

7.5. TXOP Schedule and Access (with AP Coordinator in BSS1)

7.5.1. TXOP Schedule and Access with Unicast TXOP Offer Frame (with AP)

Figure 41:
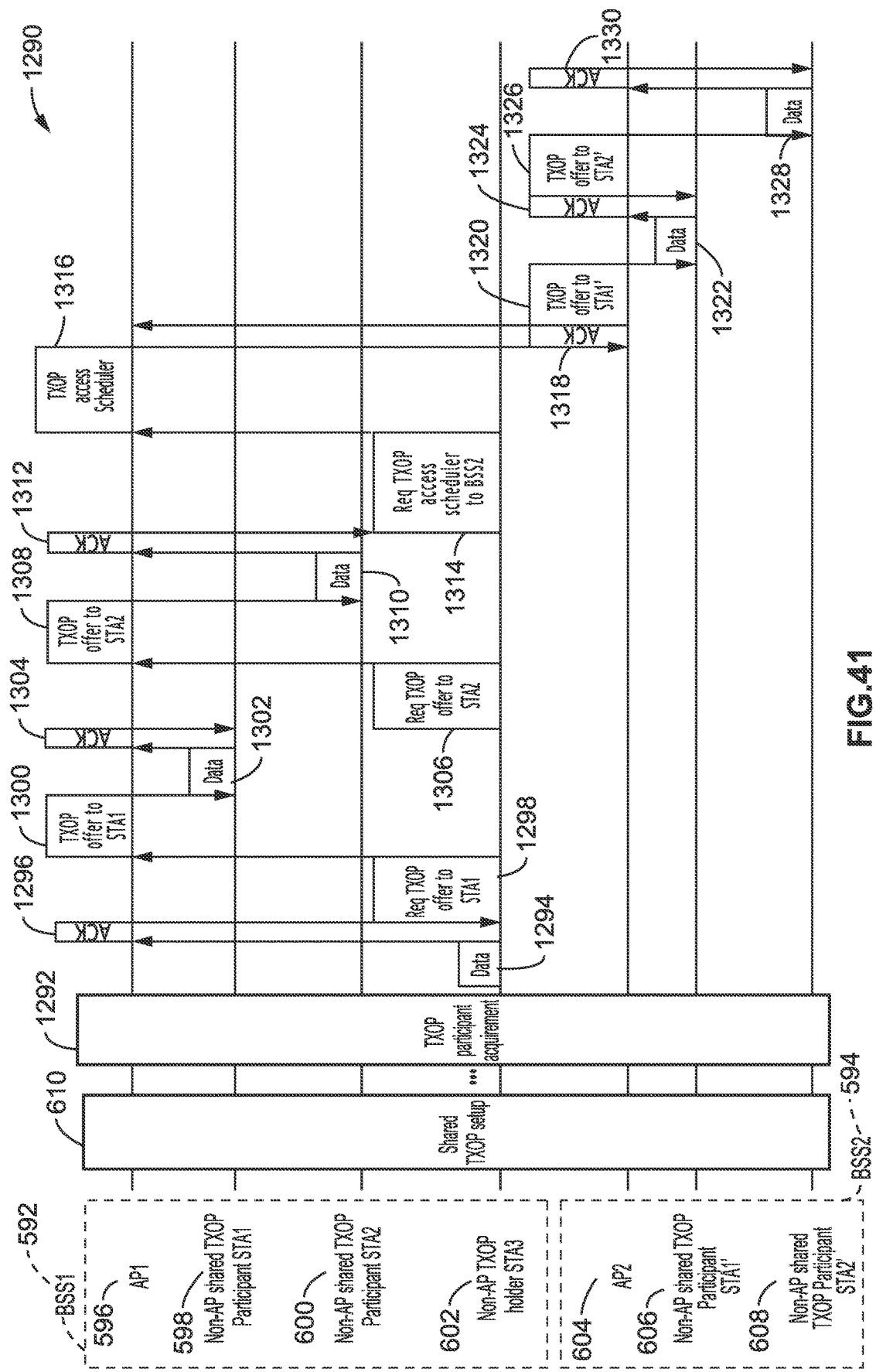
FIG. 41 is a communication sequence diagram of a UL initiated TXOP schedule and access stage with unicast TXOP offer frame (with AP according to at least one embodiment of the present disclosure.

FIG. 41 illustrates an example embodiment 1290 of a UL initiated TXOP schedule and access stage with unicast TXOP offer frame (with AP). As in many of the prior figures, interactions are shown between STAs across a first BSS (BSS1) 592, containing AP1 596, and non-AP STA1 598, non-AP STA2 600 and non-AP STA3 602. A second BSS (BSS2) 594 is shown with AP2 604, non-AP STA1' 606 and non-AP STA2' 608. A TXOP shared setup procedure 610 is performed, followed by a TXOP participant acquirement stage 1292.

STA3, which is the shared TXOP holder, sends UL DATA 1294 to the AP in its BSS and receives an ACK 1296 in response from the AP. STA3 then separately sends (unicasts) TXOP offer frames 1298 and 1306 to the AP to communicate to each shared TXOP participant in BSS1. The AP is seen sending TXOP offers 1300 and 1308 to STA1 and STA2, respectively. After receiving the TXOP offer frames, the shared TXOP participants (STA1 and STA2) send UL DATA 1302 and 1310 to the associated AP, each within the transmission duration defined in the TXOP offer frame. The AP 596 receives the UL DATA and responds with an ACK 1304 and 1312 indicating that the DATA has been received.

After STA3 finishes triggering UL transmissions in its own BSS, it sends a Request TXOP access scheduler frame to BSS2 1314 to its associated AP in BSS1. The scheduler frame indicates that this is the schedule for another BSS (indicated in the BSSID in this frame). The AP receives the Request TXOP access scheduler frame, which shows a different BSSID from itself, and responds by sending a TXOP access scheduler frame 1316 to the AP associated with that BSSID (BSS2 in this example) and it includes the scheduler information in this frame and indicates the source BSSID of the TXOP access scheduler frame.

AP2 604 in BSS2 receives the TXOP access scheduler frame from a different BSS (indicated in the BSSID), and responds with an ACK 1318 to indicate successful reception. Then, AP2 sends TXOP offer frames to each shared TXOP participant in BSS2, shown as TXOP offers 1320 and 1326 to STA1' and STA2', respectively, which each send their UL DATA 1322 and 1328 to the associated AP (AP2) within the transmission duration defined in the TXOP offer frame in response, and AP2 sends respective ACKs 1324 and 1330 to the STAs.

Figure 42:
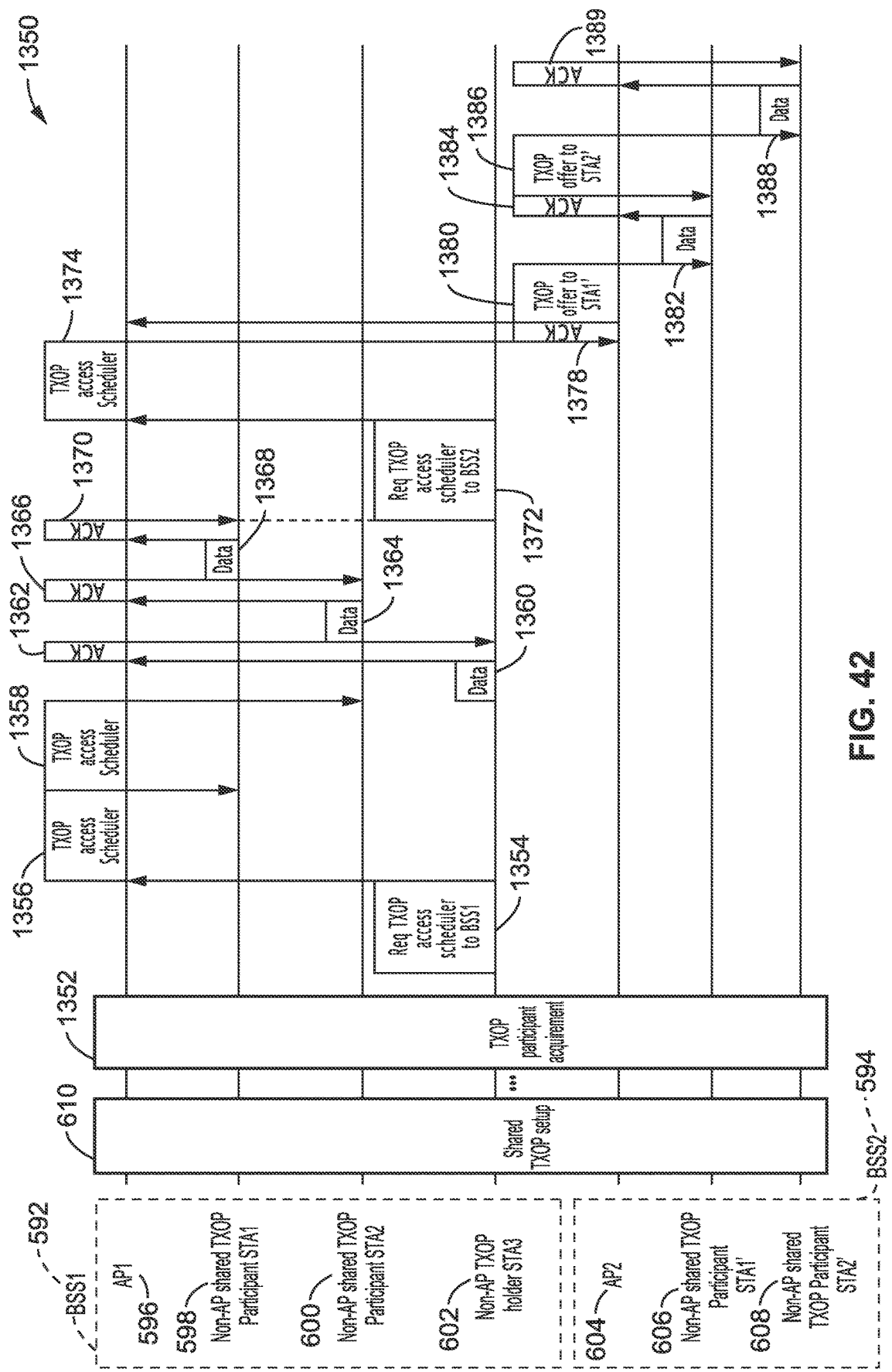
FIG. 42 is a communication sequence diagram of a TXOP schedule and access stage with unicast TXOP access scheduler frame (with AP) according to at least one embodiment of the present disclosure.

7.5.2. TXOP Schedule and Access with Unicast TXOP Access Scheduler with AP Coordination FIG. 42 illustrates an example embodiment 1350 of the TXOP schedule and access stage with unicast TXOP access scheduler frame (with AP). As in many of the prior figures, interactions are shown between STAs across a first BSS (BSS1) 592, containing AP1 596, and non-AP STA1 598, non-AP STA2 600 and non-AP STA3 602. A second BSS (BSS2) 594 is shown with AP2 604, non-AP STA1' 606 and non-AP STA2' 608. A TXOP shared setup procedure 610 is performed, followed by a TXOP participant acquirement stage 1352.

STA3 is the shared TXOP holder and unicasts the request TXOP access scheduler frame 1354 to its associated AP (i.e., AP1), indicating the TXOP scheduler for the shared TXOP participants in BSS1 and sets the BSSID to the ID of BSS1. AP1 receives the request TXOP access scheduler frame and checks if the BSSID is its own address (same as itself), then AP1 unicasts the TXOP access scheduler frame 1356 and 1358 to each shared TXOP participant in BSS1 (i.e., STA1 and STA2). After receiving the TXOP access scheduler frame, and the TXOP holder sending UL DATA 1360, then the shared TXOP participants (STA1 and STA2) send UL DATA 1364 and 1368 to the associated AP in different time slots as indicated in the Allocation Control field in the Access request information element as embedded in the beacon frame or other previously exchanged management frames. AP1 receives the UL DATA directed to it and responds with an ACK 1362, 1366 and 1370 to each DATA source.

The TXOP holder STA, shown here as STA3, then sends a request TXOP access scheduler 1372 to its associated AP (AP of BSS1) for communication on the OBSS. AP1 receives the access schedule information and generates a TXOP access scheduler frame 1374 to the AP (AP2) in BSS2 594. Upon receipt of this schedule, AP2 generates an ACK 1378 back to AP1 in BSS1, and starts looping through its STAs sending them TXOP offers. The examples shows TXOP offers 1380 and 1386 sent to STA1' and STA2', which send UL data 1382 and 1388 back to AP2, which ACKs 1384 and 1389 the receipt of the UL DATA.

7.5.3. TXOP Schedule and Access with Broadcast TXOP Scheduler (with AP)

Figure 43:
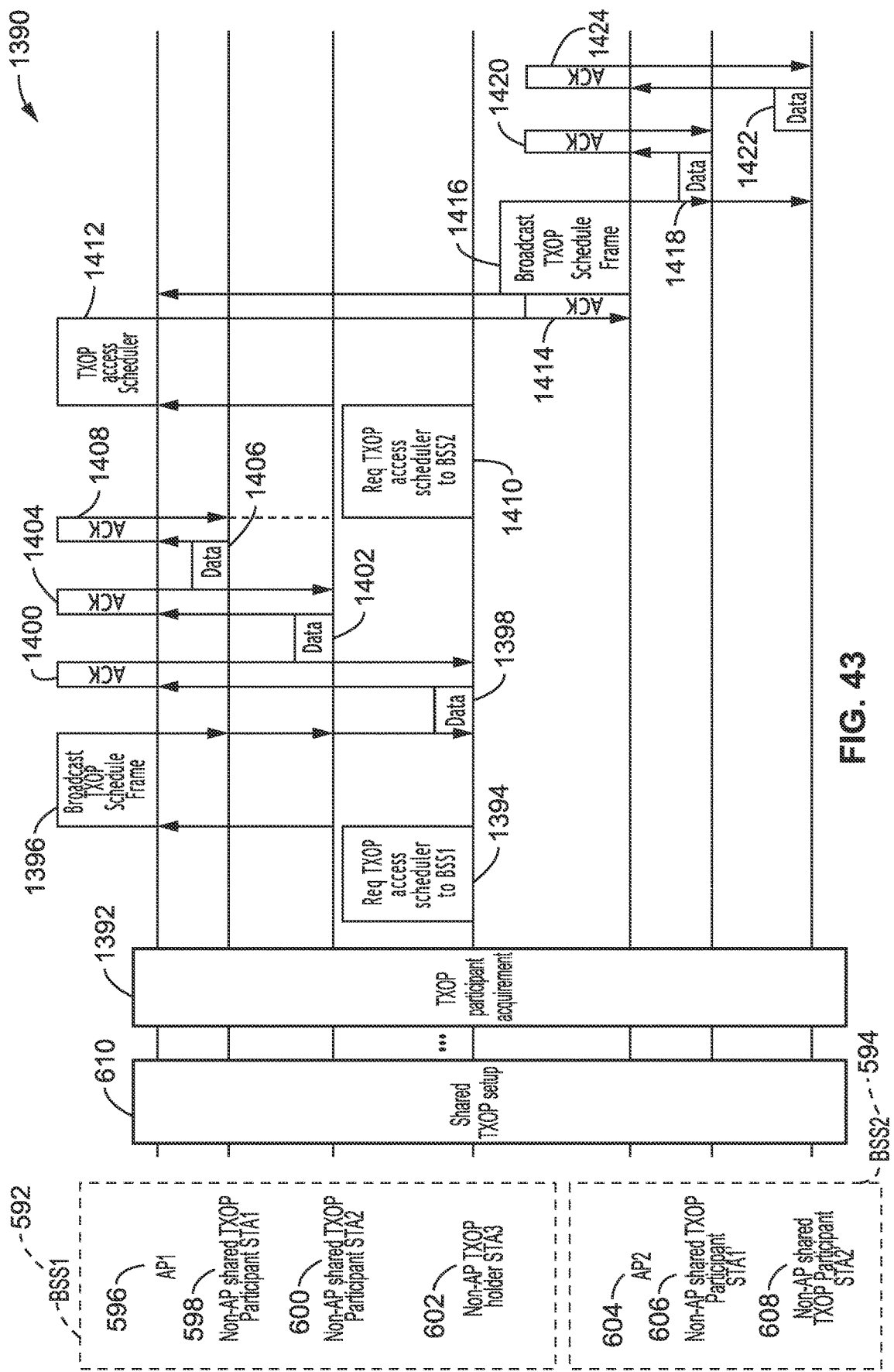
FIG. 43 is a communication sequence diagram of a TXOP schedule and access stage with broadcast TXOP scheduler frame (with AP as coordinator) according to at least one embodiment of the present disclosure.

FIG. 43 illustrates an example embodiment 1390 of the TXOP schedule and access stage with broadcast TXOP scheduler frame (with AP as coordinator). As in many of the prior figures, interactions are shown between STAs across a first BSS (BSS1) 592, containing AP1 596, and non-AP STA1 598, non-AP STA2 600 and non-AP STA3 602. A second BSS (BSS2) 594 is shown with AP2 604, non-AP STA1' 606 and non-AP STA2' 608. A TXOP shared setup procedure 610 is performed, followed by a TXOP participant acquirement stage 852.

This figure is similar to FIG. 30 with some difference in the packet exchange for BSS1. In this figure, STA3 (shared TXOP holder) unicasts the request TXOP access scheduler frame 1394 to the associated AP (i.e., AP1), with indication of the TXOP scheduler for the shared TXOP participants in BSS1 and sets the BSSID to the ID of BSS1; whereas in FIG. 30 STA3 broadcasts the TXOP schedule frame to the other STAs (AP, STA1 and STA2).

In particular AP1 receives the request TXOP access scheduler frame 1394, checks that the BSSID is the same as itself, then AP1 broadcasts a TXOP access scheduler frame 1396 to all STAs in BSS1.

After receiving the broadcast TXOP scheduler frame, the STAs in BSS1 confirm this frame is from the same BSS (indicated by the BSSID). Then the non-AP TXOP holder STA sends UL DATA 1398, and the shared TXOP participants (STA1 and STA2) send UL DATA 1402 and 1406, to the associated AP in different time slots as indicated in the broadcast TXOP scheduler frame. The AP individually responds to receiving each UL DATA transmission with an ACK 1400, 1404 and 1408.

The TXOP holder STA, shown here as STA3, then sends a request TXOP access scheduler 1410 to its associated AP (AP of BSS1) for communication on the OBSS. AP1 receives the access schedule information and generates a TXOP access scheduler frame 1412 to the AP (AP2) in BSS2 594. Upon receipt of this schedule AP2 generates an ACK 1414 back to AP1 in BSS1, and broadcasts TXOP schedule frames 1416 to the STAs in its BSS, which respond by sending UL data 1418 and 1422 back to AP2, which ACKs 1420 and 1424 the receipt of the UL DATA.

It should be noted here as well as throughout the examples that the AP can also join the shared TXOP as other shared TXOP participants or the AP can share the TXOP as the shared TXOP holder. Thus, the TXOP can be shared among the AP and STAs.

Figure 44A:
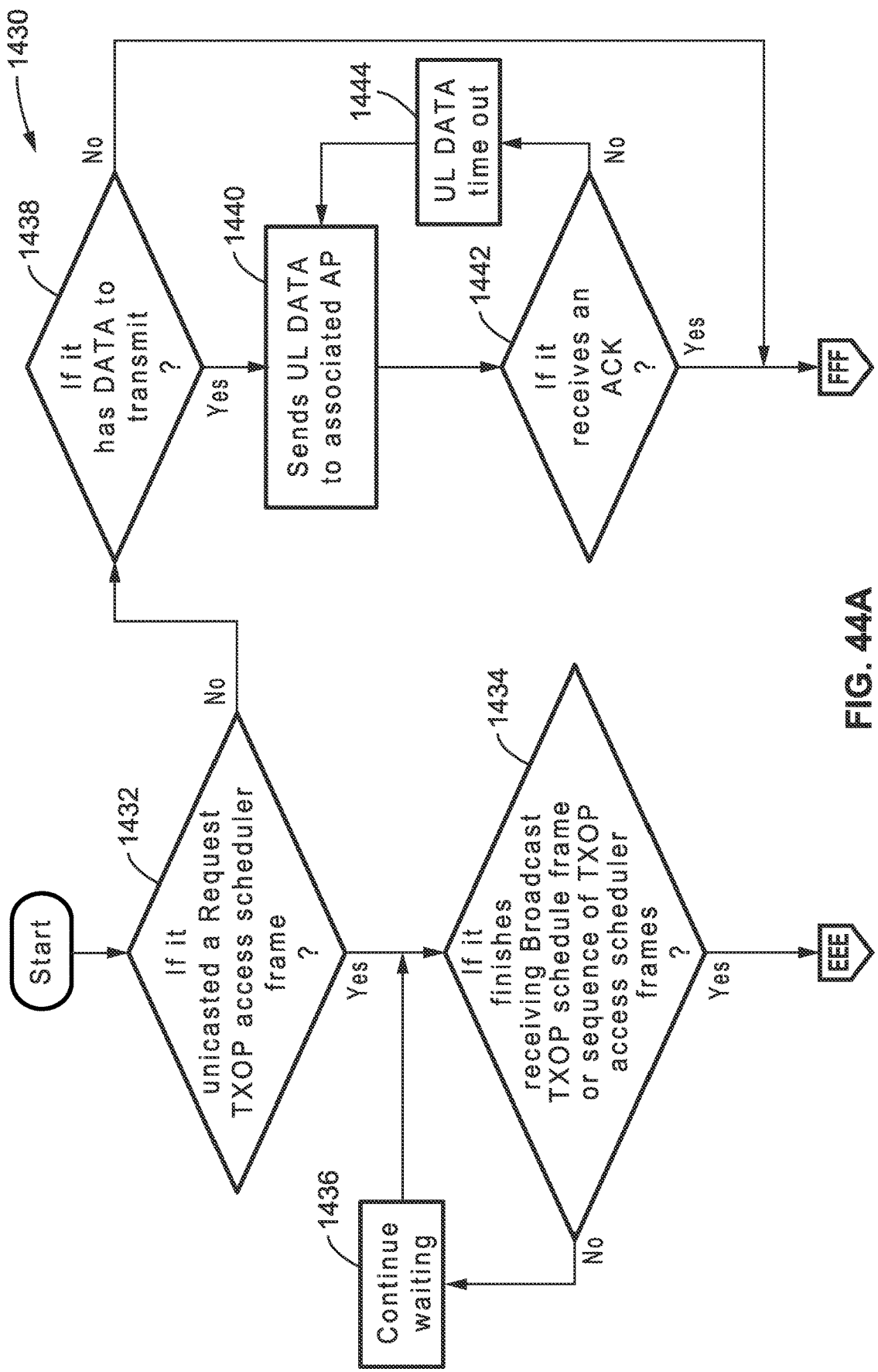
FIG. 44A through FIG. 44C is a flow diagram of a TXOP schedule and access stage, processed at the non-AP TXOP holder STA level according to at least one embodiment of the present disclosure.

7.5.4. TXOP Schedule and Access Stage Processed at Non-AP TXOP Holder STA Level FIG. 44A through FIG. 44C illustrates an example embodiment 1430 of TXOP schedule and access stage, processed at the non-AP TXOP holder STA level.

The non-AP TXOP holder STA checks 1432 if it has unicasted a request TXOP access scheduler frame. If the condition is not met, then execution moves to check 1438. Otherwise, since it unicasted the request TXOP access scheduler frame, then at block 1434 it checks to determine if it has finished receiving broadcast TXOP access scheduler frames, or sequences of TXOP access scheduler frames. If it has not received all these frames then it continues waiting 1436 (for some period of time).

Figure 44B:
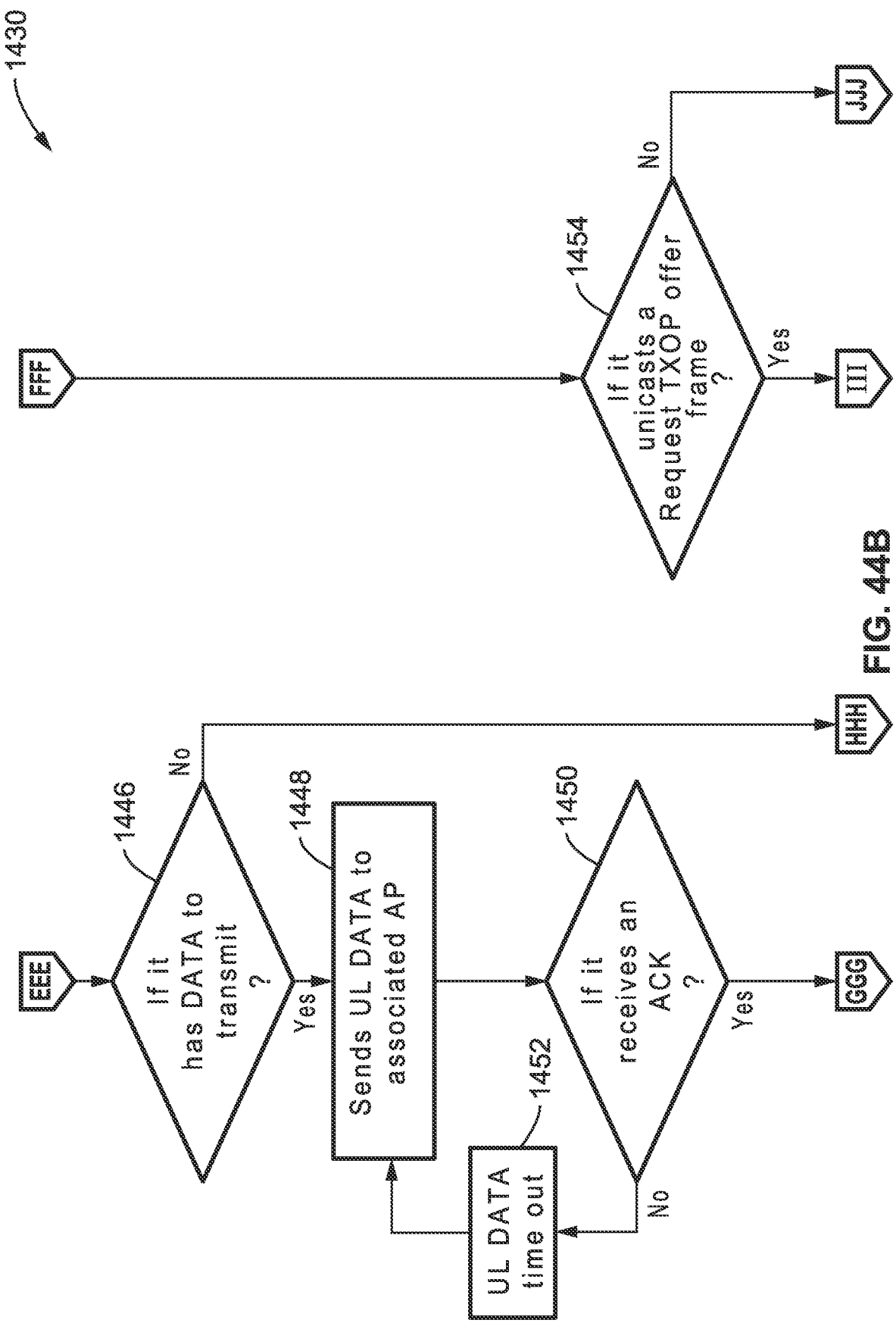
Figure 44C:
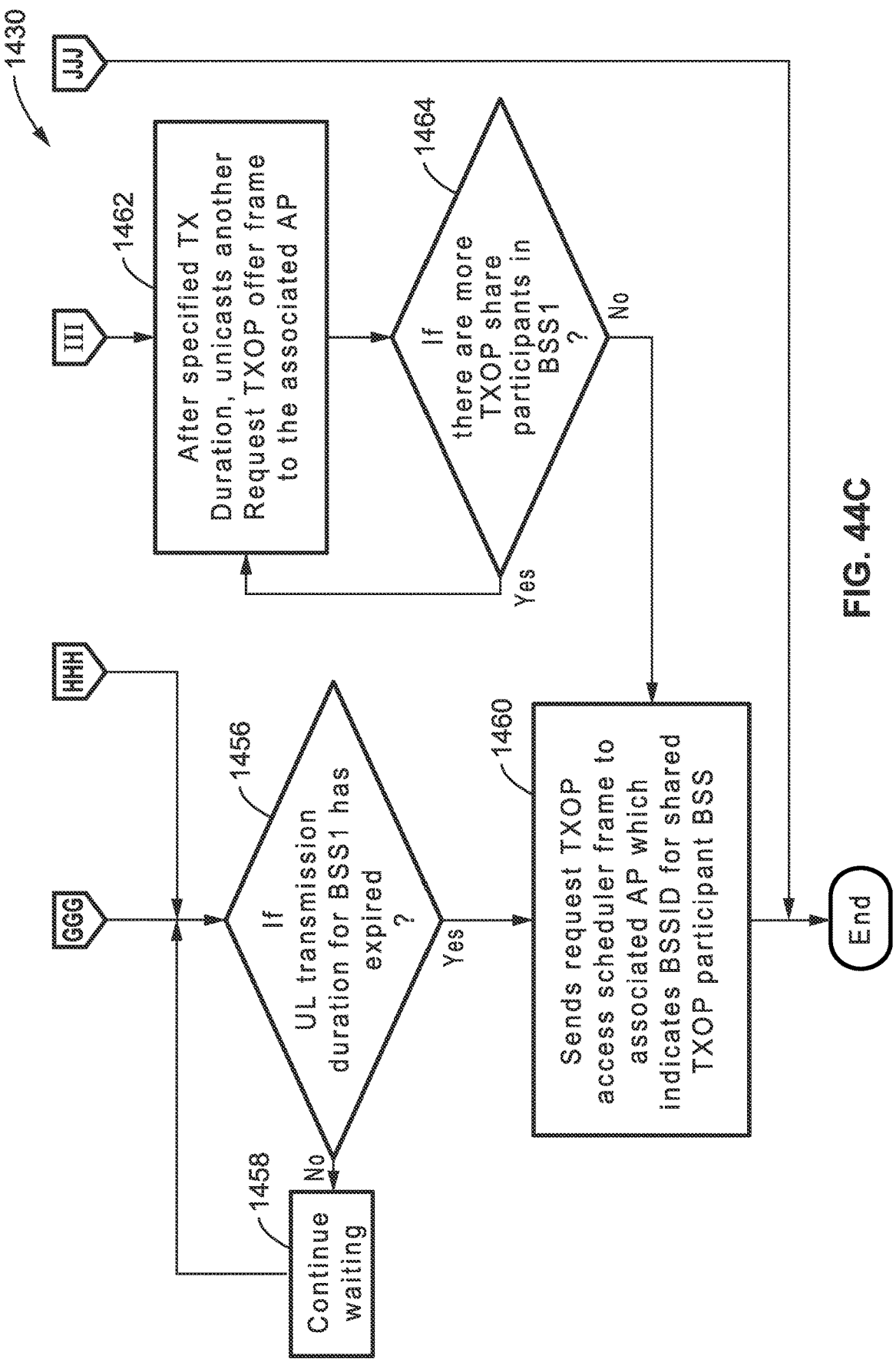

Otherwise having received all these TXOP access scheduler frames, then execution moves to check 1446 in FIG. 44B where the non-AP TXOP holder STA determines if it has DATA to be transmitted. If it does not have DATA to transmit, then execution moves forward to block 1456 in FIG. 44C. Otherwise, the non-AP TXOP holder STA sends UL DATA 1448 to the associated AP and checks 1450 to determine if it received an ACK. If no ACK was received in the given time period, then a UL DATA timeout 1452 occurs and execution returns to block 1448. Otherwise, with the ACK received the non-AP TXOP holder STA reaches check 1456 in FIG. 44C which determines if the UL transmission duration for BSS1 has expired. If the duration has not yet expired, then waiting continues 1458 with a return to 1456. Otherwise, the non-AP TXOP holder STA sends 1460 a request TXOP access scheduler frame to the associated AP which indicates BSSID for shared TXOP participant BSS, and this process ends.

Returning now to discuss the path from 1432 when the non-AP TXOP holder STA did not unicast a request TXOP access scheduler frame, and check 1438 determines if the non-AP TXOP holder STA has DATA to transmit. If there is no DATA to transmit then execution moves forward to block 1454 in FIG. 44B which determines if the non-AP TXOP holder STA has unicast a request TXOP access scheduler frame. If it has not performed this unicasting, then this processing ends. Otherwise, if it has performed the unicasting, then execution moves to block 1462 in FIG. 44C in which the non-AP TXOP holder STA, after a specified transmit duration, transmits another request TXOP access scheduler frame to the associated AP, and performs check 1464 to determine if there are more TXOP share participants in its same BSS (BSS1). If there are more participants, then execution returns to block 1462, otherwise execution reaches block 1460 which was already discussed.

7.5.5. TXOP Schedule and Access Stage Processed at the AP Level in BSS1

Figure 45A:
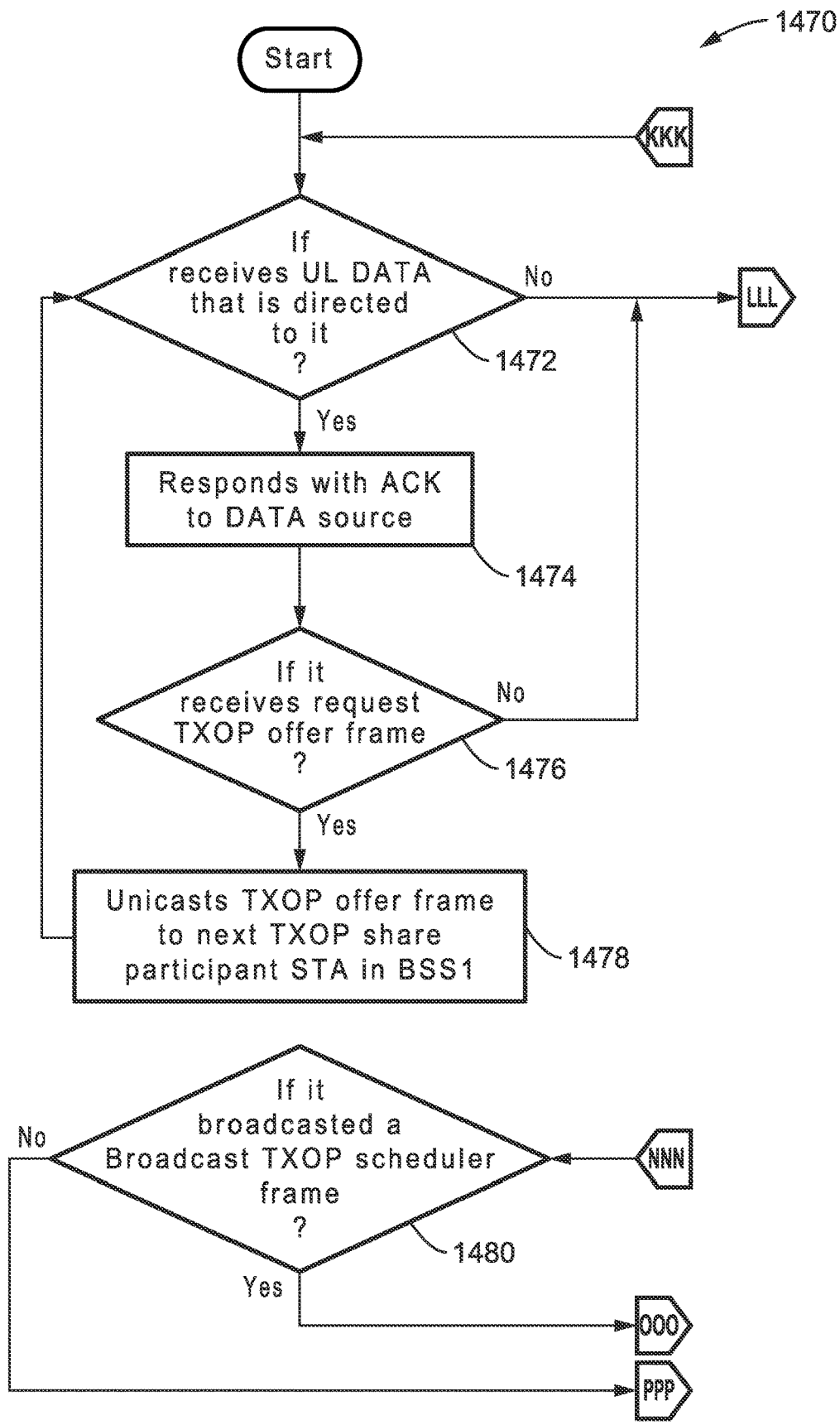
FIG. 45A through FIG. 45C is a flow diagram of a TXOP schedule and access stage, processed at the AP level in BSS1 according to at least one embodiment of the present disclosure.
Figure 45B:
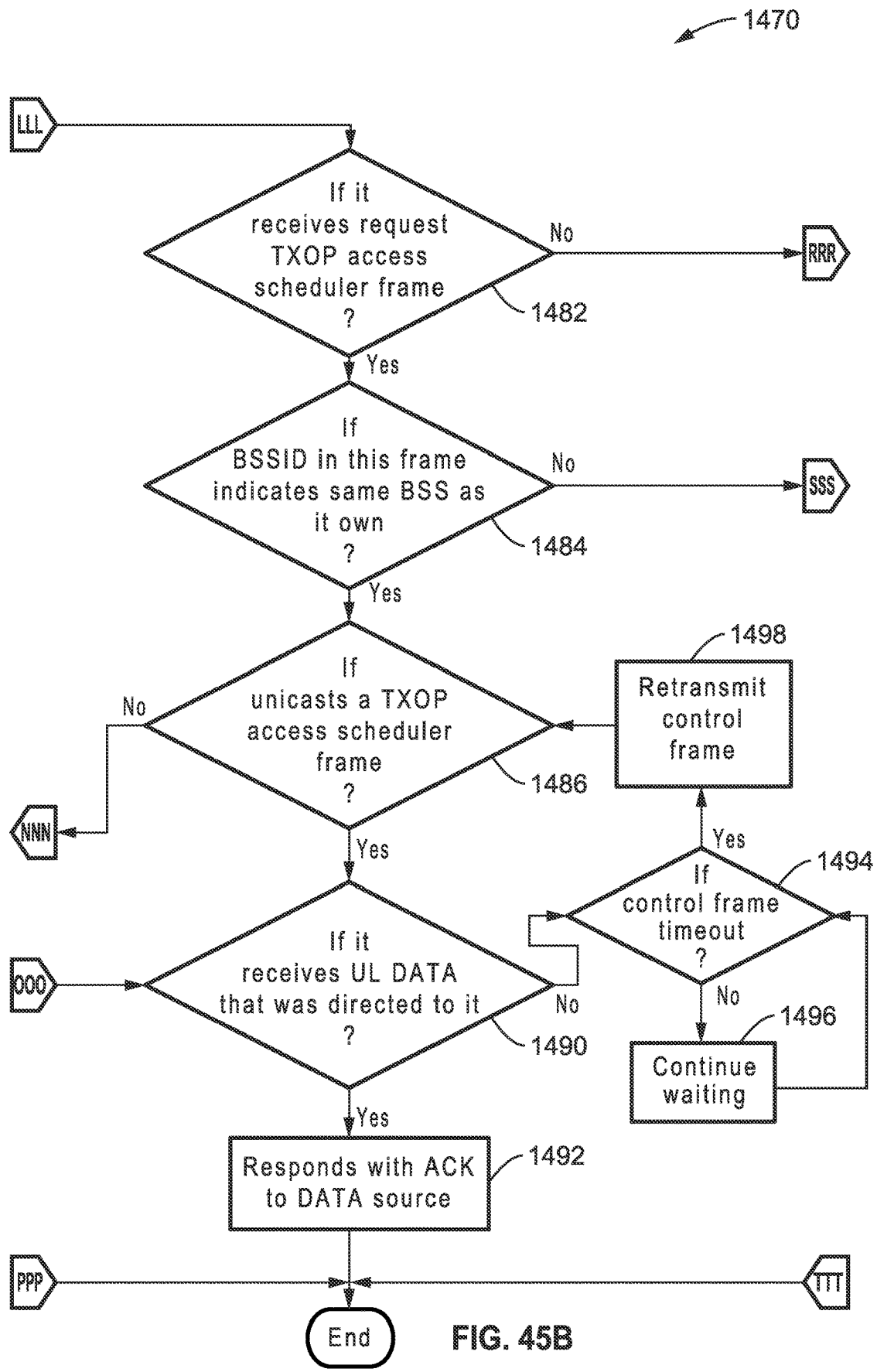
Figure 45C:
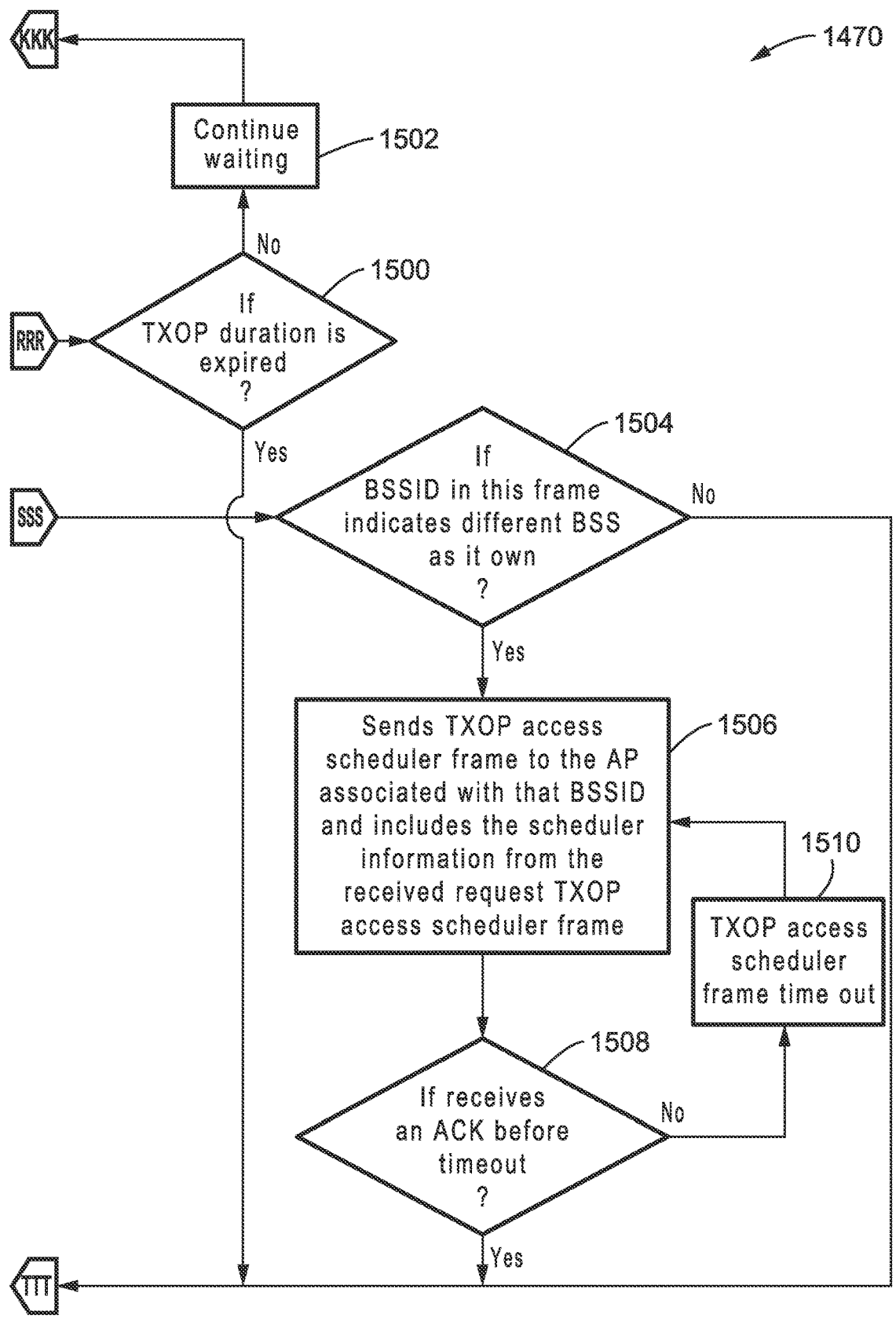

FIG. 45A through FIG. 45C illustrate an example embodiment 1470 of the TXOP schedule and access stage, processed at the AP level in BSS1.

The AP which is in the same BSS as the TXOP holder, checks 1472 to determine if it has received UL DATA that is directed to it. If it has not received UL DATA then execution moves to check 1482 in FIG. 45B, which will be discussed later. Otherwise, after receiving UL DATA the AP responds 1474 with an ACK to the sender, which is the source of the UL DATA. Check 1476 determines if the AP has received a request TXOP offer frame. If it has received the offer frame then at block 1478 the AP unicasts a TXOP offer frame to the next TXOP share participant STA in BSS1, with execution returning to check 1472.

Check 1482 is reached if either the AP has not received UL DATA as determined in check 1472, or if the AP has not received a request TXOP offer frame as determined in check 1476. Check 1482 determines if the AP has received a TXOP access scheduler frame. If it has not received the scheduler frame, then execution moves to check 1500 in FIG. 45C, which determines if the TXOP duration has expired. If the duration has expired, then processing ends. However, if the duration has not expired, then the AP continues waiting 1502 and execution returns to check 1472.

Otherwise, if the condition of check 1482 was met, then check 1484 determines if the BSSID contained in this frame is the same BSS as its own; in other words it determines that this TXOP access scheduler frame is directed to this AP. If the condition is not met, then execution moves to check 1504 in FIG. 45C which is discussed below. Otherwise, check 1486 determines if the AP has unicast a TXOP access scheduler frame. If the condition is not met, then execution moves to check 1480 in FIG. 45A which determines if a TXOP access scheduler frame was broadcast. If the TXOP access scheduler frame also was not broadcast, then this processing ends. Otherwise, since the TXOP access scheduler frame was broadcast, then execution moves to check 1490 in FIG. 45B, to which execution also reaches from check 1486 if the AP unicasted the TXOP access scheduler frame.

Check 1490 determines if the AP has received any UL DATA directed to it. If the condition is met, then in block 1492 the AP responds with an ACK to the source STA which sent the UL DATA, and this processing ends. Otherwise, if the UL DATA was not received, then check 1494 determines if a control frame timeout has occurred. If the timeout has not occurred, then the AP keeps waiting 1496 and checking 1494 for control frames. Otherwise, if the control frame timed out, then block 1498 retransmits the control frame and execution moves back to check 1486.

Returning now to discuss check 1504 in FIG. 45C, reached from the condition not being met in check 1484, it determines if the BSSID of this frame indicates a different BSS than its own BSS. If it is not a different BSS, then this processing is completed. Otherwise, if it is a different BSS, then the AP sends 1506 a TXOP access scheduler frame to the AP associated with that BSSID, and includes the scheduler information as received in the request TXOP access scheduler frame which was received. Check 1508 determines if an ACK has been received before timeout. If the ACK was received before timeout, then this processing is completed. Otherwise, a TXOP access scheduler timeout occurs 1510 and execution returns to block 1506.

7.5.6. TXOP Schedule and Access Stage, Processed at the AP Level in BSS2

The handling of the TXOP schedule and access stage, processed at the AP level in BSS2 is the same as seen in FIG. 33A through FIG. 33B.

7.5.7. TXOP Schedule and Access Stage, Processed at the Non-AP Shared TXOP Participant STA Level The handling of TXOP schedule and access stage, processed at the non-AP shared TXOP participant STA level is the same as that seen in FIG. 34A through FIG. 34B.

7.6. Overview of Semi-Static Scenario

In this scenario, two stages are designed including the shared TXOP setup stage and the TXOP schedule and access stage.

In the shared TXOP setup stage, each non-AP STA exchanges the share offer/request information for the shared TXOP with the AP. In addition to this, each non-AP TXOP holder STA also announces the time allocation for other non-AP shared TXOP participant STAs and exchanges this allocation configuration information with other non-AP STAs through coordination of the AP.

The semi-static configuration is performed at the beginning stage. In this case, the complex scheduling process in the TXOP schedule and access stage can thus be skipped (bypassed), as the non-AP STAs directly access the TXOP channel with assigned time slots as configured in the shared TXOP setup stage.

In the semi-static scenario, the disclosed protocol has two stages: (1) a Shared TXOP setup stage (section 7.6.), with (a) Share offer/request setup substage (section 7.6.1.), and (b) a TXOP holder configuration setup substage (section 7.6.2.); and (2) a TXOP sharing announcement stage and shared TXOP access stage (section 7.6.3.).

7.6.1. Share Offer/Request Setup Substage

Figure 46:
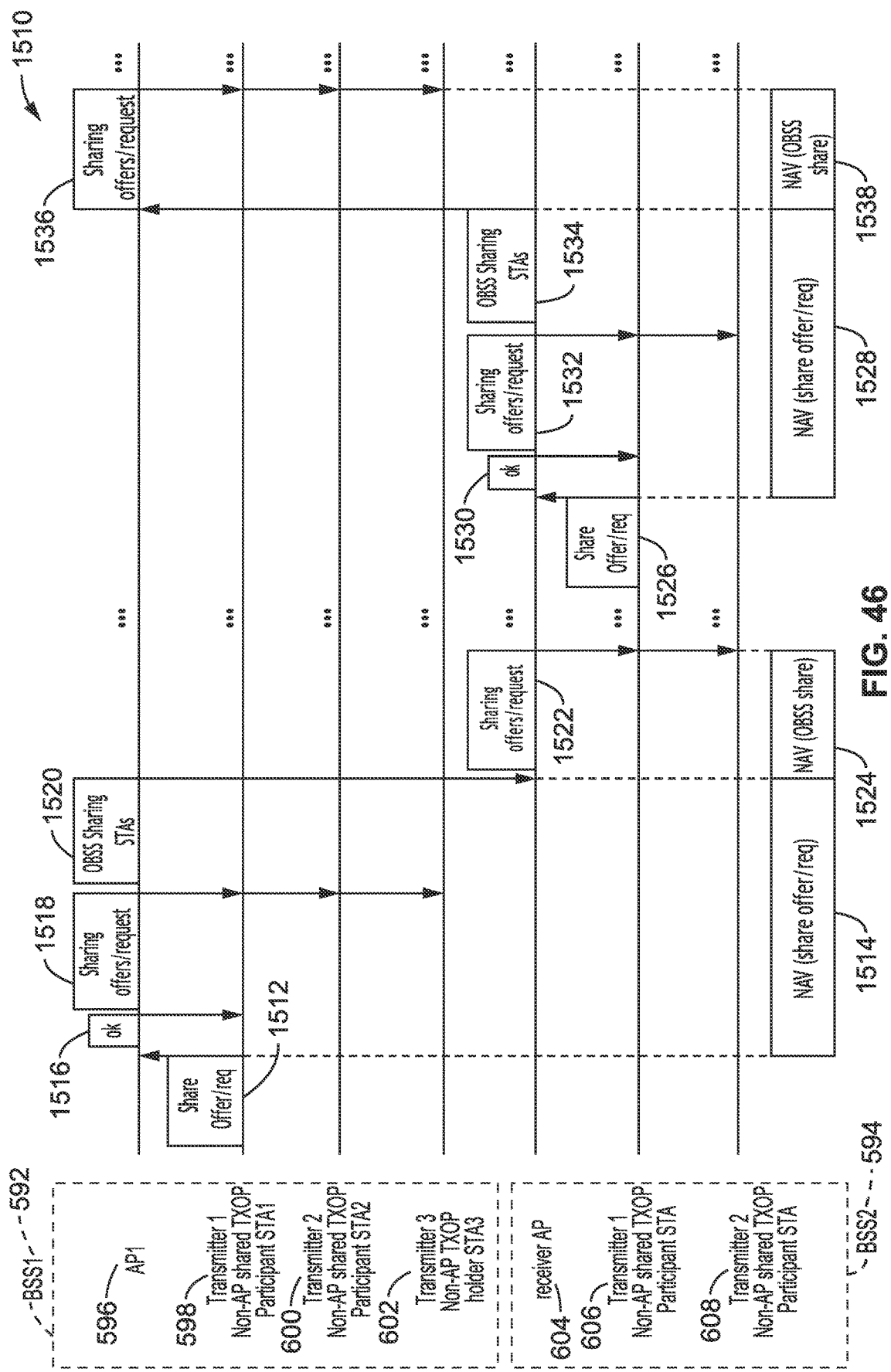
FIG. 46 is a communication sequence diagram of a according to at least one embodiment of the present disclosure.

FIG. 46 illustrates an example embodiment 1510 of frame exchange in the share offer/request setup substage of the semi-static protocol for the OBSS scenario. As in many of the prior figures, interactions are shown between STAs across a first BSS (BSS1) 592, containing AP1 596, and non-AP STA1 598, non-AP STA2 600 and non-AP STA3 602. A second BSS (BSS2) 594 is shown with AP2 604, non-AP STA1' 606 and non-AP STA2' 608.

A non-AP STA sends a Share Offer/Request frame 1512 to its associated AP indicating an offer or/and a request for a shared TXOP access, which is then acknowledged 1516 by the AP. Transmission of the Share Offer/Request frame 1512 is shown setting NAV (share offer/request) 1514.

After the AP receives this Share Offer/Request frame from the non-AP STA, the AP maintains the shareability information and broadcasts a Sharing offer/request frame 1518 to update the latest shareability information to all non-AP STAs in its own BSS (BSS1). After that, the AP unicasts an OBSS Sharing STAs frame 1520 to another AP (AP2) 604 of the other BSS (BSS2) 494 indicating the non-AP STAs shareability of BSS1.

Once AP2 receives this OBSS Sharing STAs frame, it broadcasts a Sharing offer/request frame 1522 to update the latest shareability information of non-AP STAs of BSS1 to all non-AP STAs of BSS2. Transmission of the Share Offer/Request frame 1522 by AP2 is shown setting NAV (OBS share) 1524. Then any participating STAs send their Share offer/request, exemplified by stations STA1' sending Share offer/request 1526. The transmission of Share offer/request 1526 sets NAV (share offer/request) 1528 and the AP2 obtains the information from the share offer/request and acknowledges receipt 1530. AP2 then broadcasts a sharing offer/request 1532 to the participating non-AP STAs to update them on the latest shareability information in its own BSS (BSS2). After that, the AP unicasts an OBSS Sharing STAs frame 1534 to another AP (AP1) of the other BSS (BSS1) indicating the non-AP STAs shareability in BSS2. Sending of the OBSS Sharing STAs frame 1534 sets NAV (OBSS share).

AP1 receives the OBSS sharing STAs frame and sends (e.g., broadcasts) a Sharing offers/request 1536 to update the non-AP STAs of BSS1 with the latest shareability information on all participating non-AP STAs of BSS2.

Figure 47:
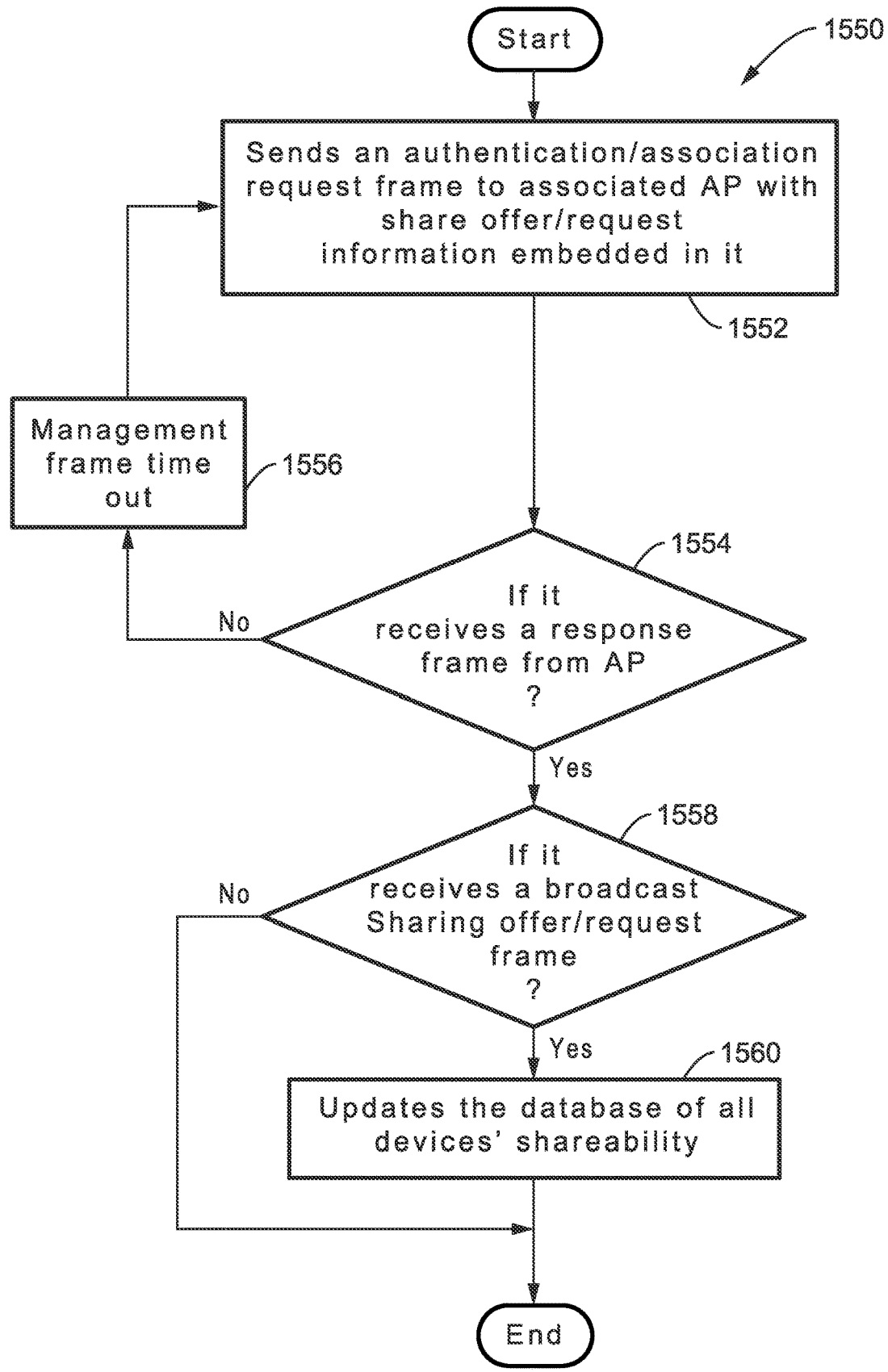
FIG. 47 is a flow diagram of a TXOP share offer/request setup substage of the semi-static protocol for OBSS scenario, which is processed on non-AP STA level according to at least one embodiment of the present disclosure.

7.6.1.1. TXOP Share Offer/Request Setup Substage of Semi-Static Protocol for OBSS Scenario, Processed at Non-AP STA Level FIG. 47 illustrates an example embodiment 1150 of the TXOP share offer/request setup substage of the semi-static protocol for OBSS scenario, which is processed on non-AP STA level.

The non-AP STA sends 1552 an authentication/association request frame to its associated AP with share offer/request information embedded in it. Check 1554 determines if the non-AP STA has received a response from the AP. If the response has not been received within the allotted time period, then a management frame time out occurs 1556 with execution returning to block 1552.

Otherwise, check 1558 determines if the non-AP STA has received a broadcast sharing offer/request frame. If the condition is not met, then processing ends. Otherwise, at block 1560 the non-AP STA updates the shareability database for all devices.

7.6.1.2. TXOP Share Offer/Request Setup Substage of the Semi-Static Protocol for the OBSS Scenario on the AP Level.

Figure 48:
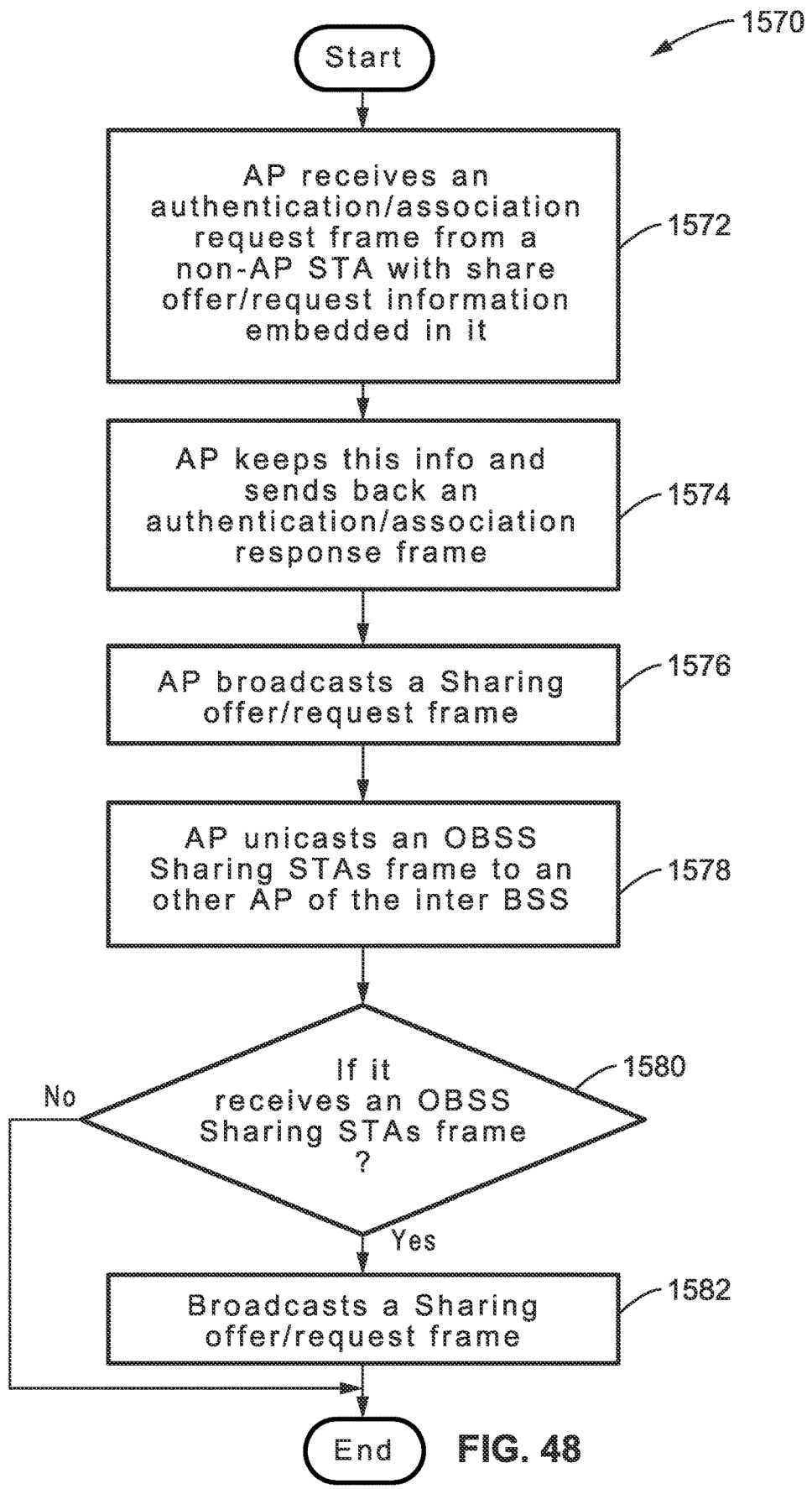
FIG. 48 is a flow diagram of a TXOP share offer/request setup substage of the semi-static protocol for OBSS scenario at the AP level according to at least one embodiment of the present disclosure.

FIG. 48 illustrates an example embodiment 1570 of the TXOP share offer/request setup substage of the semi-static protocol for OBSS scenario (on the AP level).

The AP receives 1572 an authentication/association request frame from a non-AP STA with the share offer/request information embedded in it. The AP retains 1574 the shareability information and sends back an authentication/association response frame to the non-AP STA.

Then the AP broadcasts 1576 a Sharing offer/request frame to update the latest shareability information to all non-AP STAs in its BSS (BSS1). After that, the AP unicasts 1578 an OBSS Sharing STAs frame to another AP (AP2) of the other BSS (BSS2) which indicates the non-AP STAs shareability of BSS1.

Check 1580 determines if an OBSS sharing STAs frame has been received. If the OBSS sharing STAs frame is not received, then processing ends. Otherwise, after AP2 receives the OBSS Sharing STAs frame from the other BSS, it broadcasts 1582 a Sharing offer/request frame to update non-AP STAs of BSS1 on the latest shareability information about the non-AP STAs of BSS2.

7.6.2. TXOP Holder Configuration Setup Substage of the Semi-Static Protocol

Figure 49:
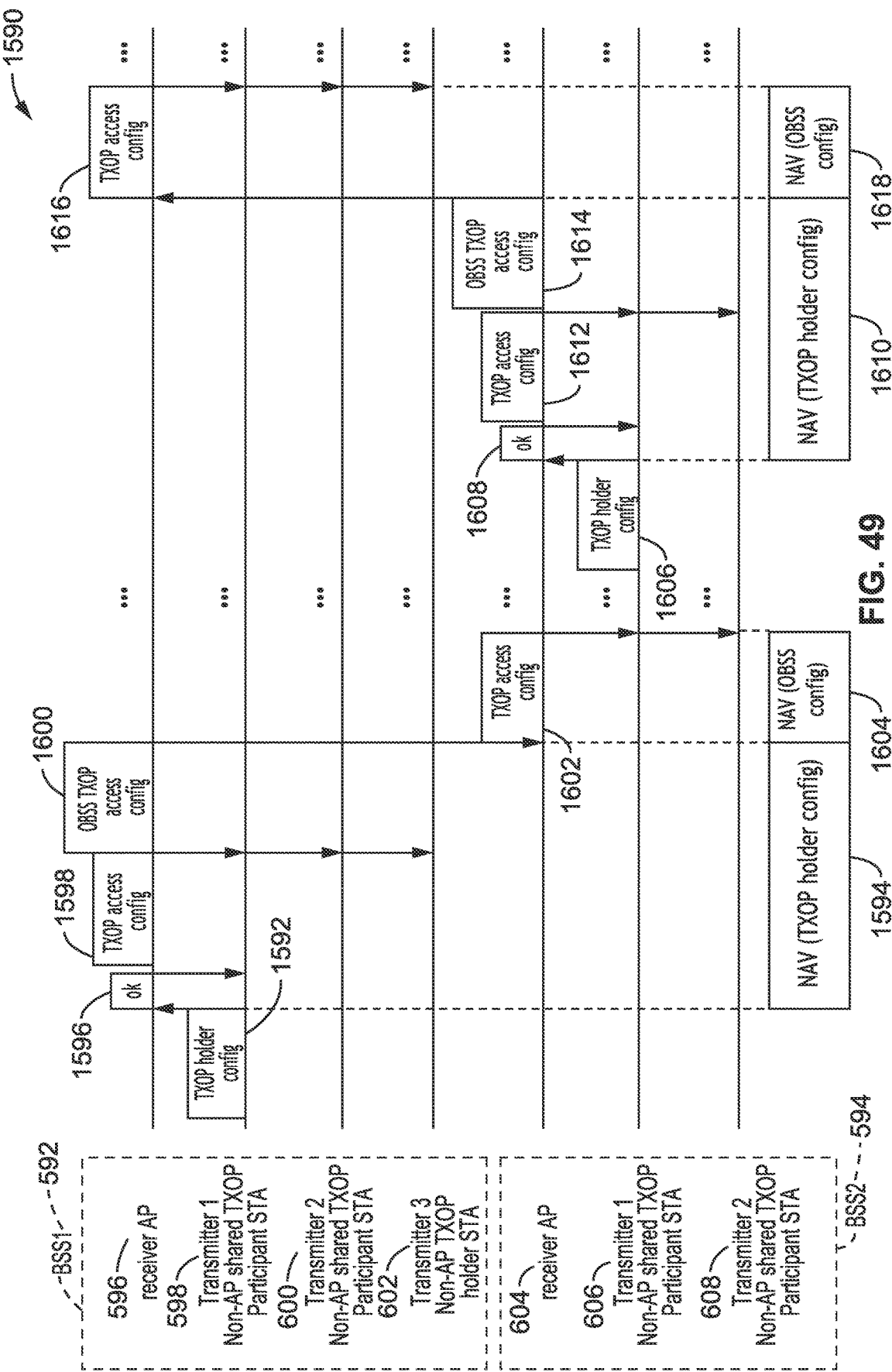
FIG. 49 is a communication sequence diagram of a TXOP holder configuration setup substage of the semi-static protocol for OBSS scenario according to at least one embodiment of the present disclosure.

FIG. 49 illustrates an example embodiment 1590 of the TXOP holder configuration setup substage of the semi-static protocol for OBSS scenario. As in many of the prior figures, interactions are shown between STAs across a first BSS (BSS1) 592, containing AP1 596, and non-AP STA1 598, non-AP STA2 600 and non-AP STA3 602. A second BSS (BSS2) 594 is shown with AP2 604, non-AP STA1' 606 and non-AP STA2' 608.

The non-AP TXOP holder STA first sends a TXOP holder configuration frame 1592 to the associated AP and indicates the schedule and distribution of channel access resources to other non-AP shared TXOP participant STAs. A NAV (TXOP holder configuration) 1594 starts at that time. It should be noted that in this stage, STAs just prepare for the future shared TXOP, there is no actual TXOP holder. Each STA could be a potential TXOP holder in the future, so each one should let others know how it wants to allocate the TXOP to other shared STAs if it becomes the TXOP holder in the future.

After an AP receives the TXOP holder configuration frame from the non-AP STA, the AP retains the shared TXOP access scheduling information and sends back a response frame 1596 to the non-AP STA. Then, the AP broadcasts a TXOP access configuration frame 1598 to update the latest TXOP access scheduling information to all non-AP STAs in its BSS (BSS1). After that, the AP (AP1) unicasts an OBSS TXOP access configuration frame 1600 to another AP (AP2) of the other BSS (BSS2), indicating shared TXOP access scheduling of BSS2. A NAV (OBSS configuration) 1604 starts at that time.

Once AP2 receives the OBSS TXOP access configuration frame, it broadcasts a TXOP access configuration frame 1602 to update its non-AP STAs of BSS2 with the latest shared TXOP channel access scheduling information from BSS1.

A TXOP holder configuration frame 1606 is sent from one of the non-AP participant STAs to the associated AP (AP2) with schedule and distribution of channel access resources to other non-AP shared TXOP participant STAs. A NAV (TXOP holder configuration) 1610 starts at that time. It should be noted that STA1 in BSS2 could also be a potential TXOP holder in the future, so it preferably informs other STAs on how it wants to schedule the shared TXOP for others in this stage.

AP2 receives and acknowledges 1608 the TXOP holder configuration frame, and sends a TXOP access configuration frame 1612 so that the participant STAs in BSS2 are updated as to the TXOP access scheduling information. Then AP2 sends an OBSS TXOP access configuration frame 1614 to AP1 in BSS1, with a NAV (OBSS configuration) 1618 commencing.

AP1 receives the OBSS TXOP access configuration frame and sends a TXOP access configuration frame 1616 to the non-AP STAs in its BSS on the latest shared TXOP channel access scheduling information from BSS2.

7.6.2.1. TXOP Holder Configuration Setup Substage of the Semi-Static Protocol for OBSS Scenario (at the Non-AP STA Level)

Figure 50:
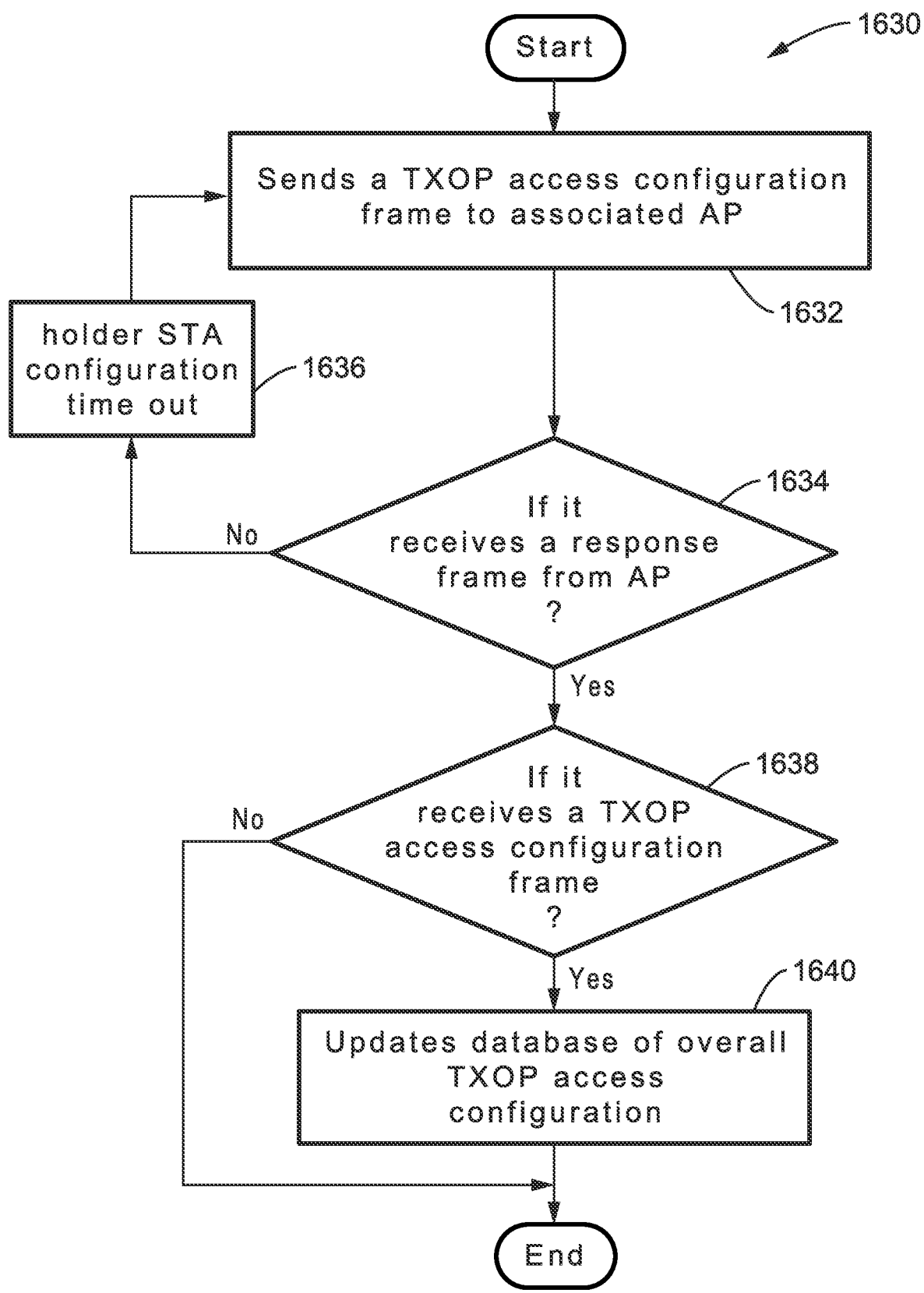
FIG. 50 is a flow diagram of a TXOP holder configuration setup substage of the semi-static protocol for OBSS scenario, which is processed on the non-AP STA level according to at least one embodiment of the present disclosure.

FIG. 50 illustrates an example embodiment 1630 of TXOP holder configuration setup substage of the semi-static protocol for OBSS scenario, which is processed on the non-AP STA level.

A non-AP STA sends 1632 a TXOP holder configuration frame to the associated AP and indicates the schedule and distribution of assigned access resources to other non-AP shared TXOP participant STAs.

Check 1634 determines if the non-AP STA receives a response from the associated AP before the TXOP holder STA configuration frame time out. If the non-AP STA doesn't receive any feedback from the associated AP before the TXOP holder STA configuration frame times out, then a holder STA configuration time out occurs 1636 and the non-AP TXOP STA retransmits 1632 the TXOP holder configuration frame.

If a non-AP STAs receives a broadcast TXOP access configuration frame from the AP, it should update 1640 the overall TXOP access configuration in its database.

7.6.2.2. TXOP Holder Configuration Setup Substage of the Semi-Static Protocol for OBSS Scenario (on AP Level)

Figure 51:
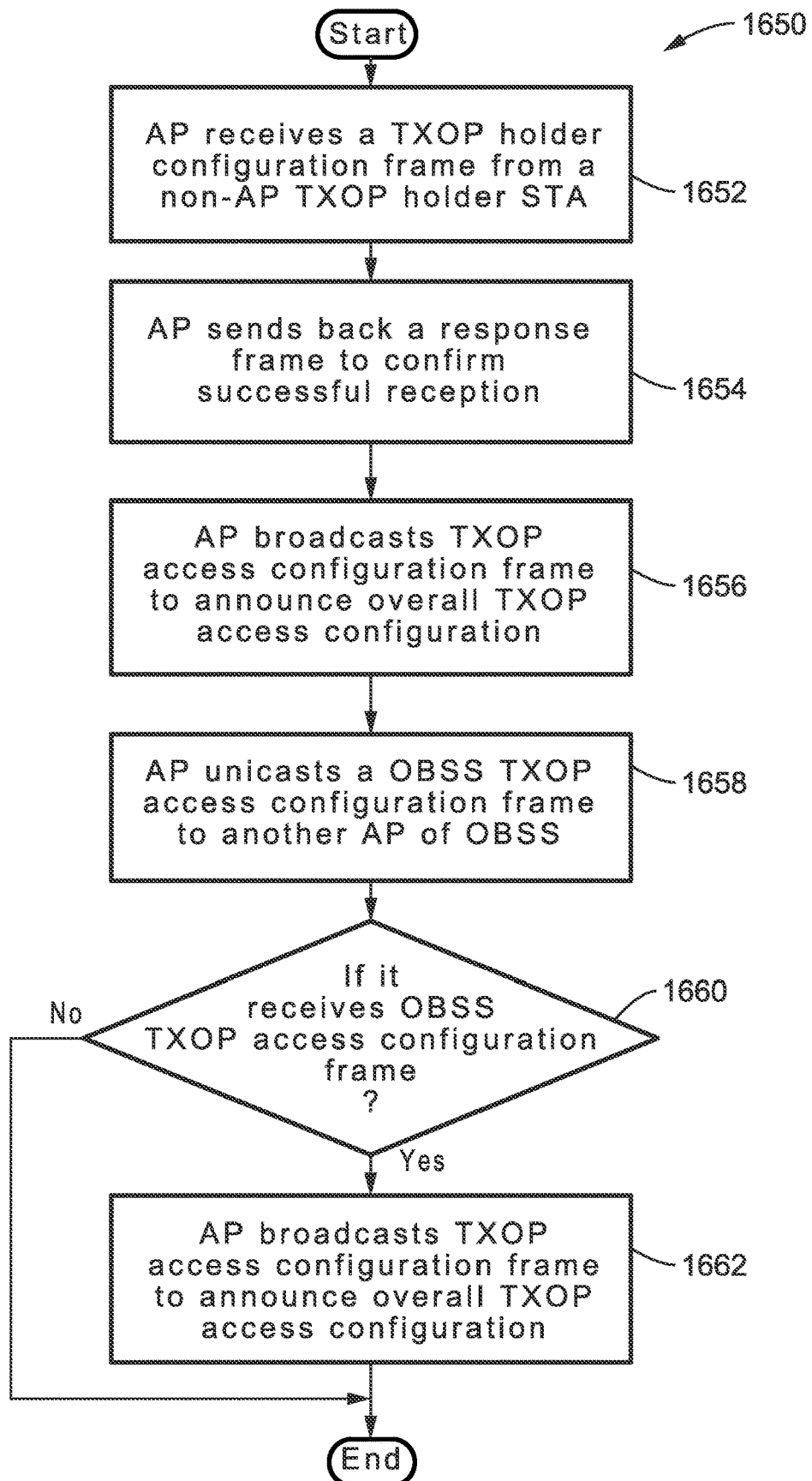
FIG. 51 is a flow diagram of a TXOP holder configuration setup substage of the semi-static protocol for OBSS scenario, which is processed at the AP level according to at least one embodiment of the present disclosure.

FIG. 51 illustrates an example embodiment 1650 of the TXOP holder configuration setup substage of the semi-static protocol for OBSS scenario, which is processed at the AP level.

After an AP receives 1652 a TXOP holder configuration frame from a non-AP STA, it retains the shared TXOP access scheduling information and sends back 1654 a response frame to the non-AP STA. Then the AP broadcasts 1656 a TXOP access configuration frame to update all non-AP STAs in its BSS (BSS1) with the latest TXOP access scheduling information.

In block 1658 the AP unicasts an OBSS TXOP access configuration frame to another AP (AP2) of the other BSS (BSS2) indicating shared TXOP access scheduling of BSS2.

Check 1660 determines whether the AP has received an OBSS TXOP access configuration frame from the AP of the other BSS. Upon this being received, the AP (in BSS2) broadcasts 1662 a TXOP access configuration frame to update all non-AP STAs of BSS2 with the latest shared TXOP access scheduling information.

7.6.3. Semi-Static TXOP Sharing (UL Initiated Shared TXOP)

Figure 52:
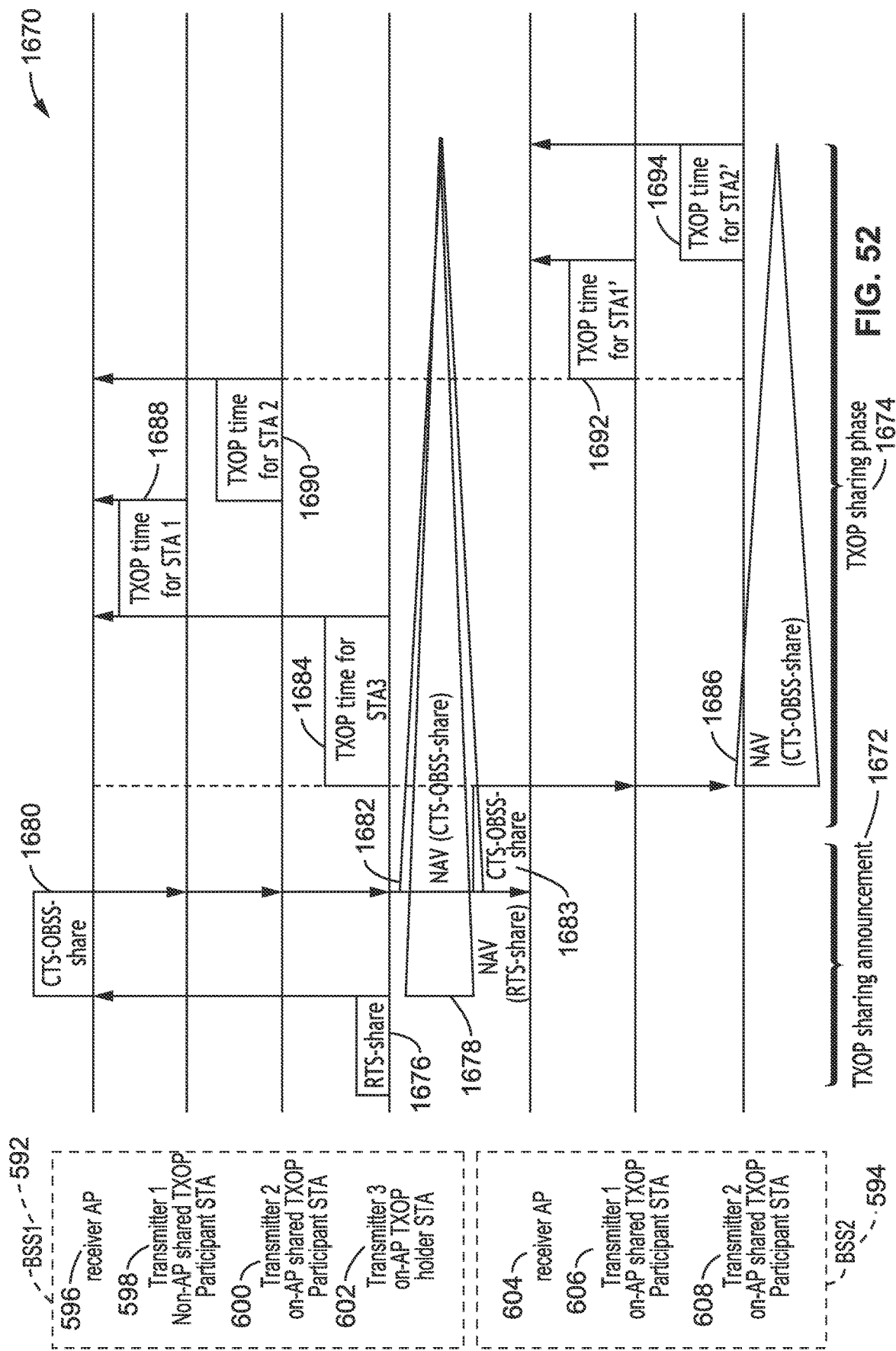
FIG. 52 is a communication sequence diagram of a semi-static TXOP sharing stage (UL initiated) according to at least one embodiment of the present disclosure.

FIG. 52 illustrates an example embodiment 1670 of a semi-static TXOP sharing stage (UL initiated). As in many of the prior figures, interactions are shown between STAs across a first BSS (BSS1) 592, containing AP1 596, and non-AP STA1 598, non-AP STA2 600 and non-AP STA3 602. A second BSS (BSS2) 594 is shown with non-AP STA1' 506 and non-AP STA2' 508.

The exchange of RTS-share and CTS-OBSS-share between the sharing STA and the AP announce that the coming TXOP can be shared according to the agreed-on configuration. In an RTS-share 1676 it is announced the starting of a shared TXOP, in which the NAV (RTS-share) 1678 is set up to protect the following shared TXOP.

The AP of BSS1 then sends a CTS-OBSS-share 1680 in which the NAV is set to protect all BSS1-AP associated STAs and the BSS2-AP to join the shared TXOP. It will be noted that this CTS-OBSS-share is sent to not only the non-AP STAs of BSS1 but also to the AP (AP2) of BSS2.

Once AP2 receives the broadcast CTS-share frame, it then broadcasts a CTS-OBSS-share frame 1683 to announce to its non-AP STAs that the coming TXOP can be shared, and NAV (CTS-OBSS-share) 1686 is set to protects all BSS2-AP associated STAs to join the shared TXOP. Once other STAs in BSS1 and BSS2 receive these CTS-OBSS-share frames from their associated APs and are willing to send the UL DATA, then they have been made aware that they are included in the sharing configuration, and these STAs can determine when to access the channel according to the previously received TXOP access configurations frame. However, the STAs in other BSSs receive CTS-OBSS-share frame not from the associated AP (e.g., but instead from the AP of BSS1), then they cannot transmit any frame during the NAV indicated in the CTS-OBSS-share.

In the figure UL DATA 1684, 1688 and 1690 are shown being sent in time slots by STA3, STA1 and STA2, respectively, to the AP of BSS1. Similarly, UL DATA 1692 and 1694 are shown being sent from slots by STA1' and STA2', respectively, to the AP (AP2) of BSS2.

It should be noted that the TXOP can be shared between UL and DL transmissions. It should also be appreciated that different types of messages may be utilized, besides those described above or in other embodiments, to be exchanged between the STA sharing its TXOP and the AP where other STAs can receive it and carry the information necessary for sharing the TXOP.

7.6.4. Semi-Static TXOP Sharing (DL Initiated Shared TXOP)

Figure 53:
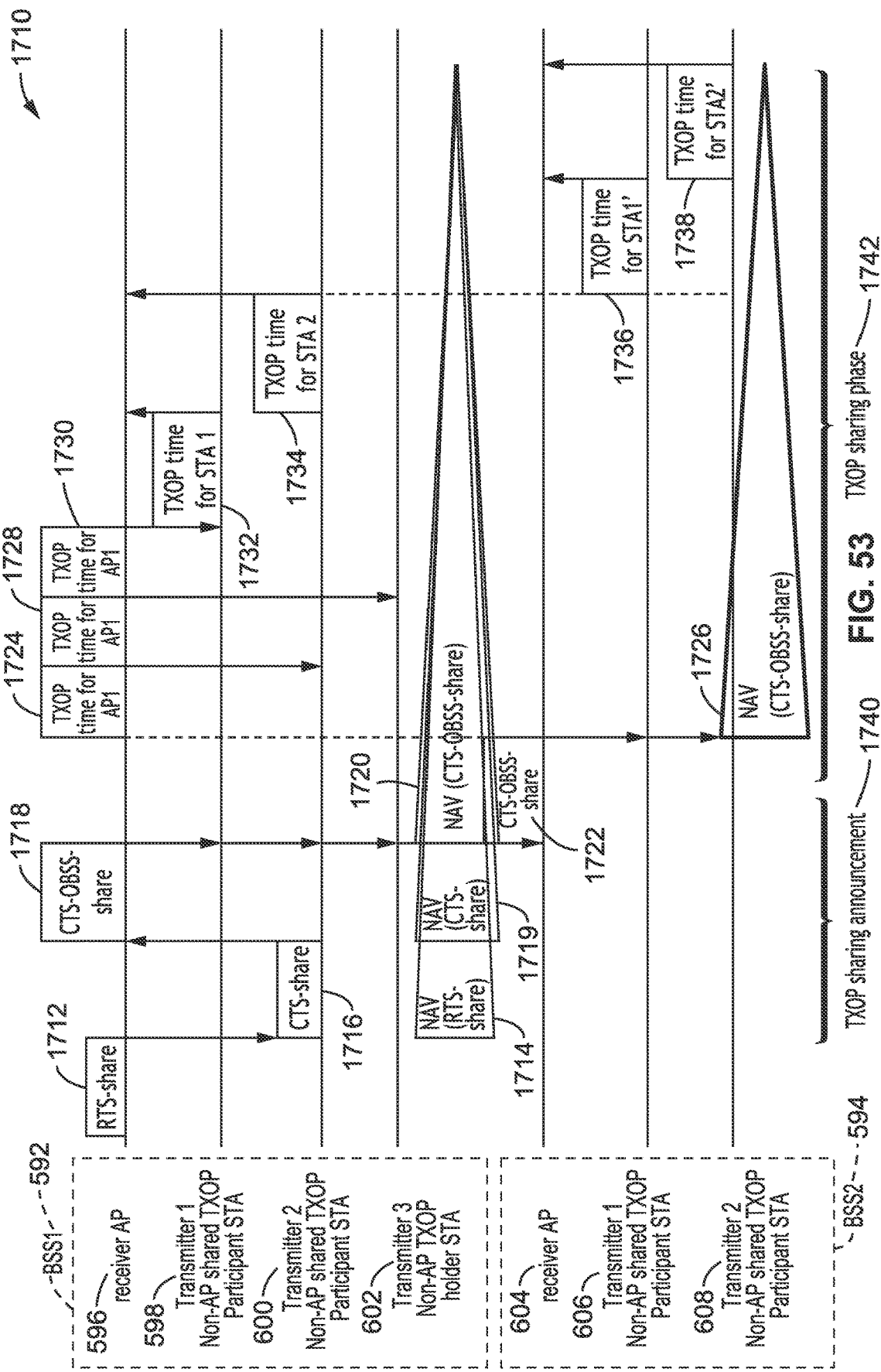
FIG. 53 is a communication sequence diagram of a semi-static TXOP sharing stage (DL initiated) according to at least one embodiment of the present disclosure.

FIG. 53 illustrates an example embodiment 1710 of the semi-static TXOP sharing stage (DL initiated). As in many of the prior figures, interactions are shown between STAs across a first BSS (BSS1) 592, containing AP1 596, and non-AP STA1 598, non-AP STA2 600 and non-AP STA3 602. A second BSS (BSS2) 594 is shown with AP2 604, non-AP STA1' 606 and non-AP STA2' 608. Two stages are depicted as a TXOP sharing announcement phase 1740 and a TXOP sharing phase 1742.

In this case, AP1 first gains the channel by sending an RTS-share frame 1712 to the destination STA, exemplified as STA2, and receives the CTS-share frame 1716 as a response to indicate the successful transmission of the RTS-share.

In the RTS-share frame it is announced the starting of a shared TXOP, and the NAV (RTS-share) 1714 is set up to protect the following shared TXOP. In the CTS-share frame the NAV (CTS-share) 1716 is setup to protect the following CTS-OBSS-share frame and the following shared TXOP duration.

Then, having received the CTS-share 1716, AP1 in BSS1 broadcasts a CTS-OBSS-share frame 1718 to its non-AP STAs and to the AP of the other BSS (AP2 of BSS2 in this example), and sets NAV (CTS-OBSS-share) 1720 to protect all BSS1-AP associated STAs and the BSS2-AP to join shared TXOP.

Once AP2 receives a broadcast CTS-share frame, it also broadcasts a CTS-OBSS-share frame 1722 to its non-AP STAs to announce that the coming TXOP can be shared, and NAV (CTS-OBSS-share) 1726 is set in BSS2 to protect all BSS2 associated STAs to join the shared TXOP provided by BSS1.

Once the APs of each BSS send out CTS-share frames, then the STAs are made aware when to access the channel and how long each may occupy the channel for DL transmissions because of the sharing configurations performed in the previous stage.

Once other STAs in BSS1 and BSS2 receive CTS-OBSS-share frames from their associated APs and are willing to send the UL DATA, these STAs have obtained information on when to access the channel according to the previously received TXOP access configurations frame. The figure depicts the AP of BSS1 initiating DL DATA transmissions 1724, 1728 and 1730 to STA2, STA3 and STA1, respectively, after which STA1 and STA2 perform UL DATA transmissions 1732 and 1734 according to the schedule.

In BSS2 STA1' and STA2' are seen sending UL DATA 1736 and 1738 to their associated AP (AP2 of BSS2) according to the schedule. However, the STAs in the other BSS receive the CTS-OBSS-share frame not from the associated AP, so they cannot transmit any frame during the NAV indicated in the CTS-OBSS-share.

It should be noted therefore, that the TXOP can be shared between UL and DL transmissions. It should also be appreciated that the protocol can utilize different messages for exchanging sharing information between the TXOP holder STA, the AP and the non-AP STAs so that sufficient information is passed to enable sharing the TXOP.

8. Frame and Field Formats

The following data field diagrams are provided by way of example and not limitation. It should be appreciated that the information being conveyed can be sent in other message fields, without departing from the teachings of the present disclosure. Furthermore, new fields may be added without limitation based on the proposed frame formats to enable the AP to perform as shared TXOP holder/participant to join the shared TXOP process in the DL/UL initiated sharing scenario, and without departing from the teachings of the present disclosure.

8.1. STA TXOP Shareability Element

FIG. 54 illustrates an example embodiment 1750 of a STA TXOP shareability element format. The STA TXOP shareability element is contained in the management frames, such as an authentication request frame or association request frame, and is used by each non-AP STA to inform the associated AP about its TXOP shareability. An Element ID field identifies the element and in this instance indicates this is a STA TXOP shareability element. If an AP receives an authentication or association request frame with an Element ID field set to the STA TXOP Shareability element, then the AP records all the share offer/request information of each STA, as indicated in the STA Info field, and sends back an authentication or association response frame to indicate a successful reception. A Length field indicates the number of octets in the element excluding the Element ID and Length fields. STA Information fields (e.g., 1-n) provide information about the STAs, and are described in FIG. 55.

FIG. 55 illustrates an example embodiment 1770 of a STA Information field format from FIG. 54. The AID subfield contains the AID of the device for which TXOP shareability is indicated. The TXOP share holder subfield indicates the shareability of this device as the TXOP holder. The TXOP share holder subfield is set to a first state (e.g., 1) to indicate that this device, operating as the TXOP holder, is willing to share its TXOP with other devices. The TXOP share holder subfield is set to a second state (e.g., 0) to indicate that this device, operating as the TXOP holder, is not willing to share its TXOP with other devices.

The TXOP share participant subfield indicates the shareability of this device as the TXOP participant. The TXOP share participant subfield is set to a first state (e.g., 1) to indicate that this device, operating as the shared TXOP participant, is willing to join the following TXOP as shared by the TXOP holder. Otherwise, if the TXOP share participant subfield is set to a second state (e.g., 0), then it indicates that this device, operating as the shared TXOP participant, is not willing to join the following TXOP that was shared by the TXOP holder.

8.2. Access Request Information Element

FIG. 56 illustrates an example embodiment 1790 of Access request information element format. The fields include an Element ID field which identifies the element, and in this example it indicates that this is an Access Request information element. A Length field indicates the number of octets in the element excluding the Element ID and Length fields. Allocation control fields are shown (1-n), with the subfields for one of these being illustrated in FIG. 57.

FIG. 57 illustrates an example embodiment 1810 of an Allocation Control field. An Allocation Control subfield indicates the TID and the Allocation Type, whose format is depicted in FIG. 58. A Source AID subfield is set to the AID of the device (e.g., STA or AP) that initiates channel access during access allocation. A Destination AID subfield is set to the AID of the device (e.g., STA or AP) that the source targets during the allocation. The Random Access Counter subfield indicates a range of time, in microseconds, that can be selected to do random access count down. Possible values range from 1 to 32,767. If a device receives a frame with the AccessRequestType subfield set as Random access slot allocation and the Random Access Counter subfield is not zero, the device should randomly access channel within the range of time indicated in the Random Access Counter subfield.

The Allocation Start subfield indicates the access start time of the device. It contains the lower 4 octets of the TSF at the time the access starts.

The following should be noted for a Dedicated Access Slot Allocation type and Dedicated Transmission Access Allocation type:

Allocation Start_$n$=Allocation Start_1+($n$−1)*Allocation block duration

Allocation Start_1: the Allocation start time for the 1st allocation

Allocation Start_n: the Allocation start time for the nth allocation

The Allocation Block Duration subfield indicates the duration, in microseconds, of a time block for which the access allocation is made.

For a Dedicated Access Slot Allocation type, the block duration should be smaller, such as with a possible value range of from 1 to 32,767.

For a Dedicated Transmission Access Allocation type, the block duration should be larger, such as with possible values ranging from 1 to 65,535.

An Allocation Block Duration subfield indicates the duration, in microseconds, of a time block for which the access allocation is made. For a Dedicated Access Slot Allocation type, the block duration should be smaller, with a possible example value range of from 1 to 32,767.

For a Dedicated Transmission Access Allocation type, the block duration should be larger, with a possible example value range being from 1 to 65,535.

FIG. 58 illustrates an example embodiment 1830 of a Allocation Control subfield.

The Traffic Identifier (TID) subfield identifies the Traffic Class (TC) or Traffic Stream (TS) for the allocation request or grant. The Allocation Type subfield defines the access request type, with possible values listed in Table 1 for Access Request Type subfield values. It should be appreciated that different values can be used to represent these states, and others exemplified herein, without departing from the present disclosure.

8.3. Sharing Offer/Request Frame

FIG. 59 illustrates an example embodiment 1850 of a Sharing offer/request frame format. A Frame Control field indicates the type of frame. A Duration field contains NAV information used for CSMA/CA channel access. An RA field contains a MAC address for the recipient of the frame. A TA field contains a MAC address of the STA that transmitted the frame. A BasicServiceSet ID (BSSID) subfield is the MAC address of the AP that the non-AP STA is associated to. If the BSSID indicates the same MAC address as the TA, it means the sharing offer/request frame is delivering shareability information for the non-AP STAs from the internal BSS; otherwise, it means the sharing offer/request frame is delivering shareability information for a non-AP STAs from an inter BSS whose ID is indicated by BSSID.

One or more STA Share Offer/Request info fields are shown (e.g., 1-n) which indicate the TXOP share offer/request information of the device format and having subfields described in FIG. 60.

FIG. 60 illustrates an example embodiment 1870 of Sharing offer/request info field format. The Priority field indicates the priority of the traffic that is stored in the buffer of the DATA source, which can be used by the TXOP holder for the TXOP access scheduler design. The STA AID is the AID of the non-AP TXOP participant.

The TXOP Share Request subfield is set to a first state (e.g., 1) indicating that the device, with its AID indicated in the STA AID field, is requesting to share in the TXOP. Otherwise, this subfield is set to a second state (e.g., 0). When a device receives a Share offer/request frame that has the TXOP Share Request field set in the first state, the device is aware that the device with AID indicated in the STA AID field is willing to participant in the shared TXOP.

The TXOP Share Offered subfield being set to a first state (e.g., 1) indicates that the device with AID indicated in the STA AID field is willing to be the TXOP holder and share its TXOP with other devices. Otherwise, this subfield is set to a second state (e.g., 0). When the device receives a Share offer/request frame that has the TXOP Share Offered field set in this first state (e.g., 1), then the device is aware that the device with AID indicated in the STA AID field is willing to share its TXOP.

8.4. RTS-Share and CTS-Share Frames

The non-AP TXOP holder senses the channel is free (unoccupied) and obtains (grabs) the channel by sending an RTS-share frame to the associated AP to indicate that it is willing to share the TXOP. Then, the AP receives an RTS-share frame from a shared TXOP holder and responds with a CTS-share frame to indicate successful reception. In order to make inquiry about TXOP participants that reside in another BSS, the AP of the TXOP holder BSS sends a CTS-share frame to the other AP of the OBSS which indicates the MAC address of this other AP, in the RA field of the CTS-share frame. Then the other AP in the OBSS receives the CTS-share frame sent by the AP of the shared TXOP holder BSS, and it responds with an ACK frame to indicate successful reception.

Figure 61:
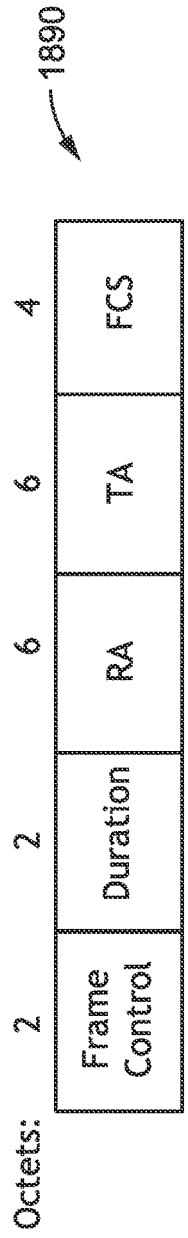
FIG. 61 is a data field diagram of an RTS-Share frame according to at least one embodiment of the present disclosure.

FIG. 61 illustrates an example embodiment 1890 of a RTS-Share frame. A Frame Control field indicates the type of frame. A Duration field contains NAV information used for CSMA/CA channel access. By way of example and not limitation, the duration field is encoded with Bits 0-13 set up for a short NAV duration value, which cannot be equal to 0; Bits 14-15 are set as 01, which is a code indicating this as sharing information. If the sharing information is indicated in the duration value field in this RTS share frame then this indicates that the TXOP is shareable. An RA field contains an address for the recipient of the frame. A TA field contains an address for the STA transmitting the frame. The above fields are part of the MAC header.

Figure 62:
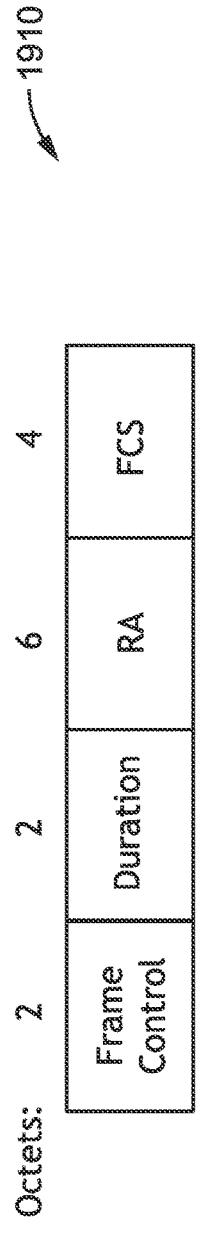
FIG. 62 is a data field diagram of CTS-Share frame according to at least one embodiment of the present disclosure.

FIG. 62 illustrates an example embodiment 1910 of a CTS-Share frame. A Frame Control field indicates the type of frame. A Duration field contains NAV information used for CSMA/CA channel access. An RA field contains an address for the recipient of the frame. The above fields are part of the MAC header.

8.5. TXOP Offer Frame

Figure 63:
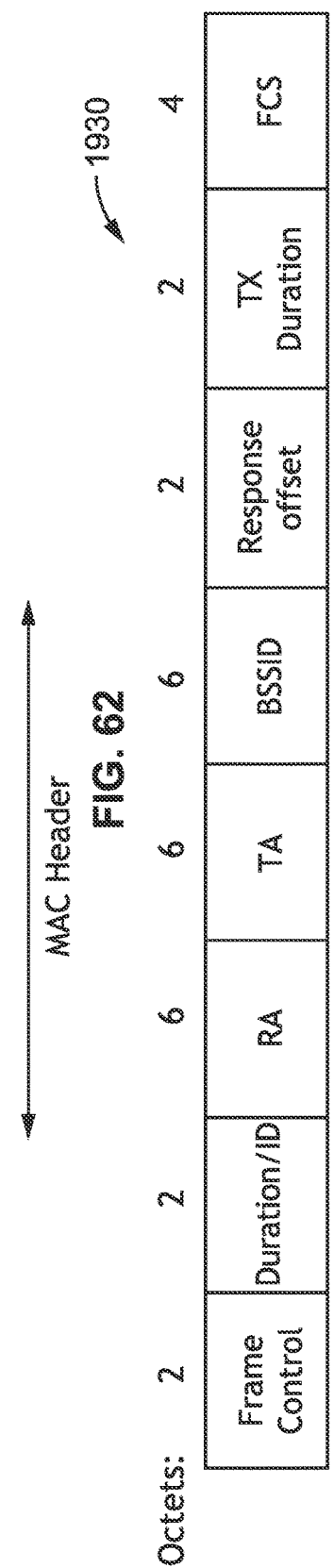
FIG. 63 is a data field diagram of TXOP Offer Frame according to at least one embodiment of the present disclosure.

FIG. 63 illustrates an example embodiment 1930 of a TXOP Offer Frame. In the TXOP participant acquirement stage the non-AP TXOP holder broadcasts the TXOP Offer frame to indicate that it is willing to share its TXOP and makes inquiry to determine other devices that are willing to join the shared TXOP. Once another device receives this TXOP Offer frame, it responds with a newly designed frame Access Request frame to indicate it is willing to join the following shared TXOP with the non-AP TXOP holder.

In the TXOP schedule and access stage, after the non-AP TXOP holder successfully transmits UL DATA, it unicasts a TXOP Offer frame to the next TXOP share participant STA, indicating the transmission duration for the next TXOP share participant STA. After receiving the unicast TXOP Offer frame, the non-AP shared TXOP participant STA sends UL Data to the associated AP within the transmission duration.

The Duration/ID field contains the AID value assigned to the shared TXOP holder who transmitting the frame. The RA field is set to the address of the STA to which this frame is directed. If this frame is broadcast, then the RA field should be set with an address to indicate broadcasting address, for example FF:FF:FF:FF:FF:FF. The TA field value is the MAC address of the shared TXOP holder which transmits this frame.

The BSSID field is a new field added in the present disclosure, with the BSSID indicating the BSSID of the sender of this TXOP offer frame. When a device receives a broadcast TXOP offer frame which is sent from a different BSS (indicated by the BSSID), it doesn't do anything. The Response Offset field indicates that the receiver of this frame should send a response frame, e.g., an Access Request frame to the non-AP TXOP holder within this time offset once it has received the TXOP Offer frame.

The TX Duration field value indicates that the time period which the receiver of this frame can utilize but should not extend past when transmitting data upon it receiving the TXOP Offer frame.

8.6. Access Request Frame

Figure 64:
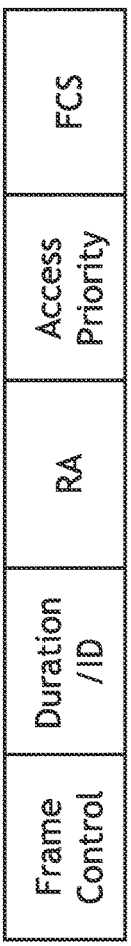
FIG. 64 is a data field diagram of Access request frame format according to at least one embodiment of the present disclosure.

FIG. 64 illustrates an example embodiment 1950 of Access request frame format. A Frame Control and Duration/ID field is shown as in previous message examples. The value of the RA field of the Access request frame is the MAC address of the received TXOP offer frame source. An Access Priority subfield provides information on the priority of the access and is described in FIG. 65.

FIG. 65 illustrates an example embodiment 1970 of an Access priority subfield format. An Access Category Information (ACI) Bitmap subfield indicates access categories for which the buffer status is reported. Each bit of the ACI Bitmap subfield is set to a first state (e.g., 1) to indicate that the buffer status of the corresponding AC is included in the Queue Size All subfield, and set to a second state (e.g., 0) otherwise (except if the ACI Bitmap subfield is 0 and the Delta TID subfield is 3) then it indicates the buffer status of all eight TIDs. A Delta TID subfield, used in combination with the values of the ACI Bitmap subfield, indicate the number of TIDs for which the STA is reporting the buffer status.

An Access Category Information (ACI) High subfield indicates the ACI of the Access Category (AC) for which the Access Request Frame is indicated in the Queue Size High subfield. A Scaling Factor (SF) subfield indicates the unit SF, in octets, of the Queue Size High and Queue Size All subfields. A Queue Size High subfield indicates the amount of buffered traffic, in units of SF octets, for the AC identified by the ACI High subfield. A Queue Size All subfield indicates the amount of buffered traffic, in units of SF octets, for all the ACs identified by the ACI Bitmap subfield.

8.7. TXOP Access Scheduler Frame

The non-AP TXOP holder unicasts a TXOP Access Scheduler frame to the non-AP shared TXOP participant STAs, indicating the transmit duration for each of the STAs. Once the STAs receives the TXOP Access Scheduler frame, they will send DATA to the associated AP in different time slots as indicated in the Allocation Control field in the Access request information element as embedded in the beacon frame. The TXOP Access Scheduler frame can also be unicast from one AP to an other AP in the OBSS, indicating the shard TXOP access allocation to the STAs in that OBSS.

FIG. 66 illustrates an example embodiment 1990 of a TXOP access scheduler frame format. A Frame Control and Duration/ID field is shown as in previous message examples. An RA field is set to an address for a STA which is to receive this frame. A TA field contains the address for the STA transmitting this frame.

The BSSID field is a newly added field in the present disclosure. The BSSID indicates the BSSID of the sender of this TXOP access scheduler frame. When an AP receives a TXOP access scheduler frame which is sent from its own BSS (indicated in the BSSID), it performs within its own BSS. When an AP receives a TXOP access scheduler frame which is sent from a different BSS (indicated in the BSSID), it is made aware that the TXOP access schedule was determined by another device from a different BSS. This AP should respond with a frame e.g., ACK to indicate the successful reception and then forwards the TXOP access scheduler to the STAs in its own BSS by sending TXOP offer frame or TXOP access scheduler frame, or broadcasts the TXOP scheduler frame, and provides an indication of itself as the destination of the UL DATA transmission in the shared TXOP.

The TXOP Access Allocation Info field defines the TXOP allocation information for the dedicated transmission access.

FIG. 67 illustrates an example embodiment 2010 of an Access Allocation Info subfield as was seen in FIG. 66. The TID subfield identifies the TC or TS for the TXOP access allocation. The Allocation Type subfield defines the TXOPs access scheduler type, with possible values listed in Table 1, with certain bits being set to specific state(s) (e.g., B4 and B5 are set as 1 and 0, respectively) to indicate that this is a dedicated transmission access allocation. The Source AID subfield is set to the AID of the device that initiates channel access during access allocation. The Destination AID subfield is set to the AID of the device that the TXOP access scheduler frame is directed to during the allocation.

8.8. Broadcast TXOP Schedule Format

The non-AP TXOP holder device or the AP broadcasts a Broadcast TXOP Scheduler frame to the TXOP share participant devices, indicating the transmit Duration for each of the shared TXOP participant devices. Once a STA receives a Broadcast TXOP Scheduler frame, it will send DATA to the associated AP in different time slots as indicated in the Broadcast TXOP Scheduler frame.

FIG. 68 illustrates an example embodiment 2030 of a Broadcast TXOP schedule frame format. A Frame Control and Duration/ID field is shown as in previous message examples.

The BSSID field is a newly added field in the present disclosure. The BSSID indicates the BSSID of the sender of this Broadcast TXOP scheduler frame. When a device receives a broadcast TXOP scheduler frame which is sent from its own BSS (indicated by the BSSID), it performs TXOP sharing within its own BSS. When a device receives a broadcast TXOP scheduler frame which is sent from a different BSS (indicated by the BSSID), then the TXOP duration of a first BSS can be shared by a second BSS.

An RA field is set to an address for recipient STA which is to receive this frame. A TA field contains the address for the STA transmitting this frame. One or more STA TXOP schedules (e.g., 1-n) are seen containing TXOP schedules, and having subfields shown in FIG. 69.

FIG. 69 illustrates an example embodiment 2050 of a Broadcast TXOP Schedule field format. An Allocation Control subfield indicates the TID and the Allocation Type as seen in FIG. 70. The Source AID subfield is set to the AID of the device that initiates channel access during access allocation. The Destination AID subfield is set to the AID of the device that the source device targets as a destination during allocation.

An Allocation Start subfield indicates the start time of the access, and by way of example contains the lower 4 octets of the TSF at the time the access starts. For a Dedicated Transmission Access Allocation type as defined in the Allocation Control subfield format, the following holds.

$$\text{Allocation Start}_n = \text{Allocation Start}_1 + (n-1)*\text{Allocation block duration.}$$

Allocation Start$_1$: the Allocation start time for the 1st STA TXOP schedule.

Allocation Start$_n$: the Allocation start time for the nth STA TXOP schedule.

The Allocation Block Duration subfield indicates the duration, in microseconds, of a time block for which the access allocation is made.

For a Dedicated Access Slot Allocation type, the block duration should be smaller, by way of example and not limitation, having a possible value range of from 1 to 32,767. For a Dedicated Transmission Access Allocation type, the block duration should be larger (e.g., double the size) for example having a possible value range of from 1 to 65,535.

FIG. 70 illustrates an example embodiment 2070 of an Allocation Control subfield format showing of a Traffic Identifier (TID) as an identifier used to classify a packet, and an Allocation Type subfield.

8.9. Shared TXOP Participant Announcement Frame Format

FIG. 71 illustrates an example embodiment 2090 of a Shared TXOP participant announcement frame format. A Frame Control and Duration/ID field are shown as in previous message examples, along with an RA field and TA field such as previously described. Fields are included for one or more STA TXOP participants, the example showing 1-n participants. The subfields within this participant field are seen in FIG. 72.

FIG. 72 illustrates an example embodiment 2110 of a Shared TXOP participant field format. The Source AID subfield is set to the AID that initiates channel access during access allocation. The Destination AID subfield is set to the AID of the STA that the source STA targets during the allocation. An ACI Bitmap subfield indicates the access categories for which the buffer status is reported. A Delta TID subfield is used in combination with the values of the ACI Bitmap subfield, to indicate the number of TIDs for which the STA is reporting the buffer status.

An Access Category Information (ACI) High subfield indicates the ACI of the Access Category (AC) for which the Access Request frame is indicated in the Queue Size High subfield. A Scaling Factor (SF) subfield indicates the unit SF, in octets, of the Queue Size High and Queue Size All subfields. A Queue Size High subfield indicates the amount of buffered traffic, in units of SF octets, for the AC identified by the ACI High subfield. A Queue Size All subfield indicates the amount of buffered traffic, in units of SF octets, for all the ACs identified by the ACI Bitmap subfield.

8.10. Request TXOP Offer Frame

The shared TXOP holder STA unicasts the Request TXOP Offer frame to the associated AP, indicating the partial of the obtained TXOP it is willing to share with another specific STA. The AP receiving the Request TXOP Offer frame from the shared TXOP holder STA should unicast a TXOP offer frame to the specified STA to trigger UL transmission within the specified shared TXOP duration as indicated in the Request TXOP Offer frame.

FIG. 73 illustrates an example embodiment 2130 of Request TXOP offer frame format. A frame control field, Duration/ID field, RA field and TA field are shown as in previous message examples. The Duration/ID field indicates the AID of the STA that the AP should send the TXOP Offer frame to, while the TX duration field indicates to the next STA what the maximum duration the shared STA could use to complete UL DATA transmission.

8.11. Request TXOP Access Scheduler Frame

The shared TXOP holder STA unicasts the Request TXOP Access Scheduler frame to the associated AP, indicating the schedule of allocating a portion (partial TXOP) of the obtained TXOP to other STAs in its own BSS or in the OBSS. The AP receives the Request TXOP Access Scheduler frame from its associated non-AP STA should either trigger UL transmission in its own BSS with sending TXOP access scheduler frame or Broadcast TXOP Schedule frame or unicast a TXOP access scheduler frame to another AP of the OBSS.

FIG. 74 illustrates an example embodiment 2150 of a Request TXOP Access Scheduler frame format. A Frame Control field and Duration field, RA field and TA field are shown as in previous message examples.

The BSSID field is a new field added in the present disclosure. The BSSID indicates the BSSID of the sender of this TXOP access scheduler frame. A device sends the Request TXOP access scheduler frame should indicate the TXOP access scheduler is for the devices in its own BSS or in other BSS by indicating in the BSSID. If a device receives the Request TXOP access scheduler frame with BSSID the same as its own BSS, it performs TXOP sharing in the same BSS. Otherwise, if the BSS is of another BSS, then the device sends a TXOP access scheduler to the AP of the other BSS indicated by the BSSID of the Request TXOP access scheduler frame and allows another BSS to share the TXOP interval.

At least one STA TXOP Access Request field is included, the example is shown with TXOP Access Requests 1 through n. Subfields within the TXOP Access Request field are described in FIG. 75.

FIG. 75 illustrates an example embodiment 2170 of a STA TXOP Access Request field format. At least one STA TXOP Access Request field is included, the example is shown with TXOP Access Requests 1 through n. Subfields within the TXOP Access Request field are described in FIG. 76.

FIG. 76 illustrates an example embodiment 2190 of an Allocation Control subfield format having a TID subfield and an Allocation Type subfield.

8.12. Share Offer/Request Frame Format

Each non-AP STA can send the Share Offer/Request frame to the associated AP to indicate its share offer/request information. The AP should respond by sending a frame e.g., ACK to indicate successful reception.

FIG. 77 illustrates an example embodiment 2210 of a Share Offer/Request frame format. The Share Offer/Request frame has a Frame Control field, Duration/ID field, RA field and TA field as in some previous message examples. A Share Offer/Request field indicates the TXOP share offer/request information of the non-AP STA, and is described in FIG. 78.

FIG. 78 illustrates an example embodiment 2230 of a Share Offer/Request Info frame format. A Priority field indicates the priority of the traffic stored in the buffer of the STA, which can be used by the TXOP holder for the TXOP access scheduler. A TXOP Share Request is set to a first state (e.g., 1) to indicate that this STA is requesting a shared TXOP time; otherwise TXOP Share Request is set to a second state (e.g., 0). When the AP receives a Share Offer/Request frame that has the TXOP Share Request field set to the first state, the AP is made aware (can determine) that the STA who sent this frame is willing to participant in the shared TXOP. A TXOP Duration Request indicates the amount of time in microseconds that the STA requests in the shared TXOP. The AP will broadcast this information in the Sharing Offers/Request frame. A TXOP Share Offered value is set to a first state (e.g., 1) indicating that this STA is willing to be the TXOP holder and share its TXOP with other STAs; otherwise the value is set to a second state (e.g., 0). When the AP receives a Share Offer/Request frame that has the TXOP Share Offered field set to the first state, the AP is made aware that the STA who sent this frame is willing to share the TXOP with other STAs. A TXOP Duration Offered subfield indicates the amount of time in microseconds that the TXOP holder STA is willing to share with other STAs, and the AP will broadcast this information in the Sharing Offers/Request frame.

8.13. Sharing Offers/Request Frame Format

The AP broadcasts the sharing offers/request frame and responds after receiving the Share Offer/Request frame from a STA. The Sharing Offers/Request frame has a specific STA Share Offer/Request field designed for that STA, which indicates the TXOP share/request information.

FIG. 79 illustrates an example embodiment 2250 of a Sharing Offers/Request frame format, having a Frame Control field, Duration field, RA field and TA field as in some previous message examples. Multiple STA Share Offer/Requests may be contained in the frame, depicted here as STA Share/Requests 1 through n. The format of a STA Share Offer/Request is seen in FIG. 80.

FIG. 80 illustrates an example embodiment 2270 of a STA Share offer/request info field format. A Priority field indicates the priority of the traffic that storage in the TXOP participant's buffer, which can be used by the TXOP holder for the TXOP access scheduler design. A STA Address field is the MAC address of the TXOP participant, which can be used by the TXOP holder to assign the TXOP access start time and duration for the specific TXOP participant. A STA AID field is the AID of the TXOP participant. The remaining fields of TXOP Share Request, TXOP Duration Request, TXOP Share Offered and TX Duration Offered were described in regard to FIG. 78.

8.14. OBSS Sharing STAs Frame

The AP of one BSS unicasts the OBSS Sharing STAs frame to another AP of the OBSS, indicating the latest obtained share offer/request information from STAs in the first BSS.

FIG. 81 illustrates an example embodiment 2290 of an OBSS Sharing STAs Frame. A Frame control field indicates the type of frame. A Duration field contains NAV information used for CSMA/CA channel access. The STA Share offer/request info field format is defined in Sharing Offer/Request frame. The RA field is the received BSSID of this trigger frame. The TA field is the transmitted BSSID of this trigger frame.

Once the AP receives the OBSS sharing STAs frame, it will check the share offer/request information (as indicated in the STA Share Offer/Request fields) as well as the transmitted BSSID (indicated in TX field), and broadcast this information within its BSS.

8.15. TXOP Holder Configuration Frame

Each non-AP STA can send the TXOP Holder Configuration frame to the associated AP to indicate its allocation and schedule of a partial of the obtained TXOP to be shared with specific STAs. The AP should respond by sending a frame e.g., ACK to indicate the successful reception.

FIG. 82 illustrates an example embodiment 2310 of Sharing Configuration frame format. The Frame Control, Duration, RA and TA fields are as described for other previous frames. A TXOP share offered field indicates the overall TXOP duration that the TXOP holder STA is willing to share with other device.

Figure 85:
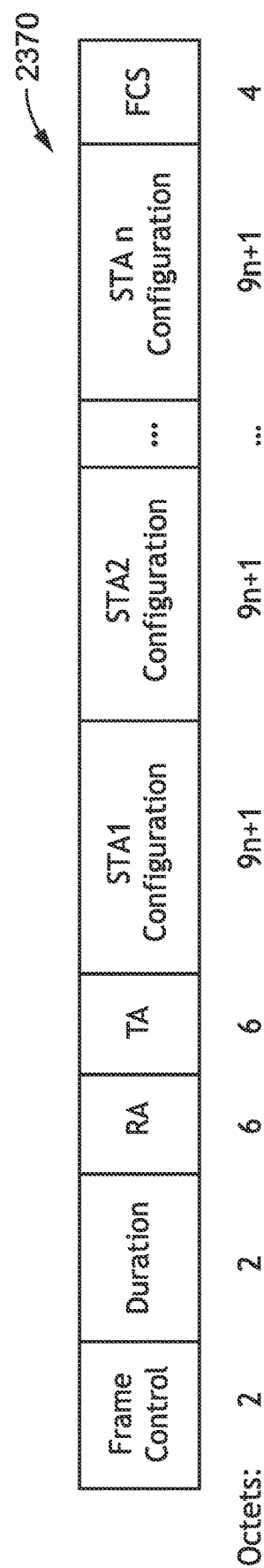
FIG. 85 is a data field diagram of a Sharing configurations frame format according to at least one embodiment of the present disclosure.

A STA TXOP Access Allocation field indicates the TXOP access start time and duration for each specific device. After the AP receives the Sharing configuration frame from the potential TXOP holder, the AP will record this STA TXOP Access Allocation information and broadcast it with the sharing configurations frame (FIG. 85).

FIG. 83 illustrates an example embodiment 2330 of a STA TXOP Access Allocation field format. A STA Address field indicates the MAC address of the TXOP holder. This information will be used by the AP to set the TXOP Holder MAC Address in the sharing configurations frame (FIG. 85).

Figure 86:
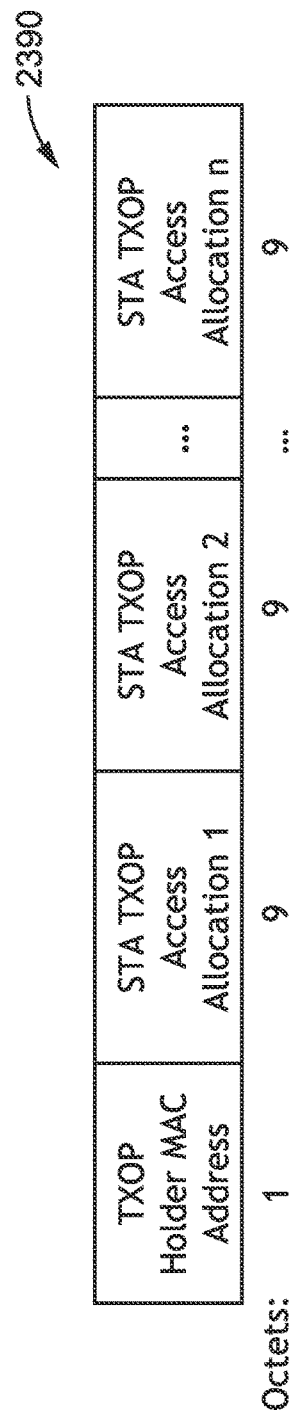
FIG. 86 is a data field diagram of a STA Configuration field format according to at least one embodiment of the present disclosure.

A Participant Address field indicates the MAC address of the TXOP participant. The AP uses this information to set the Participant Address subfield in the STA Configuration field (FIG. 86).

An Allocation Start field indicates the start time of TXOP transmission of the participant device. An Allocation block field duration indicates the duration of the TXOP transmission of the participant device.

Figure 84:
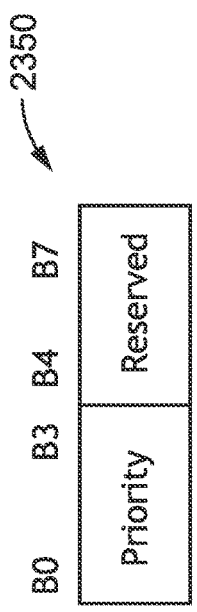
FIG. 84 is a data field diagram of an Allocation Control subfield format having a Priority subfield according to at least one embodiment of the present disclosure.

FIG. 84 illustrates an example embodiment 2350 of an Allocation Control subfield format having a Priority subfield, exemplified with four bits, which indicates the traffic priority of the buffered data.

8.16. TXOP Access Configurations Frame

The AP broadcasts the Sharing Configurations frame to all the STAs with indications of the configuration for each device in the STA Configuration field.

FIG. 85 illustrates an example embodiment 2370 of a Sharing configurations frame format. The AP broadcasts the Sharing Configurations frame to all the STAs and indicates the configuration for each device in the STA Configuration field.

The Sharing Configuration frame has a Frame Control field, Duration field, RA field and TA field as in some previous message examples. The frame contains one or more configurations for specific stations, depicted as STA1 through to STA n. The STA Configuration subfield is described in FIG. 86.

FIG. 86 illustrates an example embodiment 2390 of a STA Configuration field format. The TXOP Holder MAC Address indicates the MAC address of the TXOP holder. One or more STA TXOP Access Allocation fields (e.g., 1-n) is the same as defined in FIG. 82.

8.17. OBSS TXOP Access Configuration

FIG. 87 illustrates an example embodiment 2410 of an OBSS TXOP access configurations frame format. The OBSS TXOP access configuration frame is sent from one AP to another AP of the OBSS to indicate the complete allocation or the configuration of TXOP duration to share with the STAs in the destination OBSS in the future.

The BSSID field indicates the ID of the BSS that generate the TXOP access configuration information. The BSSID is the MAC address of the AP in that BSS. The remaining fields are as described for FIG. 85.

8.18. CTS-OBSS-Share Frame

FIG. 88 illustrates an example embodiment 2430 of a CTS-OBSS-share frame. A TA field indicates the MAC address of the device that transmits this CTS-OBSS-share frame. The TXOP holder field indicates the MAC address of the shared TXOP holder.

In the semi-static scenario, after the shared TXOP starts (i.e., receives an RTS-share from the shared TXOP holder or initiates the sharing process as a shared TXOP holder itself) the AP in shared TXOP holder BSS broadcasts the CTS-OBSS-share frames which includes the MAC address of the shared TXOP holder. When the other AP in the shared TXOP participant BSS receives the CTS-OBSS-share frame, it broadcasts another CTS-OBSS-share frame and includes the MAC address of the shared TXOP holder.

The devices that receive the CTS-OBSS-share should transmit DATA within the assigned time slot according to the configuration if it meets the following conditions: (1) the transmitter of the CTS-OBSS-share frame is associated with the AP, and (2) the device is aware of the shared TXOP holder indicated in the TXOP holder field and aware of the assigned time slot corresponding to this TXOP holder as configured in the previous configuration stage.

If the devices that receive the CTS-OBSS-share frame are not from the associated AP, they cannot transmit any frame during the NAV indicated in the CTS-OBSS-share.

9. General Scope of Implementations

The enhancements described in the presented technology can be readily implemented within various wireless network communication stations. It should also be appreciated that wireless network communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

It will also be appreciated that the computer readable media (memory storing instructions) in these computations systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Implementations and embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

The following generally describes how any non-AP STA or AP obtaining a TXOP in a wireless LAN network can share its TXOP with others in the same BSS, or in an overlapping BSS (OBSS).

Different solutions are provided to achieve this performance in different scenarios, which can be classified as following:

A shared TXOP holder obtaining a TXOP in a wireless LAN network can share its TXOP with other devices not only in the same BSS but also in the OBSS in time domain. Different solutions are provided to achieve this performance in different scenarios, which can be classified as following:

(1) Dynamic scenarios: (With or without AP as coordinator).

Each STA exchanges the share offer/request information with the associated AP by embedding this info in the management frames (such as authentication, authentication response, association, association response, beacon or any other frames). After this, the APs in both the shared TXOP BSS and the OBSS further exchange the TXOP shareability information (with an OBSS Sharing STAs frame) and broadcast the sharing info to the OBSS (through a sharing offer/request frame).

Then, the non-AP TXOP holder inquires other share TXOP participants, w/ or w/o the coordination of AP, in its BSS (i.e., unicast or broadcast TXOP offer frame by the shared TXOP holder if w/o AP as coordinator or unicast or broadcast TXOP offer frame by the AP if w/ AP as the coordinator) to identify the shared TXOP participant in the shared TXOP (with receiving the access request frame from the shared TXOP participant). Then the AP from the shared TXOP holder BSS further initiate the inquire process in the OBSS (by sending a CTS-share frame to the AP of the OBSS). The AP of the OBSS inquires the other STAs in the OBSS (by exchanging TXOP offer and access request frames) to identify the shared TXOP participants in the OBSS and sends their information back (in a shared TXOP participant announcement frame) to the AP of the shared TXOP BSS. AP of the shared TXOP BSS forwards the info of all shared TXOP participants to the shared TXOP holder.

In the end, the non-AP TXOP holder allocates and assign the channel access resource with or w/o the coordination of AP (by sending or triggering AP to send TXOP offer frame or TXOP access scheduler frame or broadcasted TXOP schedule frame) to all the shared TXOP participants of the shared TXOP BSS. Then, the AP in the shared TXOP holder BSS forward the assignment of the TXOP access to the shared TXOP participants in the OBSS (by unicasting TXOP access scheduler frame to the AP of the OBSS, who further forwards this info to the STAs in the OBSS by sending TXOP offer frame or TXOP access scheduler frame or broadcasted TXOP schedule frame).

The APs can also be the shared TXOP holder or join the shared TXOP as other shared TXOP participants. Thus, the TXOP can be shared among AP and STAs, based on UL initiated or DL initiated transmission as was described in our previous application regarding Coordinated WiFi Stations with shared TXOP among DL and UL over time domain.

(2) Semi-Static Scenarios:

The shared TXOP holder device can decide on the other devices from the same BSS or from an OBSS accessing its TXOP and the accessing time allocation and order of access in a semi-static way through exchanging messages with the coordination of AP in single BSS/OBSS scenario.

The non-AP STAs runs a setup procedure to setup the semi-static configurations:

Non-AP STAs exchange share offer/request info with each other through the coordination of AP in its BSS (by sending the share offer/request frame to the AP and the AP broadcasts the updated share offer/request info to the BSS with a sharing offers/request frame). The AP further forwards this shareability information to another AP of the OBSS (with an OBSS Sharing STAs frame). Then, the other AP broadcasts the received shareability information in the OBSS (with broadcasting sharing offers/request frame).

Non-AP STAs exchange the configuration, semi-static TXOP sharing schedule with each other through the coordination of AP in each BSS (by sending TXOP holder configuration frame to the associated AP and the AP broadcast the updated shared TXOP access configuration info in its BSS with a TXOP access configuration frame). The AP further forwards the shared TXOP access scheduler to another AP of the OBSS (by sending an OBSS TXOP access configuration frame). Then, the other AP broadcasts the received shared TXOP access scheduler information in the OBSS (with a TXOP access configuration frame).

Non-AP STAs from both the TXOP holder BSS and the OBSS send UL DATA to the associated AP in the advertised time slot after receiving the notice (e.g., broadcasted CTS-OBSS-share frame) from the associated AP indicating it's ready for the reception.

The AP can also be the shared TXOP holder or join the shared TXOP as other shared TXOP participants. Thus, the TXOP can be shared among AP and STAs, based on UL initiated or DL initiated transmission as was in a prior application describing Coordinated WiFi Stations with shared TXOP among DL and UL over time domain.

An apparatus for wireless communication in a network, the apparatus comprising: (a) a wireless communication circuit, as a wireless station (STA) operating as either an Access Point (AP) or a non-AP STA, is configured for wirelessly communicating over at least one channel with other wireless stations (STAs), which are either APs or non-AP STAs, on a local area network (WLAN) in its reception area; (b) a processor coupled to said wireless communication circuit for operating on the WLAN as a station; (c) a non-transitory memory storing instructions executable by the processor for the STA in time sharing a TXOP of a TXOP holder STA with other STAs in the same basic service set (BSS), or in an overlapping BSS (OBSS); and (d) wherein said instructions, when executed by the processor, perform steps comprising: (d)(i) exchanging messages in preparation for sharing a TXOP with other STAs in the BSS and/or OBSS; (d)(ii) gaining access to the channel and informing other STAs that an upcoming TXOP is available to be shared; and (d)(iii) sending messages to other STAs about duration and time of channel access for the upcoming shared TXOP, wherein these messages are communicated after gaining channel access for a dynamic scenario, or communicated during step (d)(i) for a semi-static configuration in which the duration and time of channel access is not allowed to change dynamically.

An apparatus for wireless communication in a network, the apparatus comprising: (a) a wireless communication circuit, as a wireless station (STA) operating as either an Access Point (AP) or a non-AP STA, is configured for wirelessly communicating over at least one channel with other wireless stations (STAs), which are either APs or non-AP STAs, on a local area network (WLAN) in its reception area; (b) a processor coupled to said wireless communication circuit for operating on the WLAN as a station; (c) a non-transitory memory storing instructions executable by the processor for the STA in time sharing a TXOP of a TXOP holder STA with other STAs in the same, or different, Basic Service Set (BSS); and (d) wherein said instructions, when executed by the processor, perform steps comprising: (d)(i) exchanging messages with an Access Point (AP) of the BSS informing and/or gaining approval for sharing its TXOP with other STAs in the BSS; (d)(ii) gaining access to the channel and communicating that an upcoming TXOP is available to be shared by broadcasting a message from the STA as TXOP holder to other STAs, in one or more BSS, either directly from the TXOP holder STA or by communicating through an AP, indicating that the STA as TXOP holder is willing to share the TXOP with other STAs; (d)(iii) exchanging messages with other STAs, either in the BSS of the TXOP holder STA or in another BSS, either directly to the TXOP holder or indirectly through the AP, in determining which STAs are requesting time, as participating STAs, in the upcoming TXOP which is available to be shared; and (d)(iv) sending messages to participating STAs, which are operating as either APs or non-AP STAs, informing them of the duration and time of channel access for the upcoming TXOP which is being shared.

An apparatus for wireless communication in a network, the apparatus comprising: (a) a wireless communication circuit, as a wireless station (STA) operating as either an Access Point (AP) or a non-AP STA, is configured for wirelessly communicating over at least one channel with other wireless stations (STAs), which are either APs or non-AP STAs, on a local area network (WLAN) in its reception area; (b) a processor coupled to said wireless communication circuit for operating on the WLAN as a station; (c) a non-transitory memory storing instructions executable by the processor for the STA in time sharing a TXOP of a TXOP holder STA with other STAs in the same, or different, Basic Service Set (BSS); and (d) wherein said instructions, when executed by the processor, perform steps based on the semi-static scenario, comprising: (d)(i) exchanging messages through the coordination of the associated Access Point (AP) for informing and/or gaining approval, and then scheduling for sharing its TXOP with other STAs in the TXOP sharing BSS and the TXOP shared OBSS; (d)(ii) gaining access to the channel and informing other STAs that an upcoming TXOP is available to be shared by broadcasting a message through the coordination of the associated APs in the TXOP sharing BSS and the TXOP shared OBSS; and (d)(iii) receiving a message indicating a shared TXOP is started and accessing the channel during the allocated shared TXOP time as predetermined in step (d)(i).

The apparatus of any preceding implementation, wherein non-AP STAs can autonomously share and schedule TXOP access with other STAs when they have obtained the channel, instead of waiting for scheduling and assignment from the AP.

The apparatus of any preceding implementation, wherein the TXOP is shared with other STAs in the same BSS, and also sharing the TXOP with other STAs of an OBSS.

The apparatus of any preceding implementation, wherein determining which STAs are requesting time as participating STAs is performed by receiving requests through random channel access or dedicated access to slots in the channel.

The apparatus of any preceding implementation, wherein the sharing of the TXOP is performed in said dynamic scenario as either: (A) without an AP as coordinator in the sharing BSS of the TXOP holder STA, (B) or with an AP as coordinator in the sharing BSS of the TXOP holder STA; and wherein whether or not an AP of the sharing BSS is used as coordinator, the other AP in the OBSS, which is the BSS that the TXOP holder STA shares a portion of the TXOP with, always performs as a coordinator.

The apparatus of any preceding implementation, wherein said dynamic scenario comprises: (A) exchanging share offer/request information with the associated AP by embedding this offer or request information into management frames; (B) the APs in both the TXOP sharing BSS and the TXOP shared OBSS exchanging TXOP share offer/request information (with an OBSS Sharing STAs frame) and further broadcast the share offer/request info from the sharing BSS to the STAs in the shared OBSS (through a sharing offer/request frame).

The apparatus of any preceding implementation, wherein said TXOP shareability information is indicated in a STA TXOP shareability element which indicates if the STA, which sent the frame with the STA TXOP shareability element, will offer a portion of its TXOP to others if it becomes a TXOP holder or request others TXOP if it will be a TXOP participant.

The apparatus of any preceding implementation, wherein said management frames are selected from the group of message frames consisting of authentication request frame, authentication response frame, association request frame, association response frames, and beacon frame, and any other frames exchanges between non-AP STAs and AP.

The apparatus of any preceding implementation, wherein non-AP STAs can autonomously share and schedule TXOP access with other STAs when they have obtained the channel, instead of waiting for scheduling and assignment from the AP; and wherein non-AP STAs do not require an AP to initiate UL transmissions for a shared TXOP; wherein if a non-AP STA senses that the channel is unoccupied and the STA has data to be transmitted to the AP, it does not need to wait until receiving a trigger frame from the associated AP to join the shared TXOP for UL transmission; and wherein a non-AP STA does not have to wait for the AP to schedule and distribute available channel resources between this non-AP STA which has obtained the channel and the other non-AP STAs.

The apparatus of any preceding implementation, wherein in said semi-static scenario, each STA predetermines the allocation/schedule of a portion of its TXOP to share with other STAs in its own BSS and/or in its OBSS that request a shared TXOP duration; and wherein each STA broadcasts this schedule configuration information with the coordination of APs.

The apparatus of any preceding implementation, wherein when a STA receives a message indicating a shared TXOP is started by a shared TXOP holder, it shall use the allocated TXOP duration assigned by this shared TXOP holder based on the predetermined schedule obtained in step (d)(i) of Claim 11.

The apparatus of any preceding implementation, wherein a STA can restart exchanging of share offer/request information with others in its own BSS and in its OBSS at any time; and wherein a STA can reset or update its predetermined schedule at any time and broadcast the new schedule configuration through the coordination of APs.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

It will also be noted that each of the above apparatus implementations can also be described in the context of a computer-implemented protocol for wireless communications between stations (STAs) on a network.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

AccessRequestType subfield values

| Bit 4 | Bit 5 | Meaning |
| --- | --- | --- |
| 0 | 0 | Random access slot allocation |
| 0 | 1 | Dedicated access slot allocation |

TABLE 1-continued

AccessRequestType subfield values

| Bit 4 | Bit 5 | Meaning |
|---|---|---|
| 1 | 0 | Dedicated transmission access allocation |
| 1 | 1 | Reserved |

What is claimed is:

1. An apparatus for wireless communication in a network, the apparatus comprising:
(a) a wireless communication circuit, as a wireless station (STA) operating as either an Access Point (AP) or a non-AP STA, is configured for wirelessly communicating over at least one channel with other wireless stations (STAs), which are either APs or non-AP STAs, on a local area network (WLAN) in its reception area;
(b) a processor coupled to said wireless communication circuit for operating on the WLAN as a station;
(c) a non-transitory memory storing instructions executable by the processor for the STA in time sharing a transmit opportunity (TXOP) of a TXOP holder STA with other STAs in the same basic service set (BSS), or in an overlapping BSS (OBSS); and
(d) wherein said instructions, when executed by the processor, perform steps comprising:
(i) exchanging messages in preparation for sharing a TXOP with other STAs in the BSS and/or OBSS;
(ii) gaining access to the channel and informing other STAs that an upcoming TXOP is available to be shared; and
(iii) sending messages to other STAs about duration and time of channel access for the upcoming shared TXOP, wherein these messages are communicated after gaining channel access for a dynamic scenario, or communicated when exchanging messages in preparation for sharing a TXOP with other STAs in the BSS and/or OBSS for a semi-static configuration in which the duration and time of channel access is not allowed to change dynamically.

2. The apparatus of claim 1, wherein non-AP STAs can autonomously share and schedule TXOP access with other STAs when they have obtained the channel, instead of waiting for scheduling and assignment from the AP.

3. The apparatus of claim 1, wherein the TXOP is shared with other STAs in the same BSS, and also sharing the TXOP with other STAs of an OBSS.

4. An apparatus for wireless communication in a network, the apparatus comprising:
(a) a wireless communication circuit, as a wireless station (STA) operating as either an Access Point (AP) or a non-AP STA, is configured for wirelessly communicating over at least one channel with other wireless stations (STAs), which are either APs or non-AP STAs, on a local area network (WLAN) in its reception area;
(b) a processor coupled to said wireless communication circuit for operating on the WLAN as a station;
(c) a non-transitory memory storing instructions executable by the processor for the STA in time sharing a transmit opportunity (TXOP) of a TXOP holder STA with other STAs in the same, or different, Basic Service Set (BSS); and
(d) wherein said instructions, when executed by the processor, perform steps comprising:
(i) exchanging messages with an Access Point (AP) of the BSS informing and/or gaining approval for sharing its TXOP with other STAs in the BSS;
(ii) gaining access to the channel and communicating that an upcoming TXOP is available to be shared by broadcasting a message from the STA as TXOP holder to other STAs, in one or more BSS, either directly from the TXOP holder STA or by communicating through an AP, indicating that the STA as TXOP holder is willing to share the TXOP with other STAs;
(iii) exchanging messages with other STAs, either in the BSS of the TXOP holder STA or in another BSS, either directly to the TXOP holder or indirectly through the AP, in determining which STAs are requesting time, as participating STAs, in the upcoming TXOP which is available to be shared; and
(iv) sending messages to participating STAs, which are operating as either APs or non-AP STAs, informing them of the duration and time of channel access for the upcoming TXOP which is being shared.

5. The apparatus of claim 4, wherein determining which STAs are requesting time as participating STAs is performed by receiving requests through random channel access or dedicated access to slots in the channel.

6. The apparatus of claim 5, wherein the sharing of the TXOP is performed in said dynamic scenario in the sharing BSS of the TXOP holder STA as either: (A) without an AP as coordinator, (B) or with an AP as coordinator; and
wherein whether or not an AP of the sharing BSS is used as coordinator, the other AP in the OBSS, which is the BSS that the TXOP holder STA shares a portion of the TXOP with, always performs as a coordinator.

7. The apparatus of claim 6, wherein said dynamic scenario comprises:
(A) exchanging share offer and/or request information with the associated AP by embedding this offer or request information into management frames;
(B) the APs in both the TXOP sharing BSS and the TXOP shared OBSS exchanging TXOP share offer and/or request information, with an OBSS Sharing STAs frame, and further broadcast the share offer/request info from the sharing BSS to the STAs in the shared OBSS, through a sharing offer and/or request frame.

8. The apparatus of claim 7, wherein said TXOP shareability information is indicated in a STA TXOP shareability element which indicates that the STA, which sent the frame with the STA TXOP shareability element, will offer a portion of its TXOP to others when it becomes a TXOP holder or request others TXOP when it will be a TXOP participant.

9. The apparatus of claim 7, wherein said management frames are selected from the group of message frames consisting of authentication request frame, authentication response frame, association request frame, association response frames, and beacon frame, and any other frames exchanges between non-AP STAs and AP.

10. The apparatus of claim 4:
wherein non-AP STAs autonomously shares and schedule TXOP access with other STAs when they have obtained the channel, instead of waiting for scheduling and assignment from the AP; and
wherein non-AP STAs initiate UL transmissions for a shared TXOP without the need of an AP to perform the initiation;
wherein when a non-AP STA senses that the channel is unoccupied and the STA has data to be transmitted to the AP, the non-AP STA is not required to wait until receiving a trigger frame from the associated AP to join the shared TXOP for UL transmission; and wherein a non-AP STA does not have to wait for the AP to schedule and distribute available channel resources between this non-AP STA which has obtained the channel and the other non-AP STAs.

11. An apparatus for wireless communication in a network, the apparatus comprising:
  (a) a wireless communication circuit, as a wireless station (STA) operating as either an Access Point (AP) or a non-AP STA, is configured for wirelessly communicating over at least one channel with other wireless stations (STAs), which are either APs or non-AP STAs, on a local area network (WLAN) in its reception area;
  (b) a processor coupled to said wireless communication circuit for operating on the WLAN as a station;
  (c) a non-transitory memory storing instructions executable by the processor for the STA in time sharing a transmit opportunity (TXOP) of a TXOP holder STA with other STAs in the same, or different, Basic Service Set (BSS); and
  (d) wherein said instructions, when executed by the processor, perform steps based on the semi-static scenario, comprising:
    (i) exchanging messages through the coordination of the associated Access Point (AP) for informing and/or gaining approval, and then scheduling for sharing its TXOP with other STAs in the TXOP sharing BSS and the TXOP shared OBSS;
    (ii) gaining access to the channel and informing other STAs that an upcoming TXOP is available to be shared by broadcasting a message through the coordination of the associated APs in the TXOP sharing BSS and the TXOP shared OBSS; and
    (iii) receiving a message indicating a shared TXOP is started and accessing the channel during the allocated shared TXOP time as predetermined when exchanging messages through the coordination of the associated Access Point (AP) for informing and/or gaining approval, and then scheduling for sharing its TXOP with other STAs in the TXOP sharing BSS and the TXOP shared OBSS.

12. The apparatus of claim 11:

wherein in said semi-static scenario, each STA predetermines the allocation/schedule of a portion of its TXOP to share with other STAs in its own BSS and/or in its OBSS that request a shared TXOP duration; and wherein each STA broadcasts this schedule configuration information with the coordination of APs.

13. The apparatus of claim 11, wherein when a STA receives a message indicating a shared TXOP is started by a shared TXOP holder, it shall use the allocated TXOP duration assigned by this shared TXOP holder based on the predetermined schedule obtained when exchanging messages through the coordination of the associated Access Point (AP) for informing and/or gaining approval, and then scheduling for sharing its TXOP with other STAs in the TXOP sharing BSS and the TXOP shared OBSS.

14. The apparatus of claim 11:

wherein a STA can restart exchanging of share offer and/or request information with others in its own BSS and in its OBSS at any time; and wherein a STA can reset or update its predetermined schedule at any time and broadcast the new schedule configuration through the coordination of APs.

* * * * *